US012771621B2

(12) United States Patent
Smith

(10) Patent No.: US 12,771,621 B2
(45) Date of Patent: Oct. 20, 2026

(54) METHODS AND SYSTEMS FOR MICRO EDGE SELF PROVISIONING

(71) Applicant: VEEA INC., New York, NY (US)

(72) Inventor: Clint Smith, New York, NY (US)

(73) Assignee: VEEA INC., New York, NY (US)

( * ) Notice: Subject to any disclaimer, the term of this patent is extended or adjusted under 35 U.S.C. 154(b) by 64 days.

(21) Appl. No.: 18/760,662

(22) Filed: Jul. 1, 2024

(65) Prior Publication Data

US 2025/0007783 A1 Jan. 2, 2025

Related U.S. Application Data

(60) Provisional application No. 63/524,314, filed on Jun. 30, 2023.

(51) Int. Cl.

| | |
|---|---|
| ***H04L 41/5054*** | (2022.01) |
| ***H04L 9/40*** | (2022.01) |
| ***H04L 41/0806*** | (2022.01) |
| ***H04L 41/0823*** | (2022.01) |
| ***H04L 41/0893*** | (2022.01) |
| ***H04L 41/0894*** | (2022.01) |
| ***H04L 41/0895*** | (2022.01) |

(Continued)

(52) U.S. Cl.

CPC ...... *H04L 41/5054* (2013.01); *H04L 41/0806* (2013.01); *H04L 41/0836* (2013.01); *H04L 41/0893* (2013.01); *H04L 41/0894* (2022.05); *H04L 41/0895* (2022.05); *H04L 47/805* (2013.01); *H04L 63/062* (2013.01); *H04L 63/0876* (2013.01); *H04L 63/104* (2013.01); *H04L 63/20* (2013.01); *H04W 12/069* (2021.01); *H04W 48/18* (2013.01)

(58) Field of Classification Search

CPC . H04L 41/0893; H04L 47/805; H04L 63/062; H04L 63/0876; H04L 63/104; H04L 63/20; H04L 41/40; H04L 63/0272; H04L 63/065; H04L 41/5054; H04W 12/069

See application file for complete search history.

(56) References Cited

U.S. PATENT DOCUMENTS 10,440,043 B2 10/2019 Glenn
10,609,016 B2 3/2020 Goeringer et al.

(Continued)

*Primary Examiner* — Tonia L Dollinger
*Assistant Examiner* — Linh T. Nguyen
(74) *Attorney, Agent, or Firm* — The Marbury Law Group, PLLC

(57) ABSTRACT

A method for automated device provisioning and management in an edge computing system includes retrieving self-provisioning parameters and device credentials from a database using a processor. The method involves adding a new device, determining if the allowed device limit for a group is exceeded, removing devices if necessary, and adding devices through a top-off process if the limit is not exceeded. It forms trusted and self-service device groups, monitors and manages devices based on policies, changes services or applications, dynamically changes device group associations, and assigns virtual pre-shared keys (vPSKs) to private LANs. The method also includes creating private LANs and virtual private clouds (vPCs), sharing device credentials with upstream services, and generating and using virtual networks (vNets) for device provisioning and management.

20 Claims, 65 Drawing Sheets

(51) Int. Cl.

| | |
|---|---|
| ***H04L 47/80*** | (2022.01) |
| ***H04W 12/069*** | (2021.01) |
| ***H04W 48/18*** | (2009.01) |

(56) References Cited

U.S. PATENT DOCUMENTS

| | | | | |
|---|---|---|---|---|
| 10,944,780 | B2 | 3/2021 | Glenn | |
| 11,252,049 | B2 | 2/2022 | Scriber et al. | |
| 11,277,746 | B2 | 3/2022 | Goeringer et al. | |
| 11,316,935 | B2 | 4/2022 | Goeringer et al. | |
| 11,343,226 | B2 | 5/2022 | Goeringer et al. | |
| 11,405,789 | B1 * | 8/2022 | Wei | H04W 4/50 |
| 11,411,945 | B2 | 8/2022 | Goeringer et al. | |
| 11,502,942 | B1 * | 11/2022 | Sun | H04L 45/24 |
| 12,052,310 | B2 * | 7/2024 | Baldwin | H04L 63/0442 |
| 2012/0113867 | A1 * | 5/2012 | Georgel | H04W 40/248 370/255 |
| 2017/0262655 | A1 * | 9/2017 | Runkis | H04L 63/18 |
| 2017/0374548 | A1 * | 12/2017 | Mason | H04L 63/062 |
| 2019/0028892 | A1 * | 1/2019 | Henry | H04L 61/503 |
| 2019/0115950 | A1 * | 4/2019 | Kakinada | H04W 76/15 |
| 2022/0104102 | A1 * | 3/2022 | Amar | H04W 76/19 |
| 2022/0150696 | A1 * | 5/2022 | Rajadurai | H04W 12/03 |
| 2022/0417742 | A1 * | 12/2022 | Dey | H04W 12/069 |
| 2023/0350708 | A1 * | 11/2023 | Draznin | G06F 11/3006 |
| 2024/0113941 | A1 * | 4/2024 | Siddiqui | H04L 41/0895 |
| 2024/0118989 | A1 * | 4/2024 | Seth | G06F 9/5083 |
| 2025/0208895 | A1 * | 6/2025 | Wu | G06F 9/45558 |

* cited by examiner

| Supported | Tier 3 | Tier 2 | Tier 1 |
|---|---|---|---|
| Device Only | Primary | N/A | N/A |
| Edge Accelerated Cloud Native | N/A | Optional | Primary |
| Edge Enhanced Device Native | Primary | Optional | N/A |
| Edge Native | Primary | Primary | N/A |

FIG. 2

| Bandwidth Service Class (BSC) | GBR | Non-GBR | Rate |
|---|---|---|---|
| Class ID (1) | | | |
| **Downlink** | | | |
| Guaranteed Bit Rate | Yes | | 5Mpbs |
| Peak/Maximum Bit Rate | Yes | | 10Mbps |
| Group Aggregate Peak/Max Bit Rate | | Yes | 15Mbps |
| Device Aggregate Peak/Max Bit Rate | | Yes | 20Mbps |
| **Uplink** | | | |
| Guaranteed Bit Rate | Yes | | 1Mbps |
| Peak/Maximum Bit Rate | Yes | | 3Mbps |
| Group Aggregate Peak/Max Bit Rate | | Yes | 5Mpbs |
| Device Aggregate Peak/Max Bit Rate | | Yes | 5Mpbs |

FIG. 29A

| Group | 1 | Group ID |
|---|---|---|
| Master Class ID | 1 | Master Class ID |
| Sub Class ID 1 | 5 | For example Class ID 5 credentials used for 1st sub class ID |
| Sub Class ID 2 | 6 | For example Class ID 2 credentials used for 2nd sub class ID |

FIG. 29B

| VQOS | BSC | Level | Delay | Error Rate | Service Example |
|---|---|---|---|---|---|
| 1 | GBR | 1 | <100ms | $<10^{-2}$ | Voice Conversation |
| 2 | GBR | 2 | <150ms | $<10^{-3}$ | Live Streaming |
| 3 | GBR | 3 | <50ms | $<10^{-3}$ | Real Time Gaming |
| 4 | GBR | 4 | <300ms | $<10^{-6}$ | Video (buffered streaming) |
| 5 | Non-GBR | 5 | <100ms | $<10^{-3}$ | Interactive Gaming (Voice/Video) - live streaming |
| 6 | Non-GBR | 6 | <300ms | $<10^{-6}$ | TCP /UDP Based Applications, Video (buffered streaming), |

FIG. 29C

METHODS AND SYSTEMS FOR MICRO EDGE SELF PROVISIONING

RELATED APPLICATIONS

This application claims the benefit of priority to U.S. Provisional Application No. 63/524,314 entitled "Methods and Systems for Micro Edge Application" filed Jun. 30, 2023, the entire contents of which are hereby incorporated by reference for all purposes.

BACKGROUND

Communications service providers (CSPs) worldwide have recognized the need for computing, storage, and networking infrastructure to be placed close to the locations in which these applications are consumed. Edge computing allows applications to be run and executed at the network edge. The benefits of edge computing include reduced latency, improved throughput, context- and location-awareness, reduced backhaul data, and better security and isolation.

Edge Cloud Computing (ECC), as promoted by 5G, is meant to offer rich virtualization and multi-tenant capabilities through the partitioning of network capacity among multiple tenants as well as offering dynamic processing capabilities on-demand, which are deployed as close to the end-user as possible. 5G promises to offer a solution for delivering high-speed data to the edge of the network. The applications that 5G supports are vast; however, the use cases can fit into one of three categories: Enhanced Mobile Broadband (eMBB), Massive Machine Type Communications (MTC), and Ultra-Reliable Low Latency Communication (LLC).

Conventional edge applications are often variations of monolithic software applications that have a single database, user interface, and server-side application. However, applications deployed at the edge of the network may have unique requirements that differ from those using a cloud or monolithic architecture approach.

SUMMARY

Various aspects include methods of automated device provisioning and management in an edge computing system, which may include retrieving self-provisioning parameters and device credentials from a database, adding a new device to the system determining whether the number of devices allowed for a group may be exceeded removing a device from the group in response to determining that the number of devices exceeds the allowed limit allowing more devices to be added to the group through a top-off process in response to determining that the number of devices does not exceed the allowed limit, forming a trusted group of devices, monitoring, adding, removing, or disabling devices based on policy for the trusted group or current system requirements, forming a self-service group of devices, changing the service or application provided via the network, dynamically changing the group(s) the new device may be associated with based on various factors or conditions, assigning a vPSK to a subnetwork or private local area network (LAN) that may be assigned to a particular subscriber rather than to individual devices, creating private LANs and virtual private clouds (vPCs) within a larger network, sharing the device credentials with upstream services, and generating and using virtual networks (vNets) to provision and manage the new device.

In some aspects, retrieving the self-provisioning parameters and the device credentials from the database may include retrieving information related to account identification, device name, medium access control (MAC) address, subscription services, quality of service (QOS), service enhancement capabilities, access restrictions, and group assignments. In some aspects, adding the new device to the system may include detecting an unrecognized device attempting to connect to the network, activating a self-provisioning process in response to detecting the unrecognized device, authenticating and authorizing the unrecognized device locally, and automatically adding the unrecognized device as the new device to the edge computing system.

In some aspects, authenticating and authorizing the unrecognized device locally may include using stored credentials to verify the identity of the unrecognized device, and validating security features of the unrecognized device and compliance with network policies before granting access. In some aspects, forming a trusted group of devices may include grouping devices based on trust levels and usage patterns, using encryption and secure protocols for secure communication within the group, and modifying group membership based on device behavior and security status. In some aspects, dynamically changing the group(s) may include evaluating real-time network performance metrics and device capabilities, reassigning devices to different groups to optimize resource utilization and service delivery, and balancing network load during peak usage times by adjusting group memberships.

In some aspects, assigning a vPSK to a subnetwork or private local area network (LAN) may include generating a unique vPSK for the subnetwork, configuring devices within the subnetwork to use the shared vPSK for secure communication, and managing the vPSK to ensure it remains secure and periodically updated. In some aspects, creating private LANs and virtual private clouds (vPCs) within a larger network may include segregating network traffic to create isolated communication channels, ensuring enhanced security and performance by isolating traffic and resources, and managing the private LANs and vPCs to maintain optimal network operation. In some aspects, sharing the device credentials with upstream services for redundancy and resiliency may include transmitting device credentials to cloud-based services or other network components, ensuring device information may be backed up and recoverable in case of failures, and periodically synchronizing credentials to maintain consistency across the system.

In some aspects, implementing and using virtual networks (vNets) may include creating isolated virtual network segments within the larger edge computing system, configuring vNets dynamically to form trusted domains, providing enhanced security and control over network traffic, and establishing vNets for specific groups of devices that provide secure communication and resource management.

Further aspects may include a computing device having a processor or processing system configured with processor-executable instructions to perform various operations corresponding to the methods discussed above. Further aspects may include a computing device having various means for performing functions corresponding to the method operations discussed above. Further aspects may include a non-transitory processor-readable storage medium having stored thereon processor-executable instructions configured to cause a processor or processing system to perform various operations corresponding to the method operations discussed above.

BRIEF DESCRIPTION OF THE DRAWINGS

The accompanying drawings, which are incorporated herein and constitute part of this specification, illustrate exemplary embodiments of the claims and, together with the general description given above and the detailed description given below, serve to explain the features of the claims.

FIG. 2 is a table that illustrates the different types of edge computing tiers and the types of applications supported in each tier in accordance with some embodiments.

FIGS. 29A-29C are illustrations of table information structures that could be used by the vDA system to categorize and manage the bandwidth usage and allocation, as well as the desired QoS, for different groups or devices within the vDA network in accordance with some embodiments.

DETAILED DESCRIPTION

Figure 1A:
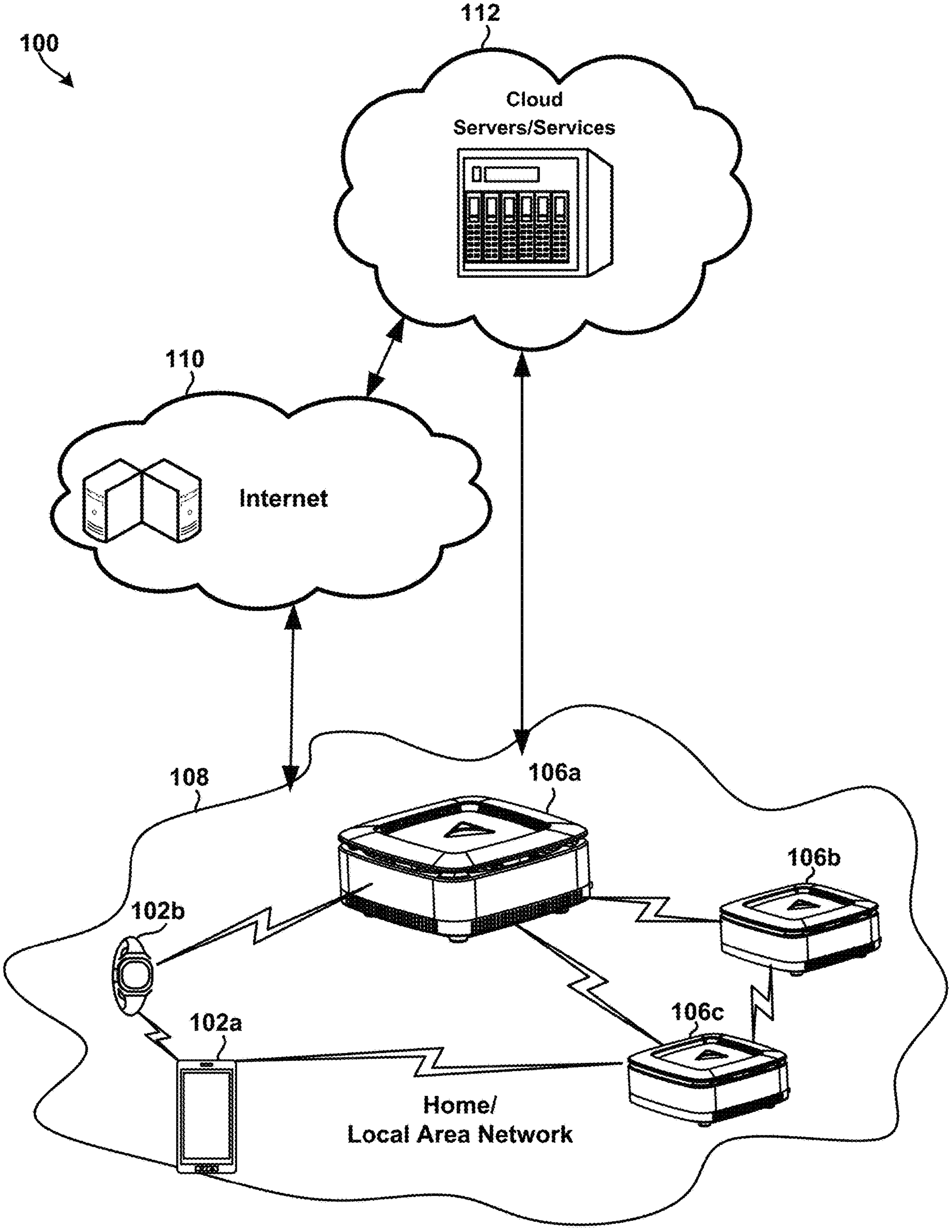
FIG. 1A is a component block diagram that illustrates an example edge computing system suitable for implementing the various embodiments.

The various embodiments will be described in detail with reference to the accompanying drawings. Whenever possible, the same reference numbers will be used throughout the drawings to refer to the same or similar parts. References made to particular examples and implementations are for illustrative purposes and are not intended to limit the scope of the claims.

The term "computing device" may be used herein to refer to any one or all of quantum computing devices, edge devices, Internet access gateways, modems, routers, network switches, access points, integrated access devices (IAD), networking adapters, personal computers, laptop computers, tablet computers, user equipment (UE), smartphones, wearable devices (e.g., smartwatches, head-mounted displays, fitness trackers), IoT devices (e.g., smart televisions, smart speakers, smart locks, smart lighting systems, smart switches, smart plugs, smart doorbells, smart cameras, smart air quality monitors, smart smoke alarms, smart security systems, smart thermostats), gaming systems, automotive heads-up displays, and other similar devices that include a programmable processor and communications circuitry for providing the functionality described herein.

The terms "end device" and "user device" may be used interchangeably herein to refer to any wireless device, mobile device, Internet-of-Things (IoT) device, smartphone, laptop computer, tablet computer, wearable device (e.g., smartwatches, head-mounted displays), and similar electronic devices that include a programmable processor, memory, and circuitry for sending and/or receiving wireless communication signals. While various embodiments may be particularly useful in wireless devices such as smartphones and tablets, the embodiments are generally applicable to any electronic device with wireless communications capabilities and a programmable processor suitable for executing software applications.

The term "container" is used herein to refer to a software component that supports virtualization technology, allows the abstraction (or virtualization) of computing resources, and/or separates software applications from their underlying infrastructure. For example, a container may be one of a plurality of isolated user-space instances operating on the kernel, each of which operates under the illusion of having full or exclusive access to the processors, peripherals, memory, and I/O of the computing system. Application programs running inside a container may only see the container's contents and devices assigned to that container. In addition to these isolation mechanisms, a container or kernel may include resource-management features that limit the impact of one container's activities on other containers. In some embodiments, the functions described herein may run as a native program on individual hardware elements, be deployed as virtual machines, and/or be deployed in containers.

The term "computing mesh" may be used herein to refer to techniques and technologies for distributing or linking various computing resources connected by wireless or wired communication links but not otherwise connected. This may include a software-defined network (SDN) in which computing resources are located in one node/component, and the data used for the program or application resides in another node/component as part of the computing mesh. A computing mesh typically uses a self-organizing network in which computing resources are shared between different nodes in a computing mesh environment.

The term "application mesh" may be used herein to refer to techniques and technologies for running and executing applications across different physical devices. The devices may be connected via wireless or wired communication links or a combination thereof. An application mesh may include different components or processes of the application running on different nodes/components based on computing resources, sensors, or auxiliary devices attached to each node/component, which may allow the software application to utilize all the resources it needs to perform its functions using different nodes/components concurrently.

The term "connectivity mesh" may be used herein to refer to techniques and technologies for connecting different computing platforms to share computing resources, run and execute applications, or provide connectivity with other devices or systems. The connectivity mesh may also be a self-organizing network (SON), with an ability to adapt and provide optimum connectivity based on node/component availability, latency, and other parameters necessary for sharing computing resources, performing application mesh techniques, or providing a self-healing backbone for delivering and receiving information.

The term "network slicing" is used herein to refer to a network computing technique that allows a single physical network infrastructure, including multiple nodes, to be divided into multiple virtual networks or "slices," each customized to meet the specific requirements of a particular type of service or application. This allows a single network to support a diverse range of services, each with its own set of performance and functional requirements. The various embodiments may implement network slicing in various ways, including vertical slicing, horizontal slicing, and diagonal slicing. Vertical slicing may include dividing the network into layers, with each layer dedicated to a specific type of service or application. Horizontal slicing may include dividing the network into horizontal planes, each dedicated to a particular service or application. Diagonal slicing may include a combination of vertical and horizontal slicing, with some slices combining elements from multiple layers or planes of the network. Network slicing may allow for more efficient and flexible delivery of diverse services over a single network infrastructure. Network slicing may also help reduce the complexity of network management by allowing each slice to be independently managed and configured to meet the specific needs of the service it supports.

The term "multi-tenant infrastructure" may be used herein to refer to an architecture in which multiple independent tenants (e.g., specific customers, user groups, organizations, etc.) share the same computing resources, such as servers, storage, and networking, within a single physical infrastructure. This infrastructure may be designed so that each tenant's data and applications remain isolated and secure from other tenants despite sharing the underlying hardware and software resources. For example, a cloud service provider may host applications and data for multiple clients on the same server while using virtualization and security mechanisms to ensure that each client's environment is logically separated from the others. The multi-tenant infrastructure may allow for more efficient resource utilization, scalability, and cost-effectiveness, as the shared resources may be dynamically allocated based on demand to provide tenants with the flexibility to scale their usage as needed without investing in additional physical infrastructure.

The term "virtual network" (vNet) may be used herein to refer to a software-defined network (SDN) for creating and configuring virtualized network resources in the cloud. vNets create a logical network infrastructure using virtual components like subnets, network interfaces, and gateways, connecting on-premises resources, virtual machines (VMs), and cloud services, allowing communication and data sharing as if part of the same physical network. vNets may segment traffic, control resource access, provide isolation between workloads or applications, create secure connections between on-premises networks and the cloud, and extend existing networks into the cloud.

The term "vNet application" may be used herein to refer to a software program hosted and executed within the virtualized network environment. A vNet application may be hosted on virtual machines (VMs) or cloud services connected to the vNet and may communicate with other resources within the network. Client computing devices that connect to the vNet may access the application via a browser or a client application. The vNet application may use the network connection to communicate with other resources within the vNet, such as databases or other servers, as well as with external resources outside the vNet.

The term "virtual local area network" (VLAN) may be used herein to refer to a logical grouping of devices connected to a network. VLANs may allow administrators to create logical groupings of devices based on their function or role within the network rather than their physical location. For example, a VLAN could be created for devices that perform a specific function within the network. VLANs may segment a network into smaller, virtual sub-networks and are typically implemented using software-defined networking (SDN) technologies. In the various embodiments, VLANs may combine sub-networks into a single network layer.

The term "edge computing" may be used herein to refer to systems, techniques, or technologies that improve the user experience by offloading computation-intensive tasks to edge devices or servers deployed at the edge of the networks, thereby freeing up resources on the computing device and/or allowing the computing device to perform more computations or more resource-intensive tasks. Edge computing may reduce latency, increase performance, and improve the efficiency of data processing by bringing computation and storage closer to the devices generating and/or using the data.

The term "edge device" may be used herein to refer to a computing device that includes a programmable processor and communications circuitry for establishing communication links to consumer devices (e.g., smartphones, UEs, IoT devices) and/or to network components in a service provider, core, cloud, or enterprise network. For example, an edge device may include or implement functionality associated with an access point, gateway, modem, router, network switch, networking adapter, customer premise device, multiplexer, and/or other similar devices. An edge device may also include various memories and an edge database. Some embodiments may include an edge computing system that includes one or more edge devices, any or all of which may be configured to perform or implement edge computing techniques or technologies.

The term "edge application" may be used herein to refer to a software application designed to run at the edge of a network (network edge), rather than in a remote data center or cloud service. An edge application may utilize a distributed network that provides computing power and capabilities close to the devices analyzing or providing services. An edge application may utilize local computing power for faster response times and lower latency than would be available from a centralized or cloud service. The edge application may utilize computing resources in a remote data center or cloud service for parts of the edge application.

The term "network edge" may be used herein to refer to the point where data is processed or analyzed as close to its source as possible, using distributed resources like edge devices and servers to balance trade-offs between performance, latency, and power consumption. The specific location of the network edge may vary based on context, such as a home network or large enterprise network, and the needs and goals of the system. Various edge computing solutions such as Fog Computing, Mobile Edge Computing (MEC), and Cloudlets have distinct characteristics and definitions, with each vendor having specific definitions due to a lack of standardization.

The term "shard" may be used herein to refer to a distinct segment of a network slice within the vDA system in which each shard represents an isolated and independent unit of resource allocation. Shards may be generated or created to allow different groups and devices within a network slice to remain segregated from each other (thereby maintaining isolation and security). Each shard may operate independently, with its own dedicated resources such as memory, storage, bandwidth, and processing power. This isolation may allow for more granular control over resource distribution and management and/or may help prevent interference or cross-talk between different segments of the network. In some embodiments, shards may be dynamically created, adjusted, and terminated based on the changing requirements and conditions of the network (e.g., for more efficient and effective utilization of resources, etc.).

Some embodiments provide, improve upon, include, use, or implement Fog Computing, a decentralized computing paradigm that brings computing and data storage closer to the edge, complementing cloud computing by reducing latency and bandwidth requirements. Fog Computing performs local processing and storage, which is especially useful for IoT applications with limited connectivity or resources operating in the local area network (LAN), IoT gateway, or Fog node.

Some embodiments provide, improve upon, include, use, or implement Mobile Edge Computing (MEC), a computing paradigm bringing computing and storage capabilities to the network edge, particularly in cellular network base stations and edge platforms, reducing latency and bandwidth requirements, useful for mobile applications requiring low-latency access to data and services, often implemented as virtual platforms in a larger NFV cloud service.

Some embodiments provide, improve upon, include, use, or implement Cloudlets, small data centers at the network edge that provide computing and storage capabilities close to end devices. They offload computing with resource provisioning similar to data centers, useful for low-latency access applications. Cloudlets are typically deployed one hop away from end devices and are often part of an NFV environment with local virtual machines.

Some embodiments provide, improve upon, include, use, or implement Dew computing, a data-centric computing paradigm focusing on data access, storage, and manipulation, processing data at the edge to reduce latency and improve efficiency, with special-purpose components in user devices and an on-premises organization working in conjunction with cloud servers/services.

Some embodiments provide, improve upon, include, use, or implement micro edge services (MES), small, self-contained services performing specific functions within a larger system. These services may be designed to be modular and independently deployable, providing benefits over traditional monolithic architectures, such as easier development, deployment, maintenance, flexibility, agility, resilience, and fault tolerance.

Some embodiments provide, improve upon, include, use, or implement Micronets, delivering services through an on-site network management system with advanced technologies like software-defined networking (SDN), artificial intelligence (AI), and machine learning (ML) for robust security in home and small business networks. These embodiments may use centralized orchestration with a Micronet manager and monolithic architecture.

Some embodiments provide, improve upon, include, use, or implement NetReach, an edge computing system using shared Wi-Fi access points for connectivity and security, integrated with service providers' OSS/BSS systems via application programming interfaces (APIs), supporting dynamic micro-segmentation, distinct data connections through network slicing, and delivering connectivity and security to individual devices rather than locations.

NetReach, combined with Micronets, allows for dynamic micro-segmentation and management of broadband connections, providing seamless security without end-user configuration. It may use cellular-like wireless coverage with Wi-Fi-enabled edge computing nodes (ECNs) managed through the core network. Each device connected to NetReach may be assigned its own pre-shared key (PSK) for security, with different subscription options for groups of MAC addresses.

When combined with Micronets, NetReach may also allow for dynamic micro-segmentation and management of broadband connections to individual devices, providing seamless and transparent security without requiring end-users to handle technical configuration and maintenance tasks. In addition, NetReach may be used to implement a form of "network slicing" that allows for distinct data connections to be established between the core network and IP-addressable devices through Wi-Fi connections. As such, NetReach may be used for an early implementation of end-to-end network slicing in a hyper-converged network through Wi-Fi connections.

In contrast to traditional Internet Service Provider (ISP) modems, which provide a static or dynamic IP address to a location for all connected devices, NetReach delivers connectivity and security to each individual endpoint device rather than just the location or group of end devices. It does this through cellular-like wireless coverage of a neighborhood using Wi-Fi-enabled edge computing node (ECN) units installed on various structures such as utility poles, walls, rooftops, and potentially indoors. The control plane for edge device connections to Wi-Fi-enabled devices may be managed through the core network in a similar manner to how mobile devices are connected to 4G/5G cellular base stations through the core network.

For security purposes, each device connected to NetReach may be assigned its own pre-shared key (PSK). Service providers may offer different subscriptions for groups of MAC addresses belonging to multiple devices, allowing for flexibility in serving households or enterprises with employees working from various locations.

In some embodiments, the edge devices and/or edge computing systems discussed herein may be configured to provide, implement, or use any or all of the cloud, virtualization, and/or network techniques, technologies, systems, or solutions discussed above (e.g., Netreach, Micronets, etc.).

In some embodiments, the edge devices and/or edge computing systems may implement, provide, and use a distributed access system (herein "vDA") that includes functionality that provides, implements, replaces, or improves upon any or all of the techniques, technologies, systems and/or solutions discussed above.

In some embodiments, the edge devices may be configured to provide, implement, or use a distributed access system (herein "vDA") that allows for scalable edge service delivery and includes many other features and functions for providing edge application solutions.

Some embodiments include edge computing systems that combine the advantages of remote cloud servers and nearby edge devices to provide a powerful collaborative system that improves the performance, end-to-end latency, and energy consumption characteristics of user computing devices. Cloud servers have robust computational and storage capabilities, but they are often located in remote geographical locations and may suffer from long propagation delays when transmitting large volumes of data through the cloud. Edge devices, on the other hand, may not be subject to the same lengthy propagation delays as cloud servers, but they often have much more limited computational and storage capabilities.

The embodiments may balance these and other tradeoffs (e.g., between performance, latency, power consumption, etc.) by dynamically allocating available cloud computational resources to edge devices based on their workload, local computation capacities, and performance requirements. For example, some embodiments may include an edge computing system that includes several edge devices that are connected by wireless or wired communication links and configured to operate as a computing mesh in which the computing resources of each edge device are shared with one another. When several edge devices in a computing mesh are simultaneously served by the same cloud server, the edge computing system may intelligently and dynamically allocate tasks or the available computational resources to each edge device based on its workload, local computation capacities and/or performance requirements.

Some embodiments may include methods for establishing connections and forming groups in an edge computing system that include using a common pre-shared key (PSK), establishing connections to one or more devices, adding one or more of the devices in the vDA system, forming one or more groups, sharing the common PSK between multiple devices within a group, assigning the common PSK to a subnetwork or private local area network (LAN) that is assigned to a subscriber, allowing new devices that utilize the vDA system on the private LAN to share a similar PSK, statically or dynamically assigning a virtual PSK (vPSK) to the devices based on the type(s) of service(s) that need to be supported, and/or using the vPSK or common PSK to create a private LAN that is isolated from other devices or subscribers for a device.

In some embodiments, the methods may include performing a self-provisioning process to add devices that may only require local control or utilize a service that is not controlled by the service provider, locally recording the self-authorization of the device; and/or share device credentials with upstream services for resiliency, which may include an orchestrator that is run locally or remotely.

In some embodiments, the methods may include applying different policy attributes to one or all the devices in a group, assigning a device in the vDA system to one or more groups as part of an authentication process, assigning a device in the vDA system two or more overlapping groups as part of an authentication process, assigning a device in the vDA system to a policy group, assigning a device in the vDA system to a virtual group (vGroup) in which individual groups have the same or different policy groups, and/or assigning one or more devices in the vDA system to one or more groups as individual or multiple devices.

In some embodiments, the methods may include using the common PSK on multiple devices associated with a subscriber, generating a group that includes any or all of the multiple devices and other devices, wherein all the devices in the group share the common PSK, generating a group that authorizes member devices for self-service, and/or using the common PSK on multiple devices as a group identity.

In some embodiments, the methods may include performing device categorization, forming a group, associating the group with one or more policies to create a policy group (the policy group may be a traffic group, the policy group may belong to the subscriber who owns, leases and/or controls the end devices), using the device categorization to determine a policy to be applied for a device in the vDA system, assigning the device to a policy group based on the device categorization, and/or using the policies, group, and/or policy group to perform network slicing by type of device or bearer service.

In some embodiments, the methods may include performing network segmentation, segmenting the network into sub networks, segmenting a particular portion of the network into separate components via virtualization, segmenting front haul, backhaul, and/or middle haul portions of the radio access portion of the network based on policy or contract requirements, and/or using network segments to isolate and/or protect network traffic and/or devices in the vDA system. In some embodiments, the methods may include dynamically allocating/delivering network slices and/or dynamically reallocating the network slices.

In some embodiments, the methods may include generating or operating a slice controller, dynamically generating one or more network slices on a network or sub-network basis in real time to support a service, dynamically generating a network slice that is a complete logical network encompassing every element of the network or subnetwork, dynamically generating a network slice that is a subcomponent of the network or subnetwork, dynamically generating a network slice that is logically isolated the other components of the platform and/or network, dynamically generating a network slice that is setup to support one user or a group of users, associating the one or more network slices with a subscriber or group, dynamically generating network slices (subnet slices) within a larger network slice so as to allow for isolation of different services within the larger network slice, managing and/or deploying the one or more network slices, and/or generating or operating a slice preplan function, a deployment function, a maintenance function, and/or an end function.

In some embodiments, the methods may include generating or operating a plan function to configure a network slice in the network or sub network, generating or operating a deployment function that activates the network slice in the network or sub network, generating or operating a maintenance function that: monitors the network slice performance and (if required) adjusts to the network or subnetwork components to meet the policy and QoS requirements for the network slice or monitors service latency or packet loss and adjust routes to improve latency and/or packet loss and/or generating or operating an end function that: terminates the network slice in response to determining that a lease time has expired or that the network slice was requested to be terminated, places the resources previously assigned to the network slice into the network and or subnetwork resource pool for reallocation or reassignment to other network slices.

In some embodiments, the methods may include associating a group with a class ID based on throughput or bandwidth, associating the group with a bandwidth service class (BSC) for both uplink and downlink rates, generating or updating a group class ID assignment table, and/or using a group class ID assignment table by a policy engine.

In some embodiments, the methods may include generating or using a master Group ID to identify a group that is associated with the service, generating or using a master class ID that is a bandwidth service that defines an entire network slice, generating or using a sub class ID is a sub part (e.g., their values are either the same as the master class for a BSC or their values fall within the master class's BSC values), determining whether an application is permitted to run locally on a device within the vDA system, assigning multiple policy types to a group or network slice, allowing a slice controller to deliver the services, managing or shaping network traffic for a group or network slice, determine whether an application is able to run locally without external connectivity, determine whether to utilize resources external to the group or network slice for delivery of the service, and/or determine how to utilize the resources external to the group or network slice for delivery of the service.

FIG. 1A illustrates an example edge computing system 100 suitable for implementing various embodiments. The edge computing system 100 includes user computing devices 102*a* and 102*b*, and edge devices 106*a* to 106*c*, which may be part of a home or local area network 108 and linked to the internet 110 and cloud servers/services 112 via wired or wireless communication links. In various embodiments, the user computing devices 102*a* and 102*b* and/or edge devices 106*a* to 106*c* may include one or more processors configured to implement the functionality described with reference to the edge computing system 100.

The edge computing system 100 may address limitations of conventional solutions, such as resource shortages on user computing devices 102 running complex software applications, which may impact performance, end-to-end latency, and energy consumption, directly affecting the user experience. For example, the edge computing system 100 may offload computationally intensive tasks from user computing devices 102*a* and/or 102*b* to edge devices 106*a* to 106*c* and/or cloud servers 112. In addition, the system may offload the main components of software applications from user computing devices 102 to edge devices 106*a* to 106*c*.

The edge computing system 100 may share common resources (e.g., hardware, software) between multiple devices, such as edge devices 106*a* to 106*c*. These edge devices may operate as a computing mesh, sharing resources based on workloads, local computation capacities, and performance requirements, improving the performance of latency-sensitive applications.

The edge devices 106*a* to 106*c* may implement homogeneous or heterogeneous computing architectures. For example, they may have identical platforms and software versions (homogeneous) or different operating systems, hardware architectures, processors, storage capabilities, etc. (heterogeneous). Some edge devices may be part of a processor cluster architecture (e.g., synchronous or asynchronous).

Figure 1B:
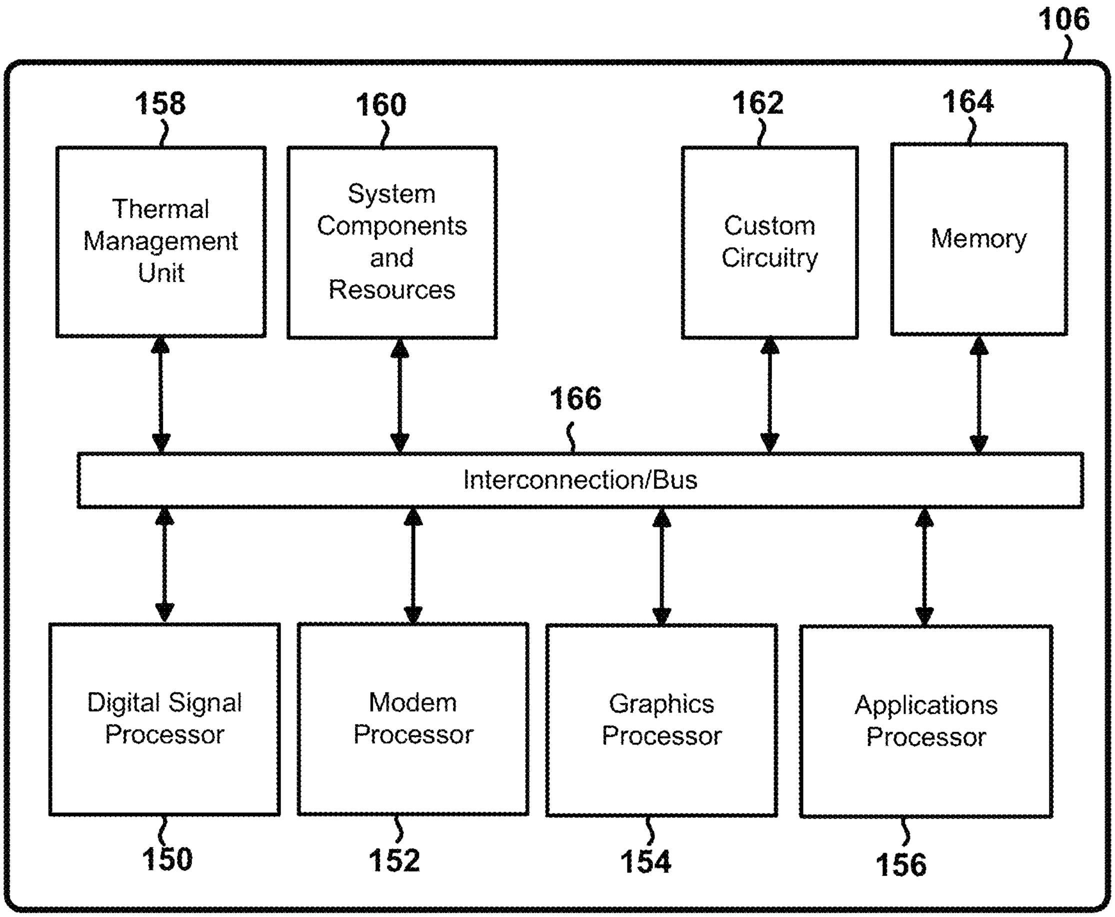
FIG. 1B is a component block diagram illustrating an example edge device that could be configured to implement an edge computing node (ENC) or other edge devices in accordance with some embodiments.

FIG. 1B illustrates the components of an edge device 106. The edge device 106 includes a digital signal processor (DSP) 150, a modem processor 152, a graphics processor 154, an application processor 156, memory 164, custom circuitry 162, system components and resources 160, a thermal management unit 158, and an interconnection/bus module 166. The edge device 106 may operate as a central processing unit (CPU), performing arithmetic, logical, control, and input/output (I/O) operations.

Each processor 150, 152, 154, and 156 may include one or more cores, with each core capable of performing operations independently. For example, the edge device 106 may include processors running different operating systems, such as FreeBSD, LINUX, OS X, or Microsoft Windows. These processors may be part of a processor cluster architecture.

The processors 150, 152, 154, and 156 may be interconnected with memory 162, system components and resources 160, custom circuitry 162, and the thermal management unit 158 via the interconnection/bus module 166. This module may include reconfigurable logic gates or implement a bus architecture, providing communication through advanced interconnects like high-performance networks-on-chip (NoCs).

The Thermal Management Unit 158 may monitor and manage the device's temperature and power consumption, determining when and how to throttle the performance of processing components.

System components and resources 160 and custom circuitry 162 may manage sensor data, analog-to-digital conversions, wireless data transmissions, and other specialized operations. For example, they may include power amplifiers, voltage regulators, oscillators, temperature sensors, data controllers, memory controllers, and more. Custom circuitry 162 may interface with other computing systems and peripheral devices.

The edge device 106 may also include an input/output module (not illustrated) for communicating with external resources, such as a clock and a voltage regulator, which may be shared by multiple internal processors/cores.

In addition to edge device 106, various embodiments may be implemented in a wide variety of computing systems, including systems-on-chips (SOCs), systems-in-packages (SIPs), single processors, multiple processors, multicore processors, or combinations thereof.

Figure 1C:
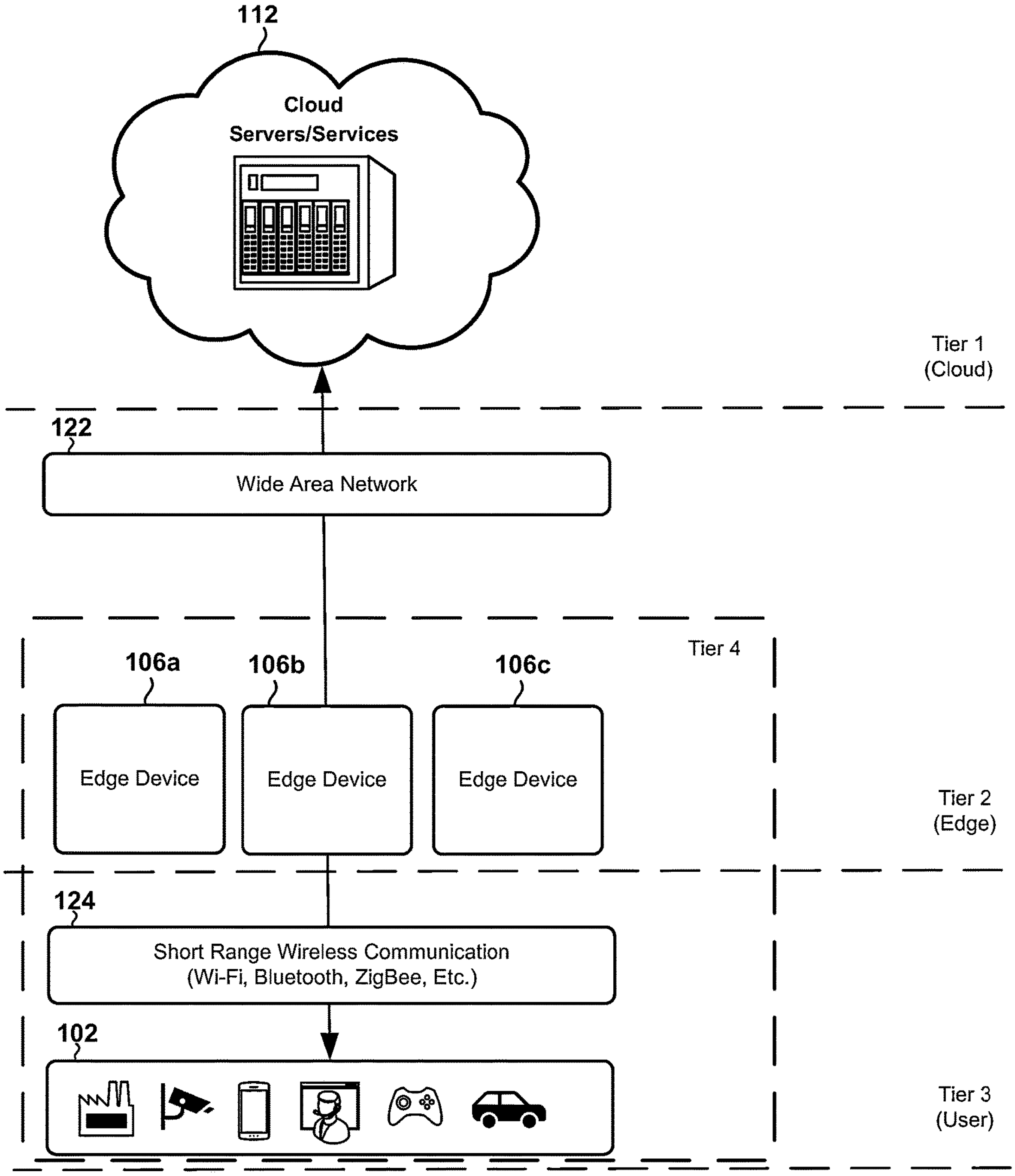
FIG. 1C is a component block diagram that illustrates an example edge computing system that is divided into tiers in accordance with some embodiments.

FIG. 1C illustrates an example edge computing system 200 divided into tiers. The system includes cloud servers/services 112 coupled to edge devices 106*a* to 106*c* via a wide area network (WAN) 122. The edge devices 106*a* to 106*c* may be coupled to user devices 102 and/or each other via short-range wireless communications 124, such as Wi-Fi, Bluetooth, or ZigBee.

The edge devices 106*a* to 106*c* may be Edge Computing Nodes (ECNs) supporting edge computing by processing and analyzing data at the network edge rather than in a centralized data center. ECNs may have both wired and wireless connectivity that allow for communication with other devices and ECNs.

Components in FIG. 1C may be organized into tiers: cloud servers/services 112 in Tier 1, edge devices 106*a* to 106*c* in Tier 2, and user devices 102 in Tier 3. Some embodiments may include a fourth tier that spans Tiers 2 and 3 and may optionally include a Dew computing node or the versatile elastic edge computing architecture.

FIG. 2 is a table illustrating different edge computing tiers and the types of applications supported in each tier. For example, device-only applications are primarily supported on the third tier (Tier 3). Edge-accelerated and/or cloud-native applications are primarily supported on the first tier (Tier 1) but may optionally run on the second tier (Tier 2). Edge-enhanced and/or device-native applications are primarily supported on the third tier (Tier 3) but may also optionally run on the second tier (Tier 2). Edge-native applications are primarily supported on both the second and third tiers (Tier 2 and Tier 3).

FIGS. 3A-3E are component block diagrams that illustrate an example edge computing system 300 that could be configured to implement a vDA system in accordance with some embodiments. In the examples illustrated in FIGS. 3A-3E, the edge computing system 300 includes cloud servers/services 112, a WAN 122, and a plurality of edge computing nodes (ECNs) 306*a*-308*c*. Each of the ECNs 306*a*-308*c* may be an edge device (e.g., edge devices 106 illustrated in FIGS. 1A-1C). As such, the ECNs 306*a*-308*c* may be configured to implement or operate a vDA system and/or otherwise support edge computing by processing and analyzing data at the edge of a network (network edge) instead of in a central data center or cloud 112. The ECNs 306*a*-308*c* may be equipped with both wired and/or wireless connectivity, which may allow them to communicate with other devices (e.g., user devices 102, other ECNs 306*a*-308*c*, etc.) in the system 300.

In some embodiments, each of the ECNs 306*a*-308*c* may be equipped with wireless access points (WAPs) with overlapping or distinct coverage areas, depending on the configuration of the network. Each ECN 306*a*-308*c* may also have its own service set identifiers (SSIDs) so that it may operate as a local network or WAP.

Figure 3A:
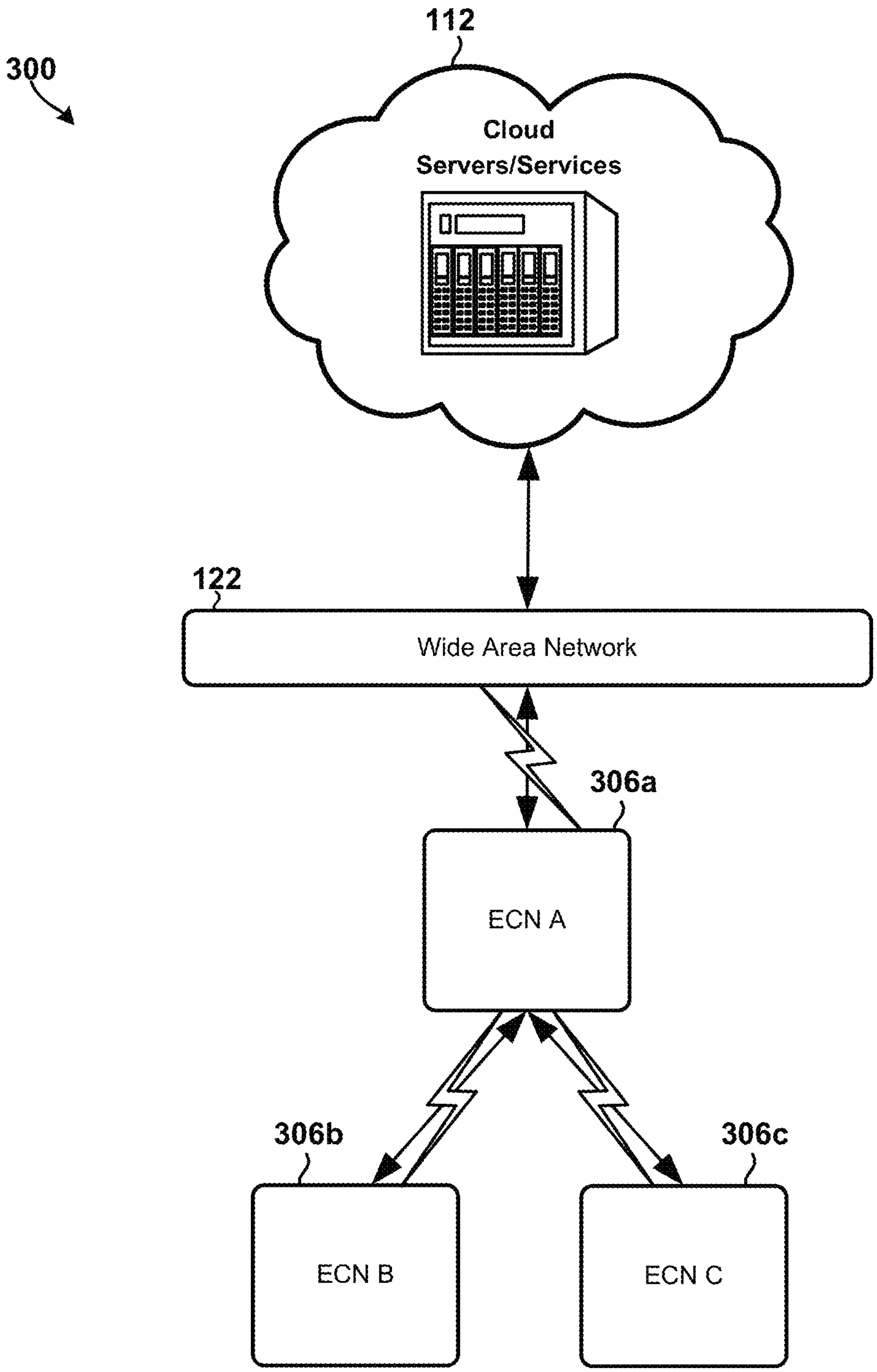
FIG. 3A is a component block diagram that illustrates an example edge computing system that could be configured to implement a distributed access system ("vDA system") in accordance with some embodiments.

In the example illustrated in FIG. 3A, ECN A 306*a* provides the connectivity to the WAN 122 for ECN B 306*b* and ECN C 306*c*, both of which connect to ECN A 306*a* through a wired or wireless link. Such ECN-to-ECN connectivity may be configured in a variety of ways, such as in a star or mesh topology.

ECNs 306 that incorporate a WAP may be installed to work jointly, with each ECN 306 placed at regular intervals based on the effective coverage range of the wireless signal and/or the intended use of the devices. For example, a plurality of ECNs 306 might be installed in a warehouse to provide connectivity to a WAN 112 and/or to provide/support the monitoring and control of various systems and devices. Additional ECNs 306 may be added to the network or system 300, and the added ECNs 306 may reuse the same set of SSIDs that are part of the ECN network. This may extend the effective coverage of the local network independent of whether the ECNs 306 have direct wireless connectivity with each other. Yet this network approach, while effective, may have several disadvantages.

One disadvantage is that each ECN 306 may need to be individually and specifically configured based on its location, which may be time-consuming and/or require careful planning. Additionally, adding and removing subscribers may require configuration of a specific ECN 306, which may be cumbersome and/or may require a technician or technical expertise. The network coverage may also be limited to a specific ECN 306 (e.g., ECN A 306*a*, etc.) and does not benefit from the presence of other ECNs 306 nearby, meaning that the network does not take full advantage of the opportunistic synergistic coverage provided by the other ECNs 306 in the area. The mesh management may also be more complex with this approach, as an ECN 306 may need to be provisioned on the exact mesh corresponding to the ECN 306 with WAN connectivity (e.g., ECN A 306*a* in FIG. 3A). This may be challenging to set up and maintain. Further, users may not have access to Wi-Fi outside of the immediate area around the network because other ECNs 306 in the local area may not be broadcasting a recognized SSID, limiting the coverage and accessibility of the network. The various embodiments (e.g., embodiments with reference to FIGS. 3B-3E, the vDA system, etc.) overcome these and other disadvantages of network approach discussed above.

Multiple devices (e.g., ECNs 306, user devices 102, etc.) may be related to a particular edge application deployment. The embodiments discussed below may establish “trusted domains” or “groupings” to manage these devices and the application they are running. For example, some embodiments may group all the devices that are related to a particular edge application deployment into the same group or trusted domain. The embodiments may allow all devices that are grouped into the same trusted domain to communicate and share data with each other securely and efficiently, without cumbersome verification or authentication procedures. These groups may allow an edge application to operate in a distributed manner at the network edge on the devices that are best equipped or best suited for the specific tasks to which they are assigned.

Figure 3B:
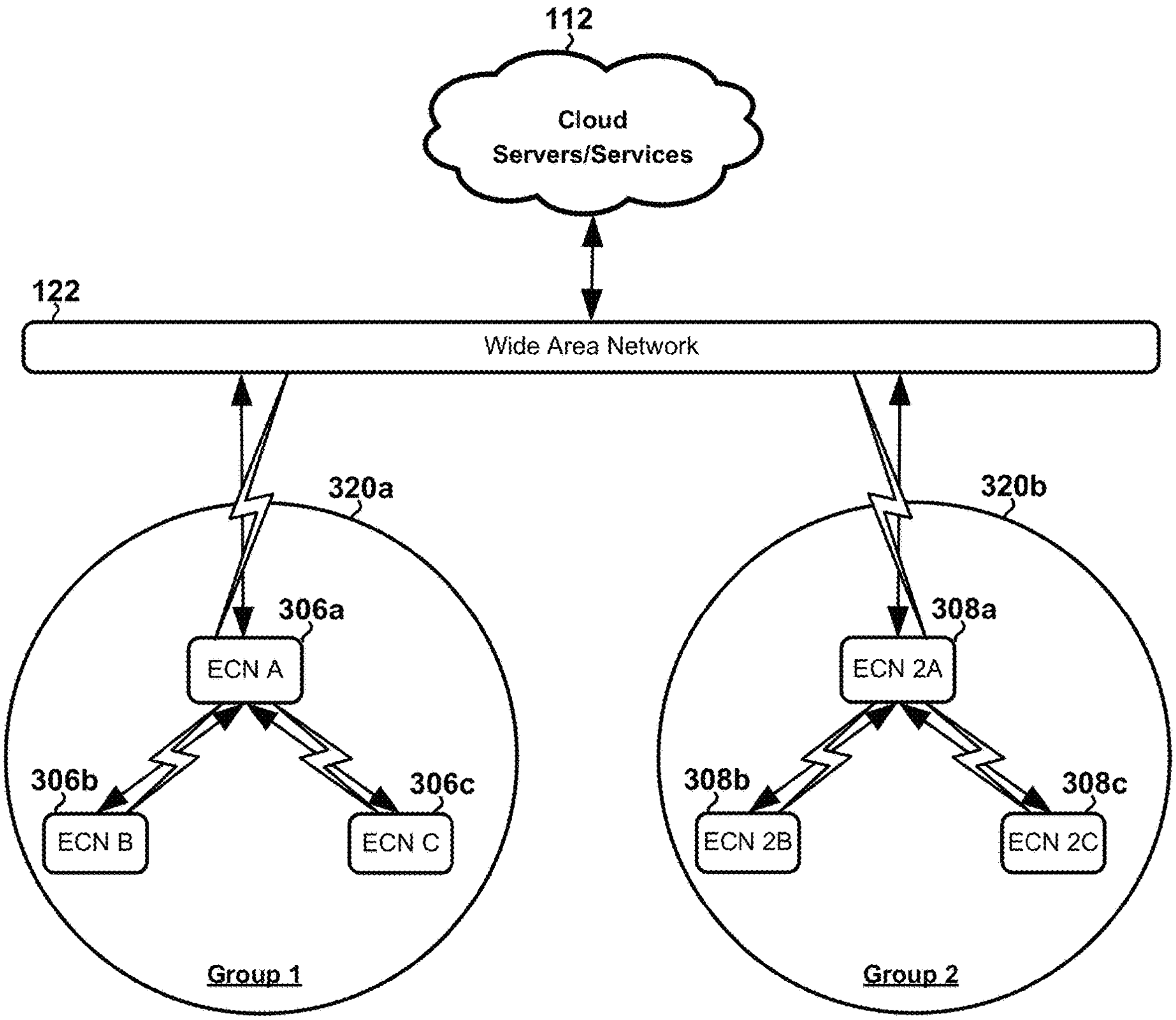
FIG. 3B is a component block diagram that illustrates an example edge computing system in which the edge compute nodes in the vDA system are organized into groups in accordance with some embodiments.
Figure 3C:
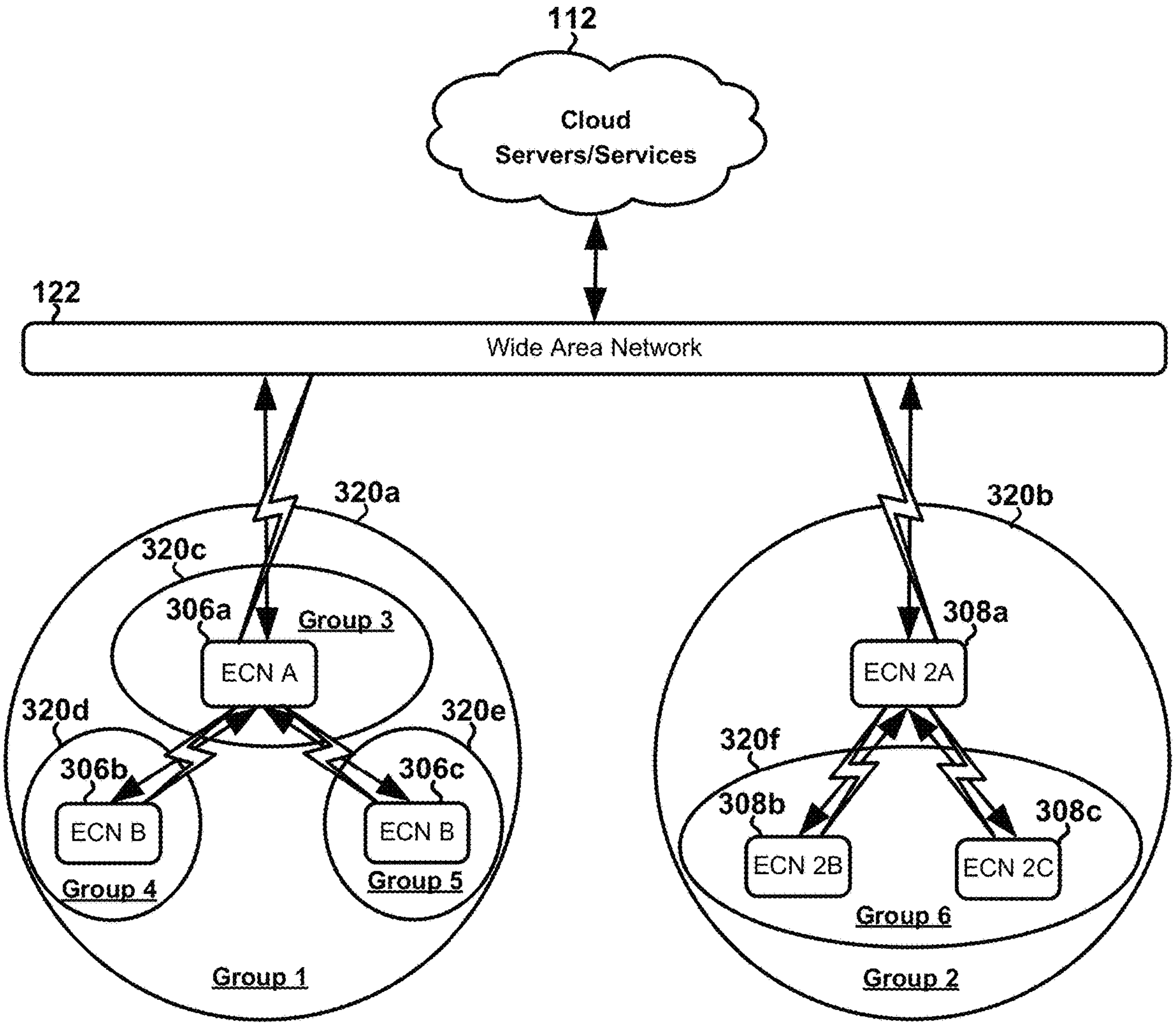
FIG. 3C is a component block diagram that illustrates an example edge computing system in which one or more of the edge compute nodes in the vDA system are associated with multiple groups in accordance with some embodiments.
Figure 3D:
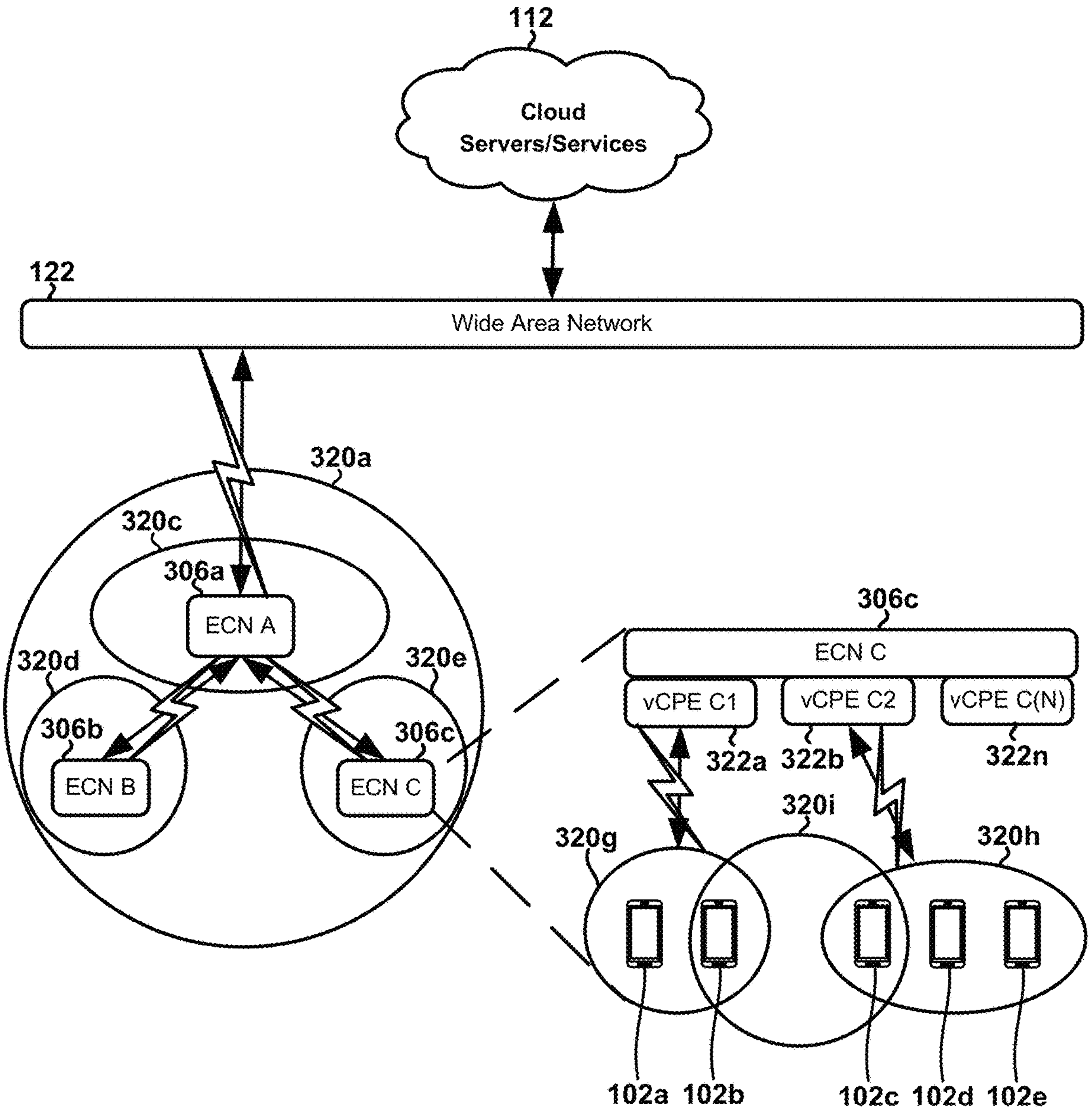
FIG. 3D is a component block diagram that illustrates an example edge computing system that includes edge compute nodes and virtual customer premises equipment (vCPE) and is organized into groups of edge compute nodes and user devices in accordance with some embodiments.

FIGS. 3B-3E illustrate examples in which the ECNs 306, 308 are organized into groups in accordance with some embodiments. It should be understood that, in the various examples below, the ECNs 306, 308 may belong to the same group or they may be divided into two or more groups, which may or may not isolated from one another. It should also be understood that, although only FIG. 3D illustrates an ECN (i.e., ECN 306*c*) that includes virtual customer premises equipment (vCPE) 322*a-n*, any or all of the ECNs 306, 308 within the vDA system (e.g., ECNs 306*a*, 306*b*, 308*a*-308*c*, etc.) or discussed in this application may each also include one or more vCPEs.

In some embodiments, the vCPE 322 may be a logical portion of an ECN (i.e., ECN 306*c*). There may be multiple vCPEs per ECN. In some embodiments, a vCPE may have all the attributes of the ECN but may be logically separated or differentiated from other vCPEs within the same ECN. A vCPE may include dedicated or shared ECN resources or a combination of shared and dedicated resources. A vCPE may have dedicated resources assigned and removed, restored to the collective ECN, depending on the policy and particular application that is being run on the vCPE itself.

In some embodiments, the vDA system may be configured to assign the ECNs 306, 308 to the groups. For example, the vDA system may assign the ECNs 306, 308 to groups based on a policy that aims to achieve a specific objective (e.g., grouping similar devices together, separating devices that have different power sources or resiliency requirements, etc.).

In some embodiments, an ECN 306, 308 may serve as a gateway function, connecting to other ECNs 306, 308 or to a cloud server 112, or simply functioning as a local LAN. A subscriber may log into the gateway (e.g., ECN 306, 308) on the isolated or private network (e.g., local LAN defined by a group, etc.) and access the WAP within the network (e.g., an ECN WAP, etc.).

In some embodiments, each group 320 may be isolated on its own private local area network (LAN). In some embodiments, the ECNs 306, 308 and/or any of the grouped devices (e.g., user device 102 illustrated in FIG. 3D, etc.) may be configured to use a pre-shared key (PSK) for secure communications within their respective groups or isolated or private LAN.

In some embodiments, the vDA system (e.g., ECNs, etc.) may be configured to store and maintain information structures that identify the groups, group memberships, policies associated with the groups, pre-shared key (PSK) associated with the groups or devices, and other similar information.

In some embodiments, the vDA system may be configured so that additional ECNs 306, 308 and/or vCPEs 322 may be added to a grid or geographic zone for filling in coverage using the common configuration for integration. Traffic between devices belonging to the same subscriber may be permitted within the defined grid or geographic zone. Each policy group (or traffic group) may have its own policies to control how data traffic is allowed to flow between devices within the same group and between devices in other groups. Traffic between devices belonging to different subscribers that are not defined in the policy may be restricted, blocked or otherwise not allowed.

FIG. 3B illustrates an example in which the ECNs 306, 308 are organized into two groups 320*a*, 320*b*. In particular, ECNs 306*a*-306*c* are members of Group 1 320*a* and ECNs 308*a*-308*c* are members of Group 2 320*b*. The two groups 320*a*, 320*b* are isolated from one another. As such, ECNs 306*a*-306*c* are in their own isolated private LAN (Group 1 320*a*) and ECNs 308*a*-308*c* are a different isolated private LAN (Group 2 320*b*).

FIG. 3C illustrates an example in which one or more of the ECNs 306, 308 are organized into multiple groups 320. In particular, ECN A 306*a* is a member of both Group 1 320*a* and Group 3 320*c*. ECN B 306*b* is a member of Group 1 320*a* and Group 4 320*d*. ECN C 306*c* is a member of Group 1 320*a* and Group 5 320*e*. ECN 2A 308*a* is a member of Group 2 320*b*. ECN 2B 308*b* and ECN 2C 308*c* are both members of Group 2 320*b* and Group 6 320*f*.

FIG. 3D illustrates example relationships between ECNs, vCPEs, user devices, and groups. In particular, FIG. 3D illustrates that ECN C 306*c* includes multiple vCPEs 322*a*-322*n*, each of which may be associated with multiple user computing devices 102*a*-102*e*. The user devices 102*a*-102*e* may be associated with one or groups 320*g*-320*i*. Specifically, in the example illustrated in FIG. 3D, user devices 102*a* and 102*b* are included in Group C1 320*g*, and user devices 102*c*, 102*d* and 102*e* are included in Group C2 320*h*. User device 102*b* and 102*c* are also included in Group C3 320*i*. Thus, Group C3 320*i* includes devices (e.g., 102*b*, 102*c*) that are associated with both Group C1 320*g* and Group C2 320*h*.

The user devices 102 may be configured to use a pre-shared key (PSK) for secure communication within their respective groups 320. For example, user devices 102*a* and 102*b* in Group C1 320*g* may use one PSK, while user devices 102*c*-102*e* in Group C2 320*h* may use another PSK. In some embodiments, user devices 102*b* and 102*c* in Group C3 320*i* may use yet another PSK.

Figure 3E:
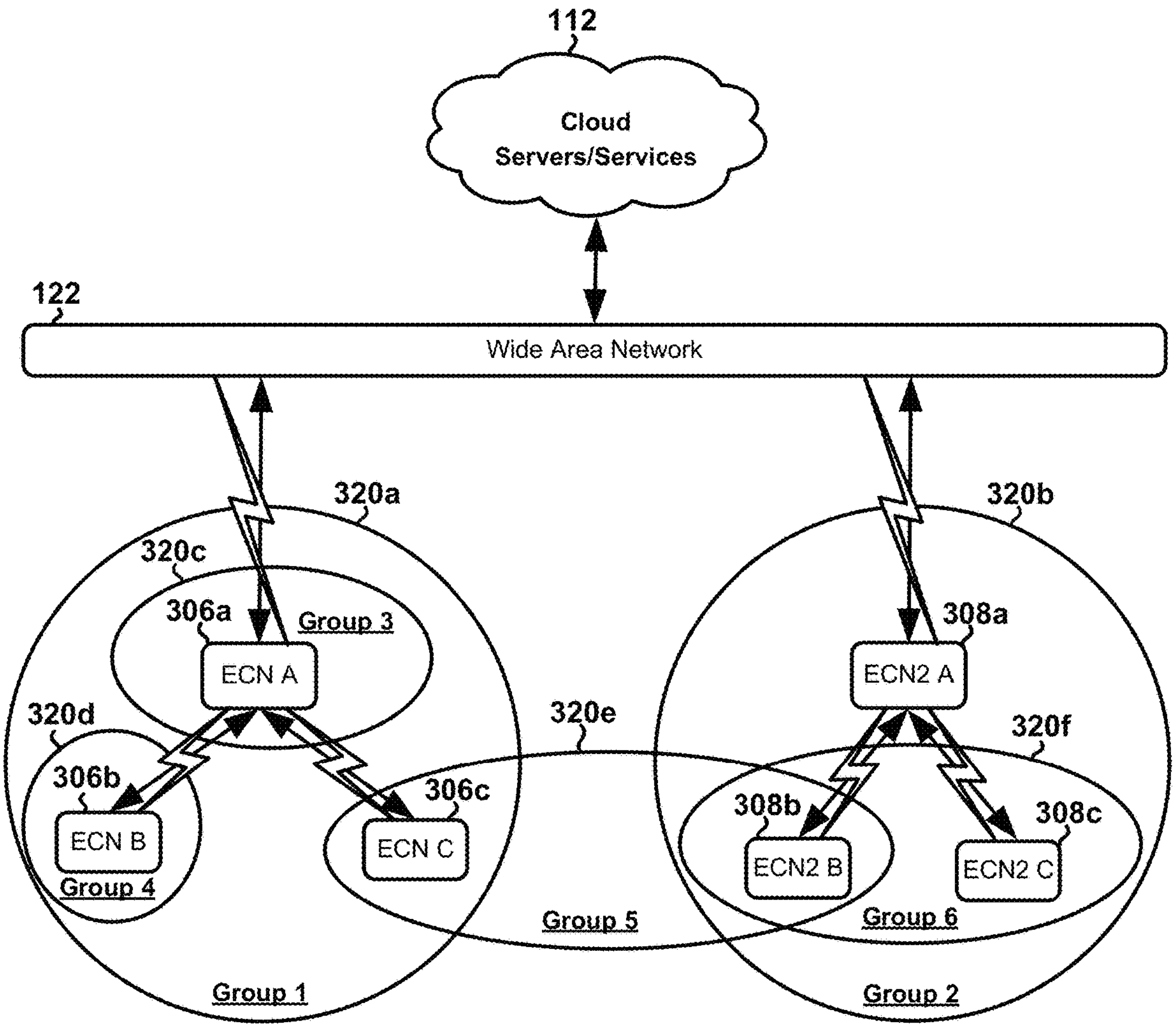
FIG. 3E is a component block diagram that illustrates an example edge computing system in which one or more of the edge compute nodes in the vDA system are associated with multiple diverse groups in accordance with some embodiments.

FIG. 3E illustrates an example in which the ECNs 306, 308 belong to multiple, diverse, groups at the same time. In the example illustrated in FIG. 3E, ECN C 306*c* is shown to be a member of Group 1 320*a* and Group 5 320*e*, while ECN 2B 308*b* belongs to Group 2 320*b*, Group 6 320*f*, and Group 5 320*e*. As such, FIG. 3E demonstrates the flexibility of group membership and the ability for an ECN 306, 308 to be associated with multiple groups simultaneously.

In some embodiments, the vDA system may be configured to simplify the network access processes of the client devices (e.g., user devices 102, edge devices 106, ECNs 306, etc.) while maintaining strong security measures, and also overcoming various other limitations and disadvantages of existing and conventional solutions.

For example, in conventional solutions, the authentication, service delivery, and control of user devices is typically managed centrally to ensure a good user experience and for control purposes. These conventional solutions may assign a unique PSK to each device, which may be used to centrally control access to the network by user devices and to prevent the sharing or borrowing of PSKs for access. However, due to a proliferation of user devices with different bandwidth and latency requirements, it is becoming increasingly important to shift towards delivering services and implementing security measures at the edge of the network (network edge) rather than centrally or in the cloud.

In some embodiments, the vDA system may be configured to use the groups (e.g., described with reference to FIGS. 3B-3E, 8A-8C, 9A, etc.), virtual PSKs (vPSK), per-policy-group passphrases, and/or common SSIDs to overcome these and other limitations of conventional solutions and/or to better or more efficiently deliver services and implement security measures at the edge of the network.

When a wireless local area network (WLAN) is configured with pre-shared key (PSK) security, all devices on the WLAN share the same PSK. In some embodiments, the vDA system may be configured to implement or use a virtual PSK (vPSK) that allows multiple PSKs (including the option of assigning a unique PSK to each client) to be configured on the same Service Set Identifier (SSID), while optionally providing different levels of access to each client. It should be noted that vPSK is different from 802.1x authentication. This is important because not all clients support 802.1x. Some common examples of devices that do not support 802.1x include older barcode scanners, medical devices, building control devices, and a wide range of consumer internet of things (IoT) equipment.

Figure 4A:
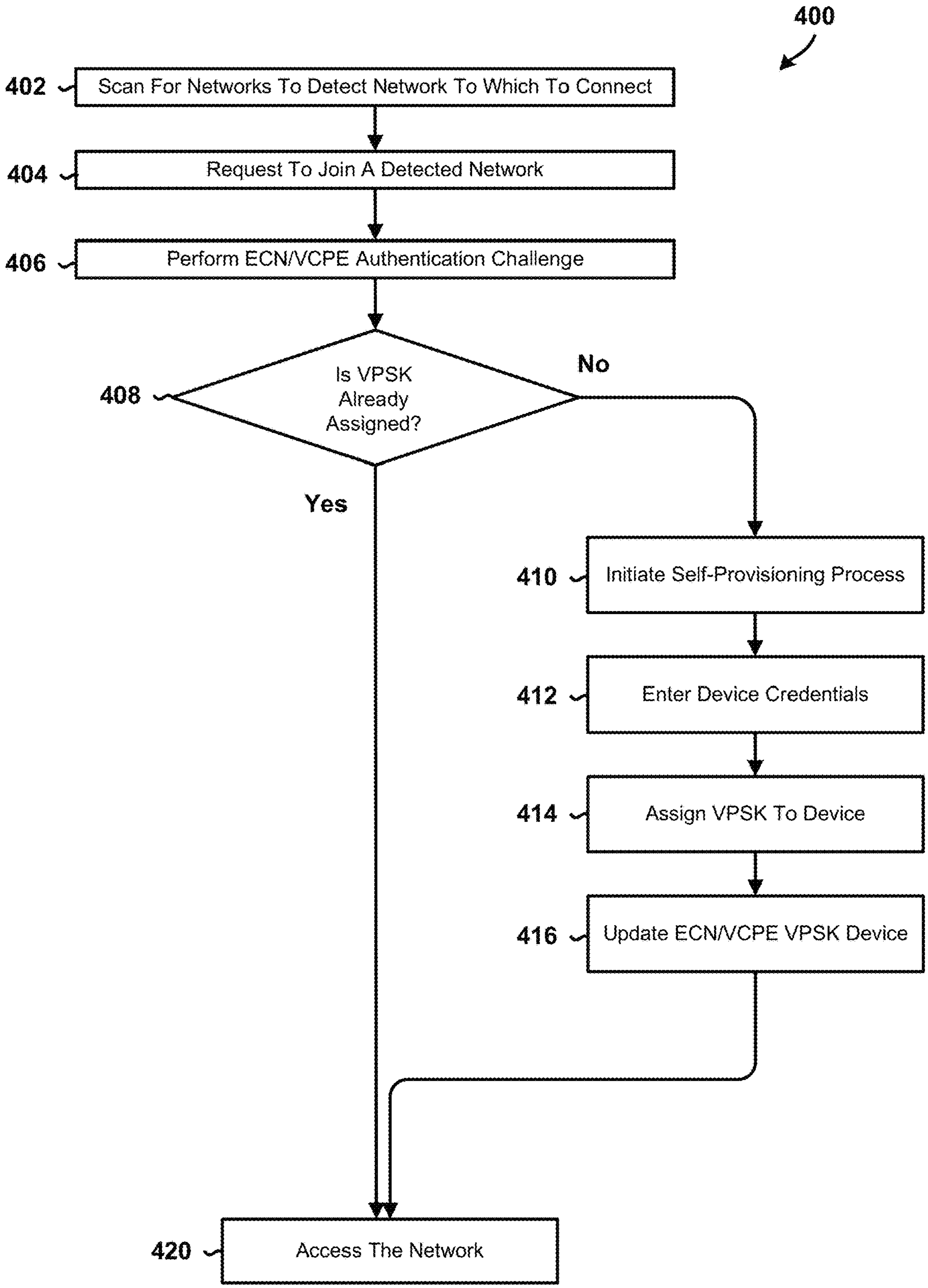
FIGS. 4A-4C are process flow diagrams that illustrate methods of assigning and using a virtual pre-shared key (vPSK) to simplify client device access in accordance with some embodiments.

FIG. 4A illustrates a method 400 of assigning and using a virtual pre-shared key (vPSK) to simplify client device access in accordance with some embodiments. Method 400 may be performed by a processor in a client computing device (e.g., edge devices 106, ECN 306, 308, etc.) in an edge computing system.

In block 402, the client device (e.g., ECN 306), may commence scanning for networks to detect SSIDs, WAPs, and/or a network to which it may connect. In response to detecting a suitable SSID or other network identifier in block 404, the client device may send a request to join a detected network to an ECN associated with the SSID, WAP, or network.

In block 406, the client device and/or ECN may perform an authentication challenge, which may include the ECN WAP asking the client device to provide the correct vPSK (or PSK) and the client device sending the ECN WAP an authentication request message that includes a vPSK (or PSK).

In determination block 408, the ECN may determine whether the vPSK has already been assigned or registered. In response to determining that the vPSK has been assigned (i.e., determination block 408="Yes"), the ECN WAP may allow the client device to access the network in block 420. That is, if the client device has the correct vPSK, it is granted access to the network in block 420.

In response to determining that the vPSK has not been assigned or registered (i.e., determination block 408="No"), the client device and/or ECN WAP may initiate a self-provisioning process in block 410. That is, if the client device does not have the correct vPSK or any vPSK at all, rather than denying the connection request, the vDA system may initiate a self-provisioning process in block 410 to add or register the client device with the system and/or commence using network slices or other features of the vDA system.

The self-provisioning process may allow users to add devices that may only need local control or use a service that is not controlled by the service provider. When the self-provisioning process starts, the end user may self-authorize the device, which may be recorded in the ECN/vCPE. Examples of information that may be stored include account identification, device name, the device name like kitchen laptop, the MAC address, subscription services, QoS, service enhancement capable, vPSK creation/assignment, access restrictions. The access restrictions may include identifying whether the device is allowed use the wireless network for connectivity only and/or whether the device is allowed to access content not on the network. The ECN WAP may also share the device credentials with upstream services for resiliency (which may include sending the information to an orchestrator that is run locally or remotely).

With reference to FIG. 4A, after initiating the self-provisioning process in block 410, the client device may enter device credentials in block 412. In block 414, the ECN WAP may assign a vPSK to the client device.

In block 416, the ECN may update the ECN/vCPE vPSK information, which may include account identification, device name, mac address, vPSK, subscription services, QoS, service enhancement capability, access restrictions, group assignment(s), etc.

In block 420, the ECN WAP may allow the client device to access the network and/or the client device may access the network without the need for additional authentication or support. Once a device is granted access to the network, it may use an application to receive the desired service. The vDA system may also add the client device to the edge computing system and commence using the resources of the client device. Said another way, when the client device is allowed to connect to the network in block 420, the client device may join or commence using the vDA system and/or an application (e.g., vNet application, edge application, etc.) for service delivery in block 422. In some embodiments, the client device may use a network slice for the service delivery.

In some embodiments, the processor may use Service Set Identifiers (SSIDs) to group devices that share the same vPSK, facilitating network segmentation. Each SSID may represent a distinct network segment, allowing devices within that segment to communicate using a common vPSK. This segmentation may allow for the efficient management and allocation of network resources and services. The processor may dynamically change the vPSK assigned to a device based on the requested service, which may allow devices to join different groups as needed for service delivery. For example, when a device's service plan changes (e.g., upgrading to a higher-tier service with more features, downgrading to a lower-tier plan, etc.), the processor may reassign the vPSK accordingly. This dynamic reassignment may allow for sub-SSID network slicing, where multiple devices with different vPSKs operate under the same SSID but are segmented based on their specific vPSKs.

As part of the operations in block 422, the client device's processor may dynamically adjust its vPSK to align with the assigned service tier or group configuration. This real-time adjustment may reallocate network resources, ensuring that the device operates within its service agreement. For instance, if a user upgrades their service plan, the processor in the vDA system may reassign a higher-tier vPSK to grant access to enhanced features. Conversely, a downgraded plan may result in a lower-tier vPSK, restricting access accordingly.

Dynamic vPSK assignment may enhance network security by periodically changing the keys, minimizing the risk of unauthorized access. The processor in the vDA system may use algorithms to reassign vPSKs based on usage patterns, security policies, and service agreements, ensuring that only authorized devices access the network.

Integrating vPSK management with network slicing may improve resource allocation. Each network slice may be configured with specific vPSKs, ensuring that devices on a slice meet their performance and security requirements. For example, a network slice dedicated to high-priority applications may have a unique vPSK, granting access only to devices requiring high bandwidth and low latency.

Some embodiments may include methods of assigning and using a virtual pre-shared key (vPSK) to simplify client device access in an edge computing system. In some embodiments, the methods may include scanning, by a processor in a client device, for networks to detect Service Set Identifiers (SSIDs), Wireless Access Points (WAPs), and/or a network to which the client device may connect, sending, by the processor in the client device, a request to join a detected network to an Edge Computing Node (ECN) associated with the SSID, WAP, or network in response to detecting a suitable SSID, performing, by the processor in the client device and/or the ECN, an authentication challenge (which may include the ECN WAP asking the client device to provide the correct vPSK and the client device sending an authentication request message that may include the vPSK), determining, by the processor in the ECN, whether the vPSK has already been assigned or registered, allowing, by the processor in the ECN WAP, the client device to access the network in response to determining that the vPSK has been assigned or registered, and initiating, by the processor in the client device and/or the ECN WAP, a self-provisioning process in response to determining that the vPSK has not been assigned or registered, allowing, by the processor in the ECN WAP, the client device to access the network based on the assigned vPSK, joining, by the processor in the client device, the edge computing system, and commencing the use of an application for service delivery.

In some embodiments, the self-provisioning process may include entering, by the processor in the client device, device credentials, assigning, by the processor in the ECN WAP, a vPSK to the client device, and updating, by the processor in the ECN, vPSK information. In some embodiments, the vPSK information may include account identification, device name, MAC address, vPSK, subscription services, Quality of Service (QOS), service enhancement capability, access restrictions, and group assignments. In some embodiments, the self-provisioning process may further include sharing device credentials with upstream services for resiliency.

In some embodiments, the dynamic assignment of the vPSK may be based on the requested service so that the devices are able to join different groups for service delivery. In some embodiments, the vPSK assignment may allow for sub-SSID network slicing, which may allow multiple devices with different vPSKs to operate under the same SSID while being segmented based on their specific vPSKs. In some embodiments, the vPSK assignment may enhance network security by, for example, periodically changing the keys based on usage patterns, security policies, and service agreements.

Figure 4B:
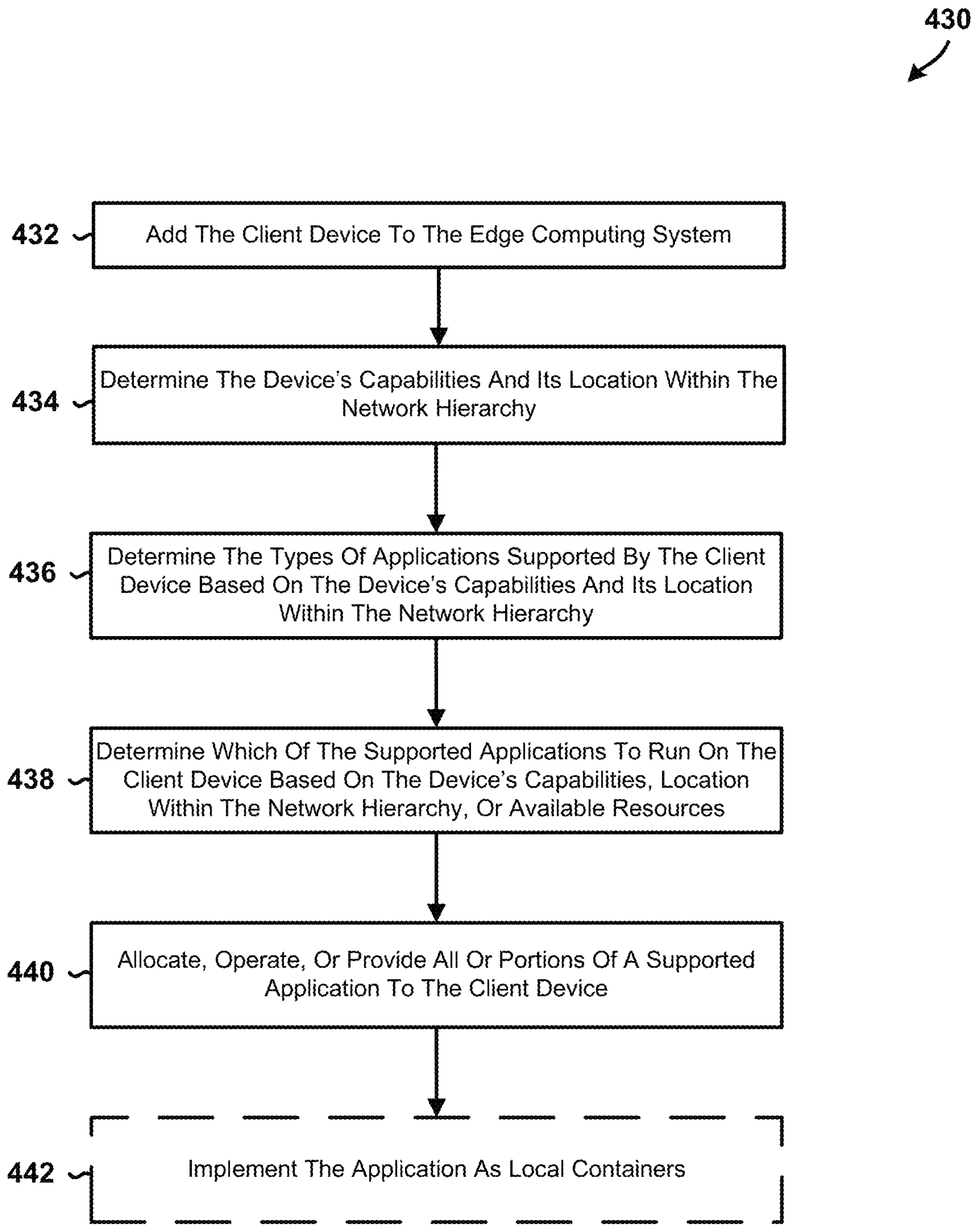

FIG. 4B illustrates a method 430 of incorporating a client device into the vDA system after using a virtual pre-shared key (vPSK) to provide access to the network in accordance with some embodiments. Method 430 may be performed by a processor in a computing device (e.g., user devices 102, edge devices 106, ECN 306, 308, etc.) in an edge computing system that includes a vDA system. Method 430 may be performed after method 400, as illustrated in FIG. 4A.

In block 432, the vDA system may add the client device to the edge computing system. In block 434, the vDA system may determine the client device's capabilities and location within the network hierarchy. In block 436, the vDA system may determine the types of applications supported by the client device based on the device's capabilities and its location within the network hierarchy. In block 438, the vDA system may select or determine which of the supported applications to run on the client device based on the device's available resources, capabilities and/or location within the network hierarchy. In block 440, the vDA system may allocate, operate, or provide all or portions of a supported application to the client device. In optional block 442, the vDA system may implement the selected/determined application as local containers (e.g., when performing the functions at the edge of the network, etc.).

Figure 4C:
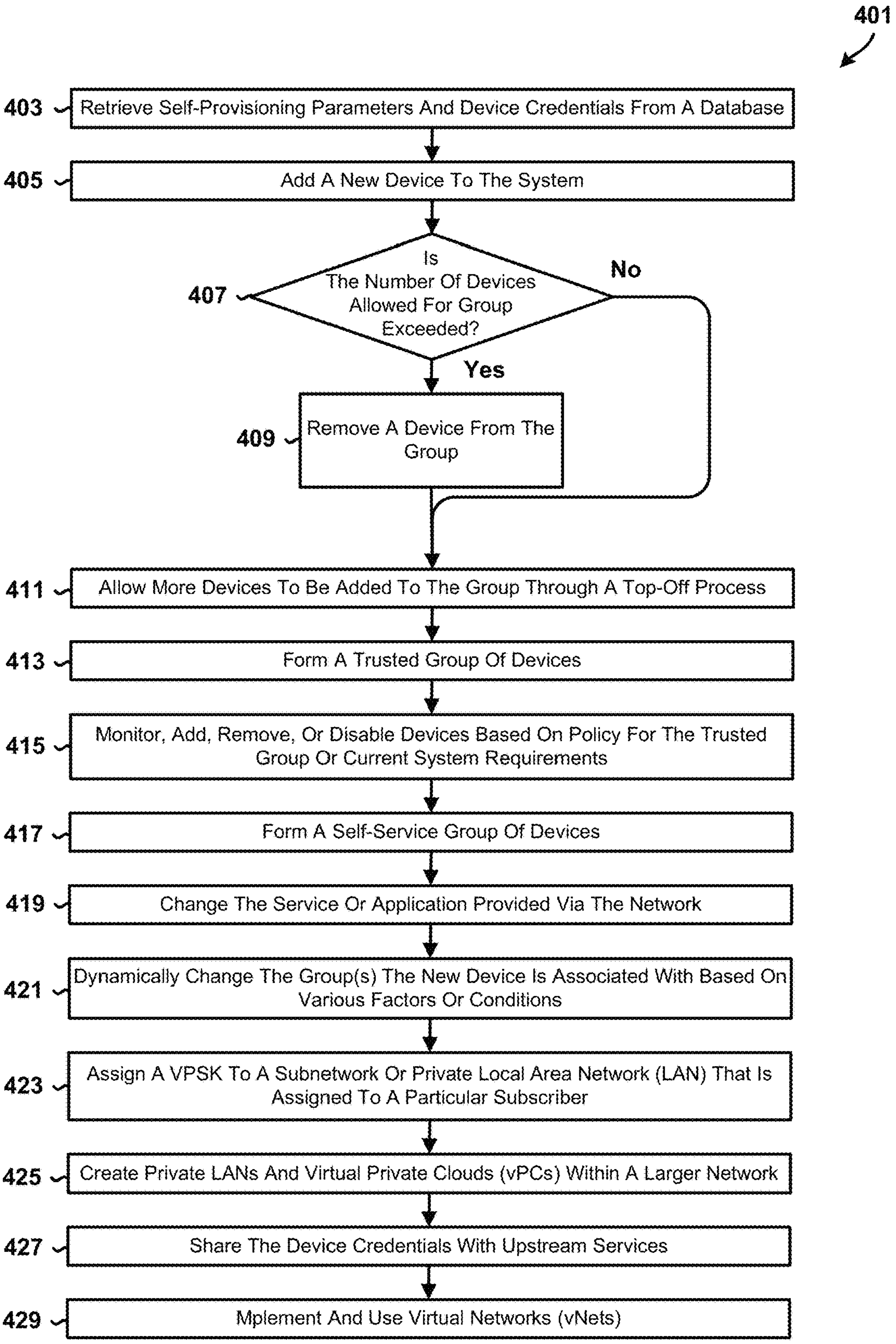

FIG. 4C illustrates a method 401 for automated device provisioning and management in an edge computing system in accordance with some embodiments. Method 401 may be performed by a processor in a computing device (e.g., user devices 102, edge devices 106, ECN 306, 308, etc.) in an edge computing system that includes a vDA system.

In block 403, the processor may retrieve self-provisioning parameters and device credentials from a database. For example, the processor may access a centralized or distributed database storing configuration data necessary for the self-provisioning process. This retrieval process may help ensure that the new device may be properly authenticated, authorized, and integrated into the edge computing system. The processor may query the database using specific identifiers or parameters associated with the new device, such as its MAC address or a unique device identifier, to fetch the relevant provisioning data. In some embodiments, the processor may retrieve information related to account identification, device name, MAC address, subscription services, quality of service (QOS), service enhancement capabilities, access restrictions, and group assignments. This information may be used to configure the device settings, assign appropriate policies, and ensure that the device complies with network security protocols and service agreements.

In block 405, the processor may add a new device to the system. For example, the processor may detect an unrecognized device attempting to connect to the network, activate a self-provisioning process upon detecting the unrecognized device, authenticate and authorize the unrecognized device locally, and automatically add the new device to the edge computing system without extensive manual configuration. This automated process may include the processor configuring the device with necessary settings, policies, and security measures to ensure seamless integration into the system.

In determination block 407, the processor may determine whether the number of devices allowed for a group is exceeded. For example, the processor may compare the current number of devices in a group with a threshold value or predefined group limit stored in the system. If the number exceeds the limit, the processor may proceed with removing a device as per block 409.

In block 409, the processor may remove a device from the group in response to determining that the number of devices exceeds the allowed limit (i.e., determination block 407="Yes"). For example, the processor may select a device based on predefined criteria, such as the least recently used device, and remove it from the group to make space for new devices.

In block 411, the processor may allow more devices to be added to the group through a top-off process in response to determining that the number of devices does not exceed the allowed limit (i.e., determination block 407="No"). In some embodiments, the processor may increment the group limit temporarily or permanently to accommodate additional devices.

In block 413, the processor may form a trusted group of devices. For example, the processor may group devices based on trust levels, usage patterns, or security requirements, creating a cohesive unit of devices that may communicate securely and efficiently within the edge computing system.

In block 415, the processor may monitor, add, remove, or disable devices based on policy for the trusted group or current system requirements. For example, the processor may continuously track device activity, performance metrics, and compliance with security policies to make real-time decisions about device management. In some embodiments, the processor may update the status of devices in real time to ensure compliance with current policies and system requirements. For example, the processor may automatically disable a device that exhibits suspicious behavior or fails to meet predefined performance criteria. In addition, the processor may add new devices to the group as they are approved and configured and remove devices that are no longer needed or have been decommissioned.

In block 417, the processor may form a self-service group of devices. For example, the processor may group devices that are intended to operate autonomously with minimal manual intervention (e.g., smart home devices, IoT sensors, etc.) into a dedicated self-service category. In some embodiments, in block 417, the processor may verify that the device credentials are valid and preapproved for a set of particular functions, add the new device to the group, prompt a user for device credentials, record the device self-authorization details, assign a policy to the new device, and assign a virtual pre-shared key (vPSK) to the new device. For example, the processor may cross-check the device credentials against a predefined list of authorized devices and functionalities so that only approved devices with appropriate permissions are added to the self-service group. The processor may then guide the user through the credential input process, securely store the authorization details, and apply relevant network and security policies to the new device. These operations may allow for its seamless integration into the network with a unique vPSK for secure communication.

In block 419, the processor may change the service or application provided via the network. For example, the processor may determine whether a requested service is not part of the current group or policy, determine whether the application can be used by the new device based on its capabilities, and adjust provisioning to allow for the new service and allow the new service to be accessed by the new device. This ensures that the device can access appropriate services based on its capabilities and user requirements.

In block 421, the processor may dynamically change the group(s) the new device is associated with based on various factors or conditions. For example, the processor may evaluate real-time network performance metrics and adjust group memberships to optimize resource utilization and service delivery. In some embodiments, the processor may reassign the new device to different groups based on device capabilities, resource availability, and service requirements. For example, the processor may move a device from a standard user group to a high-performance group if the device exhibits enhanced processing power and memory capacity or shift devices to different groups during peak usage times to balance network load and maintain optimal performance across the edge computing system.

In block 423, the processor may assign a vPSK to a subnetwork or private local area network (LAN) that is assigned to a particular subscriber rather than to individual devices. For example, the processor may configure the subnetwork with a shared vPSK, allowing all devices within the subnetwork to communicate securely while simplifying key management.

In block 425, the processor may create private LANs and virtual private clouds (vPCs) within a larger network. For example, the processor may segregate network traffic to ensure isolated communication channels for different groups of devices. This segmentation may enhance security and performance by isolating traffic and resources.

In block 427, the processor may share the device credentials with upstream services for redundancy and resiliency. For example, the processor may transmit device credentials to cloud-based services or other network components to ensure that device information is backed up and the system can recover from failures.

In block 429, the processor may implement and use virtual networks (vNets). For example, the processor may create isolated virtual network segments within the larger edge computing system to ensure secure and efficient communication between devices. The processor may dynamically configure vNets to form trusted domains that provide enhanced security and control over network traffic.

In some embodiments, the processor may use vNets to form a trusted domain that allows operators to provide remote endpoint visibility and control through dynamic network segmentation. This segmentation may help manage network resources more effectively and isolate sensitive data. For example, the processor may establish a vNet for a specific group of devices so that communication within this group remains secure and does not interfere with other network segments.

In some embodiments, the processor may use the vNets to create localized networks that are automatically and dynamically segmented into trust domains and provide automatic secure connections to services outside of the home settings. This capability may allow for seamless integration with external services while maintaining strict security protocols. For example, the processor may create a vNet for home automation devices that securely connects to a cloud service. This may allow the devices to operate within a controlled environment while analyzing necessary external resources.

By implementing and using vNets, the processor may enhance the overall security, flexibility, and efficiency of the edge computing system for better resource management and improved service delivery to end devices.

Method 401 achieves self-provisioning by automatically adding new devices to the edge computing system without extensive manual configuration. This process enhances network scalability and flexibility while maintaining strong security measures. The outcome includes dynamically managed device groups, efficient resource allocation, and secure network access tailored to individual device capabilities and service requirements.

In the examples discussed herein (e.g., with reference to FIG. 3B-4A, 4C, FIG. 8A-10, etc.), the vDA system may simplify client device access by allowing a common SSID to be used across multiple policy groups (or traffic groups), each with its own unique pre-shared key (PSK). These policy groups may be based on a single device (using a per-device PSK) or a group of devices, such as those belonging to the same subscriber (using a per-subscriber PSK), user (using a per-user PSK), or company (using a per-company PSK). Policy groups are discussed in more detail below with reference to FIG. 8A-9B.

In some embodiments, the vDA system may be configured to simplify client device access by allowing for the use of a per-subscriber passphrase (or per-traffic-group passphrase, etc.). The per-subscriber passphrase may be used for any number of devices associated with a given subscriber (as opposed to a per-device passphrase that is unique to a single device). By using a per-policy-group passphrase, all of the ECNs may be configured with the same settings, including a common SSID and passphrase. Subscribers may be easily added or removed from the system by a grid or geographic zone, rather than being tied to a specific ECN. This allows any user device to connect to any ECN or vCPE within the same grid or geographic zone, taking advantage of overlapping coverage areas.

The vDA system may also be configured to simplify client device access by allowing for the group(s) that a device is associated with to change dynamically based on various factors or conditions (e.g., device capabilities, resource availability, resource requirements, etc.). That is, by using a vPSK, per-policy-group passphrase, and/or common SSID in accordance with the various embodiments, the vDA system may dynamically reconfigure, change, modify, or adjust the group memberships of the devices (e.g., ECN, user device, etc.) based on various factors or conditions. This ability to dynamically reconfigure the group memberships and have all devices within each group communicate securely and efficiently may allow the vDA system to provide wide array of new or improved features and functionalities.

One example of a vPSK being particularly useful is in a broadband wireless network at a large multiple dwelling unit (MDU) in which broadband services are delivered by having the subscriber devices on the same subnet. This method of deployment may require the creation of multiple PSK SSIDs, so that each type of subscriber with their devices may have its own VLAN. However, the radio resources available for user traffic may decrease as the number of SSIDs increases. It is therefore preferable to have a solution with as few SSIDs as possible. The use of vPSK in accordance with the various embodiments may allow multiple devices to be on a single PSK SSID (thus reducing the number of SSIDs) while still providing differential access and services to the devices.

Another example of a vPSK being particularly useful is a broadband service provider delivering service to a school district. The school district purchases netbooks for the students, but these netbooks only support the use of pre-shared keys (PSKs). It is understood that the PSK will be attempted to be shared. The vPSK allows for a unique PSK to be assigned to each netbook and bound to the Media Access Control (MAC) address of the netbook itself. If an attempt is made to use that PSK on another device, authentication will fail. As the number of user devices per user increases, the concept of assigning a specific PSK to each device may become cumbersome for the end user. It is particularly cumbersome when multiple user devices need to be added and operate autonomously.

In some embodiments, the vDA system may be configured to assign a vPSK (or PSK) to a subnetwork or private local area network (LAN) that is assigned to a particular subscriber, rather than to individual devices. This may simplify the process for the end user and/or allow for autonomous operation of the user devices. Services on the private LAN may use either unique PSKs or a shared vPSK for all new devices. The vPSK assignment may be either static or dynamic, allowing the PSK to be reassigned to the device or the device to be associated with multiple groups based on the type of service needed. With vPSK, each PSK may create its own network or subnetwork within the LAN, creating a private LAN that is isolated from other users. A policy may also be used to bind the device's MAC address to a vPSK using a lookup table on the ECN or in the cloud, so the service will continue even if the connection is lost. Having a single shared PSK among multiple devices in a group may also allow for greater control over the edge devices.

In some embodiments, the vDA system may be configured to create private local area networks (LANs) and virtual private clouds (vPCs) within a larger network. The vDA system may use vPSK mappings and policy groups to provide self-service provisioning for user devices, allowing them to be added to the private LAN or vPC without the need for additional authentication or support. The vDA may also support distributed policy and traffic shaping through the use of dynamic network slicing, which may include dividing the network into discrete segments, or virtual slices (vSlices), to support specific services or functions. The vSlices may be created vertically, horizontally, or diagonally, and may be combined with other vSlices or sub-slices to provide the required resources and isolation for a given service or device. The vDA system may also support microservices in a container environment and/or provide Quality of Service (QOS) for user devices through the use of policies and group allocations for network slicing.

The vDA system may be configured to support a range of different services and applications, such as providing broadband service access for edge devices, local computing capabilities, traffic shaping, intelligent and targeted network slicing, and more. In doing so, the vDA system overcomes many technical challenges in delivering services and providing security at the edge, such as challenges related to the increasing number and complexity of devices, the shared and loosely managed service delivery to these devices, the limited visibility of operators within households and small and medium-sized businesses (SMBs), and the growing device-centric consumer behavior.

For example, as discussed above, the vDA system may simplify client device access. In addition, the vDA system may be configured to be flexible in handling operational and business relationships with devices, including the architecture for business support system (BSS) and operation support system (OSS) integration to support multiple payers at customer premises (e.g., tied to devices, apps, or bandwidth), custom network services, and new revenue models. The vDA system may also be configured to function with or without a cloud service and to dynamically scale the provisioning of services, allowing for the addition and removal of edge devices and end devices within the subscriber's control. It may also provide or support a secure environment, such as by establishing different categories of "trust domains" or "Trusted Zones" at customer premises for each edge device or user device (including IoT devices, etc.).

As further examples, the vDA system may be configured to provide or support elastic scaling and network slicing across specific network components, such as core elements, radio access components, or network segments. The vDA system may provide devices with wireless broadband access, with options for prepaid and postpaid subscription, as well as value-added services such as Internet Protocol television (IPTV). The vDA system may support IT services by allowing device access from available access points and providing service to devices. This may be used to, for example, facilitate home health management by allowing medical devices to directly connect to healthcare providers. The vDA system may also be used to enhance gaming experiences by providing low-latency services directly to gaming devices, even in locations that have not subscribed to this service.

In some embodiments, the vDA system may be configured to simplify client device access processes while maintaining strong security measures and overcoming many of the limitations and disadvantages of existing solutions. For example, as the number of smart devices on a network increases, a conventional network's flat structure and potentially insecure device security protocols may make it vulnerable to cyber threats. If a single device is hacked, the entire network could be compromised, leading to data theft or sabotage. The vDA system may be configured to overcome these and other limitations of conventional solutions, thereby improving the security and performance the network and its constituent components.

In addition, the vDA system may be configured so that it performs or provides a variety of other features and functions, such as providing broadband service access for edge devices, local computing capabilities, network slicing, traffic shaping, etc. Regardless of the function, the vDA system and its components may face many technical challenges in delivering the required services and providing security. These challenges may be compounded by the increasing number and complexity of devices, the shared, loosely managed, and best-effort service delivery to these devices, the limited visibility of operators within households and Small and Medium-Sized Businesses/Small and Medium-Sized Enterprises (SMB/SMEs) to devices, and the growing device-centric consumer behavior. The vDA system may be configured so that it may manage and overcome these and other challenges and still remain capable to manage future challenges as they arise.

For example, the vDA system may be configured so that it is flexible in how it handles operational and business relationships with devices, including the architecture for Business Support System (BSS) and Operation Support System (OSS) integration to support multiple payers at customer premises (e.g., tied to devices, apps or bandwidth), custom network services, and new revenue models. The vDA system may also be configured to be able to function with a cloud service, and yet continue to function without the cloud service or when upstream services are lost. The vDA system may be further configured to scale the provisioning of services and allow for the addition and removal of end devices within the subscriber's control.

In some embodiments, the vDA system may be configured to provide or support a secure environment. For example, the vDA system may be configured to establish different categories of "Trusted Zones" at customer premises for each user device or IoT device, and not just at the customers location with an IP address.

In some embodiments, the vDA system may be configured to provide or support network slicing across specific network components, such as core elements, radio access components, or network segments.

In some embodiments, the vDA system may be configured to provide wireless broadband access with options for prepaid and postpaid subscription, as well as value-added services such as IPTV. The vDA system may also support IoT services by allowing device access from available access points and providing service to devices (such as Ring doorbells, etc.). Another use case is facilitating home health management by allowing medical devices to directly connect to healthcare providers, including medical broadband with high Quality of Service (QOS), non-repudiation, and remote patient monitoring. The vDA system may also enhance gaming experiences by providing low-latency service directly to gaming devices, even in locations that have not subscribed to this service. Device profiles may follow the device, rather than the home delivery address.

In some embodiments, the vDA system may be configured to allow subscribers in multiple dwelling units (MDUs) to subscribe to their own broadband plan, eliminating the need for a subscriber access appliance such as a router or gateway. Additionally, the vDA system may provide work-device-specific services, such as security (SD-WAN), to enterprises for employees working from home. The vDA system may also respond to regulator requests to provide prioritized access to specific users, such as emergency responders or healthcare agencies, during emergencies or for quarantined individuals.

There may be multiple devices that are related to a particular edge application deployment. In some embodiments, the vDA system may establish a "trusted domain" or "grouping" in order to properly manage these devices and the application they are running. The use of a trusted domain may also be important for authentication, provisioning, service delivery, network slicing, and security in edge computing.

In some embodiments, the vDA system may be configured to deliver services to the edge of a network in a way that simplifies configuration, provisioning, and enhances security. For example, the vDA system may employ multiple layers of network security, such as network segmentation and secure network extension, which may help to prevent and address issues before they are able disrupt the rest of the network.

In some embodiments, the vDA system may be configured to implement and use a microservice architecture that is particularly well-suited for edge network applications and/or is based on a modular approach that divides software into independently replaceable and upgradeable components. The vDA system may generate the components or services as processes that communicate with each other over a network using technology-agnostic protocols. Traditional architectural styles, on the other hand, often aim to create software as a single cohesive unit, which may be less flexible and scalable.

In some embodiments, the vDA system may be configured to use Dynamic Software Defined Networking (DSDN) to dynamically set up a restricted access network or subnetwork. The vDA system may then use these DSDN subnetworks to isolate and protect connected devices. Within the vDA system, the services or applications may be part of a local network, which may have multiple managed service local networks or virtual networks (vNets). Each vNet may utilize a common pre-shared key (PSK) as part of the trusted domain for the devices to access. All devices within a vNet may share the same PSK.

Thus, in some embodiments, the vDA system may be configured to implement and use virtual networks (vNets). A vDA vNet may be a trusted domain that allows operators to provide remote end point visibility and control through dynamic network segmentation. The vDA vNets may allow for the creation of localized networks that are automatically and dynamically segmented into trust domains, providing automatic secure connections to services outside of the home settings. As such, the vDA system (e.g., using vNets, etc.) may be the next significant evolution for deploying microservices as close as possible to the end device and user, especially with the advancement of edge computing capabilities, which allow for the deployment of micro edge services at the network edge.

In some embodiments, the vDA system may include or implement an edge application delivery platform that splits an edge application into smaller standalone functions, which may then be deployed to the vNet as "vNet applications." The vNet applications may be interconnected with each other (and with other applications) for service delivery. This may allow for a more agile approach to delivering services, as it allows for updates or modifications to be made more efficiently.

In some embodiments, the vDA system may be configured to use the vNets to improve application deployments, such as by decomposing applications into fundamental and autonomous services (or vNet applications) that may be deployed independently of each other. Each of these services or applications may implement a unique set of features and/or functions.

In some embodiments, the vDA system may be configured to generate, provide, or implement a distributed edge implementation and deployment system for services that improves the deployment of edge applications. For example, in a distributed edge implementation and deployment system, applications and services may be deployed across multiple edge locations (e.g., via different ECNs, etc.), rather than being concentrated in a single central location. This may help to improve the performance, reliability, and availability of the applications and services, as the applications and services are located closer to components they access and/or to the entities that access them.

In some embodiments, the vDA system may be configured to implement or use vNets such that each individual service or micro edge service (MES) is a mini-application that may use an API that is accessed by another microservice or by the application's clients. However, in such a configuration, it may be common for each local or micro edge service to develop more and more service dependencies over time, which could lead to scalability issues in managing the interdependent micro edge services in the vDA system.

In some embodiments, the vDA system may be configured to improve edge service delivery, provisioning, and authentication. For example, for subscriber authentication, the vDA system may intercept the WPA2 4-way handshake, which is a process that occurs when a device connects to a Wi-Fi network that is using the WPA2 protocol for security. During the handshake, the device and the access point exchange a series of messages to authenticate each other and establish a secure connection. When a device starts the authentication process, an ECN in a vDA system may check to determine whether the subscriber's passphrase matches. If the subscriber has been identified, the subscriber's device may be authenticated and assigned to that subscriber's Virtual Local Area Network (VLAN). This may allow the device to communicate with other devices belonging to the same subscriber, and block communications with other subscribers.

In some embodiments, the vDA system may be configured to perform pre-shared key (PSK) lookup interception, which may include by intercepting and retrieving the PSK that is being used by a device (e.g., ECN, user device, etc.) to secure a wireless network (or the subscriber's VLAN, etc.).

In some embodiments, the vDA system may be configured to allow for the use of a per-subscriber passphrase (or per-policy-group passphrase, per-traffic-group passphrase, etc.) that may be used for any number of devices associated with a given subscriber, as opposed to a per-device passphrase that is unique to a single device. By allowing the use of a per-subscriber passphrase, the vDA system may simplify the process of client device access while maintaining strong security measures, and also overcome various other limitations and disadvantages of existing and conventional solutions.

In some embodiments, the vDA system may be configured to perform per-device VLAN tagging, which is a technique that allows administrators to assign a specific VLAN to each device that is connected to a network. Per-device VLAN tagging may include tagging network traffic that is transmitted between the device and the network with a VLAN identifier, which specifies the VLAN to which the device belongs. Per-device VLAN tagging may be implemented using VLAN Trunking Protocol (VTP) and used to segment a network into smaller, virtual sub-networks.

In some embodiments, the vDA system may be configured to support pre-shared key (PSK) lookup interception and per-device VLAN tagging locally at the edge of the network by an edge compute node (ECN). Micronets (small autonomous networks) may have a limited number of devices per subscriber, and the IP addresses may be pre-allocated by the cloud. As such, in some embodiments, the vDA system may allow the IP address management to be moved to the ECN and assigned dynamically, either by the ECN/vCPE or by the subscriber themselves.

In some embodiments, the vDA system may be configured to implement and use a microservice architecture that is particularly well-suited for edge network applications and/or is based on a modular approach that divides software into independently replaceable and upgradeable components. The vDA system may generate the microservices (or other components or services) as processes that communicate with each other over a network using technology-agnostic protocols. Traditional architectural styles, on the other hand, often aim to create software as a single cohesive unit, which may be less flexible and scalable.

In some embodiments, the vDA system may be configured to deliver microservices at the edge of the network (network edge). These microservices may be run on an ECN or vCPE, which may obtain the microservices locally, from a cloud service, or a combination thereof. In some embodiments, the vDA system may be configured to allow for the use of microservices in a container environment, which may help reduce provisioning requirements for end users and ensure that connections between devices and applications meet the necessary QOS requirements.

Figure 5:
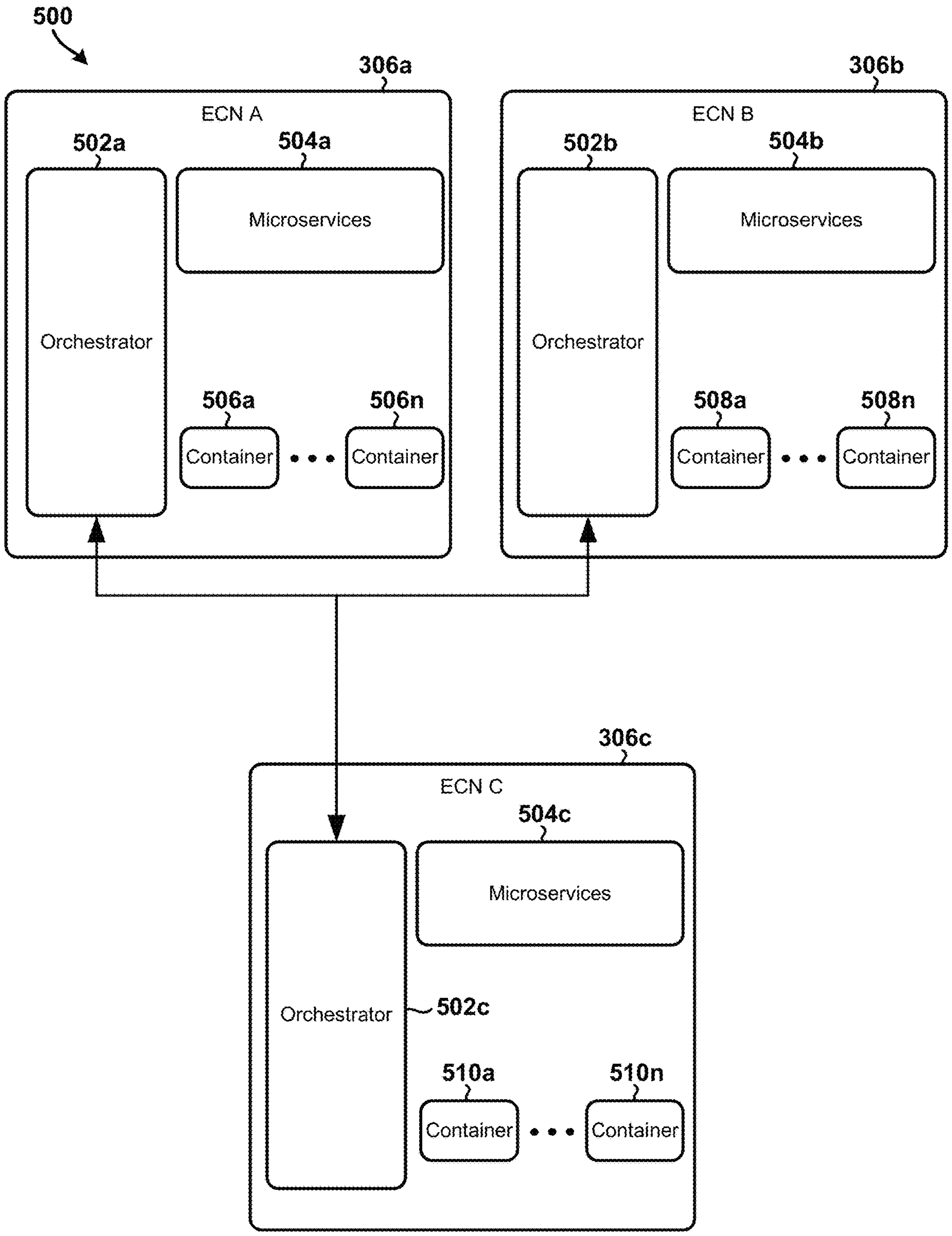
FIG. 5 is a component block diagram that illustrates an example vDA system suitable for delivering microservices in a container environment at the edge of a network in accordance with some embodiments.

FIG. 5 illustrates an example vDA system 500 suitable for delivering microservices in a container environment at the edge of a network in accordance with some embodiments. In the example illustrated in FIG. 5, the vDA system 500 includes a plurality of ECNs 306*a*-306*c* that each include an orchestrator 502*a*-502*c* component, a microservices 504*a*-504*c* component and a plurality of containers 506*a*-510*n*. The vDA system 500 may intelligently determine and select the microservices 504*a*-504*c* components and/or containers 506*a*-510*n* to use to operate, execute, or run each microservice or application based on the resource requirements of the microservice/application, the availability of the resources (e.g., ECNs, ECN resources, etc.) in the system, and/or the availability of the required resources. Each time a new ECN 306 is added or removed from the system 500 (e.g., as part of the scaling operations, etc.), the vDA system 500 may create a new container 506*a*-510*n* on an appropriate ECN 306 to run the microservice or application.

Figure 6:
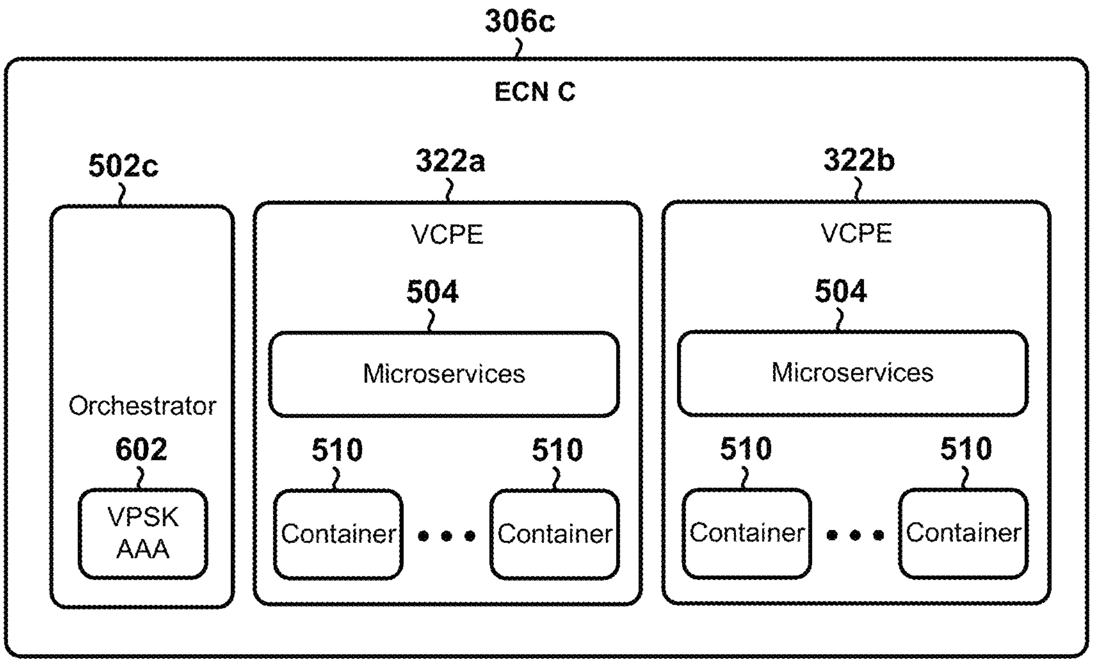
FIG. 6 is a component block diagram that illustrates a virtual customer premises equipment (vCPE) in an ECN that may be used to deliver microservices in a container in a container environment at the edge of a network in some embodiments.

FIG. 6 illustrates that virtual customer premises equipment (vCPE) in an ECN may be used to deliver microservices in a container in a container environment at the edge of a network in some embodiments. In the example illustrated in FIG. 6, ECN 306*c* includes multiple vCPEs 322*a*, 322*b* that each include the microservices 504 component and container 510 components. The ECN 306*c* also includes an orchestrator 502 component that includes a VPSK AAA 602 component. The VPSK/AAA 602 may be responsible for the local management of the vPSK and authentication. The vPSK may have different policy attributes that may be applied to any or all of the devices in the system.

Thus, the delivery of microservices may be accomplished through ECNs (as illustrated in FIG. 5) and/or through a vCPE (as illustrated in FIG. 6). In some embodiments, the ECN/vCPE may deliver microservices through various other methods, which may include running software applications in the containers, on the platform itself, as a virtual machine, etc. The microservices may be obtained locally by the ECN or vCPE, from a cloud service, or a combination thereof.

Figure 7A:
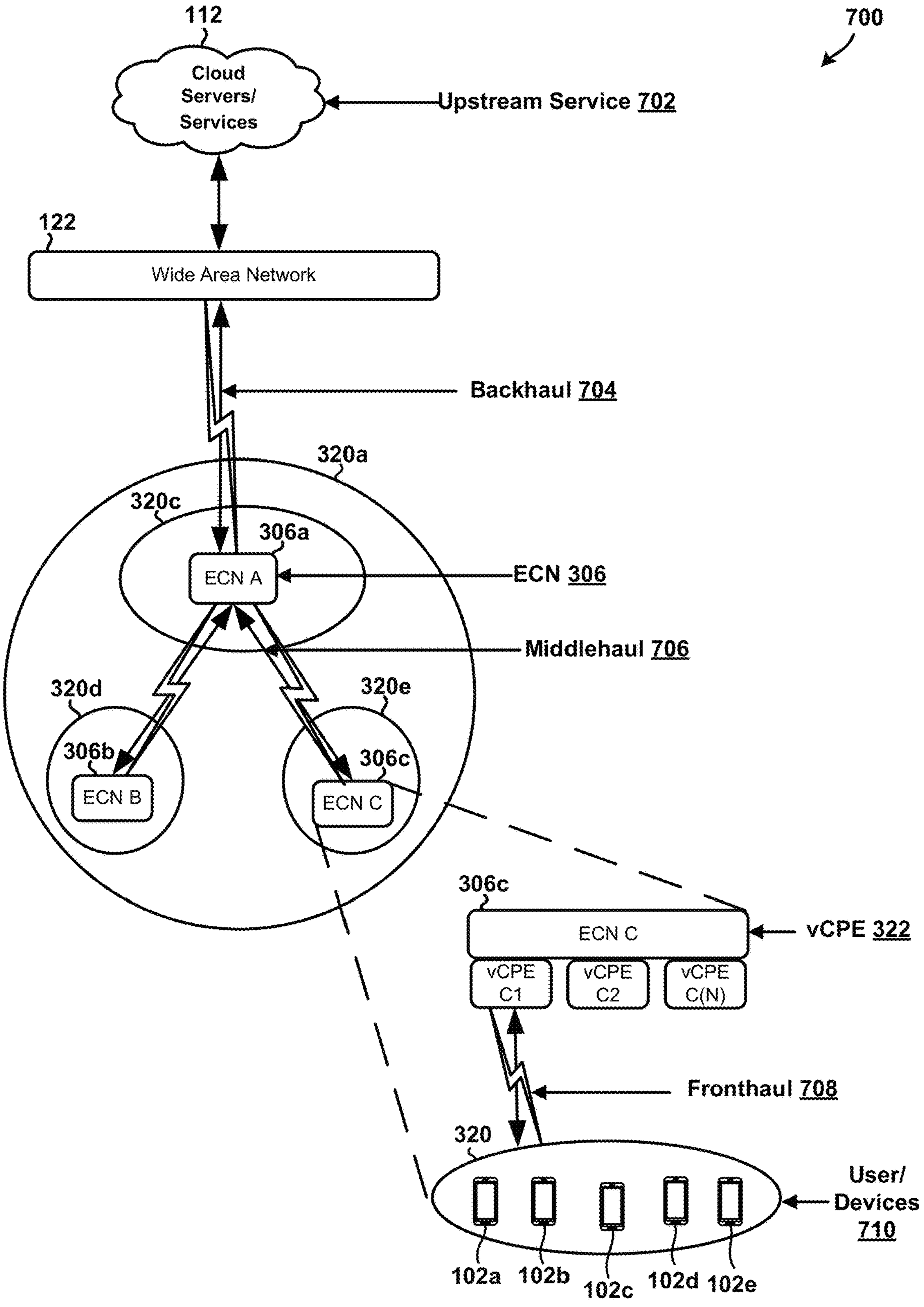
FIGS. 7A and 7B are component block diagrams that illustrate example edge network ecosystems that implement or include vDA systems that could be configured to perform vCPE segmentation in accordance with some embodiments.
Figure 7B:
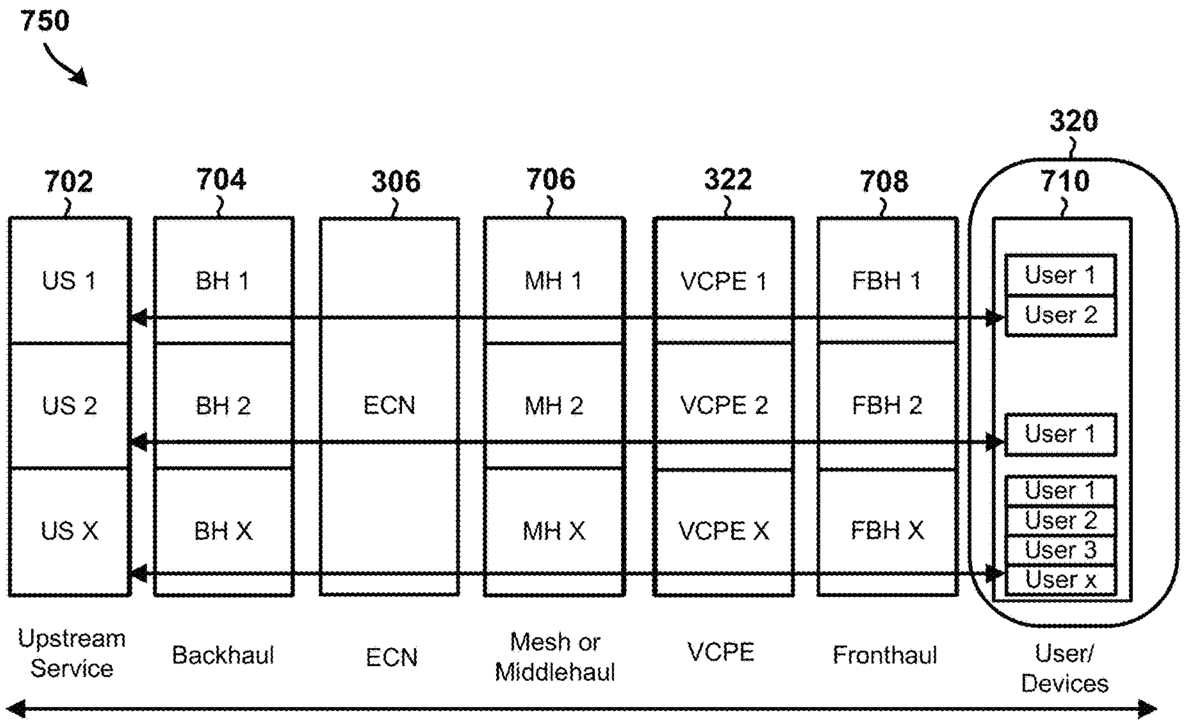

FIGS. 7A and 7B are component block diagrams that illustrate example edge network ecosystems 700, 750 that implement or include vDA systems that could be configured to perform vCPE segmentation in accordance with some embodiments. In the examples illustrated in FIGS. 7A and 7B, the systems 700, 750 include a plurality of user devices 102 are members of the same group 320 and included in the user/device 710 portion of the edge network ecosystems 700, 750. The user devices 102 (or users, devices, subscribers, etc.) connect to an upstream provider to receive upstream services 702 via a user/device 710 portion, a fronthaul 708 portion, a vCPE 322, a middlehaul 706 portion, an ECN 306, and/or a backhaul 704 portion.

The fronthaul portion 708 may be a wired or wireless connection between the user device 102 and/or the vCPE 322 (or ECN 306*c*). The middlehaul 706 portion may be an intermediary network infrastructure node (mesh node) that connects different parts of the network and acts as a relay point for data traffic, allowing data to be transmitted between vCPE 322 (or ECN 306*c*) and ECN 306*a* even if there is no direct connection between them. The middle mesh may also be a star or point to point connection. The backhaul 704 portion may include the network infrastructure between the WAN 122 and the cloud servers/services 112.

With reference to FIGS. 7A and 7B, the ECN 306*c* or vCPE 322 in the vDA system may collaborate with other ECNs (e.g., 306*a*, 306*b*, etc.) and/or vCPEs (not illustrated separately) in the system to deliver the upstream service 702 to the user device 102. The ECN 306*c* or vCPE 322 may also deliver the upstream service 702 on its own, thereby reducing the number of devices that must be traversed in the service delivery process.

In some embodiments, an ECN 306 or vCPE 322 may be configured to provide radio access, and its radio spectrum, channel, capacity, etc. may be defined by its corresponding PSK and/or group(s). The vDA system may be configured to segment or slice these radio access portions based on the groups, which may allow the vDA system to provide differential service treatment based on subscriber type (whether it is best effort or low latency).

In the example illustrated in FIG. 7B, each of the upstream services 702, backhaul 704, middlehaul 706, vCPE 322, and fronthaul 708 are divided into a multiple network segments (e.g., vCPE segments). These network segments may be used to create isolated environments within the network. These network segments may also create separate network environments for different groups or policies, such as to provide different levels of service or security. For example, the system may create a network segment for high-bandwidth users and another segment for low-bandwidth users.

In some embodiments, the ECN 306 may be both physical and virtual at the same time. For example, when the ECN 306 uses virtualization, it may be segmented into one or more virtual CPEs (e.g., vCPE 1 to vCPE X in FIG. 7B). The radio access portion for the fronthaul 708, backhaul 708, and middlehaul 706 links may also be segmented (e.g., into FBH 1 to FBH X, BH 1 to BH X, and MBH 1-MBX in FIG. 7, etc.) as needed to support the current bearer traffic requirements or those based on the subscriber's policy and contract requirements.

In some embodiments, the vDA system may be configured to segment the network (e.g., any or all of 702-708, etc.) as needed to deliver service to user devices 102. In some embodiments, the vDA system may segment the network into subnetworks or segment a particular portion of the network into separate components through virtualization.

In some embodiments, an ECN 306 or vCPE 322 may be configured to provide radio access, and its radio spectrum, channel, capacity, etc. may be defined by its corresponding PSK and/or group(s). The vDA system may be configured to segment or slice these radio access portions based on the groups, which may allow the vDA system to provide differential service treatment based on subscriber type (whether it is best effort or low latency).

Scalability is important for any network, including an edge network. A scalable network may efficiently handle an increasing workload and/or may be expanded to accommodate growth by adding more resources. Size scalability is particularly important for services and applications. Typically, an edge network scales linearly by relying on uplink infrastructure, such as cloud servers, to handle increased loads and by adding new edge computing devices. However, latency-sensitive applications and functions may be limited by the capabilities of each edge computing device.

As mentioned above, size scalability is particularly important for services and applications. Size scalability typically includes increasing the physical computing attributes such as processors, cache, memory, storage, or I/O channels, which may be accomplished in some embodiments by adding another ECN to the vDA system. The vDA system may also provide horizontal scaling, vertical scaling, diagonal scaling, and/or a combination of horizontal and vertical scaling. Horizontal scaling may include utilizing resources from other ECNs or devices that make up the edge computing system. Horizontal scaling may allow ECNs to be located anywhere within the network, not just adjacent to one another in a peer-to-peer environment. The ECNs may be one, two, or many nodes (e.g., ECNs, vCPEs, etc.) away, depending on the application and the resources available that match the application requirements.

In some embodiments, the vDA system may be configured to perform network scaling operations so as to balance various tradeoffs between performance, power consumption, and efficiency. As mentioned above, the vDA system may include a modular architecture that allows it to control and scale applications in both the horizontal and vertical network hierarchy. This modular approach allows the vDA system (e.g., via a processor or processing system in an ECN 306, etc.) to scale the network dynamically based on the existing resource pool from the existing ECNs or by adding more ECNs. The vDA system may allow a vCPE to coordinate and communicate with other ECNs (or other vCPEs on other ECNs, etc.) to ensure that traffic flow(s) remain within the policies assigned to the groups (e.g., groups 320*a*-320*i* illustrated in FIG. 3D, etc.). The vDA system may also leverage cloud and edge architectures so that the ECNs/vCPEs are an active extension of a cloud service performing local functions.

The vDA system may allow an ECN to scale the system or network horizontally, whether it is initially installed as a standalone or as part of a larger edge computing network. As a standalone implementation, the ECN or vCPE may connect to other ECNs or vCPEs through a point-to-point wireless connection, a wireless mesh network, or a wired LAN connection, or a combination thereof. A virtual local area network (VLAN) and/or a virtual extensible local area network (VLAN) may be used to connect traffic between vCPEs, offering service and defining how traffic may be managed and isolated. The use of vCPEs may allow the vDA system to provide an added level of security, isolation, and/or protection for network traffic and the device(s). The use of vCPEs may also allow an ECN to continue to perform functions even when internet or WAN connectivity is lost or temporarily interrupted.

In some embodiments, the vDA system may implement, employ, or provide an elastic edge architecture that brings computing resources and services closer to the edge of the network, which may allow even faster and more efficient access. The elastic edge architecture may allow the vDA system to be more scalable and flexible, able to rapidly adapt to changes in workloads or demands of the applications, system, or network. In some embodiments, the vDA system's elastic edge architecture may include or utilize various components (e.g., user devices, vCPEs, ECNs, cloud servers, etc.) configured to work together to provide computing resources and services at the edge of the network and/or to provide horizontal and/or vertical scaling capabilities to adapt to the changing workloads and demands.

In some embodiments, the vDA system may distribute computing resources and services throughout the network rather than centralizing them in one location, improving efficiency by reducing latency in analyzing data and services. This may be especially useful in systems that rely on real-time processing, such as in an IoT network in which devices and sensors need to transmit and receive data quickly.

In some embodiments, the vDA system may utilize some of the key features of Software-Defined Networking (SDN). SDN may divide the network into three layers: the application layer, the control layer, and the data or infrastructure layer. Software applications may be included in the application layer. These may be network applications, cloud orchestration tools, edge applications, vNet applications, business applications, etc. These applications may be located on one or multiple user devices, ECNs, edge nodes/devices, and/or cloud servers that are remotely located from the edge network itself. The control layer may include a controller component that is configured to translate the requirements of the application layer and dynamically adjust to changes in the network by readjusting or allocating resources within the edge computing system (or within the edge computing ecosystem). The infrastructure layer may include the actual network hardware, which may importantly be layer 2 of the OSI model. The infrastructure layer may consist of user devices, edge nodes/devices, and cloud services, as well as power sources, wired and wireless backhaul, node network connections, etc.

In some embodiments, the vDA system may be configured to allow for automation in the management of large numbers of edge nodes and devices, as well as dynamic network slicing. This may be particularly useful in a multiple dwelling unit (MDU) or when multiple ECNs are operating in a grid or geographic zone, as they may be required to handle very high aggregate traffic throughput.

In some embodiments, the vDA system may include one or more ECNs that may be configured to use containers for delivering applications, network scaling, and/or network slicing. This may be beneficial because containers further allow the separation of applications from the underlying infrastructure, making them infrastructure agnostic.

In some embodiments, the vDA system may be configured to take on the role of Micronet service delivery, with the ECN/vCPE operating as the Micronet manager to manage and coordinate the operations in the private LAN(s) associated with its groups.

In some embodiments, the vDA system may assign devices (e.g., user device 102, ECN 306, vCPE 322, etc.) to one or more virtual groups (vGroups). Each vGroup may have the same or different policy groups, which may be associated with a subscriber network or subnetwork. In some embodiments, the vDA system may implement or operate the vGroups as a microservice.

In the various embodiments, the vDA system may assign and/or use multiple different groups and/or group configurations to implement the various functions described in this application. For example, during the authentication process, each device 102 may be assigned to one or more groups (or vGroups). There may be any combination of groups, devices, and/or networks. For example, a user device 102 may be included in a single group, multiple groups, a single group that includes only one device, a single group that includes many devices, multiple groups on separate networks, each with multiple devices associated with it, or any other combination of groups, devices, and networks. When device 102 is assigned to multiple groups, the groups may overlap. It should be understood that there may be numerous variations in the number of groups, devices, and networks included with overlapping groups, any or all of which may be created, implemented, and/or used by the vDA system in various embodiments.

Figure 8A:
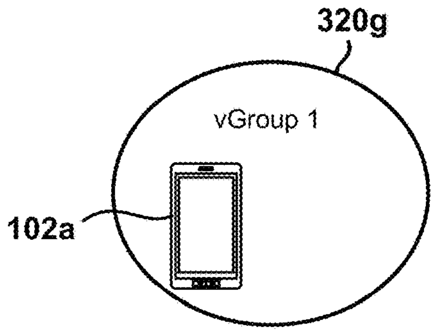
FIGS. 8A-8C are component block diagrams that illustrate three example group configurations that could be used by the vDA system to implement the various functions described in this application in accordance with some embodiments.
Figure 8B:
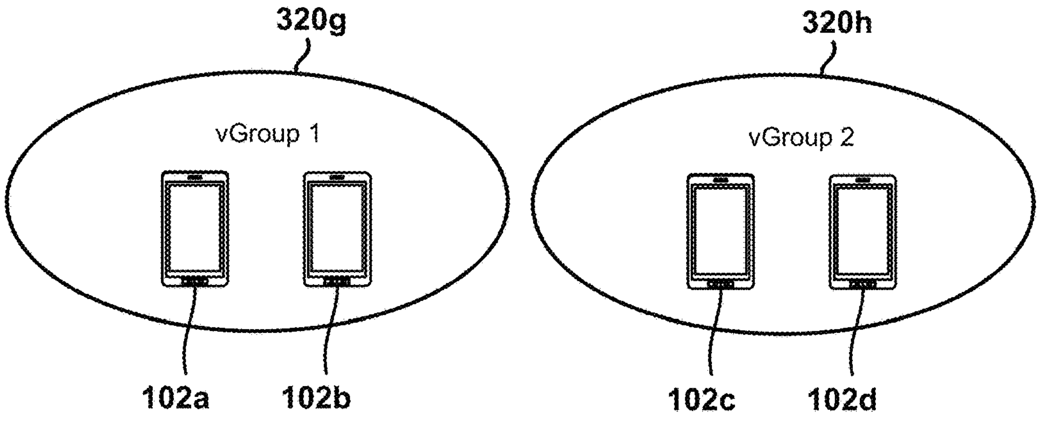
Figure 8C:
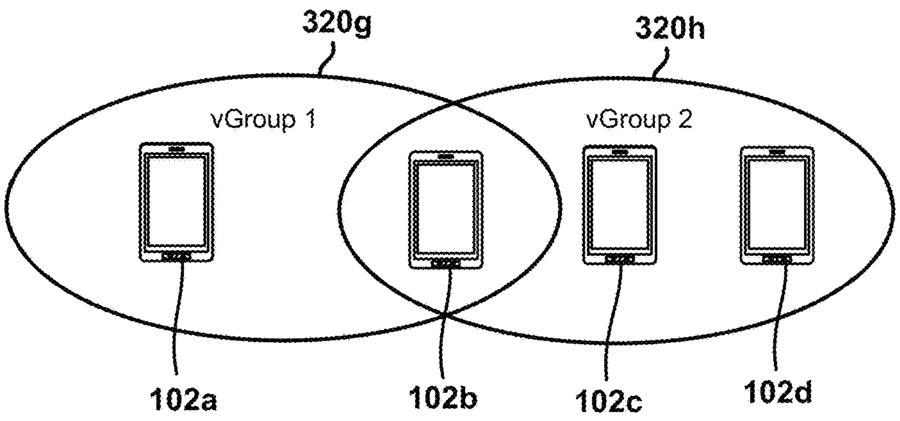

FIGS. 8A-8C illustrate three example group configurations that the vDA system could use to implement to the various functions described in this application. In the examples illustrated in FIGS. 8A-8C, the system includes 102 user devices organized into groups of 320. In some embodiments, the groups 320 may be vGroups.

FIG. 8A illustrates an example in which a user device **102*a* is included in a single group 320*g* (group 1). FIG. 8B illustrates an example in which user devices 102*a* and 102*b* are included in vGroup 1 320*g*, and user devices 102*c* and 102*d* are included in Device Group 2 320*h*. Said another way, in the example illustrated in FIG. 8B, groups 320*g* and 320*h* each include multiple devices, and each of the devices 102*a*-102*d* is assigned to a single group. There is no overlap between the groups 320*g* and 320*h***.

FIG. 8C illustrates an example in which user devices **102*a* and 102*b* are included in Device Group 1 320*g*, and user devices 102*b*, 102*c*, and 102*d* are included in Device Group 2 320*h*. Thus, user device 102*b* is included in multiple groups (i.e., in both groups 320*g* and 320*h*). As such, there is an overlap between the groups 320*g* and 320*h***.

Figure 9A:
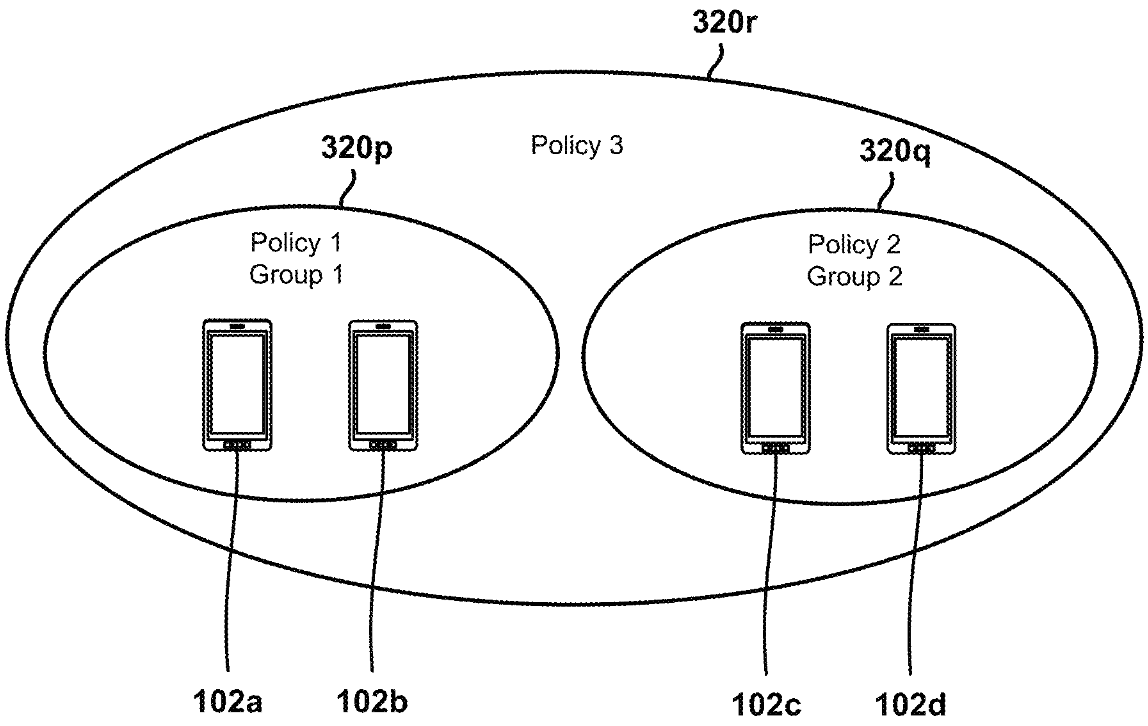
FIG. 9A is a component block diagram that illustrates that user devices may be associated with one or more policy groups, also known as traffic groups, in accordance with some embodiments.

FIG. 9A illustrates that user devices may be associated with one or more policy groups, also known as traffic groups. In the example illustrated in FIG. 9A, user devices **102*a* and 102*b* are included in Policy 1 Group 1 320*p*, and user devices 102*c* and 102*d* are included in Policy 2 Group 2 320*q*. All of the illustrated user devices 102*a*-102*d* are also included in Policy 3 group 320*r***.

Figure 9B:
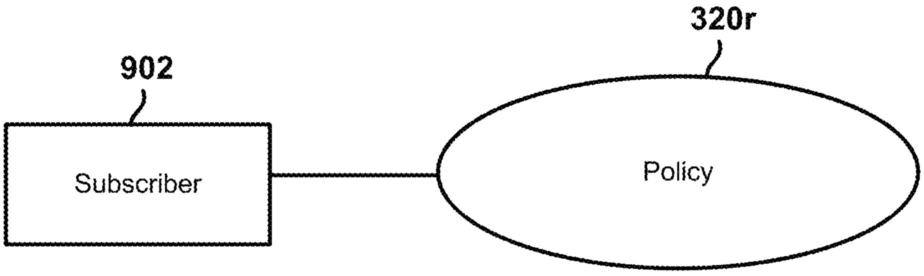
FIG. 9B is a component block diagram that illustrates that a subscriber may be associated with a policy or policy group in accordance with some embodiments.

FIG. 9B illustrates that a subscriber may be associated with a policy or policy group. In the example illustrated in FIG. 9A, subscriber 902 is associated with Policy 3 group **320*r***.

In some embodiments, the vDA system may be configured to perform policy grouping operations, which may include categorizing devices (e.g., user device 102, ECN 306, vCPE 322, etc.), associating the groups 320 with one or more policies, and assigning the devices to one or more groups 320 based on the categories and the policies related to the groups. The policies may specify, for example, Quality of Service (QOS) requirements and other bearer traffic requirements for the devices in group 320. Some devices may require multiple policies depending on the services they need. Other devices in the same group 320 may have different policy groupings.

In some embodiments, the vDA system may be configured to categorize the devices or the groups 320 based on various characteristics and/or to associate each group 320 with one or more policies. Groups 320 within a category may have the same or different policies assigned to them. The policies may be allocated in many ways, such as based on a particular subscriber or based on the group(s).

As discussed above, devices (e.g., user device 102, ECN 306, vCPE 322, etc.) may be categorized, and this categorization may be used to determine the policy that is applied to each device. Devices with the same category may be grouped into a common group, which may then be associated with one or more policies. Some devices may require multiple policies depending on the services they need, while other devices in the same group may have different policy groupings.

In some embodiments, the vDA system may be configured to associate a virtual private security key (vPSK) with a device (e.g., user device 102, ECN 306, vCPE 322, etc.) and assign it to one or more groups 320 with a defined policy. This policy may define, for example, the provisioning, network slicing, and traffic requirements for the device or group.

Figure 10:
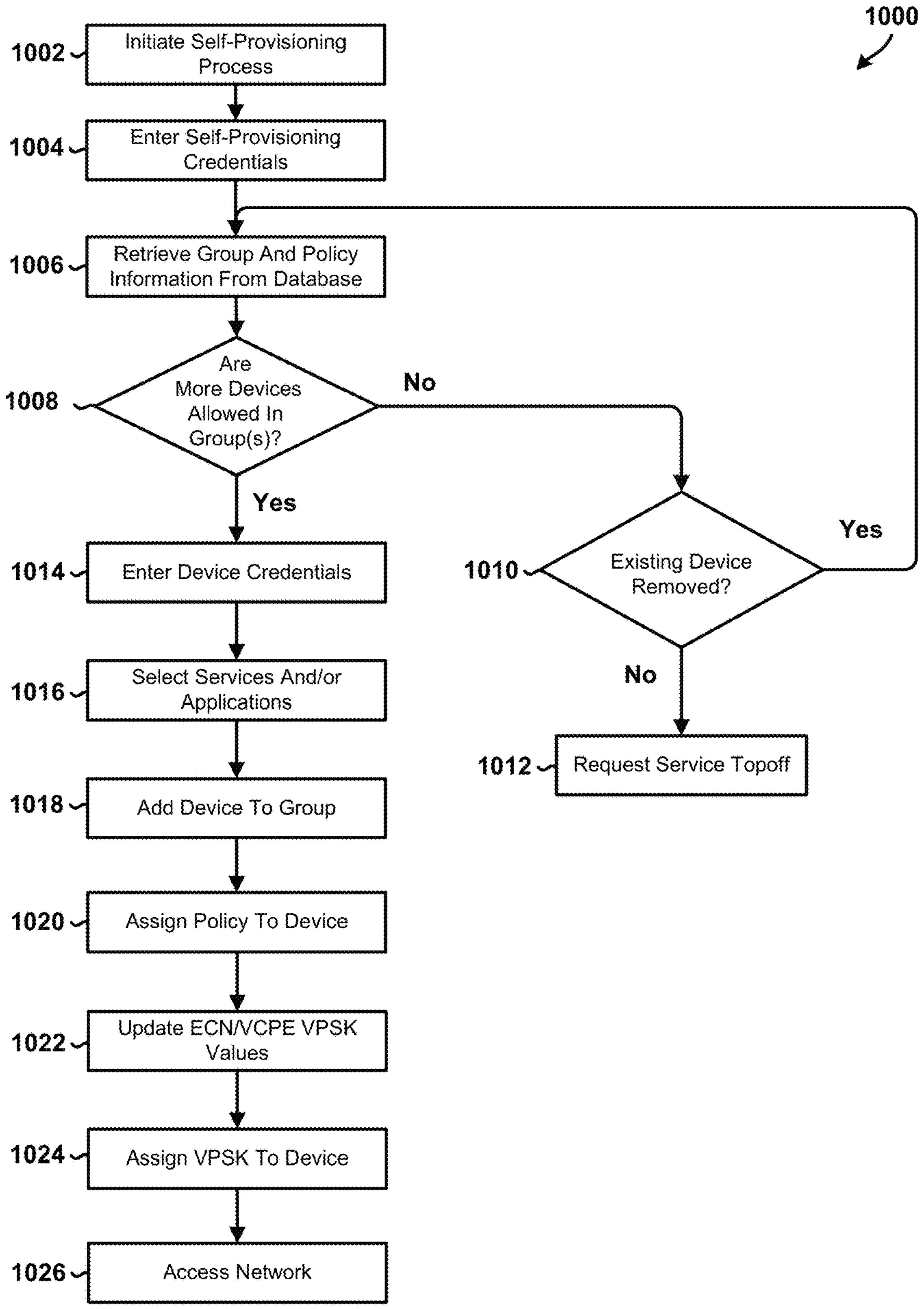
FIG. 10 is a component block diagram that illustrates a method of performing self-service in accordance with some embodiments.

FIG. 10 illustrates a method 1000 of performing self-service in accordance with some embodiments. Method 1000 may be performed by a processor in a computing device (e.g., user device 102, ECN 306, vCPE 322, etc.).

In overview, FIG. 10 illustrates that the vDA system may be configured to allow a subscriber to perform self-service to add devices to the local private network without the need for additional upstream authentication and support. With the self-service, the subscriber or end user may log into the gateway with no authentication in the isolated network and log onto the access point (AP) in the network. Within the trusted group, devices may be added, removed, disabled, or simply monitored based on policy or the system's current requirements. Some of the self-service efforts may include the vDA system predefining certain devices for local authentication and provisioning.

A self-service group of devices may be marked as local only or at some other authorization level. By defining a self-service group of devices, the vDA system may verify that the devices' credentials are valid and preapproved for a set of particular functions. Some of the functions that may be authorized for self-service include home automation devices like lighting control, a security system with an independent authentication system, or a local media server.

By allowing self-service on an ECN/vCPE, many local functions and devices may be provisioned and enabled on the local network without devices having to connect to an upstream service (e.g., upstream service 702) that is not related to the self-service device's function. For example, authorizing a security service like Ring to use the ECN/vCPE for upstream connectivity should not require the user devices 102 (e.g., Ring device) to be authorized by another service provider just to gain access to the internet and then authorize each end device and service through the security provider. The added level of authentication and provisioning is not necessary and increases the potential for service disruption as well as configuration and provisioning complexity that provides no added benefit.

With reference to FIG. 10, in block 1002, the device may initiate a self-provisioning process to acquire network access, resources, or services without external intervention or approval.

In block 1004, the device may generate and/or enter self-provisioning credentials to authenticate and authorize access to edge computing resources.

In block 1006, the device may retrieve group and/or policy information from a database. The group and/or policy information may indicate the groups and/or policies that are available in the system, available in the device, and/or required by the device.

In determination block 1008, the device may determine whether the group limit has been reached or whether there are any more devices allowed in the group(s) identified in the retrieved group information. The device may determine whether there are any more devices allowed in a group based on the number of group members in the group, a group limit value associated with the group, the group's resource requirements, the resources available to the group, etc.

In response to determining that the group limit has been reached or there are no more devices allowed in the group(s) (i.e., determination block 1008="No"), the device may determine whether an existing device was removed in block 1010. In some embodiments, the device may wait a predetermined amount of time between determining that the group limit has been reached and determining whether an existing device was removed. In some embodiments, the device may repeat the wait-and-check cycle multiple times before determining that an existing device has not been removed.

In response to determining that an existing device has not been removed (i.e., determination block 1010="No"), the device may determine that the group limit has been reached and request service top-off in block 1012. The service top-off request may cause the vDA system to scale the network or add additional resources (e.g., ECNs, etc.) or services to the edge computing system.

In response to determining that an existing device was removed (i.e., determination block 1010="Yes"), the device may retrieve new or updated group and/or policy information from the database in block 1006. That is, if a device was removed from the system, the device may determine that resources may now be available in the system and reattempt the self-service operations.

In response to determining that more devices may be added to the group(s) (i.e., determination block 1008="Yes"), the device may enter its device credentials in block 1014. In block 1016, the device may select the services and/or applications it intends to use. The services and/or applications available may be made available for selection. The services and or applications available may be selected for inclusion or non-inclusion as part of the self-provisioning process.

In block 1018, the device may be added to a group. In block 1020, the device may assign the policy to the device. In block 1022, the ECN/VCPE VPSK values for the device may be updated. In block 1024, vPSK may be assigned to the device. In block 1026, the device may access the network.

In some embodiments, the vDA system may be configured to manage the allocation of resources and the application of policies in a network to support a wide range of different services and applications. For example, the vDA system may orchestrate the creation of customized virtual networks with specific performance characteristics and requirements determined based on the policy groups, which may be tailored to the needs of different types of devices and/or services.

This combination of groups and policies (e.g., policy groups) may be used to perform network slicing, which may include partitioning a single physical network infrastructure into multiple virtual networks. Network slicing may be performed based on the type of device or desired bearer service, and it may be performed as a private subnetwork (VLAN) is established. This allows the vDA system to create customized virtual networks with specific performance characteristics and requirements, which may be tailored to the needs of different types of devices and services. The network slicing and/or policy grouping operations may include the fronthaul, backhaul, or any or all of the other components in the network ecosystem required for the delivery and execution of the service and application(s).

Figure 11A:
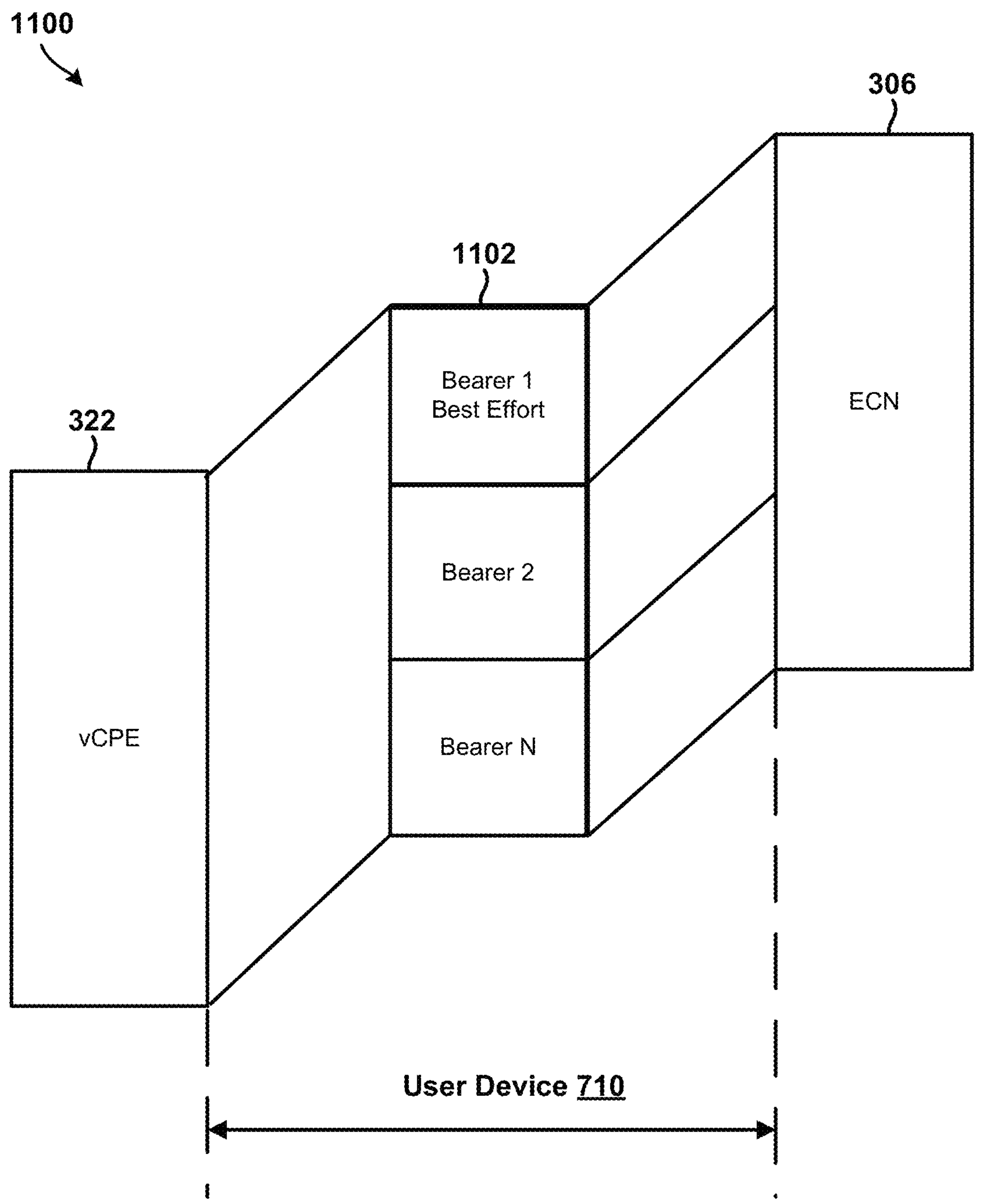
FIG. 11A is a component block diagram that illustrates an example edge network ecosystem that implements a vDA system that could be configured to perform network slicing in accordance with the various embodiments.

FIG. 11A is a component block diagram that illustrates an example edge network ecosystem 1100 that implements a vDA system that could be configured to perform network slicing in accordance with the various embodiments. In the example illustrated in FIG. 11A, the edge network ecosystem 1100 includes a user device 710, a vCPE 322, and a fronthaul 708 that includes a bearer 1102 component. The bearer 1102 component may include several bearer services (e.g., Bearer 1-N).

A particular device may have several bearer services (e.g., Bearer 1-N) associated with a vCPE 322. However, when multiple customers or subscribers are using the network, they may be separated by allocation to a vCPE 322 or a separate subnet, depending on the policy or policies implemented for the group or groups. For example, a security policy could be implemented so that a particular group is allowed to use the same vCPE 322 but on different subnets. Alternatively, the security policy may require that the groups be implemented on their own vCPE 322.

The vDA system may be configured to allow numerous group and policy combinations, allowing for the customization of services. For example, the vDA system may be configured to aggregate one or more policies onto the same subnet or network segment. Additionally, the vDA system may use one or more subnets or network segments for Peer-to-Peer (P2P) communication, which may be used by a variety of devices such as z-wave, Bluetooth, or others.

Figure 11B:
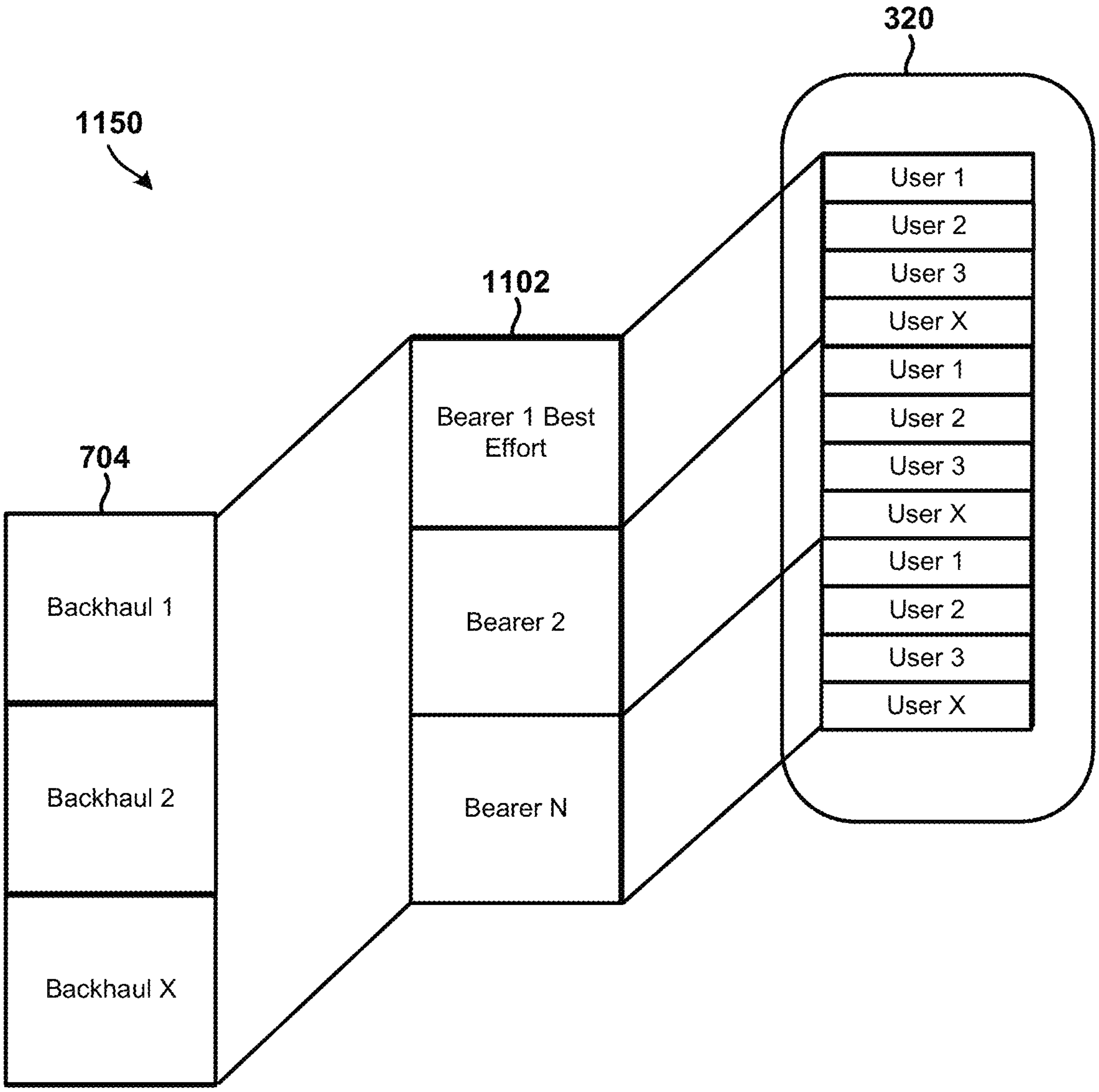
FIG. 11B is a component block diagram that illustrates an example edge network ecosystem that implements a vDA system that could be configured to perform network segmenting such that multiple devices or users are virtually segmented or segmented using network slicing on the ECN in accordance with the various embodiments.

FIG. 11B is a component block diagram that illustrates an example edge network ecosystem 1150 that implements a vDA system that could be configured to perform network segmenting such that multiple devices or users are virtually segmented or segmented using network slicing on the ECN in accordance with the various embodiments. In the example illustrated in FIG. 11B, the edge network ecosystem 1100 includes a group 320 that includes a plurality of users/devices, a bearer 1102 component, and a backhaul 704 component. The bearer 1102 component and the backhaul 704 component each include multiple segments. The bearer 1102 in FIG. 11B can transverse over the fronthaul 708, vCPE 322 mesh/middlehaul 706, and the ECN 306 shown in FIG. 7B.

In some embodiments, the vDA system may be configured to manage and execute a distributed function across multiple edge devices (e.g., ECNs) in the edge computing system (e.g., to process data and perform tasks at the edge of the network and closer to the location in which the data is generated, etc.). The objective of a distributed function is to perform as many functions as possible at the edge of the network.

The ECN/vCPE functioning as a device or network gateway may communicate with other ECN/vCPEs 322 to ensure that traffic flows remain within the policies that have been assigned within those device groups. To manage and isolate the traffic flows, the ECN/vCPE may utilize a VLAN and/or VXLAN to connect traffic between different ECN/vCPEs offering services.

The vDA system may also be configured to utilize VLAN tagging per end device. The VLAN tagged traffic never leaves the ECN nor traverses the VXLAN, so there is no reason to require the VLAN tagging to be consistent across a grid or geographic zone involving more than a single ECN.

Figure 12:
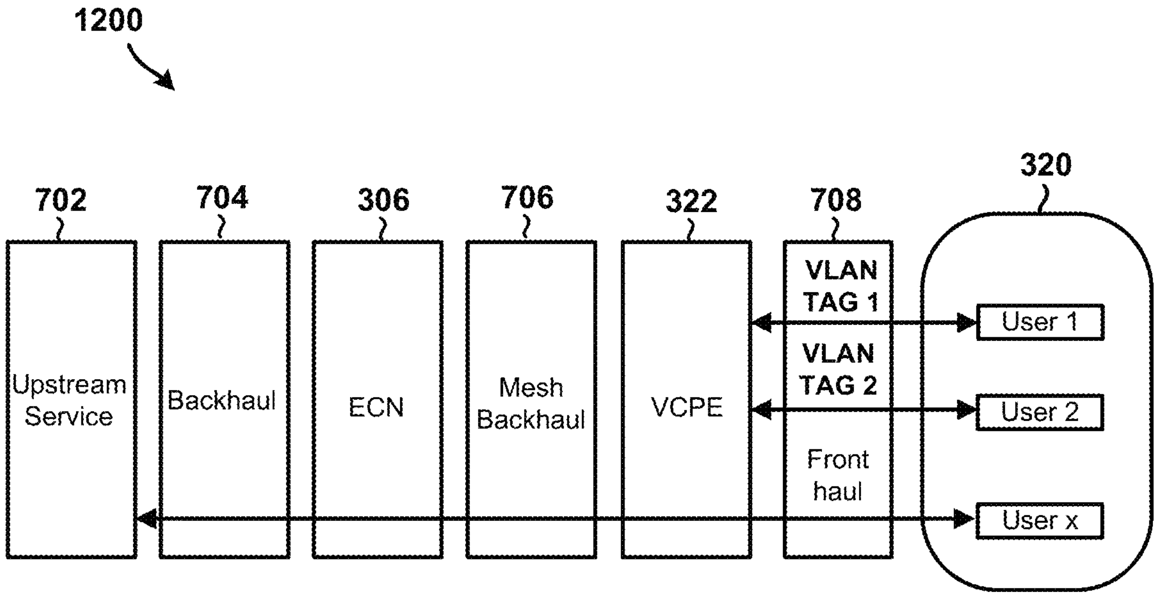
FIG. 12 is a block diagram that illustrates VLAN tagging in an example edge network ecosystem that implements a vDA system in accordance with some embodiments.

FIG. 12 is an illustration of VLAN tagging in an example edge network ecosystem that implements a vDA system. In the example illustrated in FIG. 12, the tagged VLAN is used between the user/device (users1-*x*) and the vCPE 322.

As discussed above, the vDA system may be configured to create private local area networks (LANs) and virtual private clouds (vPCs) within a larger network. The vDA system may use vPSK mappings and policy groups to provide self-service provisioning for user devices, allowing them to be added to the private LAN or vPC without the need for additional authentication or support.

Figure 13A:
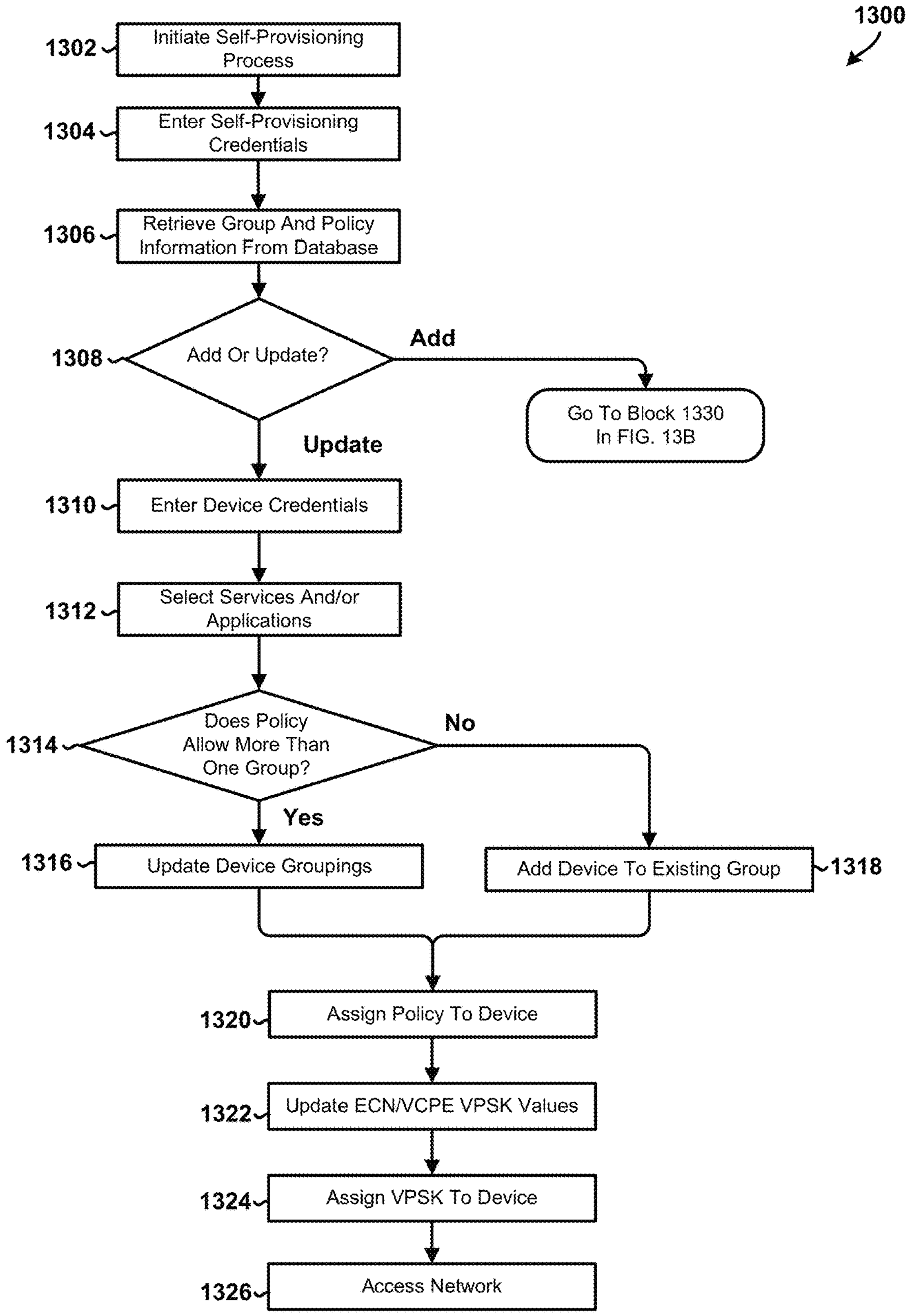
FIGS. 13A and 13B are process flow diagrams illustrating an example of self-provisioning method 1300 in accordance with some embodiments.
Figure 13B:
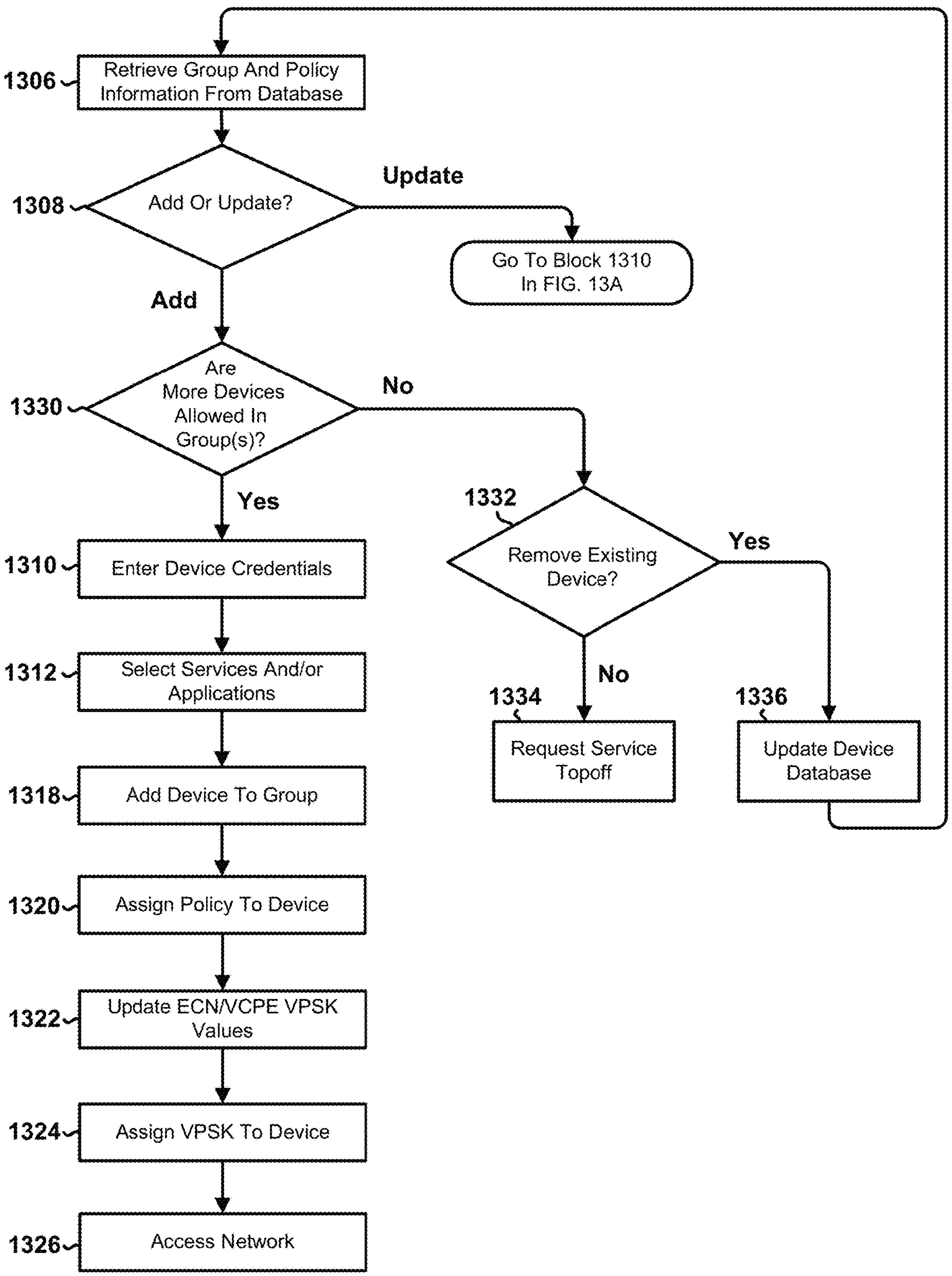

FIGS. 13A and 13B are process flow diagrams illustrating an example self-provisioning method 1300 in accordance with some embodiments. Method 1300 may be performed by a processor in a computing device (e.g., user device 102, ECN 306, vCPE 322, etc.).

In overview, method 1300 is a process for mapping or tagging a pre-shared key (PSK) to a policy group and associating the policy group with a network and a subscriber or customer. The policy group is part of a trusted domain controlled by the subscriber and can be used to apply local policies to devices in the group. In order to allow devices to connect without the need for an access point or additional upstream service for authentication, a virtual PSK (vPSK) may be used. The vPSK allows multiple devices to share the same PSK, and if the devices are part of a self-service group, the connection between them may be trusted and the credential management process can be skipped. In some cases, the vPSK may be used as a group identity shared by multiple devices, such as in the case of an ECN/vCPE with a group of devices or a vDA system with a distributed policy shared between vCPEs, ECNs in the same network, or even between networks.

With reference to FIG. 13A, in block 1302, the device may initiate a self-provisioning process. In block 1304, the device may enter self-provisioning credentials. In block 1306, the device may retrieve group and policy information from a database. In determination block 1308, the device may determine whether an add or update operation is required. In response to determining that an update operation is required (i.e., determination block 1308="Update"), the device may enter device credentials in block 1310. In block 1312, the device may select services and/or applications. In block 1314, the vDA may determine whether the policy allows more than one group. In response to determining that policy allows more than one group (i.e., determination block 1314="Yes"), the vDA may update device groupings in a database in block 1316. In response to determining that policy does not allow more than one group (i.e., determination block 1314="No"), the vDA may add the device to the current group in block 1318. In block 1320, the vDA may add the device to a group. In block 1322, the vDA may assign a policy to the device. In block 1324, the vDA may assign a vPSK value to the device. In block 1326, the device may access the network.

With reference to FIG. 13B, in response to determining that an add operation is required (i.e., determination block 1308="Add"), the vDA may determine whether there are more devices allowed in the group(s) in determination block 1330. In response to determining that more devices are allowed in the group(s) (i.e., determination block 1330="Yes"), the device may enter device credentials in block 1310, select services and/or applications in block 1312, add the device to the group in block 1318, assign policy to the device in block 1320, update ECN/VCPE VPSK values in block 1322, assign a vPSK to the device in block 1324, and access the network 1326. In response to determining that more devices are not allowed in the group (s) (i.e., determination block 1330="No"), the vDA may determine whether an existing device may be removed in determination block 1332. In response to determining that an existing device may not be removed (i.e., determination block 1332="No"), the device may request service top off in block 1334. The service top off request may cause the vDA system to scale the network or add additional resources (e.g., ECNs, etc.) or services to the edge computing system. In response to determining that an existing device may be removed (i.e., determination block 1332="Yes"), the client device may update the device database in block 1336.

In some embodiments, the vDA system may be configured to allow for distributed traffic shaping and distributed policy. Distributed traffic shaping in vDA is possible due to the relationship between the group and the policy. Different groups may have different security policies, including different access methods and treatments. Devices may also be isolated from others in a group through the use of subnetting, subgroups, nested grouping, or other methods.

In some embodiments, the vDA system may be configured to perform dynamic network slicing. Dynamic network slicing may include the allocation and reallocation of network resources on a real-time or near real-time basis for the network or micro network slice. Typically, network slicing is implemented vertically in a network architecture. The network slices may be virtual slices (vSlices) that segment the network or network elements into discrete elements, which include an entire network element or a portion of that network element.

Figure 14A:
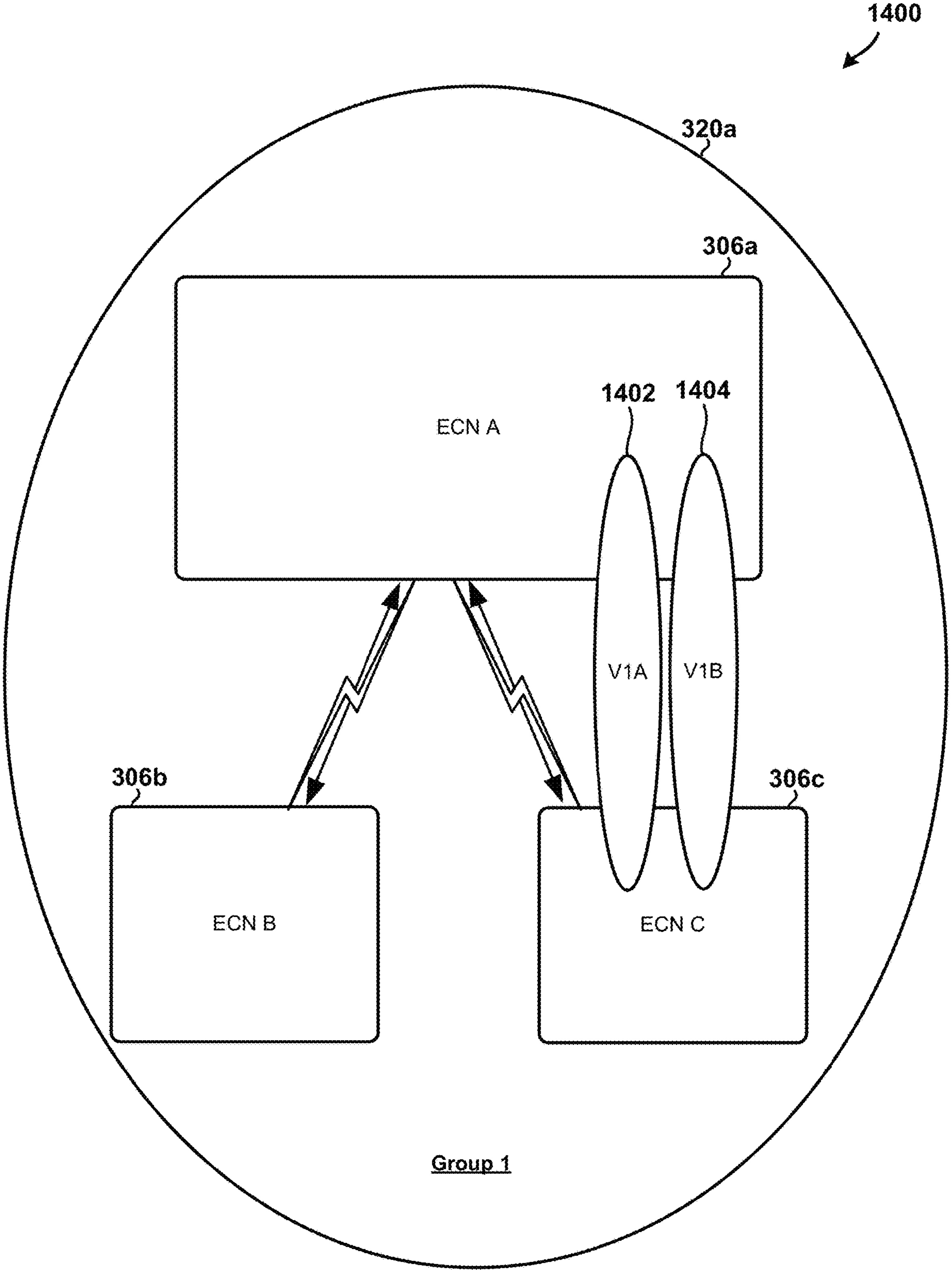
FIGS. 14A-14C are block diagrams that illustrate an edge computing system that implements a vDA system that could be configured to perform vertical and horizontal network slicing in a network hierarchy in accordance with some embodiments.
Figure 14B:
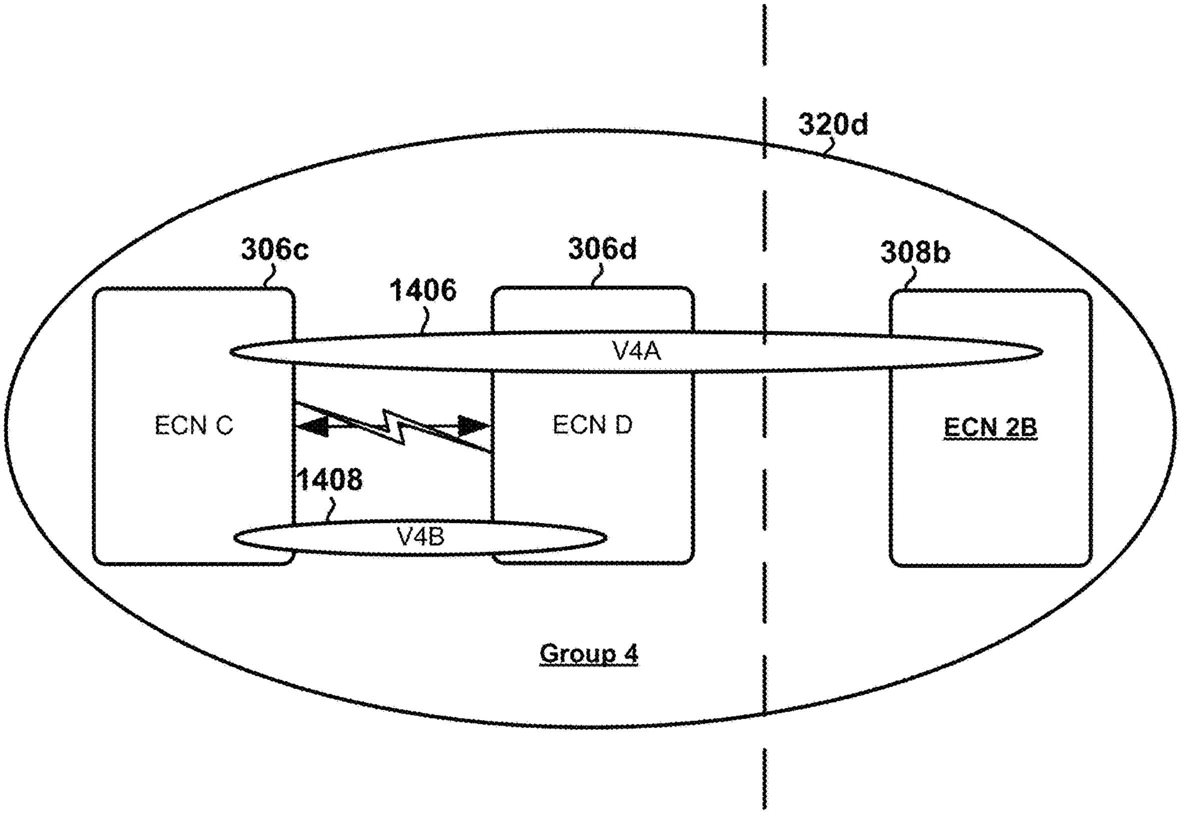
Figure 14C:
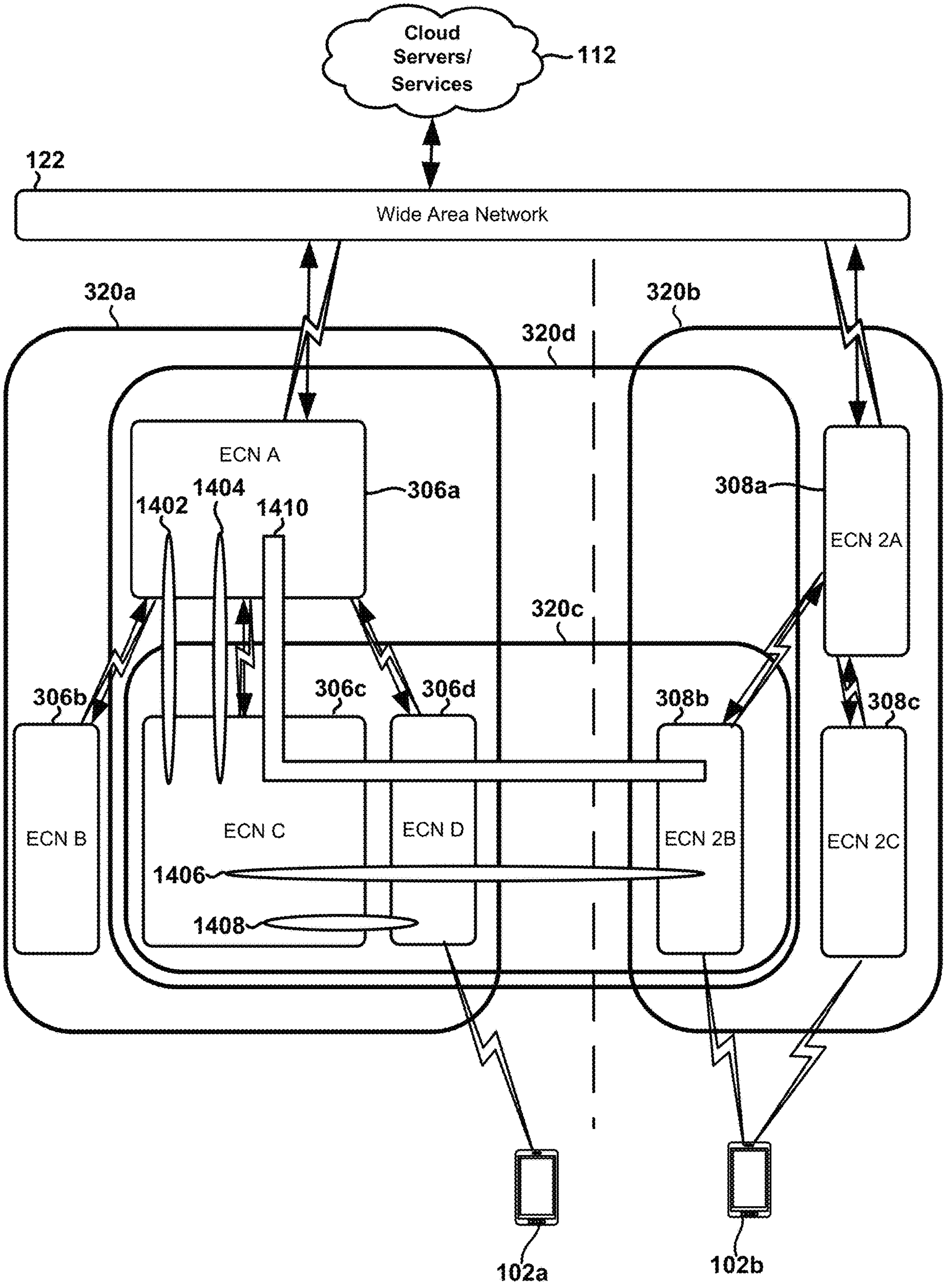

FIGS. 14A-14C illustrate an edge computing system 1400 that implements a vDA system that could be configured to perform vertical and horizontal network slicing in a network hierarchy in accordance with some embodiments.

In the example illustrated in FIG. 14A, the edge computing system 1400 includes ECN A 306*a*, ECN B 306*b*, and ECN C 306*c* included in Group 1 320*a*. vSlice A (V1A) 1402 and vSlice B (V1B) 1404 are vertical slices, or resources assigned to typical network elements in a vertical network hierarchy. In particular, VIA 1402 and V1B 1402 each include portions of ECN A 306*a* and portions of ECN C 306*c*.

In the example illustrated in FIG. 14B, the edge computing system 1400 includes ECN C 306*c*, ECN D 306*d*, and ECN 2B 308*b* included in Group 4 320*d*. vSlice A (V4A) 1406 and vSlice B (V4B) 1408 are horizontal slices, or resources assigned to typical network elements in a horizontal network hierarchy. In particular, V4A 1406 includes portions of ECN C 306*c*, ECN D 306*d*, and ECN 2B 308*b*. V1B 1408 include portions of ECN C 306*c* and ECN D 306*d*.

In the example illustrated in FIG. 14B, vSlice A and vSlice B utilize different resources. vSlice A (V4B) 1408 may be a sub-network slice that indicates network resource allocations for a sub-section of the network using a horizontal hierarchical method. As such, part of vSlice B (V4B) 1408 may or may not have access to all the resources within ECN C 306*c* and ECN D 306*d*, depending on the functions and services being performed. This is because, vSlice A (V4A) 1406 includes resources from all the ECNs (ECN C 306*c*, ECN D 306*d*, and ECN 2B 308*b*), in which vSlice B (V4B) 1408 only uses ECN C 306*c* and ECN D 306*d*.

In the example illustrated in FIG. 14C the edge computing system 1400 includes cloud servers/services 112, a WAN 112, and a plurality of edge computing nodes (ECNs) 306*a*-308*c*. The ECNs 306, 308 may belong to multiple diverse groups (e.g., 320*a*-320*d*) at the same time. Group 1 320*a* includes ECNs 306*a*-306*d*. Group 2 320*b* includes ECNs 308*a*-308*c*. Group 3 320*c* includes ECNs 306*c*, 306*d*, and 308*b*. Group 4 320*d* includes ECNs 306*a*, 306*d*, 306*d*, 308*b*. There are four groups (e.g., 320*a*-320*d*) illustrated in FIG. 14C, but more or fewer groups may be used depending on the specific needs of the network. These groups may be used to isolate subnetworks and devices from each other, and policies may be used to further isolate devices and ensure that they are communicating only with other devices in the same group.

In addition to vSlice A (V1A) 1402, vSlice B (V1B) 1404, vSlice A (V4A) 1406, and vSlice B (V4B) 1408 discussed above, the example illustrated in FIG. 14C includes a diagonal vSlice 2 1410 that combines vertical and horizontal elements of the network.

vSlice 2 1410 may be used to deliver services to user devices 102*a*, 102*b*. The vSlice 2 1410 is associated with various network elements and helps deliver services to groups in the vDA system. In some embodiments, the vDA system may also be configured to promote the use of microservices in a container environment, which may help reduce provisioning requirements for end users and ensure that connections between devices and applications meet the necessary QOS requirements. Network slicing may be used to implement these requirements and deliver microservices effectively.

Diagonal network slicing may include the use of both vertical and horizontal network elements in a single slice. In FIG. 14C, the use of diagonal network slicing is represented by vSlice 2 1410, which utilizes network elements from multiple ECNs in both vertical and horizontal hierarchies. In addition to combining vertical and horizontal elements, diagonal network slicing may also include the concatenation of various slices to create a larger slice. For instance, vSlice 2 could include sub network slices such as vSlice B (V1B) 1404, vSlice A (V4A) 1406, or vSlice B (V4B) 1408, which are associated with specific groups in the network. The use of vSlices and groups may allow the vDA system to isolate subnetworks and devices from one another, allowing for the creation of customized network slices for specific services and devices.

The vDA system may allow for the isolation of subnetworks and devices through the use of vSlices and Groups, either separately or in combination. In addition, vDA also has the capability to isolate devices through the use of policies, such as inter subscriber firewalls. The vDA system may implement inter category firewalling, in which a group of devices can communicate with each other within the same group, either in a unidirectional or bidirectional manner, based on the applied policy. The ECN/vCPE in the vDA system may host services at the edge of the network for user devices to use. It may also use both wired and wireless connections for the fronthaul (the connection between the user devices and the ECN/vCPE), as well as for connecting to the WAN through one or multiple gateways. This allows for flexibility and resiliency in the network.

In some embodiments, the vDA system may also be configured to use multiple gateways to access the WAN. The vDA system may route traffic through multiple gateways to the WAN or provide a failover in case the primary gateway is disabled or experiences performance issues that do not meet the required Quality of Service (QOS). This ensures that the network remains stable and that user devices can access the services they need.

In some embodiments, the vDA system may also be configured to allow for devices to be connected to a gateway for local or wide area network (WAN) connectivity through vCPE. When the gateway changes due to quality of service (QoS) or resiliency requirements, the IP address of the device in the group and/or the gateway IP address may also change. However, since the device is part of a trusted group, the device and its traffic remain isolated. The self-service function allows the subscriber or end user to log into the gateway without authentication in the isolated network and access the access point (AP) within the network. Devices within the trusted group may be added, removed, disabled, or monitored.

In some embodiments, the vDA system may also be configured to promote the use of microservices in a container environment, which may simplify provisioning for the end user. To ensure successful execution of an application, the connection between the device running the application and the processing device may meet certain QoS requirements, which may include radio resource allocation and network resources. The vDA system may provide the necessary QoS for end device services through the use of policies and group allocations, implemented through network slicing.

FIGS. 15A through 15I illustrate various ways in which the vDA system may use subnetwork slicing (vSlicing) to allocate network resources and deliver services to user devices. vSlicing may be vertical, horizontal, or diagonal, and can include segmenting network elements or portions of network elements into discrete units called vSlices. These vSlices may be used to isolate subnetworks and devices from each other, and to deliver services to groups of devices in a vDA system. vSlicing may also include concatenation of multiple vSlices, both vertical and horizontal, to form a single slice. In addition to vSlicing, the vDA system may use policies and grouping to isolate devices and provide required Quality of Service (QOS) for end device services. The vDA system may promote the use of microservices in a container environment and may host services at the network edge, using both wired and wireless connectivity for the front haul and as a gateway to a WAN. The vDA system may use multiple gateways to provide access to a WAN, and may also use backhaul aggregation to deliver traffic from ECNs or vCPEs.

Figure 15A:
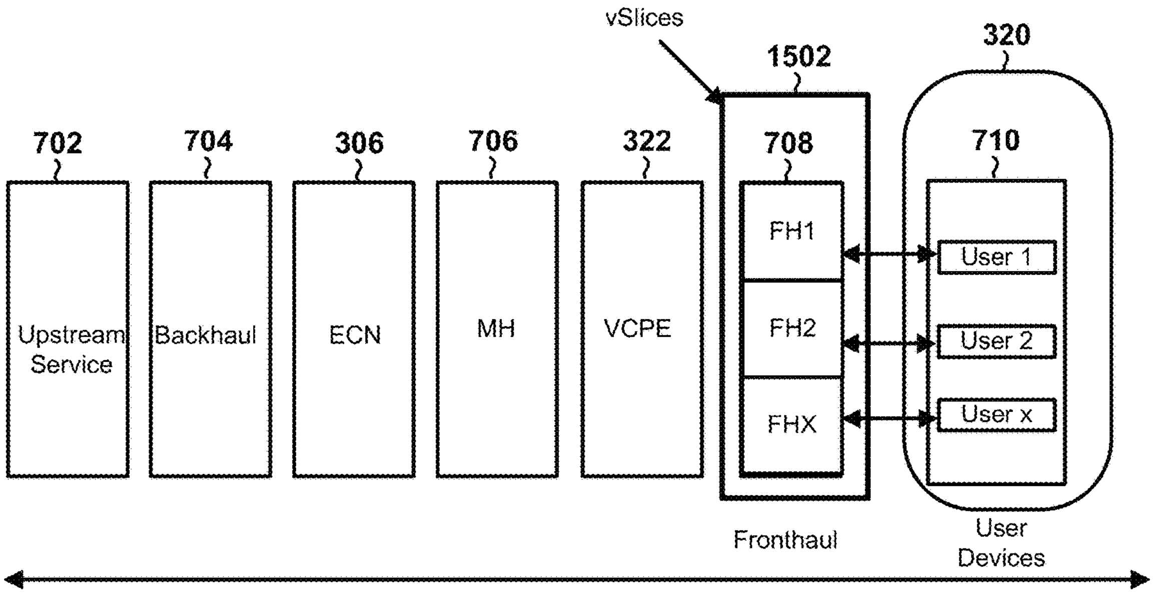
FIGS. 15A through 15I are block diagrams that illustrate various ways in which the vDA system may use subnetwork slicing (vSlicing) to allocate network resources and deliver services to user devices in accordance with some embodiments.

FIG. 15A illustrates a system in which the fronthaul 708 is segmented (e.g., into FH 1 to FH X) and various user devices utilize different segments of the fronthaul 708 to connect to the vCPE 322. The fronthaul 708 segments FH 1 to FH X may be the same radio or different radios, with each dedicated bandwidth/capacity to a specific end device or providing a guaranteed rate with the ability to share remaining capacity on a best-effort basis. Each of the fronthaul segments FH 1 to FH X may be a sub-network vSlice 1502, or a vSlice that indicates network resource allocations for a sub-section of the network using a horizontal hierarchical slicing.

Figure 15B:
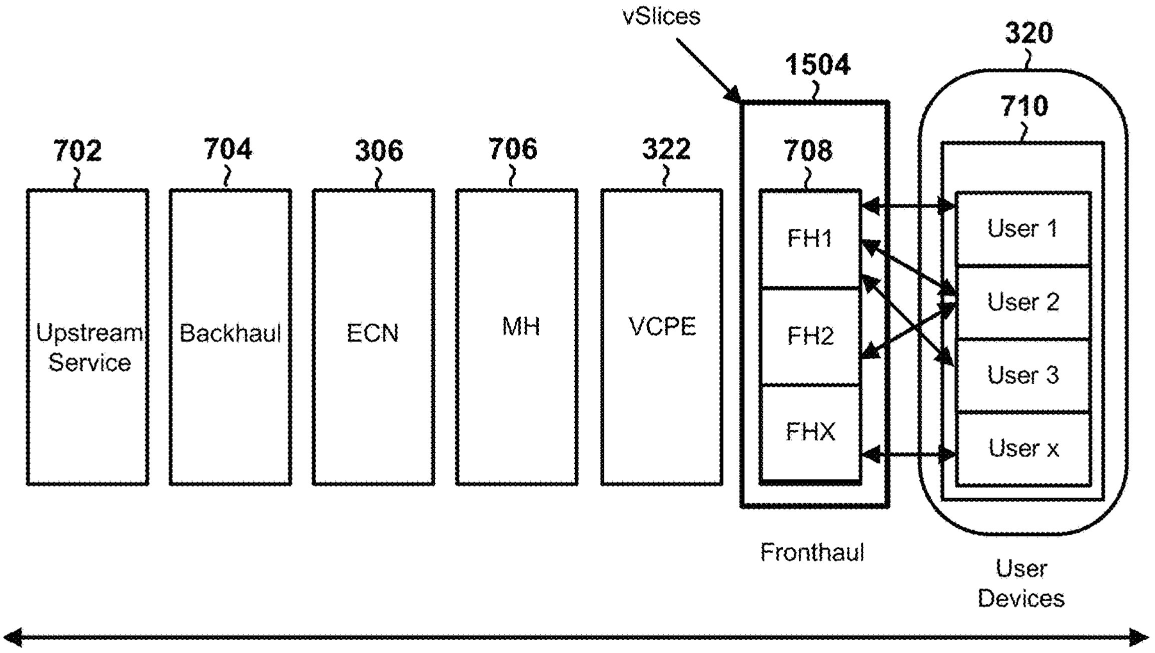

FIG. 15B illustrates the concept of slicing or allocating the fronthaul among different users, with each fronthaul representing a subnetwork vSlice 1504. In the example illustrated in FIG. 15B, the fronthaul segment FH 1 is shared among user 1, user 2, and user 3, while fronthaul segment FH 2 is only used by user 2.

Figure 15C:
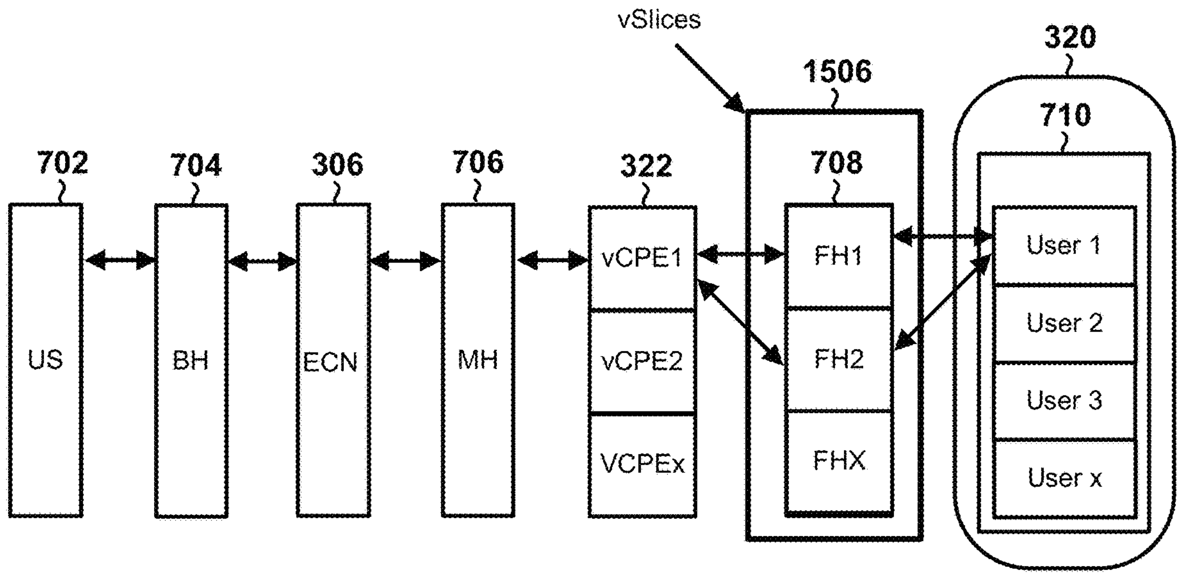

FIG. 15C illustrates that a user may have dedicated connection to vCPE1 through the use of multiple fronthaul segments FH1 and FH2. In the example illustrated in FIG. 15C, user 1 uses multiple fronthaul 708 segments (FH 1 and FH2) to connect to vCPE1. The combination of these fronthaul segments FH 1 and FH2 may be considered a vSlice 1506.

Figure 15D:
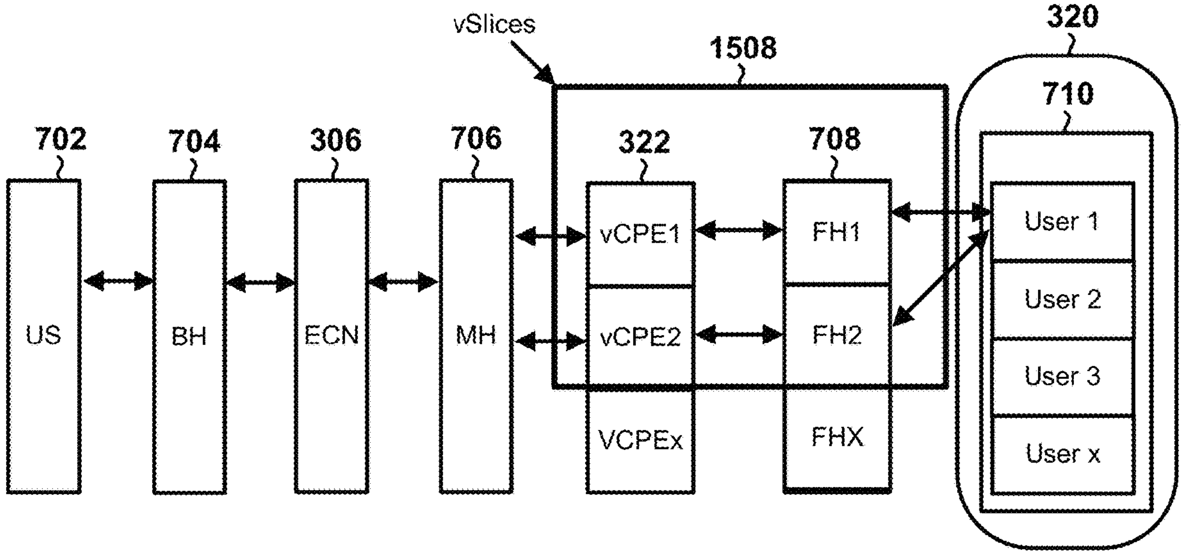

FIG. 15D illustrates that the vDA system may use multiple vCPEs and fronthaul segments (FH1 and FH2) to deliver services to user devices through the use of network slicing and resource allocation. In the example illustrated in FIG. 15D, user 1 is utilizing multiple vCPEs 322 (vCPE1, VCPE2) in order to achieve connectivity with the desired service. The multiple fronthaul 708 segments (FH 1 and FH2) that used by user 1 are aggregated together to form a vSlice 1508, which may be used to deliver the service to user 1. Additionally, the vCPEs vCPE1 and VCPE2 used by user 1 may be connected to different networks, allowing for the possibility of multiple gateways being used for failover or increased performance.

Figure 15E:
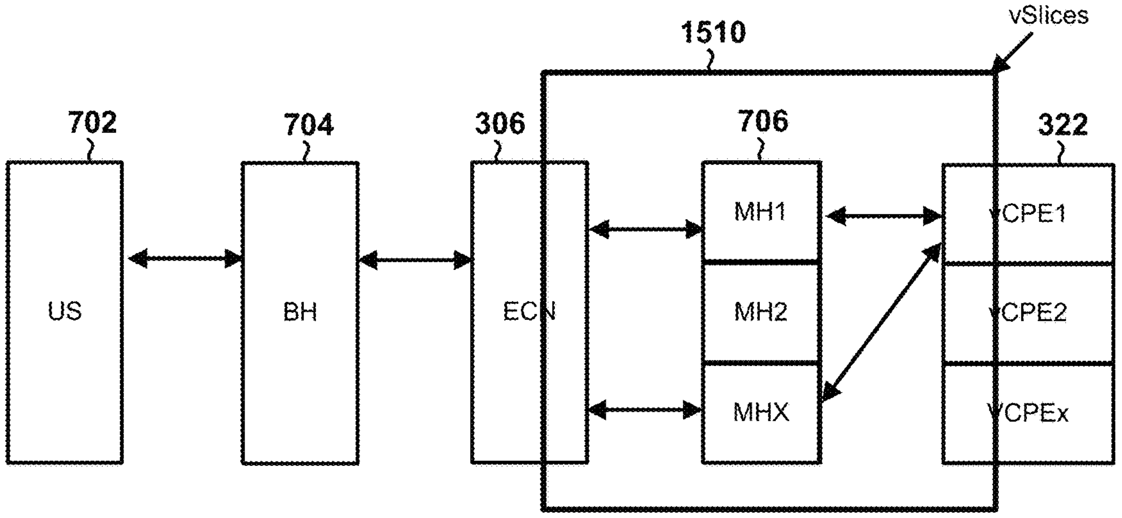

In the example illustrated in FIG. 15E, a vCPE1 uses multiple mesh or middle haul 706 segments (MH1, MH2, MHx), which may be both wireless and wired, to connect to a gateway represented by an ECN 306. The vCPE uses middle haul segments MH1 and MHx to connect to the gateway (ECN 306) and provide services to user devices. These network allocations (e.g., MH1, MHx) may be vSlices 1510.

Figure 15F:
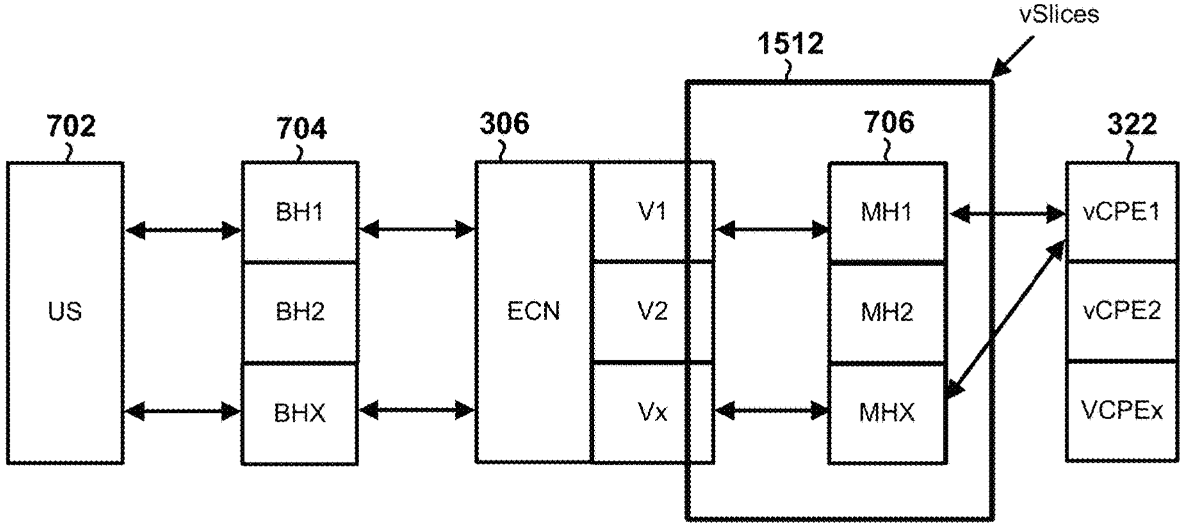

In the example illustrated in FIG. 15F, the ECN 306 includes virtual components (e.g., V1, V2, Vx), which may be vCPEs at the edge of the network. The ECN 306 shown in FIG. 15F can be a concentrator or access gateway. The system uses multiple middle haul 706 segments (MH1, MH2, MHx), which may be both wireless and wired, to connect devices to an ECN 306 serving as a gateway. The ECN's 306 virtual components (e.g., vCPEs V1, V2, Vx) support the vCPE 322 segment vCPE1. The vSlices 1512 may be used to manage the resources and connections between vCPE1 and the ECN/vCPEs (e.g., V1, V2, Vx).

Figure 15G:
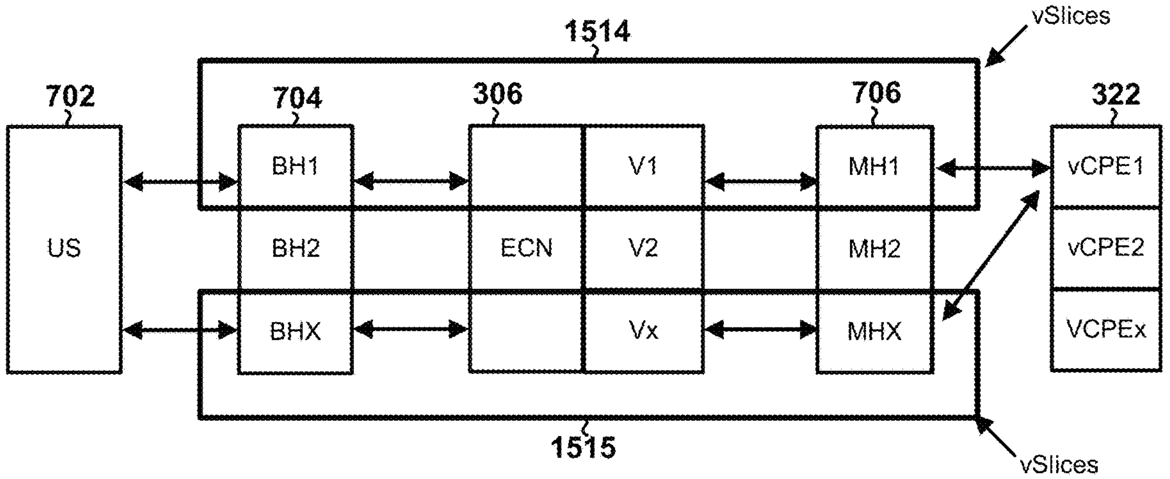

FIG. 15G illustrates the use of multiple vSlices 1514 and 1515 to connect an ECN 306 or vCPE 322 to an upstream provider 702 in order to meet specific service requirements. The ECN may act as a gateway, using backhaul aggregation to deliver traffic from the ECN. In various embodiments, the backhaul 704 may or may not be part of the vSlice 1514, 1515. The use of vSlices 1514, 1515 and backhaul aggregation may help ensure that the necessary resources are available to meet the service requirements of the user devices.

Figure 15H:
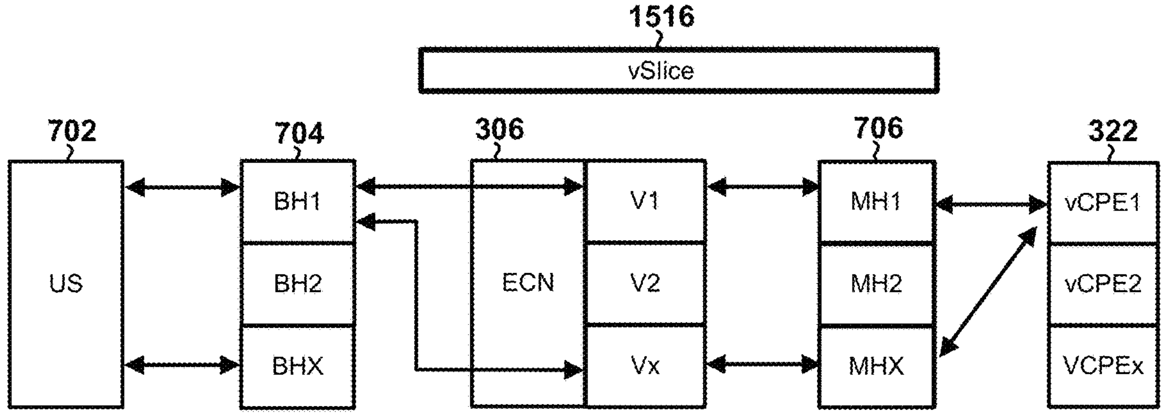

In the example illustrated in FIG. 15H, the ECN 306, acting as a gateway, uses the same backhaul segment BH1 for multiple vCPEs within the ECN (i.e., V1 and Vx). The backhaul segment BH1 depicted in may or may not be part of a vSlice 1516. This configuration allows the ECN 306 to provide internet access to multiple devices at the edge through the use of virtual components (V1 and Vx) which support the vCPE1 at the edge.

Figure 15I:
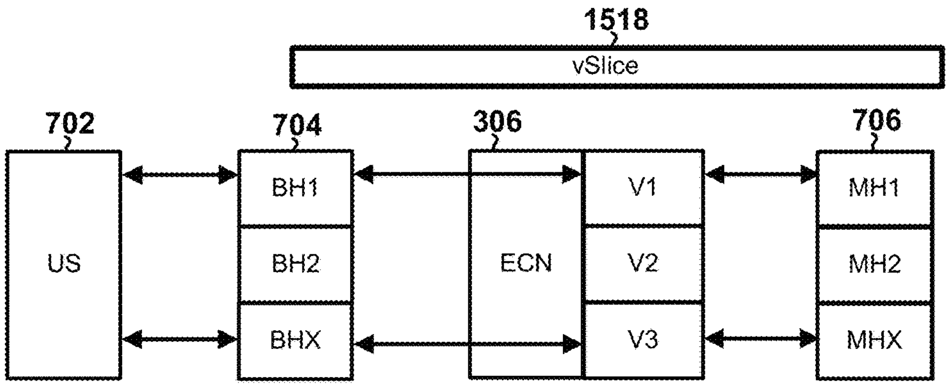

FIG. 15I illustrates that backhaul aggregation may be use for the delivery of the traffic from the ECN 306. The backhaul portions BH1, BH2, BHx may or may not be part of the vSlice 1518.

Currently, networks are designed to support a wide range of services, but this often leads to inefficiencies as each service may have different requirements. For example, real-time teleconference and live video broadcast applications typically require low latency and jitter, while big data applications like file transfers typically require high bandwidth with a low packet loss rate. It is not efficient to adapt a service to a network. It is more desirable to have a network that supports a particular service. However, with the diversity of services needed, a different approach is needed. Network slicing is an approach that allows for the delivery of multiple diverse services through a single network. Network slicing has gained attention as a way to address this diversity, but it can also be very diverse in itself in terms of its implementation and use.

As network services become more diverse, their various requirements can put asymmetrical demands on the network. For example, real-time teleconferencing and live video broadcasts often require low latency and jitter in their data paths, while big data applications like file transfers usually require high bandwidth with low packet loss rates. The current network deployments and implementations, however, tend to favor a "one size fits all" approach that may not adequately support these diverse requirements.

Network slicing is a method of dividing a network into multiple logical networks, or slices, each of which may be customized to meet the specific requirements of a particular service or use case. This allows for the efficient allocation of resources and improved security and isolation, as well as the ability to deliver deterministic latency and customized topologies. Automated slice management can also help to streamline the process of provisioning and managing these slices. Network slicing is especially useful in situations in which different services have different requirements and cannot be effectively served by a one-size-fits-all network. By creating dedicated slices for each service, network operators can ensure that each service receives the resources and support it needs, leading to improved efficiency and performance.

Network slicing allows for the creation of multiple virtual networks on top of a shared physical infrastructure so as to allow the isolation of resources and security for each slice. This allows service providers to offer customized services to their customers, as each slice may be tailored to the specific requirements and performance needs of the service being offered.

There are numerous benefits to using network slices, including the ability to isolate resources and ensure security, the ability to achieve deterministic latency, the flexibility to customize topology connections, and the ability to automate slice management. These benefits may be particularly useful in environments in which there is a need to support a diverse range of services with different functional and performance requirements, as network slicing allows for the creation of customized network environments that are optimized for specific use cases. By partitioning the network into distinct slices, it is possible to achieve a more efficient and effective use of network resources, as well as to better meet the needs of individual services and users.

Deterministic latency refers to the ability to guarantee a certain level of performance in terms of latency, or the time it takes for data to be transmitted from one point to another. Network slicing allows the creation of slices with low latency, making it suitable for real-time communication services such as video conferencing or online gaming.

Flexible topology connection customization allows service providers to create custom connectivity patterns between network nodes, which may allow the creation of highly customized and efficient networks. This is particularly useful for IoT applications, which often require a large number of devices to be connected over a wide geographical area.

Automated slice management refers to the ability to automate the provisioning, configuration, and management of network slices. This can significantly reduce the time and effort required to set up and maintain slices, which may allow service providers to offer more efficient and cost-effective services to their customers.

Currently, when deploying a service, the network is treated as a single entity with no differentiation between different services or use cases. This can lead to suboptimal resource utilization and management, as multiple network functions may need to be updated or deployed to fulfill the requirements of a specific service. Network slicing allows for the creation of separate, dedicated slices of the network for specific purposes or use cases. These slices can focus on delivering a particular service or meeting specific requirements and may be tailored to include only the necessary network components for that service. This allows for more efficient resource utilization and management, as well as increased security and isolation between different services.

Deploying a new service often requires updating and deploying multiple network functions to meet its requirements. This traditional method can lead to suboptimal resource utilization and management. Network slicing offers an alternative approach by providing a dedicated slice or portion of the network specifically designed to meet the requirements of a particular service or use case. This can improve resource utilization and security, as well as allow for customizable connections and automated management of the slice.

Network slicing allows for dividing a network into slices that are each optimized for a specific service or use case rather than trying to fit all services into a single, generic network. That is, by dividing the network into slices, each service or use case can have its own dedicated resources and be tailored to meet its specific requirements rather than trying to adapt the service to a generic network. This may improve resource utilization and management, as well as provide security and isolation, deterministic latency, and flexible topology customization. Network slicing can also be automated to further improve efficiency and management.

Depending on the service, not all components that the service traverses require segmentation or slicing. In addition, for completeness, all the components that the service traverses should be available to be included in the network slice, if required, rather than just a portion of the components that the service traverses. The components through which a service can pass include the core network components and backhaul, front haul, and middle haul, among others.

Network slicing is typically configured in a static/fixed configuration. However, the requirements for service delivery can change during the service delivery process, either due to changes in available network resources or the need for additional network resources to support the service. As a result, network slicing needs to be dynamic and able to allocate or reallocate resources on the fly to meet changing service needs.

Dynamic network slicing allows the allocation and reallocation of network resources on demand in order to meet the changing requirements of a service as it is being delivered. This means that the network slice can adapt to the changing needs of the service in real time, allowing for more efficient and effective resource utilization. This is especially important for service providers who need to deliver a wide range of services with different requirements, as it allows them to tailor their network resources to each specific service rather than relying on a one-size-fits-all approach.

In some embodiments, the vDA system may include a slice controller function, which allows it to deliver network slicing on a network or sub-network basis in a dynamic and real-time manner to support the service or services required. This dynamic, real-time delivery of network slicing allows vDA to adapt to changing requirements and ensure that the network can meet the needs of the service or services being provided. That is, the vDA system may provide dynamic, real-time network slicing on a network or sub-network level through the use of a slice controller function or equivalent. This machine learning technology makes the vDA networks application-aware, allowing it to adapt to the requirements of each group and application within the group. The system can adapt dynamically to the group and each application's requirements within the group. It allows for real-time delivery of network slicing on a network or sub-network basis to support the service and or services required. This is accomplished through the use of a slice controller function or equivalent within the vDA system.

In some embodiments, the vDA system may be configured to allow for dynamic adaptation of network slicing for the group and each application requirement within the group. The vDA system may generate a network slice that includes every element of a logical network or just a subset of it, such as a subnetwork. For example, a network slice used for an edge computing network may include sub-slices of end device computing resources, the front haul radio access network, the ECN/vCPE network, a meshing network comprising wired and wireless connections, the gateway or ECN MEN network, the transport network or backhaul, and the service end point.

In some embodiments, the vDA system may be configured to generate a network slice that is a complete logical network encompassing every element or just a subcomponent of the network, such as a subnetwork. This network slice may be used for an edge computing network and includes sub-slices of user devices' computing resources, the front haul radio access network, the ECN/vCPE network, the meshing network that includes wired and wireless connections, the gateway or ECN network, and the transport network or backhaul. The service end point may also be included in this network slice. The network slice may be logically isolated from the other components of the platform and network.

In some embodiments, the vDA system may be configured to generate network slices to support a single user or a group of users. These slices may be further divided into smaller slices, or sub-slices, to provide isolation of different services within a larger network slice or subnet slice.

Figure 16:
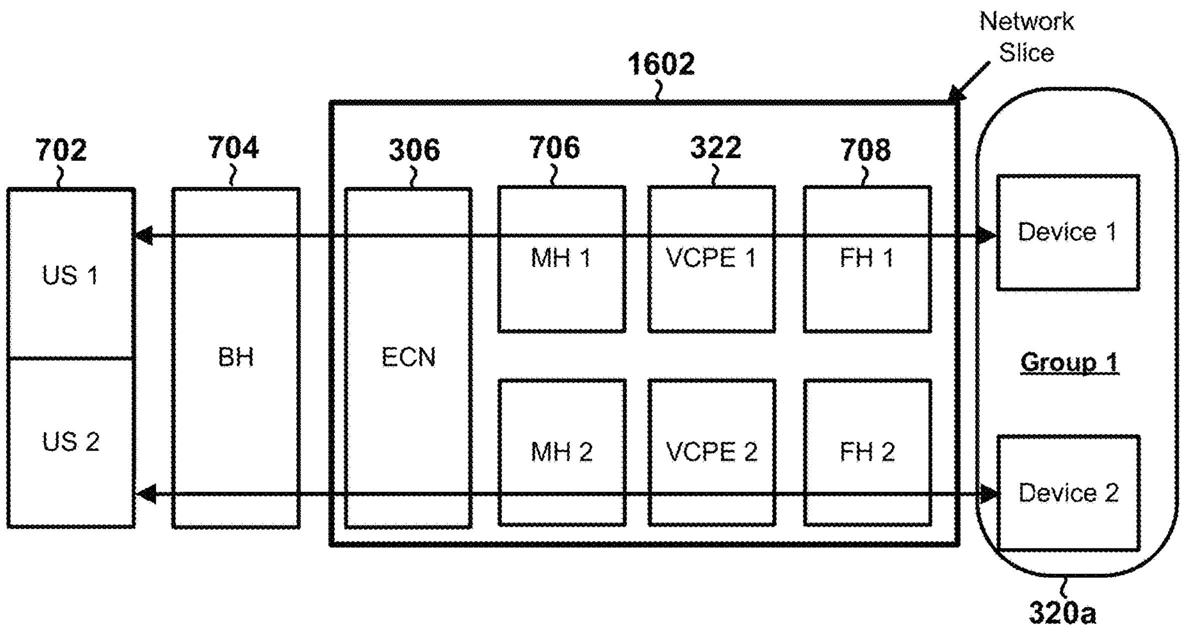
FIG. 16 is a block diagram that illustrates an example network slice that could be generated and/or used by the vDA system in accordance with the various embodiments.

FIG. 16 illustrates an example network slice 1602 that could be generate and/or used by the vDA system in accordance with the various embodiments. In the example illustrated in FIG. 16, a group of users are connected to an ECN 306 and are sharing the same pre-shared key (PSK). The network slice 1602 is set up to support all of the users in Group 1 320*a*, which includes two different devices (Device 1, Device 2). All members of Group 1 are utilizing the same network slice 1520.

Figure 17A:
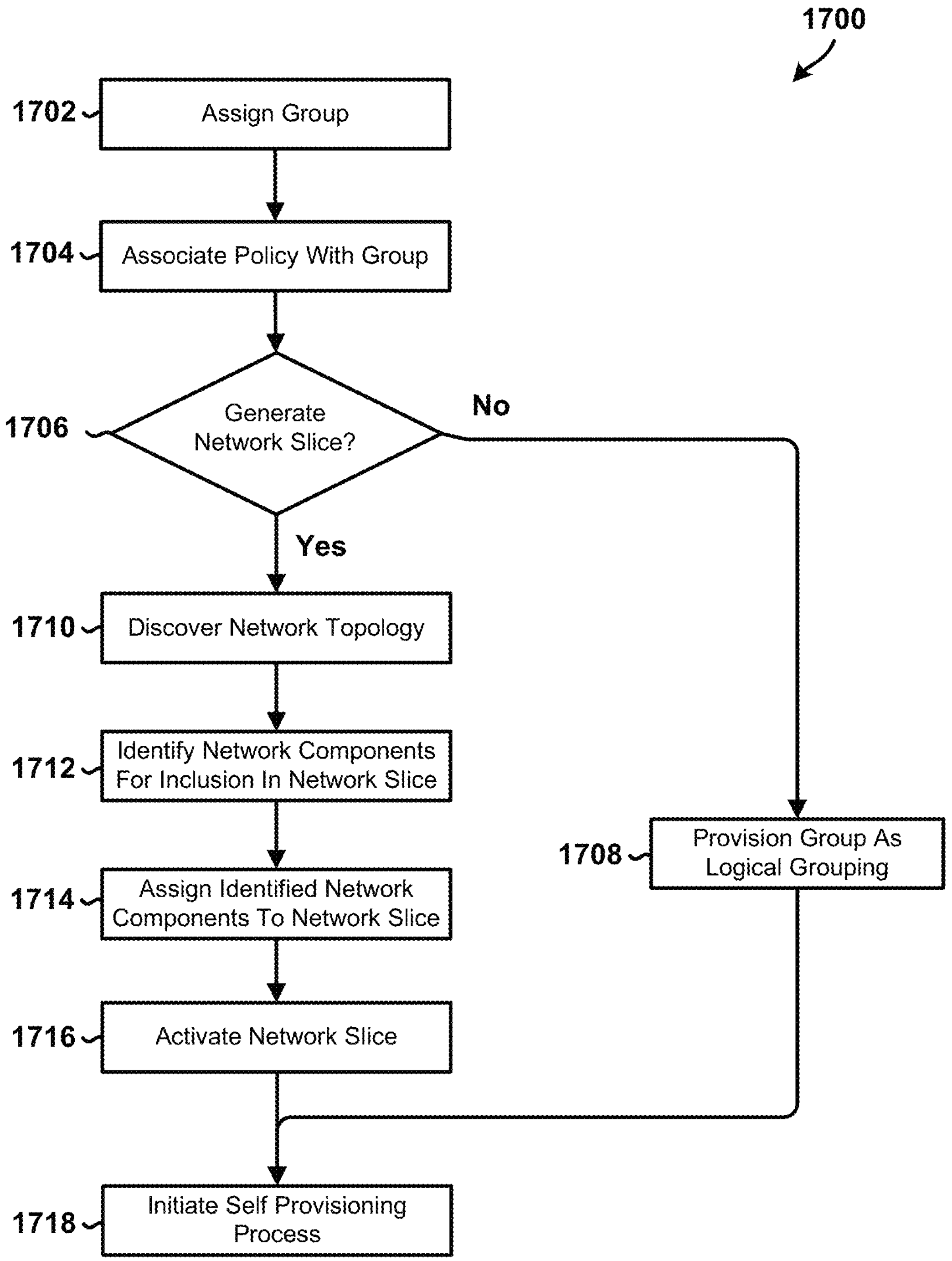
FIG. 17A is a process flow diagram that illustrates a method of performing a high-level provisioning process for a network slice in accordance with some embodiments.

FIG. 17A illustrates a method 1700 of performing a high-level provisioning process for the network slice depicted in FIG. 16 process in accordance with some embodiments. Method 1700 may be performed by a processor in a computing device (e.g., ECN, VCPE, etc.).

In overview, if a network slice is not needed for the desired service, the network slice provisioning process is skipped. However, if a network slice or sub-slice is required, the topology of the network is first discovered and the necessary components for the slice are identified. These identified components may be provisioned and segmented to assign specific resources to the network slice. Once the network slice is provisioned, the process may continue as previously defined or as specified by the network.

In block 1702, the Edge Device may assign devices to a group. For example, the Edge Device may analyze device metadata and characteristics such as device type, capabilities, roles, and usage patterns to categorize and assign devices to appropriate groups based on predefined rules and policies stored in the system. In some embodiments, the processor may perform other similar operations so that devices are grouped logically for efficient management and policy application.

In block 1704, the Edge Device may associate a policy with the group. For example, the Edge Device may select a policy template from a policy database and apply it to the group. The policy may include settings for network slicing, traffic management, security protocols, and Quality of Service (QOS) parameters to ensure the group operates under consistent and optimized network conditions.

In determination block 1706, the Edge Device may determine whether a network slice should be generated. For example, the Edge Device may evaluate the group's requirements for traffic load, latency, security, and other factors. If the group's needs exceed the capabilities of a shared network segment, the Edge Device decides to generate a dedicated network slice to meet these specific requirements.

In response to determining that a network slice is not needed (i.e., determination block 1706="No"), the Edge Device may provision the group as a logical grouping in block 1708. For example, the Edge Device may configure the group to share existing network resources without dedicated segmentation, using shared routing and access control settings to ensure efficient operation within the common network infrastructure.

In response to determining that a network slice should be generated (i.e., determination block 1706="Yes"), the Edge Device may discover the network topology in block 1710. For example, the Edge Device may use network discovery protocols to map out all connected devices and network elements, identifying their relationships and interactions to create a comprehensive view of the network topology.

In block 1712, the Edge Device may identify network components for inclusion in the network slice. For example, the Edge Device may select specific routers, switches, gateways, and other network elements that will form part of the dedicated network slice so that all necessary components are included.

In block 1714, the Edge Device may assign the identified network components to the network slice. For example, the Edge Device may configure the selected network elements to operate within the defined slice, setting up routing, switching, and access controls specific to the slice to isolate and optimize resource usage.

In block 1716, the Edge Device may activate the network slice. For example, the Edge Device may finalize the configuration and activate the network slice, updating routing tables and enforcing access controls to make the slice operational and ready for traffic.

In block 1718, the Edge Device may initiate the self-provisioning process. For example, the Edge Device may start the self-provisioning workflow by communicating with the new devices, verifying their credentials, and configuring them for network access based on the retrieved self-provisioning parameters.

Figure 17B:
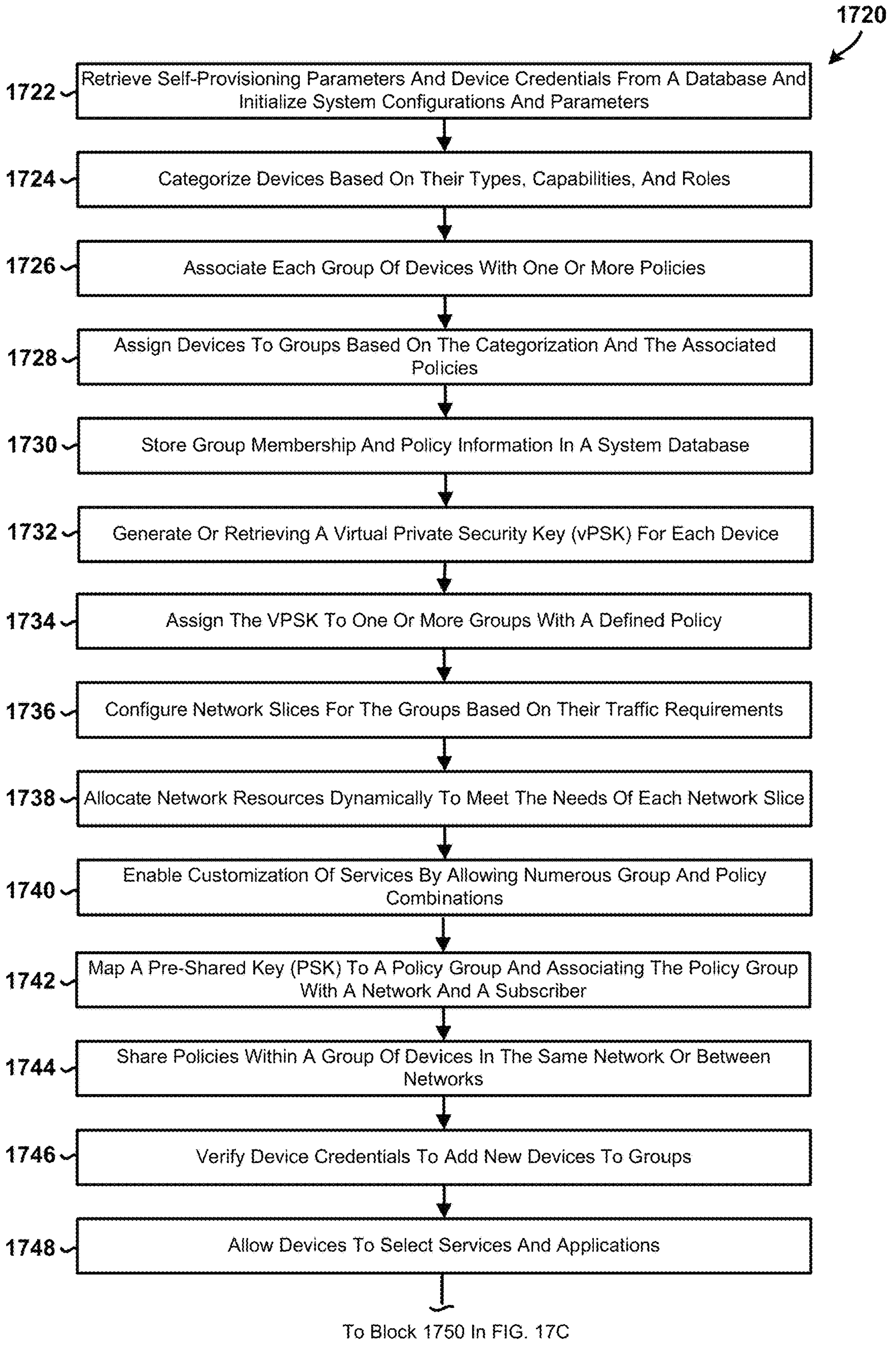
FIGS. 17B and 17C are process flow diagrams that illustrate a method of dynamically managing device provisioning, policy application, and resource allocation in real-time using virtual private security keys (vPSKs) and network slicing to enhance network efficiency, security and scalability in accordance with some embodiments.
Figure 17C:
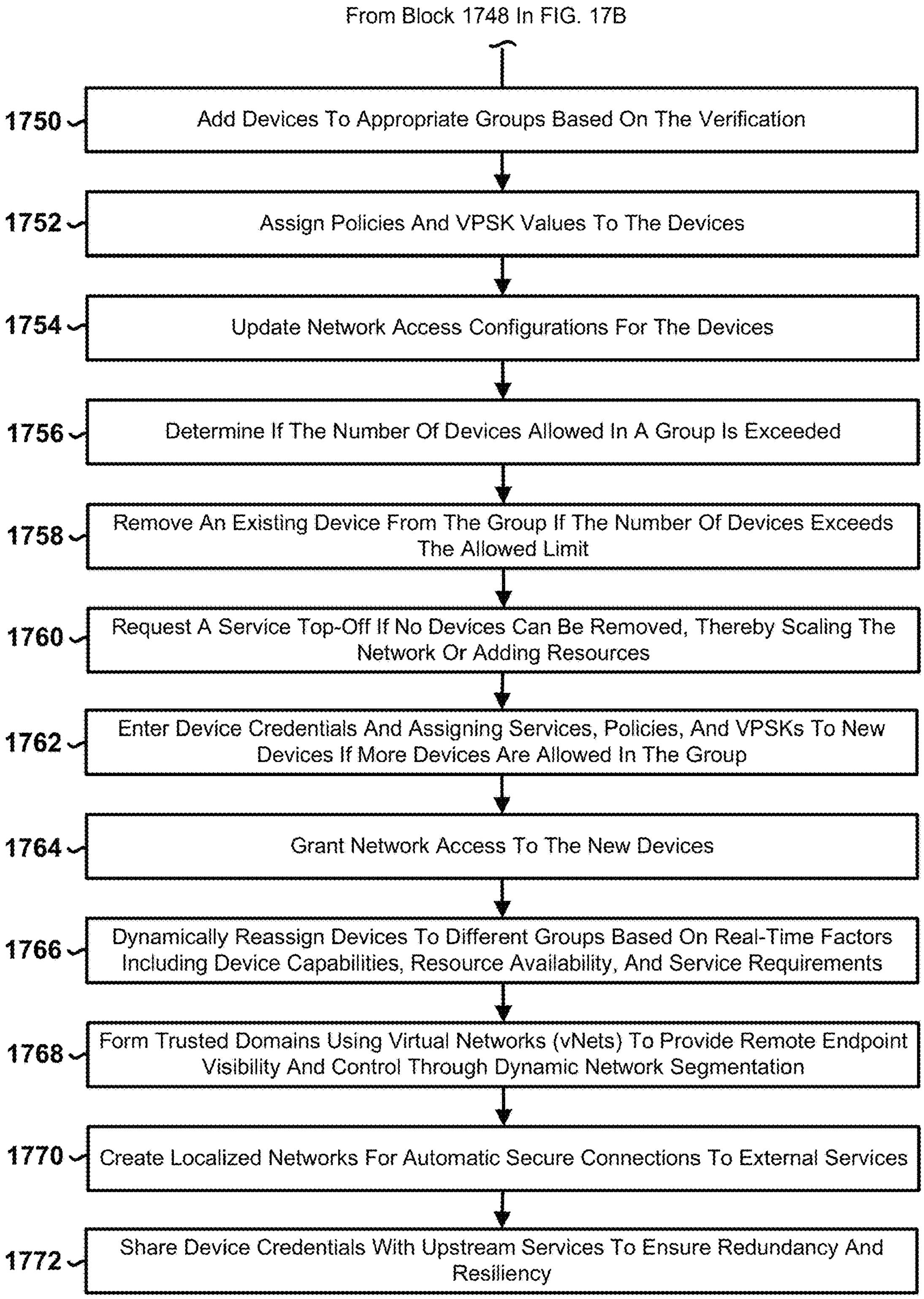

FIGS. 17B and 17C illustrate a method 1720 of dynamically managing device provisioning, policy application, and resource allocation in real-time using virtual private security keys (vPSKs) and network slicing to enhance network efficiency, security, and scalability in accordance with some embodiments. Method 1720 may be performed by a processor in a computing device (e.g., ECN, VCPE, etc.).

In block 1722, the processor may retrieve self-provisioning parameters and device credentials from a database and initialize system configurations and parameters. For example, the processor may access a secure database to fetch parameters such as device identifiers, authentication keys, and configuration settings needed for provisioning new devices. In some embodiments, the processor may retrieve information related to account identification, device name, MAC address, subscription services, quality of service (QOS), service enhancement capabilities, access restrictions, and group assignments.

Thus, in block 1722, the processor automatically retrieves self-provisioning parameters and device credentials and initializes system configurations. This may eliminate the need for extensive manual configuration and allow new devices to seamlessly integrate into the network. This is in contrast to conventional that do not include such automation.

In block 1724, the processor may categorize devices based on their types, capabilities, and roles. For example, the processor may analyze each device's hardware and software specifications, usage patterns, and functional roles to group them appropriately for optimized management and policy application. In some embodiments, the processor may identify device types, capabilities, and roles based on predefined criteria.

In block 1726, the processor may associate each group of devices with one or more policies (e.g., network slicing, traffic requirements, security settings, quality of service (QOS) parameters, etc.). For example, the processor may link each group to policies that define network slicing, traffic priorities, security measures, and QoS parameters so that each group operates under conditions that are adequate for its requirements. In some embodiments, the processor may define network slicing, traffic requirements, security settings, and QoS parameters for each policy in block 1726.

Thus, in blocks 1724 and 1726, the devices are dynamically categorized based on their types, capabilities, and roles, and then associated with specific policies. This may allow each device to operate under optimal conditions tailored to its specific requirements. The ability to dynamically associate devices with network slicing, traffic requirements, security settings, and QoS parameters may be a significant advancement over static policy application methods.

In block 1728, the processor may assign devices to groups based on the categorization and the associated policies. For example, the processor may update the system database to reflect the new group memberships so that devices are managed according to their assigned categories and policies.

In block 1730, the processor may store group membership and policy information in a system database. For example, the processor may save the updated group and policy configurations to a central database so that the information is accessible for network management and monitoring.

In block 1732, the processor may generate or retrieve a virtual private security key (vPSK) for each device. For example, the processor may either create a new vPSK or retrieve an existing one from the security database to ensure secure communication and authentication for each device.

In block 1734, the processor may assign the vPSK to one or more groups with a defined policy. For example, the processor may update the security settings to associate the vPSK with the relevant groups so that devices may securely communicate within their groups using the assigned vPSKs.

Thus, in blocks 1732 and 1734, the processor generates or retrieves vPSKs for each device and assigns them to groups with defined policies to enhance network security. This may allow the devices to communicate securely within their groups with a level of security management that goes far beyond anything available via standard PSK implementations.

In block 1736, the processor may configure network slices for the groups based on their traffic requirements. For example, the processor may set up dedicated network slices for each group, configuring routing, switching, and resource allocation to meet the specific traffic needs of the groups. In some embodiments, the processor may segment the network into logical slices to allocate resources dynamically to meet the specific needs of each group.

In block 1738, the processor may allocate network resources dynamically to meet the needs of each network slice. For example, the processor may continuously monitor network usage and adjust resource allocation in real-time so that each network slice has the necessary bandwidth, processing power, and other resources. In some embodiments, the processor may update the status of devices in real-time to ensure compliance with current policies and system requirements. In some embodiments, the processor may dynamically adjust the allocation of network resources to adapt to changing service delivery requirements in real-time.

Thus, in blocks 1736 and 1738, the processor configures network slices based on group traffic requirements and allocates network resources dynamically to meet the needs of each network slice. This real-time resource allocation allow for more efficient use of network resources and may enhance network performance by adapting to changing demands. These features are not commonly found in traditional static network management systems.

In block 1740, the processor may allow customization of services by allowing numerous group and policy combinations and supporting diverse user requirements. For example, the processor may support flexible configurations that allow network administrators to create and manage multiple groups and policies, tailoring services to meet diverse user requirements. This flexibility in service customization may provide significant improvements in user experience and network efficiency.

In block 1742, the processor may map a pre-shared key (PSK) to a policy group and associate the policy group with a network and a subscriber. For example, the processor may link each PSK to its respective policy group and associate it with the network and subscriber details.

In block 1744, the processor may share policies within a group of devices in the same network or between networks. For example, the processor may distribute policy settings across devices within the same network or interconnected networks for a more consistent application of security and performance policies. In some embodiments, the processor may share the policies in block 1744 so as to ensure policy consistency and compliance across distributed environments within the edge computing system.

In block 1746, the processor may verify device credentials to add new devices to groups. For example, the processor may authenticate new devices by checking their credentials against a database to determine whether they meet the security requirements for group membership.

In block 1748, the processor may allow devices to select services and applications. For example, the processor may present a list of available services and applications to the devices and allow users to select and customize their network experience.

In block 1750, the processor may add devices to appropriate groups based on the verification. For example, the processor may update the system database to include newly verified devices in the relevant groups so that they are managed and monitored according to group policies.

In block 1752, the processor may assign policies and vPSK values to the devices. For example, the processor may configure each device with the appropriate policies and vPSK values.

In block 1754, the processor may update network access configurations for the devices. For example, the processor may modify network settings to reflect the addition of new devices, updating routing, access controls, and other configurations as needed.

In block 1756, the processor may determine whether the number of devices allowed in a group is exceeded. For example, the processor may check the current group membership against predefined limits to make sure the number of devices does not exceed the group's capacity.

In block 1758, the processor may remove an existing device from the group if the number of devices exceeds the allowed limit. For example, the processor may identify and remove devices based on criteria such as usage patterns, priority levels, or predefined rules to maintain group limits. In some embodiments, the processor may scale the network or add additional resources or services to the edge computing system in response to determining that no existing devices can be removed from the group.

In block 1760, the processor may request a service top-off if no devices can be removed, thereby scaling the network or adding resources. For example, the processor may initiate a request for additional network resources or services to accommodate new devices if the group is at capacity and no devices can be removed.

In block 1762, the processor may enter device credentials and assign services, policies, and vPSKs to new devices if more devices are allowed in the group. For example, the processor may collect credentials from new devices and configure them with the necessary services, policies, and vPSKs to ensure secure and efficient network operation.

In block 1764, the processor may grant network access to the new devices. For example, the processor may update routing tables and access controls to allow network access for newly configured devices.

In block 1766, the processor may dynamically reassign devices to different groups based on real-time factors, including device capabilities, resource availability, and service requirements. For example, the processor may continuously evaluate device capabilities, resource availability, and service requirements, reassigning devices to improve network performance and resource utilization.

In block 1768, the processor may form trusted domains using virtual networks (vNets) to provide remote endpoint visibility and control through dynamic network segmentation. For example, the processor may create virtual networks that isolate and secure groups of devices to provide enhanced visibility and control for network administrators.

In block 1770, the processor may create localized networks for automatic secure connections to external services. For example, the processor may set up localized network segments that ensure secure and efficient connections to external services and configure routing and access controls to manage traffic.

In block 1772, the processor may share device credentials with upstream services to ensure redundancy and resiliency. For example, the processor may communicate device credentials to upstream services to allow redundancy and support failover mechanisms for continuous network operation and resilience.

The methods described provide a technical solution to several inherent problems in traditional network management systems to enhance the efficiency, security, and scalability of edge computing networks. For example, the processor may improve network performance and provide a flexible, scalable framework for modern network demands by automating device provisioning, dynamically managing policies and resources, and ensuring robust security through vPSKs. This addresses the limitations of static network configurations and manual interventions, leading to improved resource utilization, reduced latency, and enhanced security.

These methods may improve system performance by optimizing resource allocation in real time so that each network slice receives the necessary bandwidth, processing power, and other resources. This may lead to enhanced network efficiency and reduced latency and is particularly beneficial for applications requiring high performance (e.g., real-time communications, IoT deployments, etc.).

These methods may mitigate inefficiencies and vulnerabilities of traditional network management systems that rely on static configurations and manual interventions by dynamically adapting to changing network conditions, automating the provisioning and configuration processes, and enhancing security through continuous monitoring and management of device credentials and policies. By using virtual private security keys (vPSKs) and network slicing, the system may create isolated, secure segments within the network, reducing the risk of unauthorized access and improving overall network resilience. The ability to dynamically allocate resources ensures that the network may handle varying loads and maintain optimal performance, while the automation of device provisioning reduces the likelihood of human error and speeds up the deployment of new devices and services.

Figure 18:
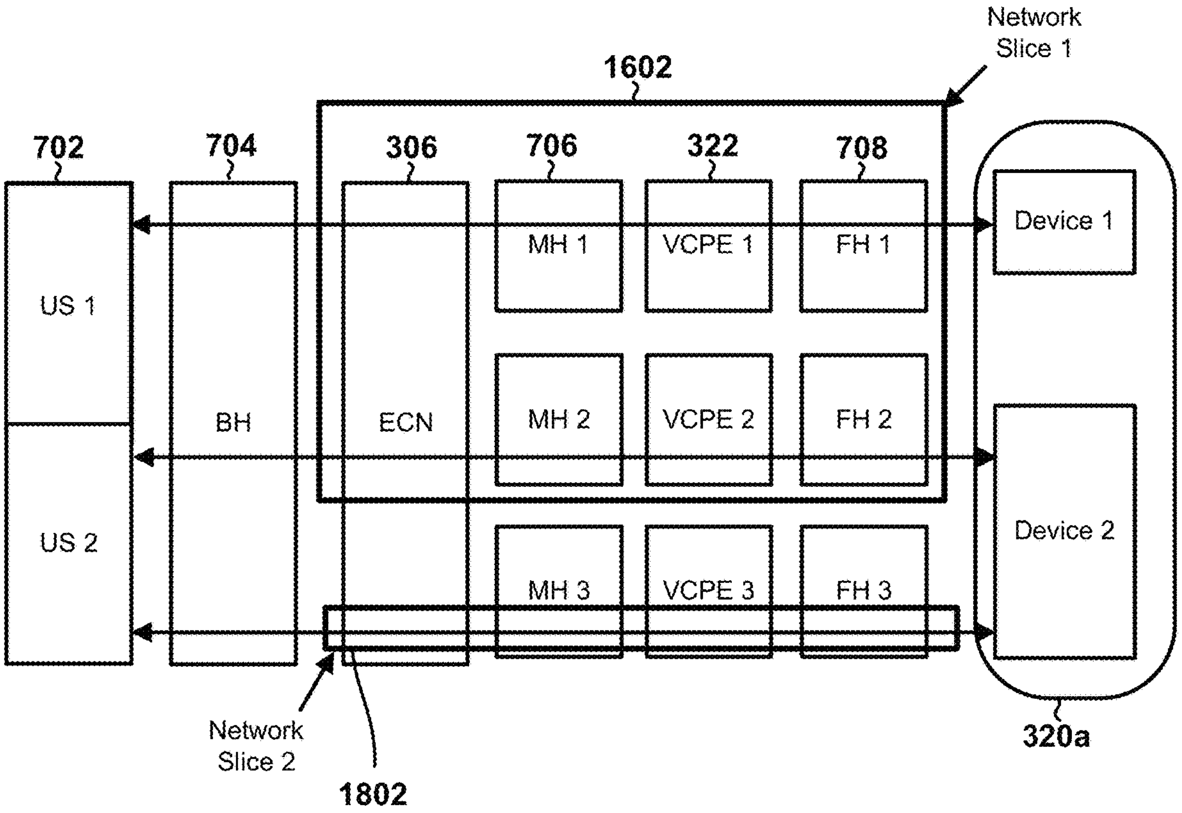
FIG. 18 is a block diagram that illustrates example network slices that could be generated and/or used by the vDA system in accordance with the various embodiments.

FIG. 18 expands upon the example network slice illustrated in FIG. 16. For example, FIG. 18 shows that Device 2 requires an additional service that is not supported by network slice 1602. As a result, an additional network slice 1802 (network slice 2) is allocated to Device 2. The inclusion of this second network slice 1802 is only possible if the policy for Group 1 320*a* allows it (e.g., in its associated policy, etc.).

In both FIGS. 16 and 18, the network slices 1602, 1802 may include all components that are part of the same network ("on-net"). However, not all components may need their own network slice, as this decision depends on their bearer traffic requirements and functionalities. As such, in some embodiments, the network slices 1602, 1802 may include a subset of the components intelligently selected based on the relevant bearer traffic requirements and/or functionalities.

Figure 19A:
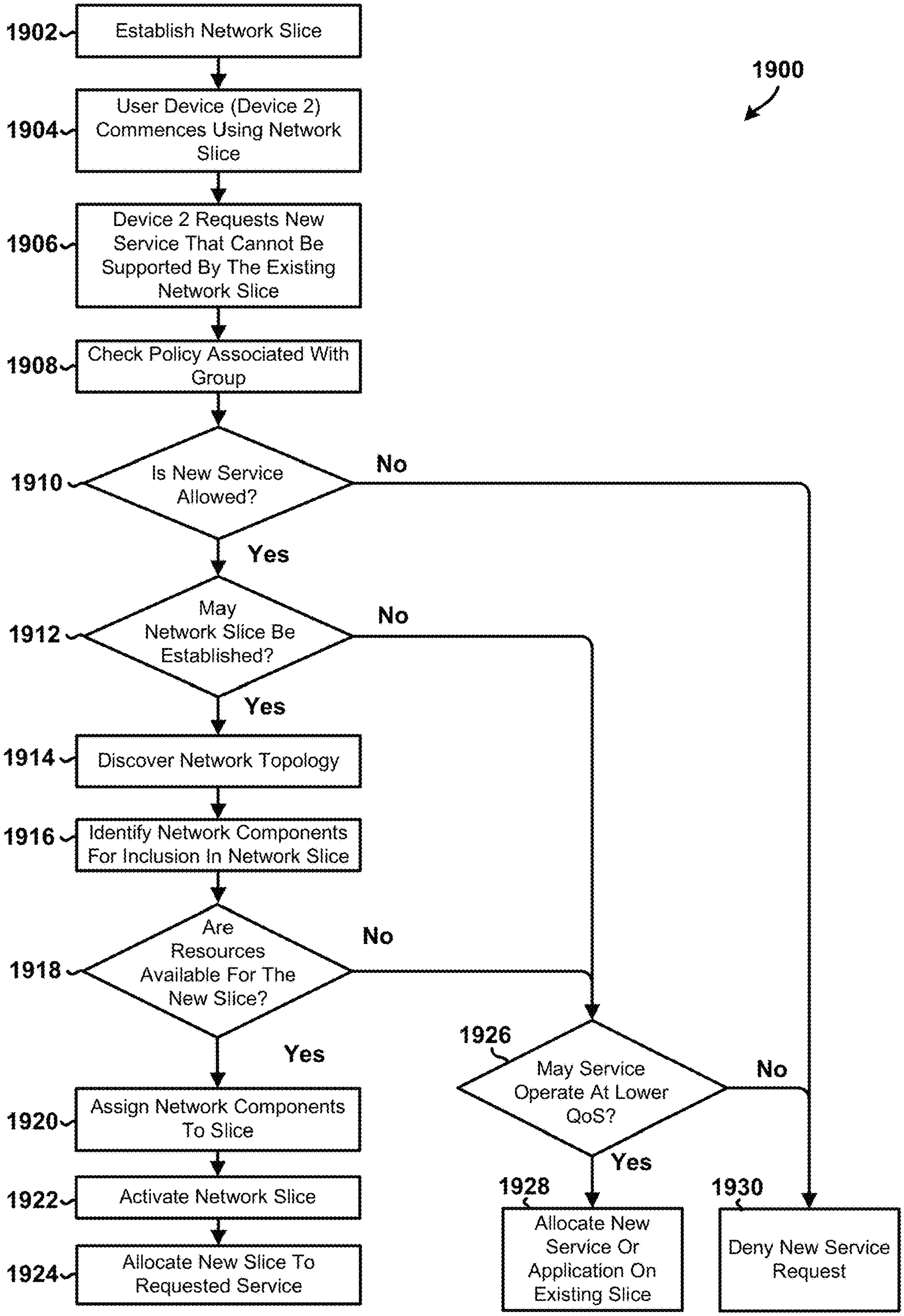
FIG. 19A is a process flow diagram that illustrates a method of performing a dynamic slice provisioning process in which a new service is being requested by a device in a group in accordance with some embodiments.
Figure 19B:
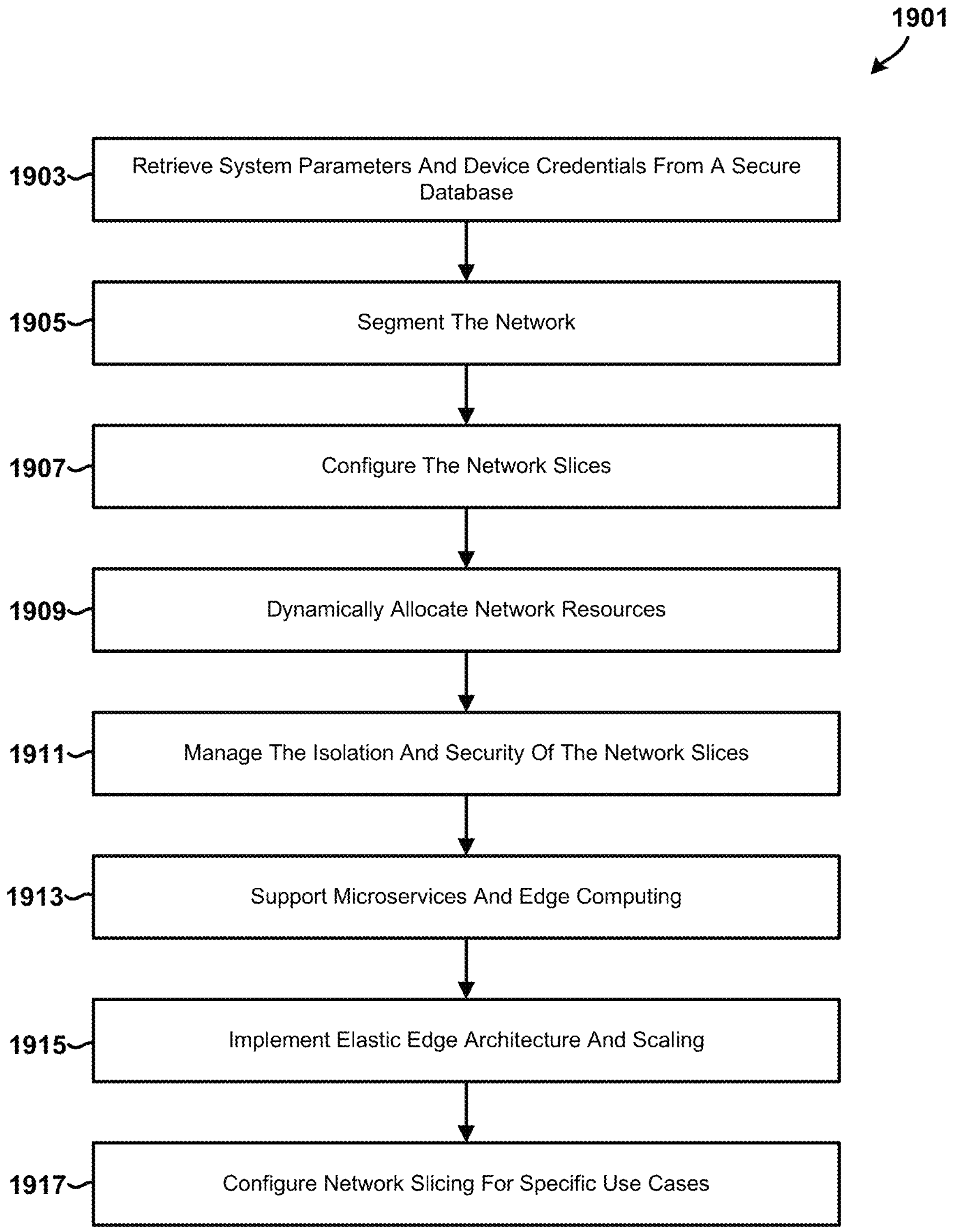
FIG. 19B is a process flow diagram that illustrates a method of dynamically segmenting and slicing networks in real-time to meet specific service requirements in accordance with some embodiments.

FIGS. 19A and 19B illustrate methods 1900 and 1901 of managing network segmentation, slicing, and scaling operations in an edge computing system in accordance with some embodiments. Method 1900, as shown in FIG. 19A, details a dynamic slice provisioning process when a new service is requested by a device in a group. Method 1901, illustrated in FIG. 19B, covers broader network segmentation, slicing, and scaling operations. Both methods may be performed by a processor in a computing device (e.g., ECN, VCPE, etc.).

In overview, when a device within a group requests a new service, the existing network slice may not have the necessary parameters to support the service. In such cases, a new network slice may be created, contingent upon the group's policy allowing for this creation. If the policy permits the creation of a new slice, the process begins with a network discovery to verify whether sufficient resources are available for the new slice. If the resources are both available and permitted, the new slice is established, and the service is granted access to it. Conversely, if resources are either unavailable or insufficient, the system then assesses whether the application or service can operate at a reduced quality of service (QOS) within the existing network slice. If the service can function under these conditions, it is allowed to proceed. Otherwise, the service request is denied.

If the application or service is able to function at a reduced QoS, it is permitted to run within the existing network slice. However, if the reduced QoS is insufficient for the application or service, the request is denied. The vDA network slicing system allows for the creation of multiple dedicated, virtualized, and isolated logical networks or groups on a single physical network. This capability allows the system to meet the differentiated requirements of various customers and provide efficient resource allocation and adaptability to changing demands and/or otherwise enhance overall network performance by dynamically adjusting resources to match specific service needs.

With reference to FIG. 19A, in block 1902, the Edge Device may establish a network slice. For example, the Edge Device may configure network elements (e.g., routers, switches, gateways, etc.) to create a dedicated slice tailored to the specific requirements of the group and/or which otherwise improves resource allocation and performance.

In block 1904, a user device (e.g., Device 2 illustrated in FIG. 18) may commence using the network slice. For example, Device 2 may commence using the resources and settings allocated to the established network slice with the dedicated bandwidth and configuration. In block 1906, the user device (Device 2) may request a new service that cannot be supported by the existing network slice. For example, Device 2 may require a high-bandwidth, low-latency application that exceeds the current slice's capabilities.

In block 1908, the Edge Device may evaluate the policy associated with the group. For example, the Edge Device may reference stored policy rules and configurations to verify whether the group's policy framework permits the addition of new services or network slices. In block 1910, the Edge Device may determine whether a new service is allowed. For example, the Edge Device may evaluate the group's policy to determine whether it allows the requested service based on pre-defined conditions and rules.

In response to determining that a new service is not allowed (i.e., determination block 1910="No"), the Edge Device may deny the new service request in block 1930. For example, the Edge Device may send a notification to Device 2 indicating that the service request has been denied due to policy restrictions. In response to determining that a new service is allowed (i.e., determination block 1910="Yes"), the Edge Device may determine whether a network slice may be established in determination block 1912. For example, the Edge Device may evaluate the current network conditions and available resources to determine whether creating a new slice is feasible. In response to determining that a network slice may be established (i.e., determination block 1912="Yes"), the Edge Device may discover the network topology in block 1914. For example, the Edge Device may use network discovery protocols to map all connected devices and network elements and to identify their relationships and interactions.

In block 1916, the Edge Device may identify network components for inclusion in the network slice. For example, the Edge Device may select specific routers, switches, gateways, and other elements that will form part of the dedicated network slice, ensuring that all necessary components are included. In determination block 1918, the Edge Device may determine whether there are resources available for the new slice. For example, the Edge Device may evaluate current resource utilization (e.g., bandwidth, processing power, storage, etc.) to determine whether sufficient resources are available.

In response to determining that there are resources available for the new slice (i.e., determination block 1918="Yes"), the Edge Device may assign network components to the slice in block 1920. For example, the Edge Device may configure the selected network elements to operate within the defined slice, setting up routing, switching, and access controls. In block 1922, the Edge Device may activate the network slice. For example, the Edge Device may finalize the configuration and bring the new slice online to update routing tables and enforce access controls. In block 1924, the Edge Device may allocate the new slice to the requested service. For example, the Edge Device may direct the requested service to use the newly established slice.

In response to determining that a network slice may not be established (i.e., determination block 1912="No") and/or in response to determining that there are not sufficient resources available for the new slice (i.e., determination block 1918="No"), the Edge Device may determine whether the requested service may operate at a lower QoS in determination block 1926. For example, the Edge Device may evaluate whether the service may function with reduced bandwidth or other resources within the existing slice. In response to determining that the service may operate at a lower QoS (i.e., determination block 1926="Yes"), the Edge Device may allocate the new service and/or application on the existing slice in block 1928. For example, the Edge Device may adjust the existing slice's settings to accommodate the new service with lower QoS requirements. In response to determining that the service may not operate at a lower QoS (i.e., determination block 1926="No"), the Edge Device may deny the new service request in block 1930. For example, the Edge Device may notify Device 2 that the service request has been denied due to insufficient resources or policy constraints.

With reference to FIG. 19B, in block 1903, a processing system in an edge computing device may retrieve system parameters and device credentials from a secure database. For example, the processing system may access device identifiers, authentication keys, and configuration settings needed to provision new devices, ensuring accurate configuration and security. In some embodiments, retrieving system parameters and device credentials in block 1903 may include querying the database for specific device details and security credentials. For example, the processing system may fetch device serial numbers and encryption keys to prepare for secure device integration.

In block 1905, the processing system may segment the network. For example, the processing system may analyze device types, capabilities, and roles to categorize them, assign devices to logical groups based on predefined rules and policies, select appropriate policies for each group (including settings for network slicing, traffic management, security protocols, and QoS parameters), and store group membership and policy information in a central database. Such segmentation may allow for more efficient management and improved performance.

In some embodiments, segmenting the network in block 1905 may include evaluating hardware and software specifications, usage patterns, and functional roles of devices. For example, the processing system may classify devices into groups (e.g., high-performance servers, low-power sensors, and mobile endpoints, etc.) and apply tailored policies to each group. In some embodiments, segmenting the network in block 1905 may include categorizing devices by analyzing each device's hardware and software specifications, usage patterns, and functional roles.

In block 1907, the processing system may configure the network slices. For example, the processing system may determine whether a new service request requires a dedicated network slice, initiate network discovery to map the network topology and identify necessary components, select and assign specific network elements to the new slice, configure and activate the network slice, update routing tables, enforce access controls, allocate resources dynamically to meet the needs of each network slice in real-time, and allow for customization of services by allowing flexible group and policy combinations. In some embodiments, configuring the network slices in block 1907 may include assessing the group's traffic load, latency, and security requirements. For example, the processing system may allocate a high-bandwidth, low-latency slice for video conferencing services while assigning a separate slice for data storage with enhanced security protocols.

In some embodiments, configuring the network slices in block 1907 may include determining whether the group's requirements for traffic load, latency, security, and other factors exceed the capabilities of a shared network segment. For example, the processing system may analyze real-time traffic data, evaluate latency requirements for each application, assess security protocols needed for sensitive data, and compare these parameters against the available resources within the shared network segment. If the evaluation indicates that the shared segment cannot meet the group's needs, the processing system may initiate the creation of a dedicated network slice to optimize performance and security for the group's specific requirements.

In block 1909, the processing system may dynamically allocate network resources. For example, the processing system may monitor current network conditions, identify underutilized resources, and redistribute them to areas experiencing high demand to improve resource use and overall network performance. In some embodiments, dynamically allocating the network resources in block 1909 may include continuously monitoring network usage, adjusting resource allocation to ensure each slice has adequate bandwidth, processing power, and other resources, evaluating whether the service may function at a reduced QoS within the existing slice in response to determining resources are insufficient for a new slice, allocating the service to the existing slice in response to determining that it may function at a reduced QoS, and denying the service request in response to determining that the reduced QoS is insufficient. For example, the processing system may use real-time analytics to track resource utilization and predict future demand, dynamically reallocating resources to maintain enhanced performance levels across all network slices.

In some embodiments, dynamically allocating the network resources in block 1909 may include reallocating resources in response to real-time changes in network usage and service requirements. For example, the processing system may shift bandwidth and computing power from low-priority tasks to high-priority ones during peak usage times so that the more important applications maintain performance.

In block 1911, the processing system may manage the isolation and security of the network slices. For example, the processing system may segregate traffic between different network slices so that each slice operates independently and securely and to prevent unauthorized access and potential data breaches. In some embodiments, managing isolation and security in block 1911 may include implementing vSlices and groups to isolate subnetworks and devices, applying policies such as inter-subscriber firewalls to manage communication within and between groups, using inter-category firewalling to control unidirectional or bidirectional communication based on applied policies, and maintaining device isolation even when IP addresses or gateways change. For example, the processing system may configure virtual firewalls to enforce strict access controls so that only authorized devices may communicate within their designated groups and dynamically adjust firewall rules to accommodate changes in network topology or device configuration.

In some embodiments, managing isolation and security in block 1911 may include using policies and grouping to isolate devices and provide the required Quality of Service (QOS) for end device services. For example, the processing system may assign specific QoS parameters to each group to prioritize important traffic and guarantee bandwidth for high-priority applications while isolating less important devices to prevent them from impacting overall network performance.

In block 1913, the processing system may support microservices and edge computing. For example, the processing system may deploy microservices on edge devices to reduce latency and improve the responsiveness of applications, allowing for real-time processing and decision-making closer to the data source. In some embodiments, supporting microservices and edge computing in block 1913 may include promoting the use of microservices in a container environment to simplify provisioning and ensure efficient application execution, hosting services at the network edge, using both wired and wireless connectivity for the front haul and as a gateway to the WAN, and using multiple gateways to access the WAN, provide failover, and support stable network performance. For example, the processing system may deploy containerized microservices across edge nodes to allow rapid scaling and efficient resource utilization while leveraging multiple gateways to balance the load and maintain high availability.

In some embodiments, supporting microservices and edge computing in block 1913 may include performing various operations to ensure that the connection between the device running the application and the processing device meets certain QoS requirements. For example, the processing system may allocate specific bandwidth and low-latency paths for important applications, monitor the performance of these connections in real-time, and dynamically adjust resources to maintain the required QoS levels.

In block 1915, the processing system may implement elastic edge architecture and scaling. For example, the processing system may dynamically allocate and reallocate resources across the network to handle varying workloads and ensure optimal performance. In some embodiments, implementing elastic edge architecture and scaling in block 1915 may include providing horizontal and vertical scaling capabilities for rapidly adapting to changes or demands of applications, systems, or networks, distributing computing resources and services throughout the network to improve efficiency and reduce latency, and implementing backhaul aggregation to deliver traffic from ECNs or vCPEs to the WAN. For example, the processing system may monitor network traffic patterns and usage trends in real-time to scale out additional edge nodes to handle increased load or consolidate resources during periods of low demand. In addition, backhaul aggregation may combine multiple network connections to increase bandwidth and provide redundancy.

In some embodiments, implementing elastic edge architecture and scaling in block 1915 may include distributing computing resources to improve efficiency by reducing latency in analyzing data and services. For example, the processing system may deploy computational tasks closer to the data source, such as user devices or edge nodes, thereby minimizing the distance data must travel and improving response times. In some embodiments, this distributed approach may include using local edge servers to perform tasks that would traditionally be handled by centralized cloud data centers.

In block 1917, the processing system may configure network slicing for specific use cases. For example, the processing system may create customized network slices tailored to the unique requirements of various applications and services, optimizing resource allocation and performance. In some embodiments, configuring network slicing for specific use cases in block 1917 may include implementing vertical, horizontal, and diagonal network slices to meet differentiated customer requirements. For example, the processing system may establish vertical slices to manage resources at different hierarchical levels, horizontal slices to segment resources across similar levels, and diagonal slices to combine vertical and horizontal elements, creating larger slices as needed to support complex services. These configurations may allow for the more efficient management of network resources to fulfill specific service demands.

In some embodiments, configuring network slicing for specific use cases in block 1917 may include isolating subnetworks and devices using vertical, horizontal, and diagonal slices to deliver services within a vDA system. For example, the processing system may use vertical slices to manage end-to-end network resources from core to edge, horizontal slices to separate different service types within the same layer, and diagonal slices to integrate vertical and horizontal elements. This approach may provide comprehensive resource allocation and/or isolated and customized network environments for diverse applications that enhance performance and security.

The vDA system may allow the creation of custom, on-demand network slices with isolation. These slices may span the entire network or just a portion of the network and may be either static or dynamic based on the policy enforced for the slice. The vDA network slicing system may also provide isolation between slices, allowing for the independent deployment and management of network services without affecting each other. The vDA system may assign a group to a predefined slice and segment the network, either in its entirety or a subset of it. This may allow for efficient resource allocation and the ability to adapt to changing demands.

When a group is assigned to a predefined slice, some efficiencies may be lost, but this may be offset by simplified group management. Also, with this arrangement, the segment may not be traffic-dependent for each application, resulting in the quality of service (QOS) for the application not matching the current capabilities of the network slice. This may lead to suboptimal performance for certain applications.

In a vDA system, the network slicing architecture may be divided into three layers: a network slice forwarding layer, a network slice control layer, and a network slice management layer. The network slice forwarding layer may be responsible for dividing the physical network's forwarding resources into multiple isolated sets that are allocated to different network slices. The network slice control layer may provide different logical network slice instances on a physical and logical network topology. It may associate the logical topologies of slices with the set of network resources allocated to them. The network slice control layer may allow the creation of network slices to meet specific service requirements. The network slice control layer may be further divided into control and data planes. The control plane may distribute, collect, and calculate network slice information, while the data plane may identify and forward network slice resources. The network slice management layer may be responsible for managing the slice. Some of its functions include slice deployment, network monitoring, maintenance functions, and the ability to terminate the slice itself.

A network slice (or sub-network slice) may be a logical network that provides specific network characteristics and capabilities. It may include all aspects and platforms within the network that are included in the creation and delivery of an application, and/or it may be associated with one component or a few components of the network depending on the service delivery and treatment requirements.

In a vDA system, a network slice may use dedicated and/or shared resources such as memory storage, power, and bandwidth and is isolated from other network slices. This isolation may allow a network to offer multiple vertical service offerings.

In some embodiments, the vDA system may be configured to deliver multiple network slices of different types, as depicted in FIG. 18, which are associated with groups that have diverse requirements, such as a browser versus streaming video. As shown in FIG. 18, network slicing may be applied to a single network or a network in which logical separations are created, with proper network isolation, resources, optimized topology, and specific configuration to serve different service requirements.

As illustrated in FIG. 18, network slicing may be applied to a single network or a network in which logical separations are created. In either case, proper network isolation, resources, optimized topology, and specific configuration are used to serve different service requirements.

As network services become more diverse, they impose different requirements on the network. For example, real-time teleconferencing and live video broadcast applications typically require low-latency, low-jitter data paths, while big data applications like file transfers typically require high-bandwidth channels with a low packet loss rate.

Network slices may be categorized into different types based on the abstraction of characteristics of the services they facilitate and the application or service behavior, including features, bandwidth, and quality of service (QOS). Each network slice in vDA may contain different groups and devices, which are normally isolated from each other. This isolation, called a "shard," has independent resource allocation.

Network slice isolation may prevent service bursts or abnormal traffic in one slice from affecting other slices in the same network. It also ensures that services in different network slices do not affect each other. This is important for edge computing applications such as smart healthcare, telemedicine, gaming, augmented and virtual reality, smart ports, and smart grids, as it prevents one service or part of a service from degrading another service outside of the policy definition. The vDA system network slicing may also facilitate network security by isolating traffic and providing isolation for the service.

Service isolation may help ensure that data packets in one network slice are not sent to another network slice on the same network. For example, service isolation may isolate the connections between different network slices, making the services of different tenants (e.g., specific customers or user groups within a multi-tenant infrastructure, etc.) invisible to each other on the same network. This may prevent interference or ensure that each service or group has its own dedicated resources.

Figure 20A:
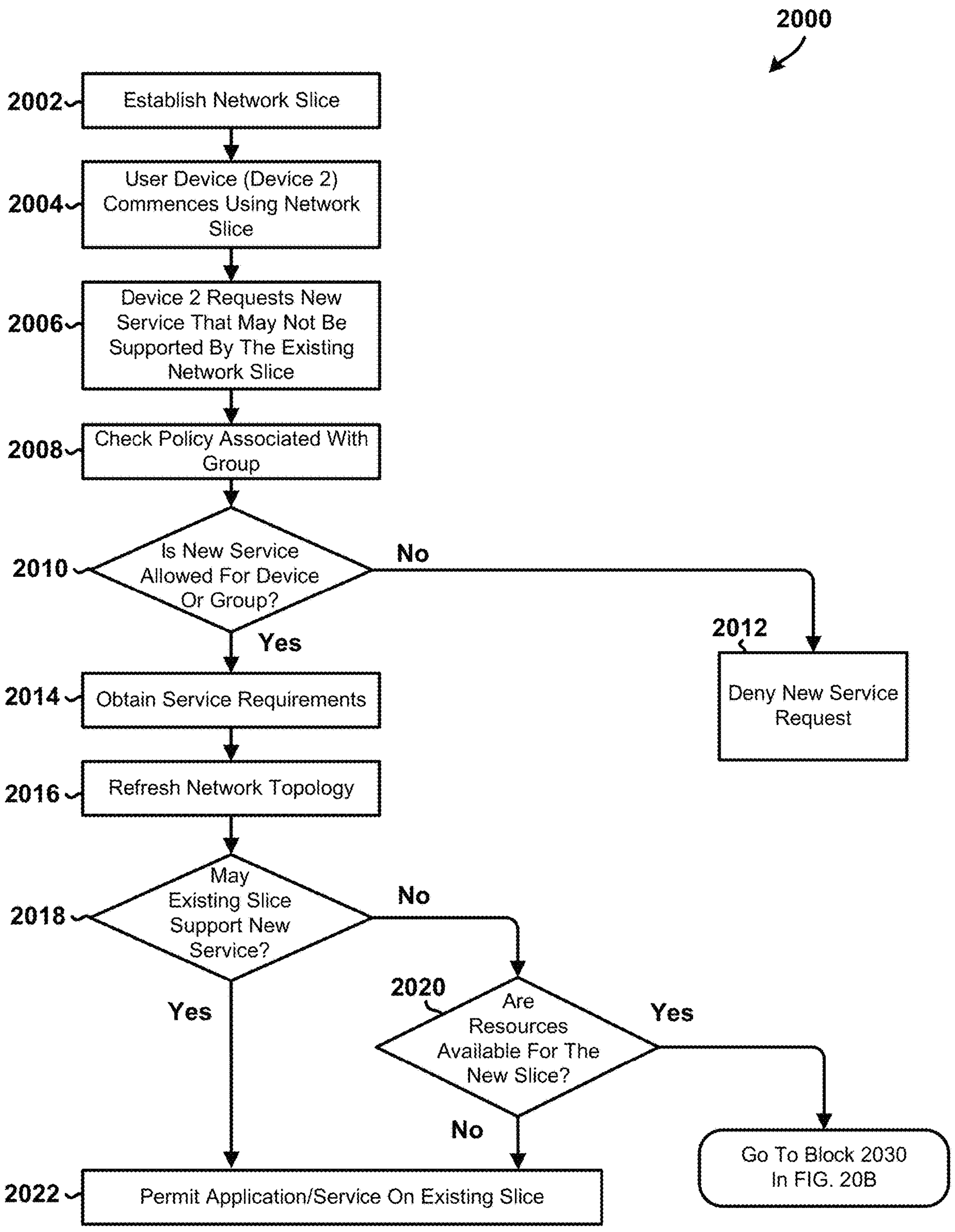
FIGS. 20A and 20B are process flow diagrams that illustrate a method of allocating network slices in accordance with some embodiments.
Figure 20B:
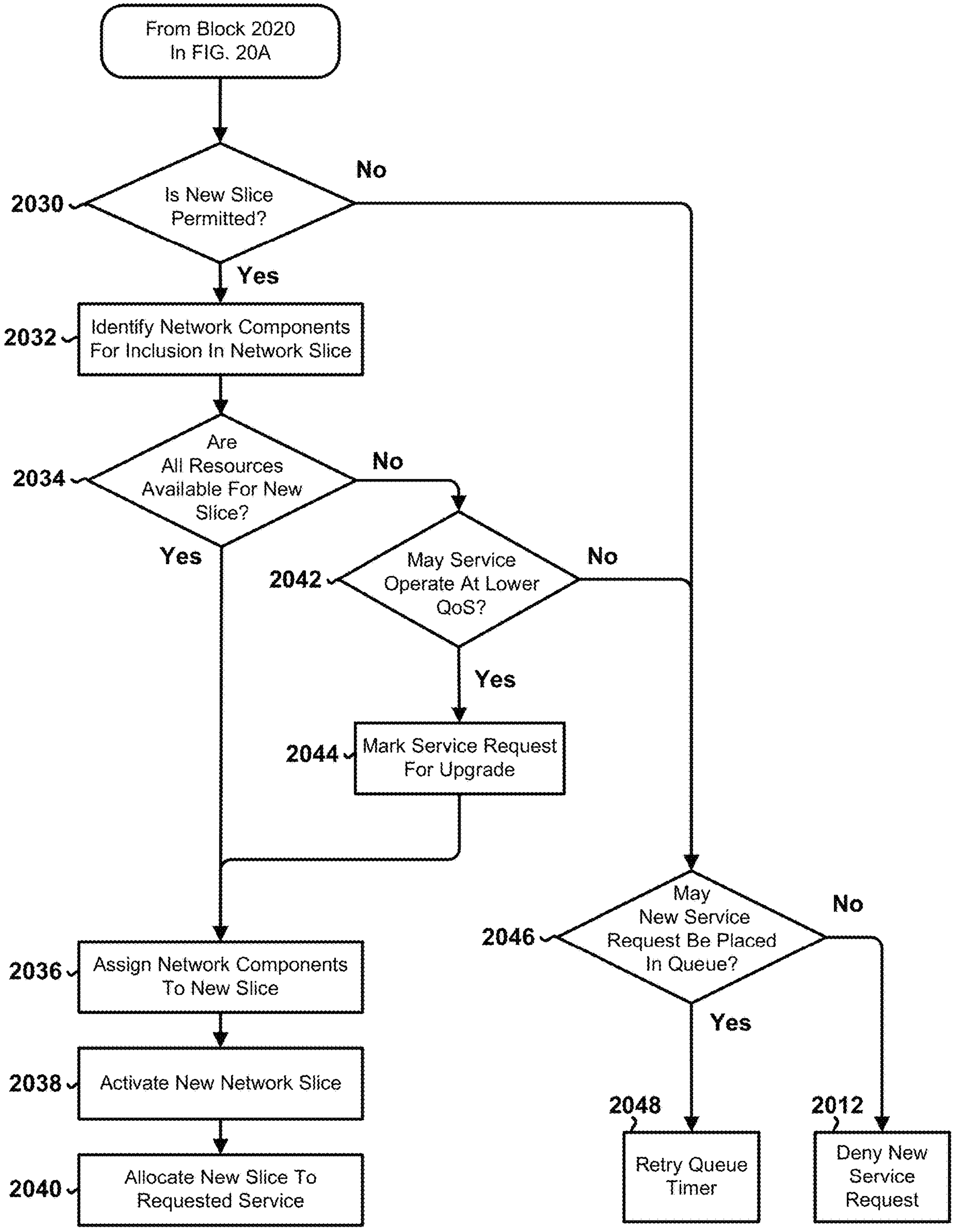

FIGS. 20A and 20B illustrate a method 2000 of allocating network slices in accordance with some embodiments. Method 2000 may be performed by a processor or processing system in an edge computing device (e.g., ECN 306, etc.).

In block 2002, the edge device may establish a network slice. For example, the processing system may configure network resources, define slice parameters, and initiate the slice setup to ensure it meets specific service requirements.

In block 2004, a user device (e.g., Device 2) may commence using the network slice and/or the edge device may determine that the user device (e.g., Device 2) has begun using the network slice. For example, the processing system may monitor network connections and log the start of service usage by the user device.

In block 2006, the edge device may receive a service request from the user device (e.g., Device 2) that requests a new service that may be supported by the existing network slice. For example, the processing system may process incoming service requests and validate them against current slice capabilities.

In block 2008, the edge device may check the policy associated with the group(s) to which the edge device and/or the user device belong. For example, the processing system may retrieve and evaluate policy settings from a centralized policy management database.

In determination block 2010, the edge device may determine whether a new service is allowed for the device(s) or associated group(s). For example, the processing system may compare the service request against policy rules to determine whether the service can be permitted.

In response to determining that a new service is not allowed for the device(s) or associated group(s) (i.e., determination block 2010="No"), the edge device may deny the new service request in block 2012. For example, the processing system may send a notification to the user device explaining the denial of the service request.

In response to determining that a new service is allowed for the device(s) or associated group(s) (i.e., determination block 2010="Yes"), the edge device may obtain service requirements for the new service in block 2014. For example, the processing system may gather detailed specifications and resource needs for the requested service.

In block 2016, the edge device may refresh the network topology. For example, the processing system may update its view of the network's structure and available resources by communicating with network monitoring tools.

In determination block 2018, the edge device may determine whether an existing slice may be used to support the requested service. For example, the processing system may analyze current slice configurations and resource allocations to determine whether they can accommodate the new service.

In response to determining that an existing slice may not be used to support the requested service (i.e., determination block 2018="No"), the edge device may determine whether there are resources available for the new slice in block 2020.

For example, the processing system may assess network resource availability, including bandwidth, CPU, and memory.

In response to determining that an existing slice may be used to support the requested service (i.e., determination block 2018="Yes") or in response to determining that there are not sufficient resources available for the new slice (i.e., determination block 2020="No"), the edge device may perform various operations to permit the application or service to use an existing slice in block 2022. For example, the processing system may reconfigure the existing slice to meet the service requirements or reallocate resources within the slice.

With reference to FIG. 20B, in response to determining that an existing slice may not be used to support the requested service (i.e., determination block 2018="No") and that there are sufficient resources available for a new slice (i.e., determination block 2020="Yes"), the edge device may determine whether a new slice is permitted in determination block 2030. For example, the processing system may consult policy settings and resource constraints to determine whether a new slice can be created.

In response to determining that a new slice is permitted (i.e., determination block 2030="Yes"), the edge device may identify network components for inclusion in the network slice in block 2032. For example, the processing system may select specific routers, switches, and virtual machines that will form part of the new slice.

In determination block 2034, the edge device may determine whether all of the identified resources are available for the new slice. For example, the processing system may verify the availability and readiness of the selected network components.

In response to determining that all of the identified resources are available for the new slice (i.e., determination block 2034="Yes"), the edge device may assign the identified and available network components to the new slice in block 2036. In block 2038, the edge device may activate the new network slice. In block 2040, the edge device may allocate the new slice to the request service (i.e., the application or service requested by the user device in block 2006). For example, the processing system may configure network paths, set up routing protocols, and allocate bandwidth to ensure the new slice is operational and supports the service.

In response to determining that all of the identified resources are not available for the new slice (i.e., determination block 2034="No"), the edge device may determine whether the requested application or service may operate at a lower quality of service in determination block 2042. For example, the processing system may determine whether the service can function with reduced bandwidth or processing power.

In response to determining that the requested application or service may operate at a lower quality of service (i.e., determination block 2042="Yes"), the edge device may mark the service request for upgrade in block 2044. The edge device may then assign the identified and available network components to the new slice in block 2036, activate the new network slice in block 2038, and allocate the new slice to the request service in block 2040. For example, the processing system may document the need for future resource upgrades and proceed with the current allocation under reduced QoS conditions.

In response to determining that a new slice is not permitted (i.e., determination block 2030="No"), the edge device may determine whether the new service may be placed in a queue for later processing in determination block 2046. For example, the processing system may determine whether the service request can be deferred until resources become available.

In response to determining that the new service may not be placed in a queue (i.e., determination block 2046="No"), the edge device may deny the new service request in block 2012. For example, the processing system may send a notification to the user device indicating that the service cannot be provided at this time.

In response to determining that the new service may be placed in a queue (i.e., determination block 2046="Yes"), the edge device may place the service in a service queue and retry the queue timer at a later time in block 2048. For example, the processing system may add the service request to a scheduled queue and periodically re-evaluate resource availability for future processing.

FIGS. 21A through 21D illustrate a method 2100 of preconfiguring network slices in accordance with some embodiments. Method 2100 may be performed by a processor or processing system in an edge computing device (e.g., ECN 306, etc.).

In block 2102, the edge device may perform various network management and system provisioning operations as part of the process for allowing the device or devices to gain access to the network. For example, the processing system in the edge device may configure initial network settings, authenticate devices, and allocate provisional resources to enable network access.

In block 2104, the edge device may assign a group based on the information received from the provisioning and authentication systems. The group may be a single device, group of devices, edge device, or group of edge devices that have one or more devices connected to them. The edge device may associate or assign the end device(s) and/or edge device(s) with a particular group or groups. For example, the processing system may categorize devices into logical groups based on their roles, capabilities, and service requirements.

In block 2106, the edge device may allow policy and services with the group that the end device is associated with. For example, the processing system may apply relevant policies to the group and configure services that the devices in the group are permitted to access.

In block 2108, the edge device may determine the group assignments and/or assign the devices to groups and edge devices to groups. For example, the processing system may finalize group membership based on updated network information and service policies.

In block 2110, the edge device may determine the services allowed for the end device(s). For example, the processing system may reference policy rules to specify which services each device in the group can utilize.

In block 2112, the edge device may determine the policy for the allowed services for the end device(s). For example, the processing system may establish service-level agreements (SLAs) and define QoS parameters for the services provided to the devices.

In block 2114, the edge device may assign the end device or edge device to the group or groups associated with the ECN/VCPE. For example, the processing system may map devices to their corresponding edge computing nodes and virtual customer premises equipment, ensuring coherent group management.

In determination block 2116, the edge device may determine whether a network slice has been pre-setup. The edge device may proceed in response to determining that the network slice that is correctly associated with the policy and group for the edge device is pre-setup. For example, the processing system may determine whether a network slice configuration matches the group's policies already in place.

In response to determining that a network slice has not been pre-setup (i.e., determination block 2116="No"), the edge device may wait for a service request from an end device in block 2120 or another edge device as in 2122. For example, the processing system may enter a standby mode until a new service request triggers further action.

In response to determining that a network slice has been pre-setup (i.e., determination block 2116="Yes"), the edge device may determine the resource requirements in block 2118. For example, the processing system may analyze the service request to identify specific resource needs such as bandwidth, processing power, and storage.

In block 2122, the edge device may receive a service or application request from the end device. In response, the edge device may determine the resource requirements in block 2118. For example, the processing system may log the service request and initiate resource allocation processes.

Figure 21A:
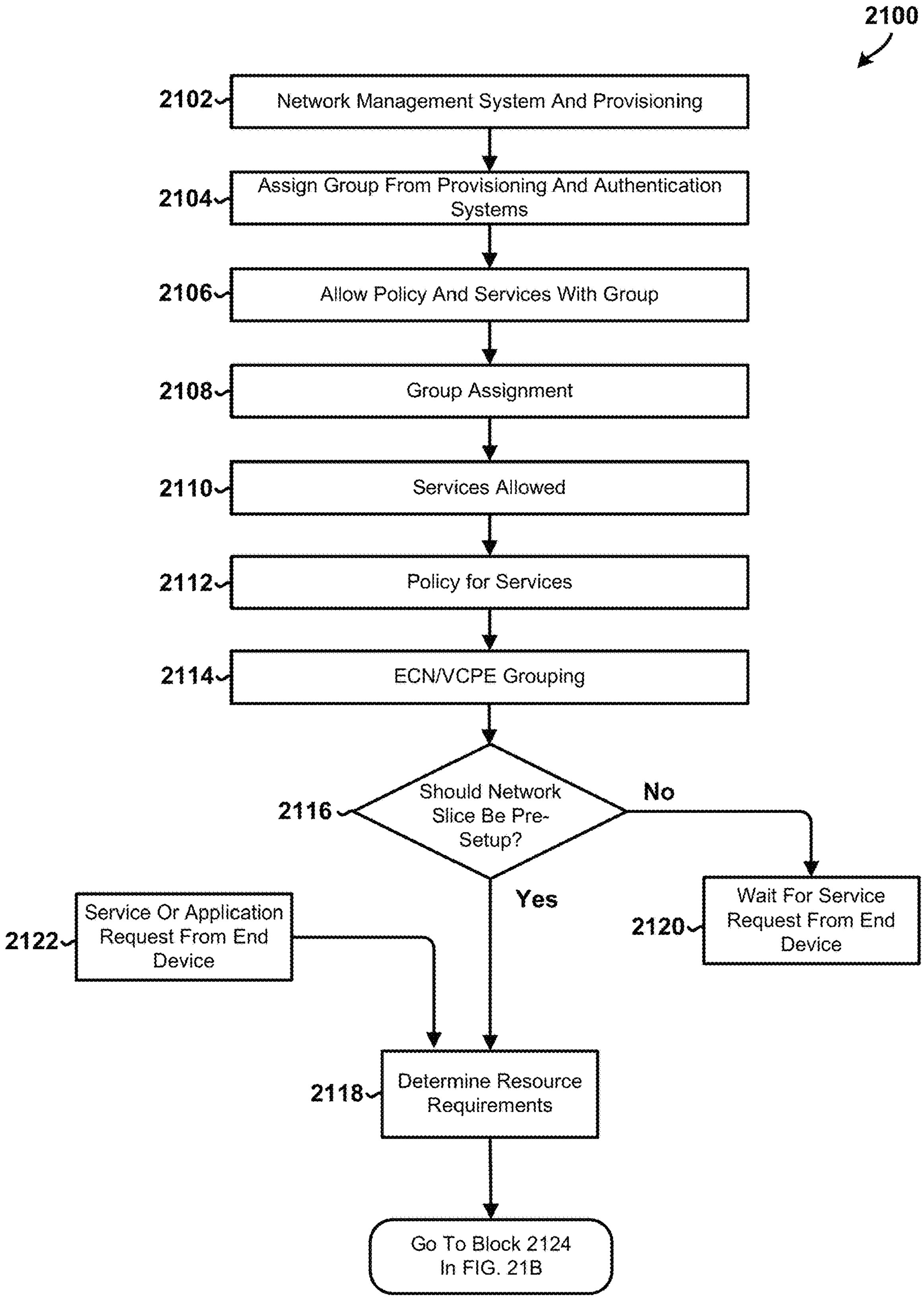
FIGS. 21A through 21D are process flow diagrams that illustrate a method of preconfiguring network slices in accordance with some embodiments.
Figure 21B:
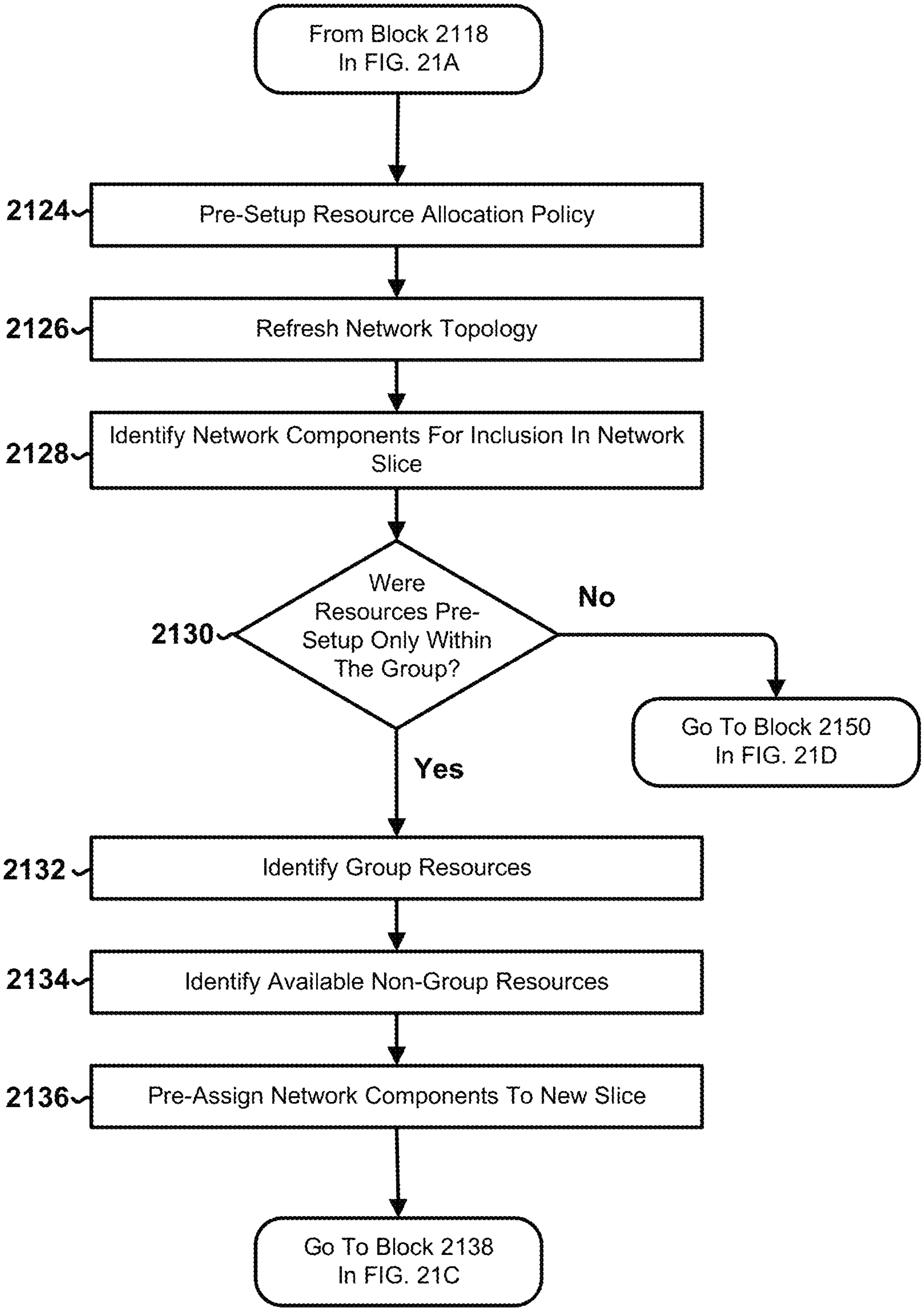

With reference to FIG. 21B, in block 2124 the edge device may utilize the pre-setup allocation policy to establish network components required for the network slice and application. For example, the processing system may configure network hardware and software based on predefined allocation policies to support the new slice.

In block 2126, the edge device may refresh the network topology to verify it has the most recent network topology information. For example, the processing system may update its network map by communicating with topology discovery tools and incorporating recent changes.

In block 2128, the edge device may identify network components for inclusion in the network slice based on network slice requirements from the pre-plan requirements. For example, the processing system may select specific routers, switches, and servers that match the slice's configuration criteria.

In determination block 2130, the edge device may determine whether the resources pre-setup were only within the group or included resources which may not be within the group. For example, the processing system may analyze whether the allocated resources are confined to the original group or extend to external resources.

In response to determining that the resources were pre-setup only within the group (i.e., determination block 2130="Yes"), the edge device may identify group resources available for inclusion in block 2132. For example, the processing system may compile a list of all network components within the group that can be used for the slice.

In block 2134, the edge device may identify available non-group resources that may be needed for the network slice. For example, the processing system may scan the broader network for additional resources that can supplement the group's capacity.

In block 2136, the edge device may pre-assign network components to the new slice. For example, the processing system may allocate and configure the identified network components to establish the network slice, ensuring all necessary resources are in place before activation.

Figure 21C:
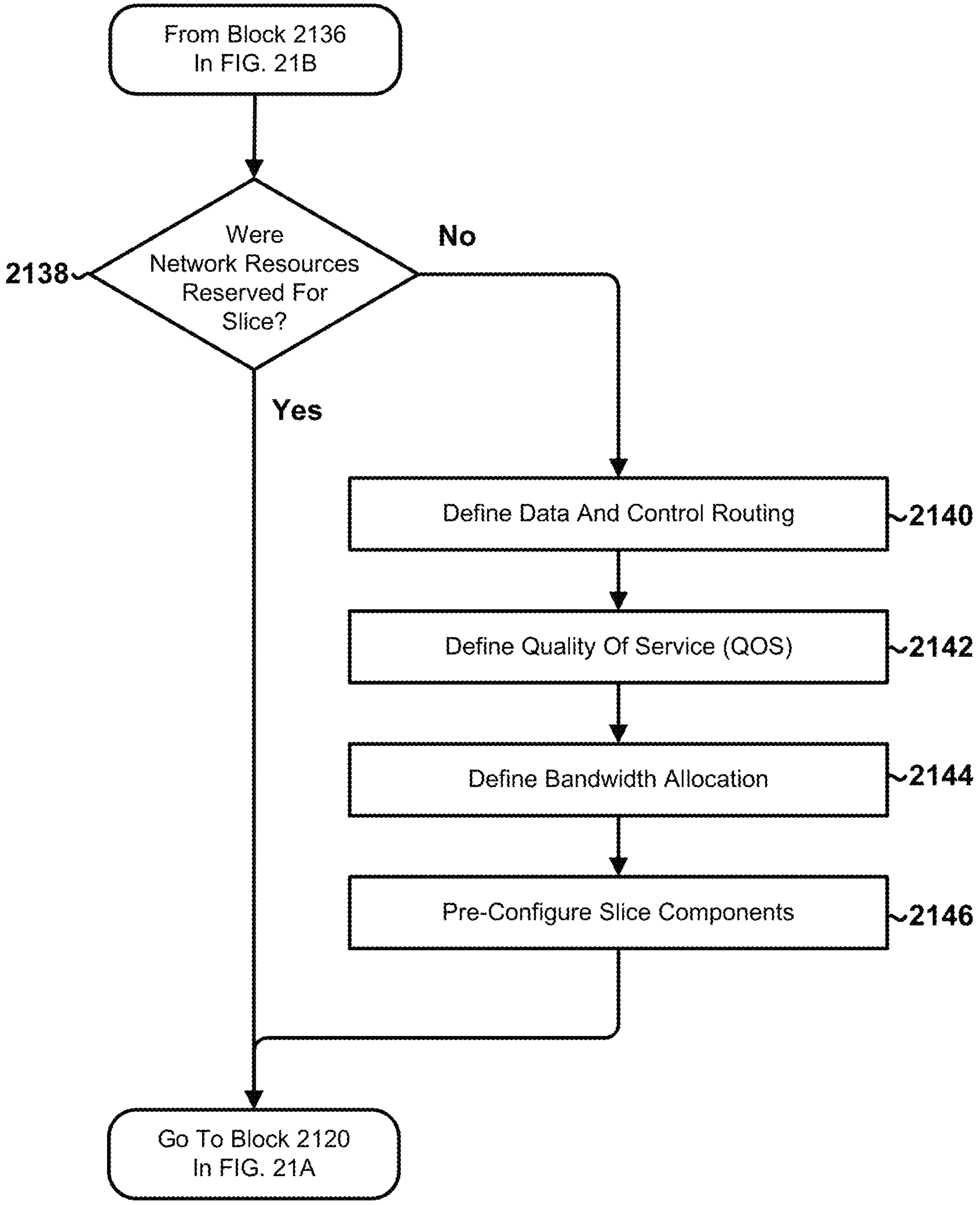

With reference to FIG. 21C, in determination block 2138, the edge device may determine whether network resources were reserved for the slice. For example, the processing system may check its resource allocation database to determine whether specific network resources have been earmarked for the particular slice configuration.

In response to determining that network resources were reserved for the slice (i.e., determination block 2138="Yes"), the edge device may wait for a service request from an end device in block 2120 (illustrated in FIG. 21A). For example, the processing system may enter a monitoring state, ready to activate the reserved resources upon receiving a relevant service request.

In response to determining that network resources were not reserved for the slice (i.e., determination block 2138="No"), the edge device may define data and control routing parameters for the application, service, network slice, and/or network slice components in block 2140. For example, the processing system may set up routing tables, configure control plane protocols, and establish data paths that ensure efficient communication across the network slice.

In block 2142, the edge device may define quality of service parameters for the application, service, network slice, and/or network slice components. For example, the processing system may specify latency, jitter, and packet loss thresholds to ensure that the network slice meets the required performance standards for the given application or service.

In block 2144, the edge device may define bandwidth parameters for the application, service, network slice, and/or network slice components. For example, the processing system may allocate specific bandwidth limits and configure bandwidth management policies to ensure that the network slice has adequate capacity for the anticipated traffic load.

In block 2146, the edge device may pre-configure the slice components. For example, the processing system may configure hardware and software elements such as switches, routers, virtual machines, and security appliances to be ready for immediate deployment when the network slice is activated.

Figure 21D:
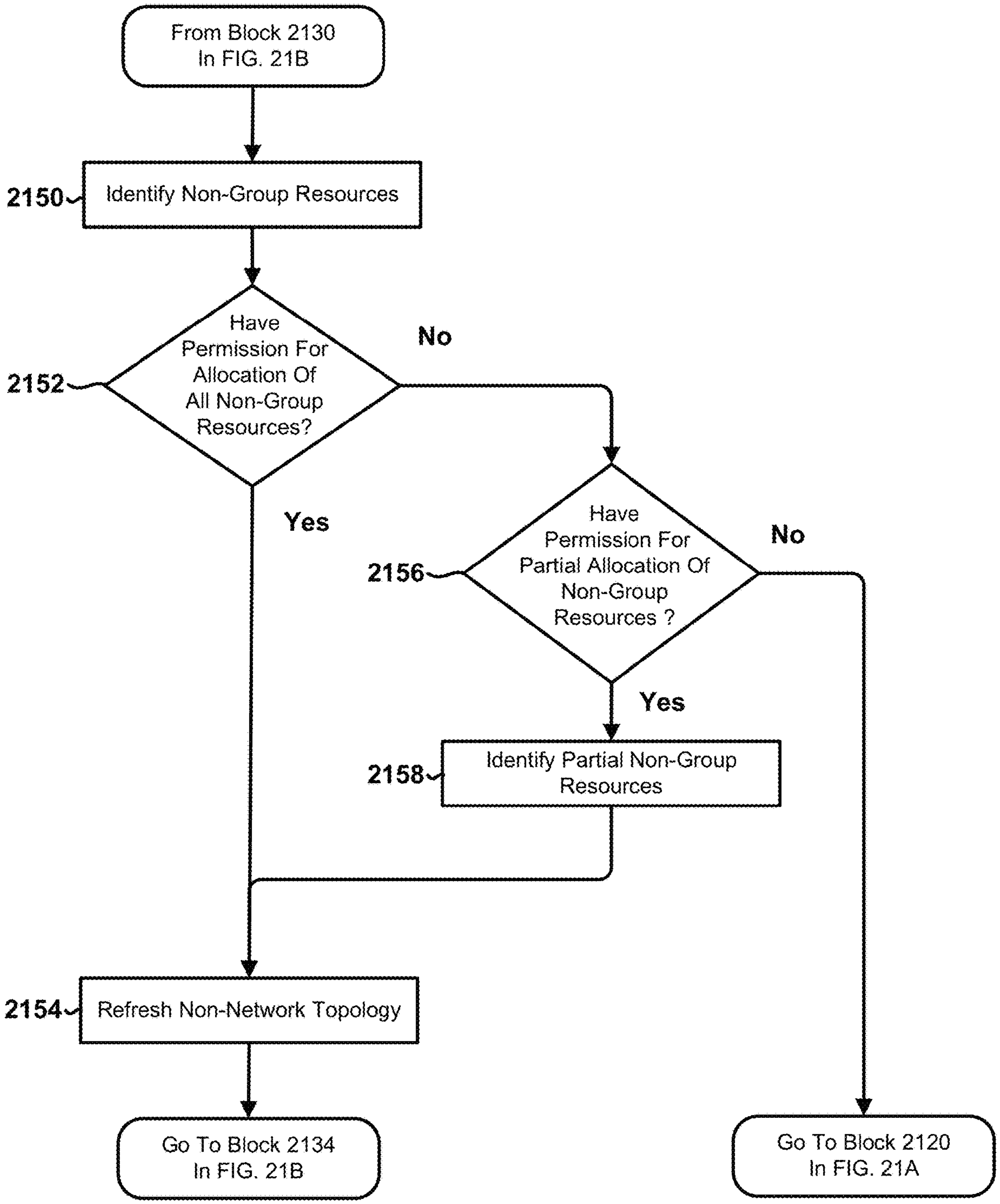

With reference to FIGS. 21A and 21D, in response to determining that the resources were not pre-setup only within the group (i.e., determination block 2130 in FIG. 21A="No"), the edge device may identify non-group resources in block 2150 illustrated in FIG. 21C.

With reference to FIG. 21D, in block 2150, the edge device may identify non-group resources. For example, the processing system may scan the network to detect resources that are not currently allocated to any specific group, such as unused bandwidth, idle processing units, and available storage devices.

In determination block 2152, the edge device may determine whether it has permission for the allocation of all non-group resources. For example, the processing system may check administrative policies and permissions to ensure it has the authority to allocate all identified non-group resources for the new network slice.

In response to determining that permission is granted for the allocation of all non-group resources (i.e., determination block 2152="Yes"), the edge device may proceed to refresh the non-network topology in block 2154. For example, the processing system may update its internal network topology maps to include the newly allocated non-group resources, ensuring the most current network configuration is reflected.

In response to determining that permission is not granted for the allocation of all non-group resources (i.e., determination block 2152="No"), the edge device may determine whether it has permission for the partial allocation of non-group resources in determination block 2156. For example, the processing system may re-evaluate its permissions to determine whether partial resource allocation is allowed under current administrative policies.

In response to determining that permission is granted for the partial allocation of non-group resources (i.e., determination block 2156="Yes"), the edge device may identify partial non-group resources in block 2158. For example, the processing system may select a subset of the identified non-group resources based on priority and availability, ensuring that only the allowed portion is allocated to the new slice.

In response to determining that permission is not granted for the partial allocation of non-group resources (i.e., determination block 2156="No"), the edge device may revert to waiting for a service request from an end device in block 2120 (illustrated in FIG. 21A). For example, the processing system may enter a standby mode, monitoring the network for incoming service requests while complying with the current resource allocation policies.

In block 2154, the edge device may refresh the non-network topology. For example, the processing system may synchronize its network topology database with the actual physical and logical layout of the network, incorporating any changes due to recent resource allocations.

FIGS. 22A through 22D illustrate a method 2200 of activating and operating applications and services in accordance with some embodiments. Method 2200 may be performed by a processor or processing system in an edge computing device (e.g., ECN 306, etc.).

In block 2202, the edge device may receive an application or service request from an end device. For example, the processing system may accept a request for a video streaming service from a user's mobile device.

In block 2204, the edge device may check to determine the permission of the end device. For example, the processing system may verify that the user's mobile device has the necessary subscription or authorization to access the requested video streaming service.

In determination block 2206, the edge device may determine whether the requested application or service is allowed for the group of devices (to which the user device is a member, etc.). For example, the processing system may check the group's policy settings to determine whether video streaming services are permitted.

In response to determining that the requested application or service is not allowed for the group of devices (i.e., determination block 2206="No"), the edge device may deny the new application/service request in block 2208. For example, the processing system may send a notification to the user's mobile device indicating that the video streaming service is not allowed under the current policy.

In response to determining that the requested application or service is allowed for the group of devices (i.e., determination block 2206="Yes"), the edge device may obtain service requirements in block 2210. For example, the processing system may retrieve the necessary bandwidth, latency, and processing power requirements for the video streaming service.

In determination block 2212, the edge device may determine whether network resources were pre-assigned. For example, the processing system may determine whether resources like bandwidth and storage were previously allocated for video streaming services.

In response to determining that network resources were pre-assigned (i.e., determination block 2212="Yes"), the edge device may obtain the pre-assigned network resources in block 2214. For example, the processing system may allocate the pre-assigned bandwidth and storage resources to the video streaming service.

In response to determining that network resources were not pre-assigned (i.e., determination block 2212="No"), the edge device may obtain the network topology in block 2216. For example, the processing system may map the current network infrastructure to identify available resources.

Figure 22A:
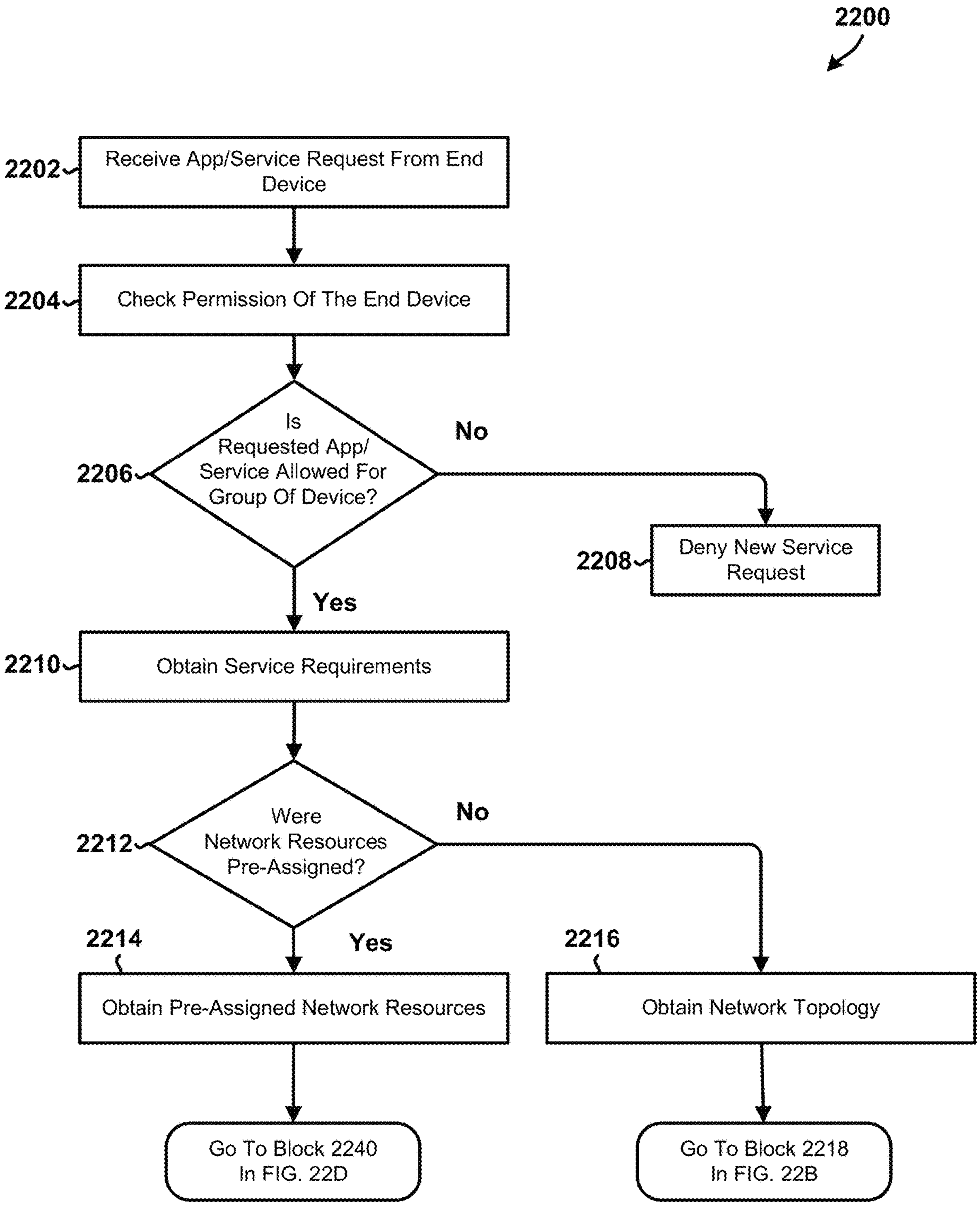
FIGS. 22A through 22F are process flow diagrams that illustrate a method of activating and operating network slices in accordance with some embodiments.
Figure 22B:
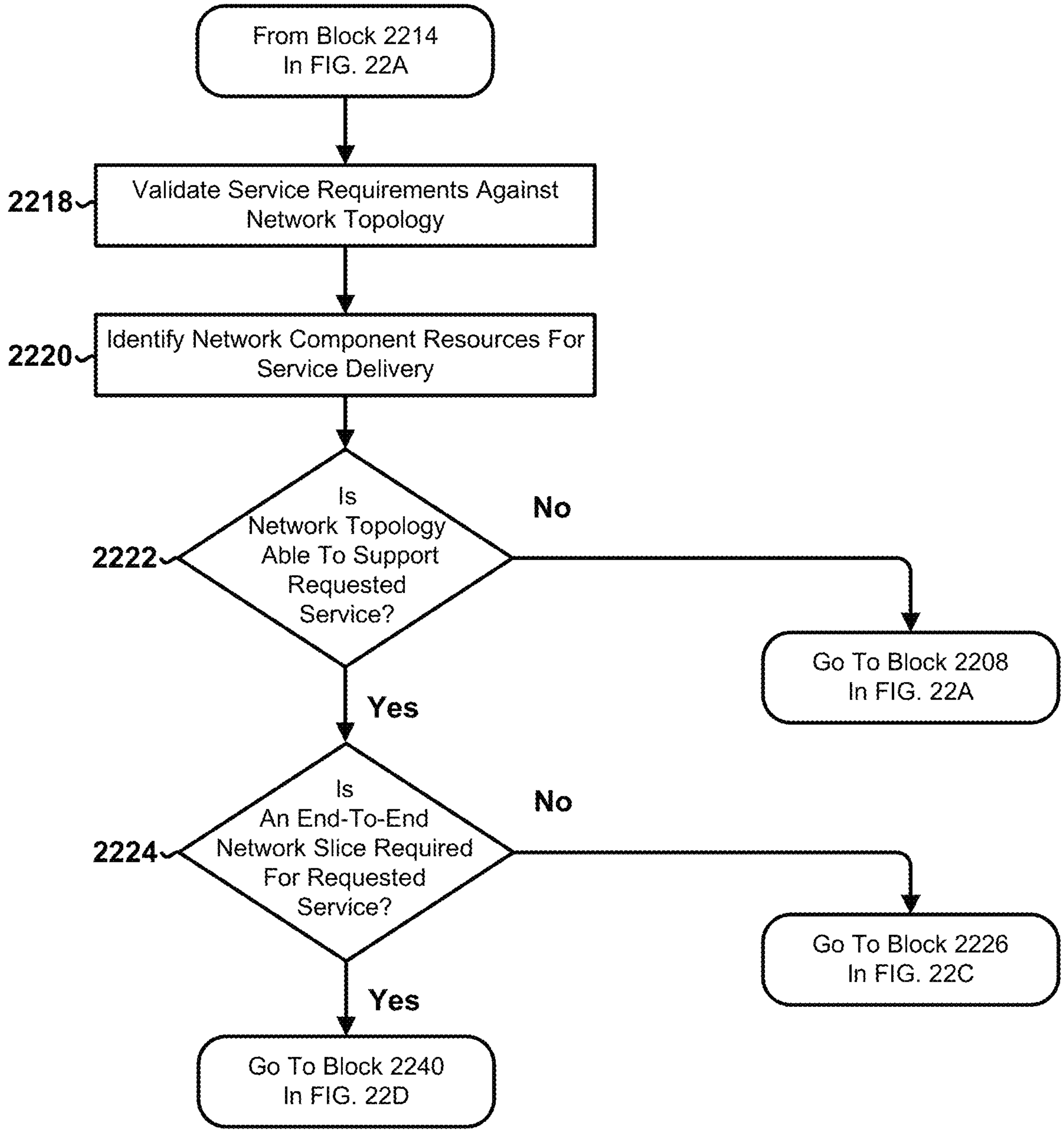

With reference to FIG. 22B, after obtaining the network topology, the edge device may validate the service requirements against the obtained network topology in block 2218 to determine whether the network topology is able to support the service requirements. For example, the processing system may compare the video streaming service's bandwidth needs against the available network capacity.

In block 2220, the edge device may identify network component resources available that are required for the service delivery. For example, the processing system may locate available routers, switches, and bandwidth that can be allocated to the video streaming service.

In determination block 2222, the edge device may determine whether the network topology is able to support the requested service. For example, the processing system may determine whether the identified network components can meet the latency and bandwidth requirements of the video streaming service.

In response to determining that the network topology is not able to support the requested service (i.e., determination block 2222="No"), the edge device may deny the new service request in block 22208 (illustrated in FIG. 22A). For example, the processing system may notify the user that the network cannot currently support the video streaming service.

In response to determining that the network topology is able to support the requested service (i.e., determination block 2222="Yes"), the edge device may determine whether an end-to-end network slice is required for the requested service in determination block 2224. For example, the processing system may determine whether a dedicated network slice spanning multiple network segments is necessary for optimal service delivery.

Figure 22C:
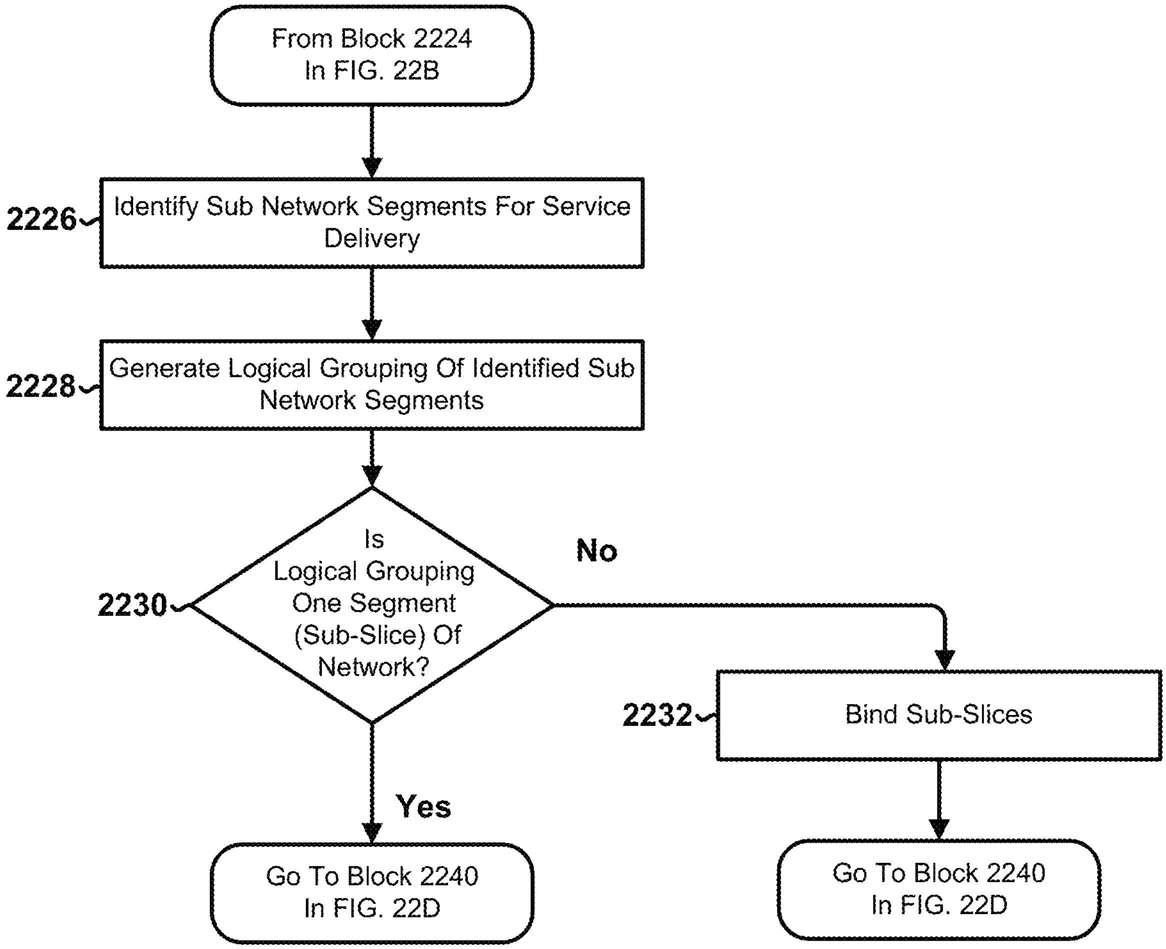
Figure 22D:
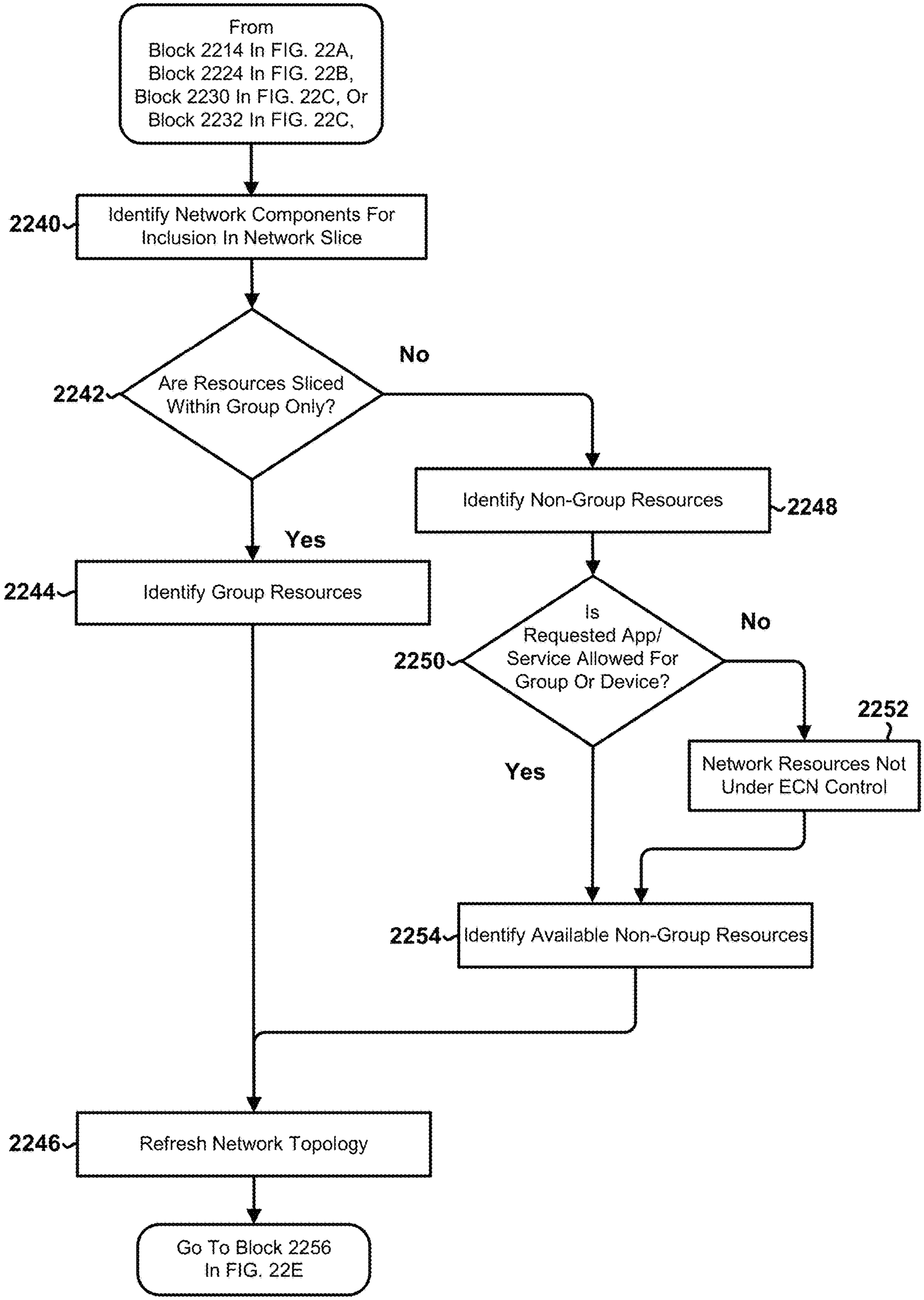
Figure 22E:
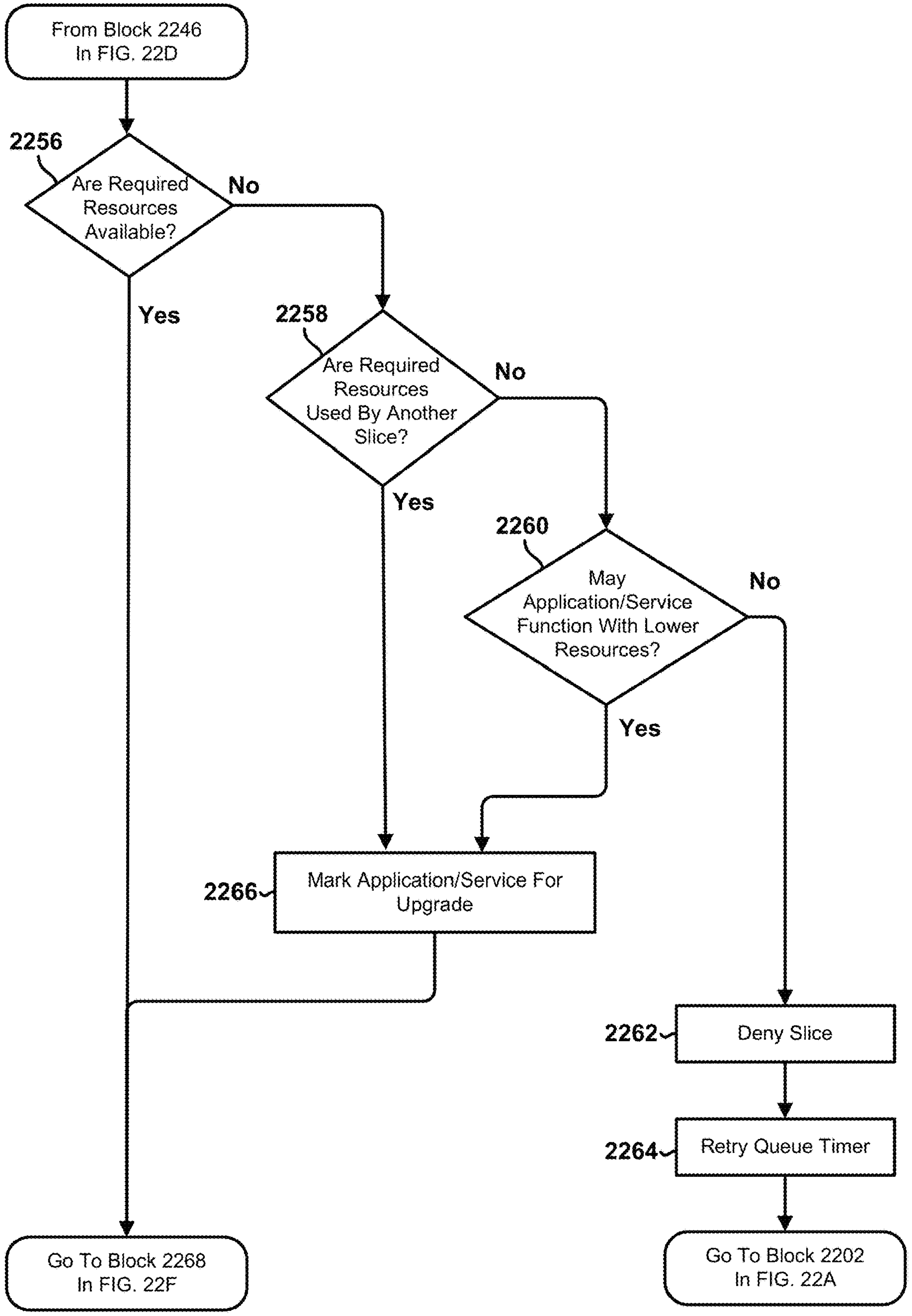

With reference to FIGS. 22B and 22D, in response to determining that an end-to-end network slice is required for the requested service (i.e., determination block 2224="Yes"), the edge device may identify subnetwork segments for service delivery in block 2240. For example, the processing system may pinpoint the specific network segments needed to form the end-to-end network slice for video streaming.

With reference to FIGS. 22B and 22C, in response to determining that an end-to-end network slice is not required for the requested service (i.e., determination block 2224="No"), the edge device may identify subnetwork segments for service delivery in block 2226. For example, the processing system may select only the necessary segments within a larger network to deliver the video streaming service.

In block 2228, the edge device may generate a logical grouping of the identified subnetwork segments to meet the service delivery requirements. For example, the processing system may create a virtual network composed of the selected network segments to support the video streaming service.

In determination block 2230, the edge device may determine whether the logical grouping is a sub-slice or one segment of the network. If the network segments are contiguous proceed "yes" proceed to block 2240. For example, the processing system may determine whether the grouped network segments form a continuous path.

In response to determining that the logical grouping is not contiguous (i.e., one slice) (i.e., determination block 2232="No"), the edge device may bind the sub-slices in block 2232 with the other network segments in order to create a network slice. For example, the processing system may link the disjointed sub-slices into a coherent network slice to facilitate seamless service delivery.

With reference to FIGS. 22A-22D, in response to obtaining the pre-assigned network resources in block 2214 (illustrated in FIG. 22A), in response to determining that an end-to-end network slice is not required for the requested service in block determination block 2224 (illustrated in FIG. 22B), in response to determining that the logical grouping is a sub-slice or one segment of the network in determination block 2230 (illustrated in FIG. 22C), or in response to binding the sub-slices in block 2232 (illustrated in FIG. 22C), the edge device may identify network components for inclusion in a network slice in block 2240 (illustrated in FIG. 22D). For example, the processing system may select routers, switches, and other necessary network elements to form the network slice.

In block 2240, the edge device may identify network components for inclusion in the network slice. For example, the processing system may compile a list of all hardware and software components required for the network slice.

In determination block 2242, the edge device may determine whether there are resources sliced within the group only. In response to determining that there are resources sliced within the group only (i.e., determination block 2242="Yes"), the edge device may identify group resources in block 2244. For example, the processing system may determine whether the required resources are already allocated within the group and identify those resources accordingly.

In block 2246, the edge device may refresh the network topology. For example, the processing system may update the network map to reflect the current allocation of resources.

In response to determining that the resources are not sliced within the group only (i.e., determination block 2242="No"), the edge device may identify non-group resources in block 2248. For example, the processing system may scan for available resources outside the group to meet the service requirements.

In determination block 2242, the edge device may determine whether a requested application or service is allowed for a group or device. In response to determining that the requested application or service is not allowed (i.e., determination block 2250="No"), the edge device may indicate the network resources that are not under ECN control in block 2252. For example, the processing system may generate a report listing the unavailable resources and their current allocations.

In block 2254, the edge device may identify available non-group resources. For example, the processing system may list all non-group resources that can be allocated to the network slice.

With reference to FIGS. 22A-22E, in block 2256, the edge device may determine whether the required resources are available in determination block 2256. For example, the processing system may determine whether the necessary bandwidth, storage, and processing power are available.

In response to determining that the required resources are not available (i.e., determination block 2256="No"), the edge device may determine whether the required resources are used by another slice in determination block 2258. For example, the processing system may determine whether the resources are currently allocated to other network slices.

In response to determining that the required resources are not used by another slice (i.e., determination block 2258="No"), the edge device may determine whether the application or service may function with fewer or lower resources in determination block 2260. For example, the processing system may determine whether the video streaming service can operate at a reduced quality with limited resources.

In response to determining that the application or service may not function with fewer or lower resources (i.e., determination block 2260="No"), the edge device may deny the slice in block 2262. For example, the processing system may send a notification to the user indicating that the service request cannot be fulfilled due to insufficient resources.

In block 2264, the edge device may retry the queue timer. For example, the processing system may set a timer to re-evaluate the resource availability after a certain period.

In response to determining that the required resources are used by another slice (i.e., determination block 2258="Yes") or in response to determining that the application or service may function with fewer or lower resources (i.e., determination block 2260="Yes"), the edge device may mark the application or service for upgrade in block 2266. For example, the processing system may label the service request for future resource allocation and quality upgrade.

Figure 22F:
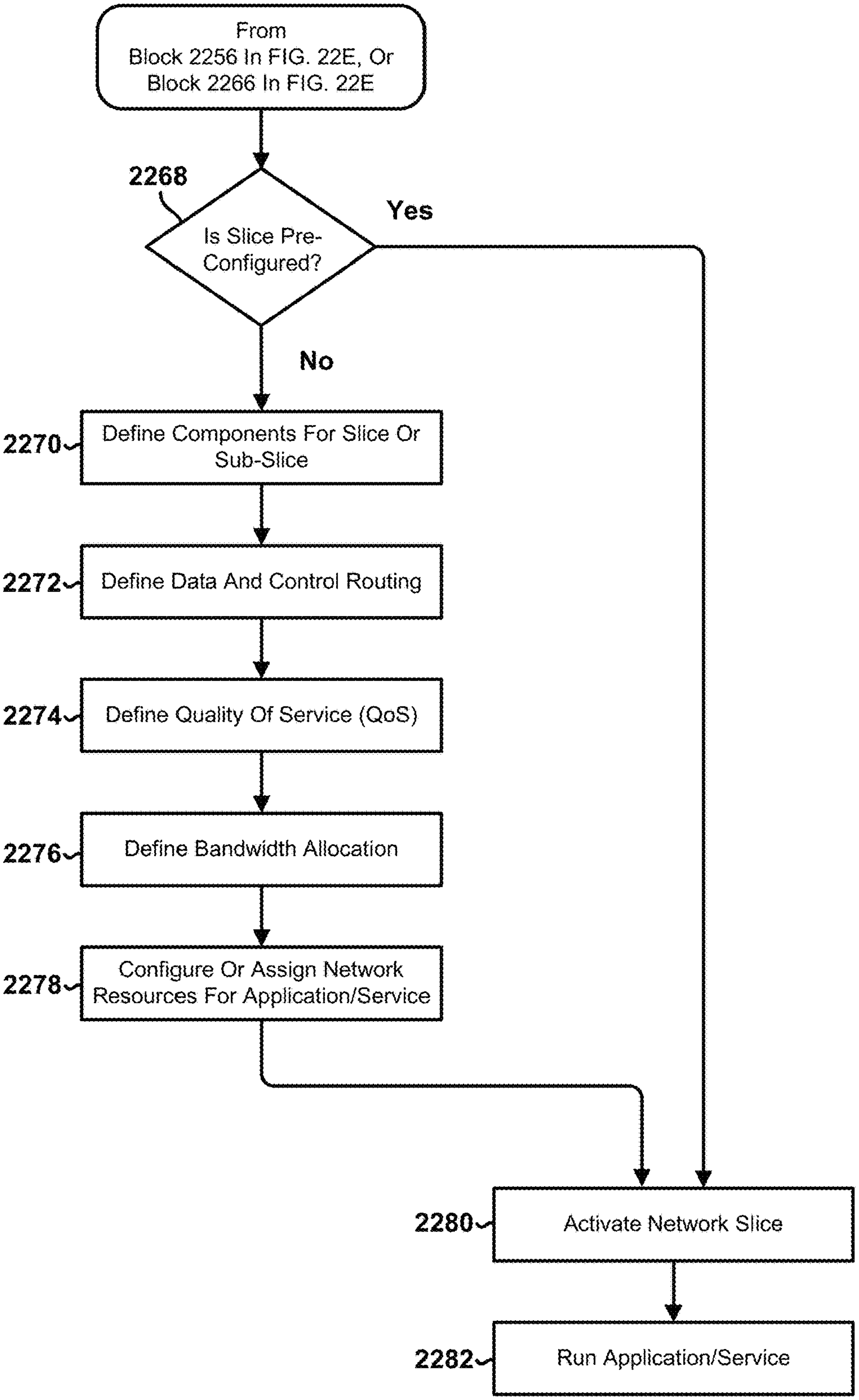

In response to determining that the required resources are available (i.e., determination block 2256="Yes") or after performing the operations in block 2266, the edge device may perform the operations in block 2268 discussed with reference to FIG. 2268 in FIG. 22F. For example, the processing system may proceed to allocate the required resources and configure the network slice.

With reference to FIGS. 22A-22F, the edge device may determine whether the network slice is preconfigured in determination block 2268. For example, the processing system may determine whether the network slice has been set up according to predefined configurations.

In response to determining that the network slice is not preconfigured (i.e., determination block 2268="No"), the edge device may define components for slice or sub-slice in block 2270. For example, the processing system may specify the routers, switches, and other components to be included in the network slice.

In block 2272, the edge device may define data and control routing. For example, the processing system may set up the data paths and control signals necessary for the service delivery.

In block 2274, the edge device may define Quality of Service (QOS). For example, the processing system may establish the QoS parameters, such as latency and jitter, to ensure optimal service performance.

In block 2276, the edge device may define bandwidth allocation. For example, the processing system may allocate the required bandwidth to meet the service demands.

In block 2278, the edge device may configure or assign network resources for the application/service. For example, the processing system may allocate the necessary network resources, such as bandwidth, processing power, and storage, to the video streaming service.

In block 2280, the edge device may activate the network slice. For example, the processing system may enable the configured network slice, making it operational for service delivery.

In block 2282, the edge device may run the application or service. For example, the processing system may start the video streaming service, delivering content to the user's mobile device.

Figure 23:
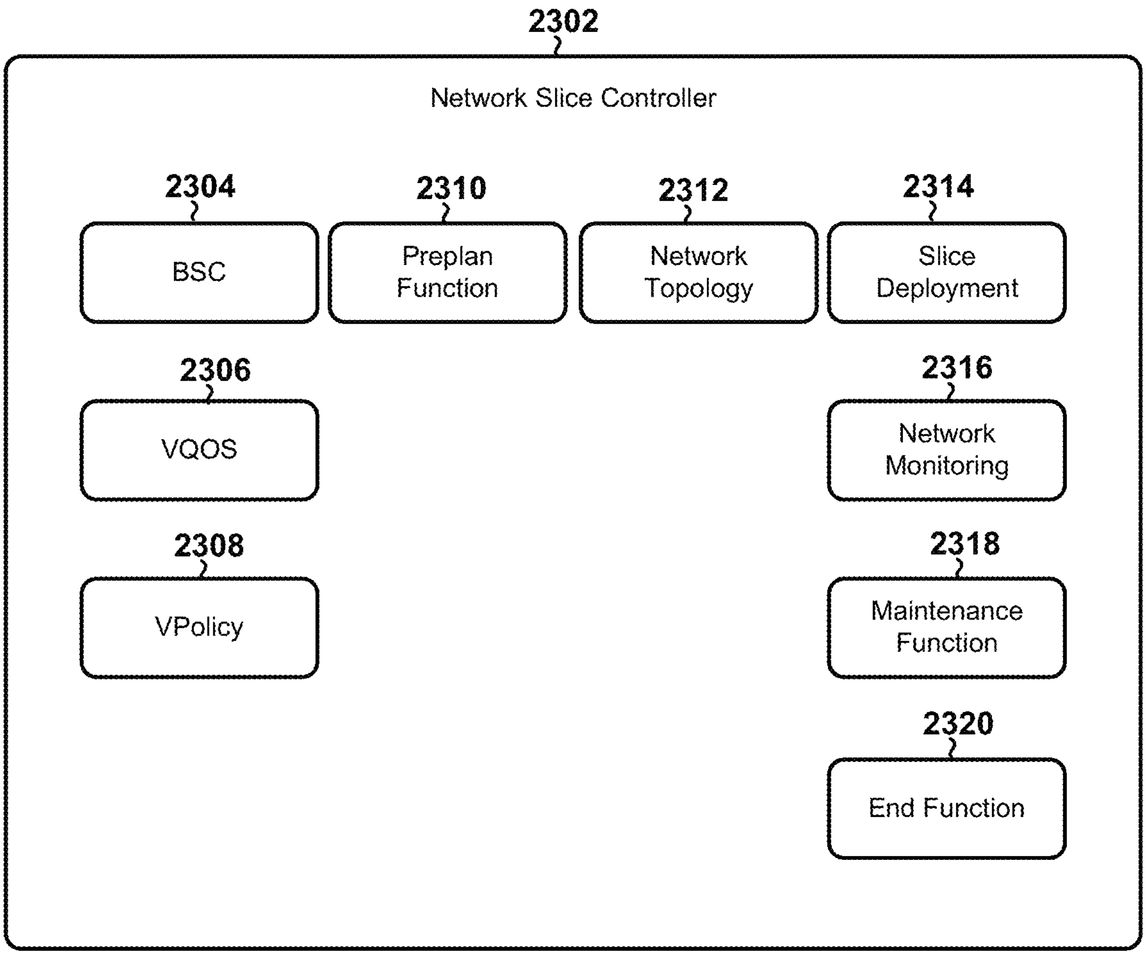
FIG. 23 is a block diagram that illustrates an example vDA network slice controller that could be included in a vDA system and used to control the network slices in accordance with some embodiments.

FIG. 23 illustrates an example vDA network slice controller 2302 that could be included in a vDA system and used to control the network slices in accordance with some embodiments. In the example illustrated in FIG. 23, the slice controller 2302 includes a bandwidth service class (BSC) 2304 component, a vQOS 2306 component, a vPolicy 2308 component, a preplan function 2310 component, a network topology 2312 component, a slice deployment 2314 component, a network monitoring 2316 component, a maintenance function 2318 component, and an end function 2320 component.

The vDA network slice controller 2302 may be responsible for managing and deploying the slice, which may include functions such as slice pre-planning, deployment, maintenance, and termination. The BSC 2304 component may classify and manage the bandwidth requirements for different network slices, ensuring each slice has the necessary bandwidth allocation. The vQOS 2306 component may ensure each network slice meets the required quality standards (e.g., latency, reliability, etc.) tailored to specific service needs. The vPolicy 2308 component may be a policy engine that defines the rules and actions permitted within a network slice. The vPolicy 2308 component may determine whether an application can run locally, the prioritization of services, and how resources are managed and allocated.

The preplan function 2310 component may configure the network slice in the network or sub network, which may include reviewing and including the policy and group(s) for the slice, monitoring the network topology for available resources, determining the resource requirements for the slice and its applications, allocating slice configuration requirements to the entire network or components within the network, resolving slice conflicts that may arise, determining the route for data and control signaling, overseeing and adjusting the bandwidth usage and configuration (e.g., ratio, fixed, burst allocation, etc.) for the slice, and aligning the QoS latency requirements to the network available latency and providing the best path to meet those requirements. The network topology 2312 may be configured to manage the mapping and organization of network components so that the network's structure supports the efficient deployment and operation of network slices.

The slice deployment 2314 component may be configured to activate the slice in the network or sub network, which may include deploying the network slice or sub slice components, enabling the various interfaces needed for the slice (including wired and wireless connectivity), configuring the data and control plane routing paths for efficiency and to meet QoS and latency requirements, allocating the bandwidth for each slice using various methods (e.g., fixed, ratio, burst allocation, etc.), and configuring the required VPN connections used with the network slice. The network monitoring 2316 component may be configured to monitor the performance of network slices and adjust configurations to maintain service quality and address any issues such as latency or packet loss.

The maintenance function 2318 component may be configured to monitor the network slice performance and adjust the network or subnetwork components as needed to meet the policy and QoS requirements for the slice, which may include monitoring the service latency and packet loss and adjusting routes to improve latency and packet loss if necessary, monitoring network performance and making dynamic adjustments to the slice if required for network or subnetwork performance problems, adjusting network resources (e.g., bandwidth, CPU, or memory, etc.) for the slice if allowed, adjusting interfaces to address failures or improve performance, redeploying the slice or sub slice if a failure is detected, and terminating a slice or slices if necessary.

The end function 2320 component may be responsible for terminating the slice when its lease or time has expired or when it has been requested to be terminated. At this point, the slice controller 2302 may release the resources that were previously assigned to the slice back into the network and/or subnetwork resource pool, in which they may be reallocated or assigned to another slice or slices.

Figure 24A:
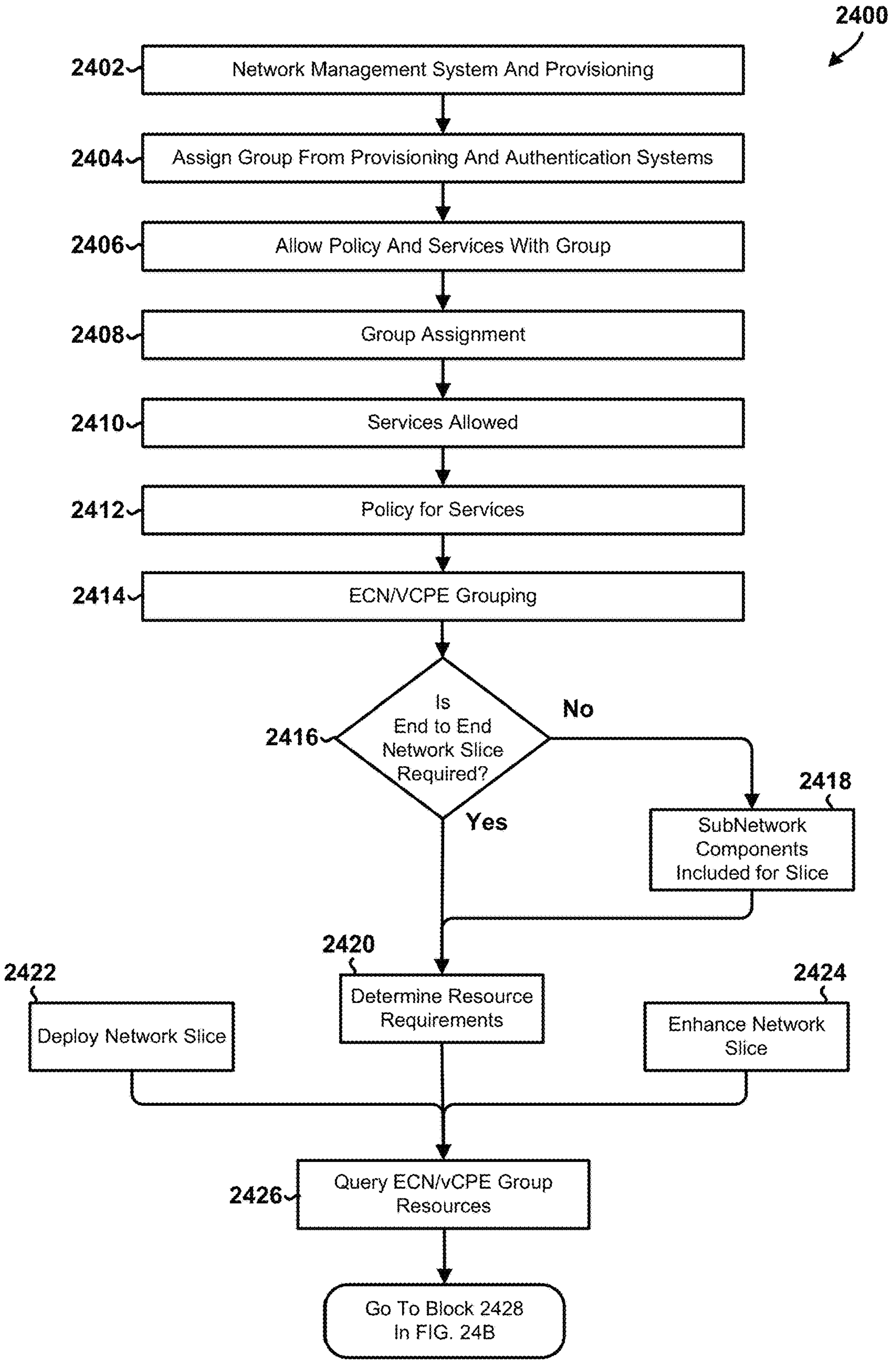
FIGS. 24A through 24C are process flow diagrams that illustrate a method of operating a slice controller 2302 to pre-deploy a network slice in accordance with some embodiments.
Figure 24B:
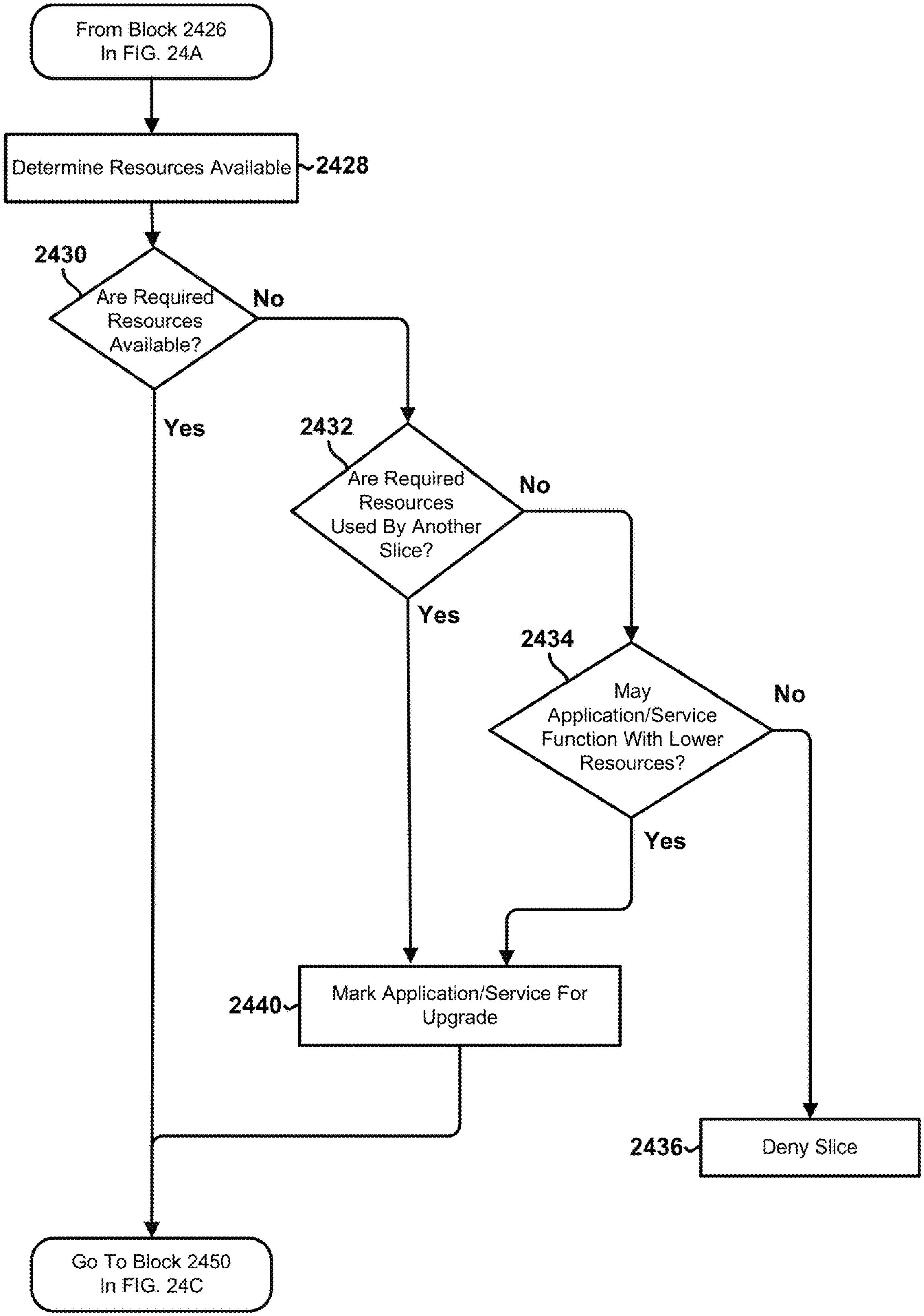
Figure 24C:
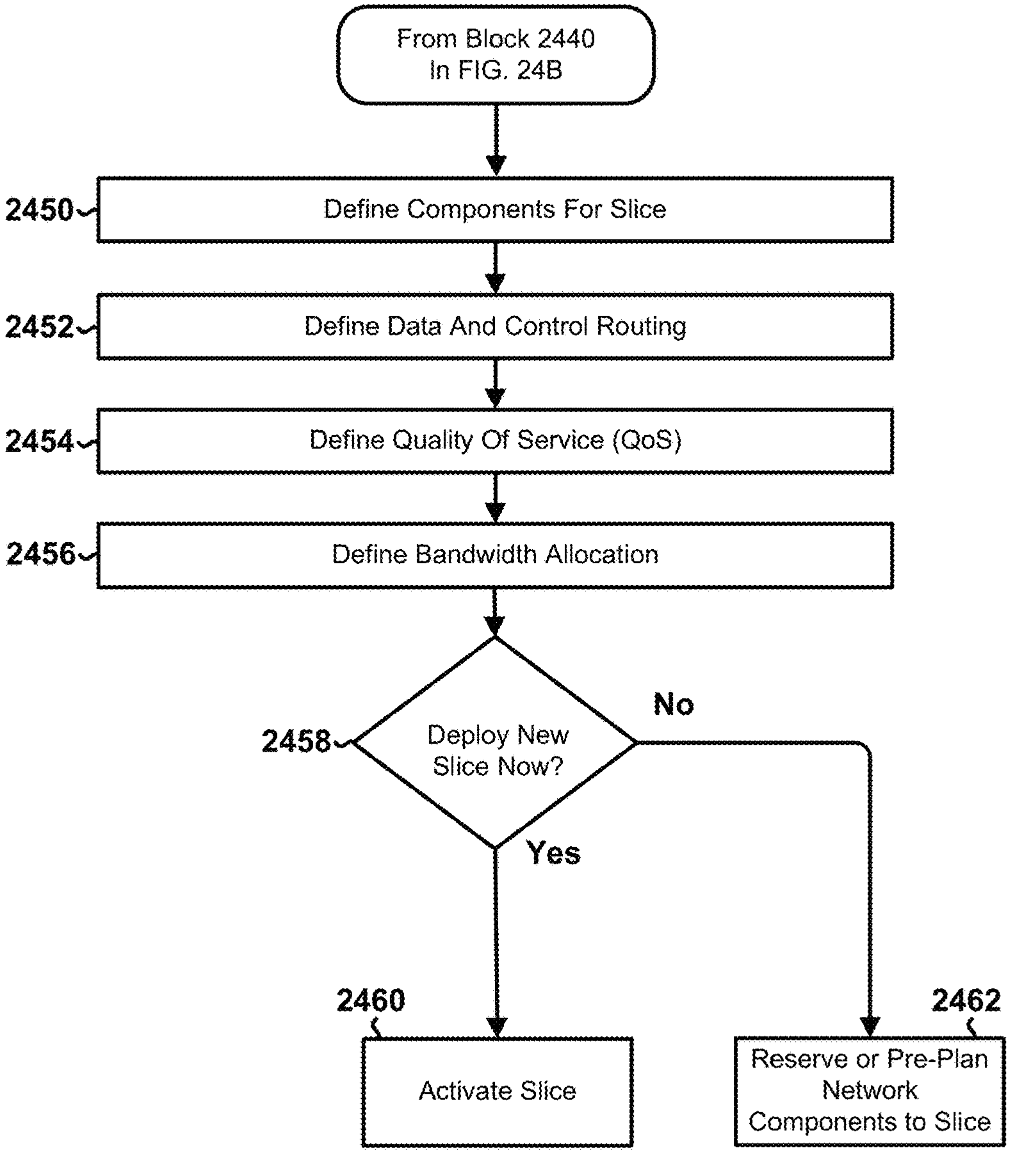

FIGS. 24A through 24C illustrate method 2400 of operating a slice controller 2302 to pre-deploy a network slice in accordance with some embodiments. Method 2400 may be performed by a processor or processing system in an edge computing device (e.g., ECN 306, etc.).

In block 2402, the processing system may initiate the network management system and provisioning. For example, the processing system may establish connections with provisioning and authentication systems to prepare for group assignments and policy enforcement.

In block 2404, the processing system may assign a group from the provisioning and authentication systems. For example, the processing system may retrieve group information, such as device identifiers and user credentials, to categorize and manage devices within specific groups.

In block 2406, the processing system may allow policy and services with the group. For example, the processing system may apply predefined policies to the group, ensuring that the assigned devices have access to the appropriate services and resources based on their group membership.

In block 2408, the processing system may perform group assignment. For example, the processing system may allocate devices to their respective groups based on provisioning data, ensuring that each device is correctly associated with its designated group for resource management.

In block 2410, the processing system may determine the services allowed for the group. For example, the processing system may evaluate the group policies to identify which services are permitted for the devices within the group.

In block 2412, the processing system may enforce policy for services. For example, the processing system may ensure that the allowed services are correctly applied to the devices within the group, adhering to the specified policies and resource allocations.

In block 2414, the processing system may manage ECN/VCPE grouping. For example, the processing system may organize edge computing nodes (ECNs) and virtual customer premise equipment (vCPE) into logical groupings to streamline resource management and service delivery.

In block 2416, the processing system may determine whether an end-to-end network slice is required. For example, the processing system may evaluate the service requirements and determine whether a comprehensive network slice spanning multiple components is necessary. If an end-to-end network slice is required, the processing system may proceed to block 2420. If an end-to-end network slice is not required, the processing system may proceed to block 2418.

In block 2418, the processing system may enhance the existing network slice by including subnetwork components. For example, the processing system may integrate additional network elements to improve the capabilities and performance of the current network slice.

In block 2420, the processing system may determine resource requirements for the network slice. For example, the processing system may assess the necessary bandwidth, processing power, and storage to support the requested service.

In block 2422, the processing system may deploy the network slice. For example, the processing system may allocate and configure the identified resources to create a dedicated network slice tailored to the service's requirements.

In block 2424, the processing system may enhance the network slice. For example, the processing system may optimize the existing network slice by adjusting configurations, reallocating resources, and integrating additional network components. These enhancements may include fine-tuning Quality of Service (QOS) parameters, upgrading hardware or software components, and improving security protocols to ensure that the network slice meets the evolving requirements of the service. The processing system may also dynamically scale resources to handle increased demand.

In block 2426, the processing system may query ECN/vCPE group resources. For example, the processing system may collect information on the current state and availability of resources within the edge computing nodes and virtual customer premise equipment to ensure optimal resource allocation.

With reference to FIG. 24B, in block 2428, the processing system may determine the availability of resources required for the new network slice. For example, the processing system may evaluate the current network load, available bandwidth, processing power, and storage capacity to ascertain whether sufficient resources exist to support the requested service.

In block 2430, the processing system may determine whether the required resources are available. If the necessary resources are available, the method proceeds to block 2440. If not, the method continues to block 2432 to assess resource usage by other network slices.

In block 2432, the processing system may determine whether the required resources are already being used by another slice. If the resources are not in use by another slice, the method proceeds to block 2434. If the resources are in use, the method proceeds to block 2440 to mark the application or service for an upgrade, indicating the need for additional resources or reconfiguration to accommodate the new service.

In block 2434, the processing system may evaluate whether the application or service can function with reduced resources. For example, the processing system may determine whether the service can operate at a lower Quality of Service (QOS) level with limited bandwidth, processing power, or storage. If the service can function with lower resources, the method proceeds to block 2440. If not, the method moves to block 2436.

In block 2436, the processing system may deny the request for the new network slice. This denial may be communicated to the requesting device, indicating that the current network conditions do not support the required resources for the new service.

In block 2440, the processing system may mark the application or service for an upgrade. This marking may indicate that the service will be provided with available resources, potentially at a lower QoS, until an upgrade can be performed to meet the service's full requirements.

In block 2426, the processing system may query the ECN/vCPE group resources to enhance resource allocation for the new or existing network slices. This query may help maintain an updated view of resource availability and usage across the network.

With reference to FIG. 24C, in block 2450, the processing system may define the components required for the new network slice. For example, the processing system may identify and allocate specific network elements (e.g., routers, switches, gateways, etc.) that will form part of the network slice.

In block 2452, the processing system may define the data and control routing for the network slice. This may include configuring the routing paths for both data and control signals to ensure efficient communication within the slice. The processing system may set up routes that optimize the flow of traffic and maintain low latency for important services.

In block 2454, the processing system may define the Quality of Service (QoS) parameters for the network slice. For example, the processing system may establish criteria for bandwidth allocation, latency, jitter, and packet loss to meet the specific needs of the service being supported.

In block 2456, the processing system may define the bandwidth allocation for the network slice. This may include specifying how much bandwidth each service within the slice will receive to ensure adequate performance. The processing system may allocate bandwidth based on the priority and requirements of each service to balance the overall network load.

In block 2458, the processing system may determine whether to deploy the new network slice immediately. If the decision is to deploy the slice, the method proceeds to block 2460. If not, the method moves to block 2462 to reserve or pre-plan the network components for the slice.

In block 2460, the processing system may activate the new network slice. This activation may include configuring the identified components, establishing the defined routing paths, and enforcing the QoS and bandwidth policies to bring the slice online. The processing system may verify that the slice is fully operational and ready to support the requested service.

In block 2462, the processing system may reserve or pre-plan the network components for the slice. These operations may include allocating the necessary resources and planning their deployment to ensure that the network slice may be quickly activated when required. In some embodiments, these operations may allow the processing system to maintain a state of readiness that allows for rapid deployment of the slice in response to future service requests.

Figure 25:
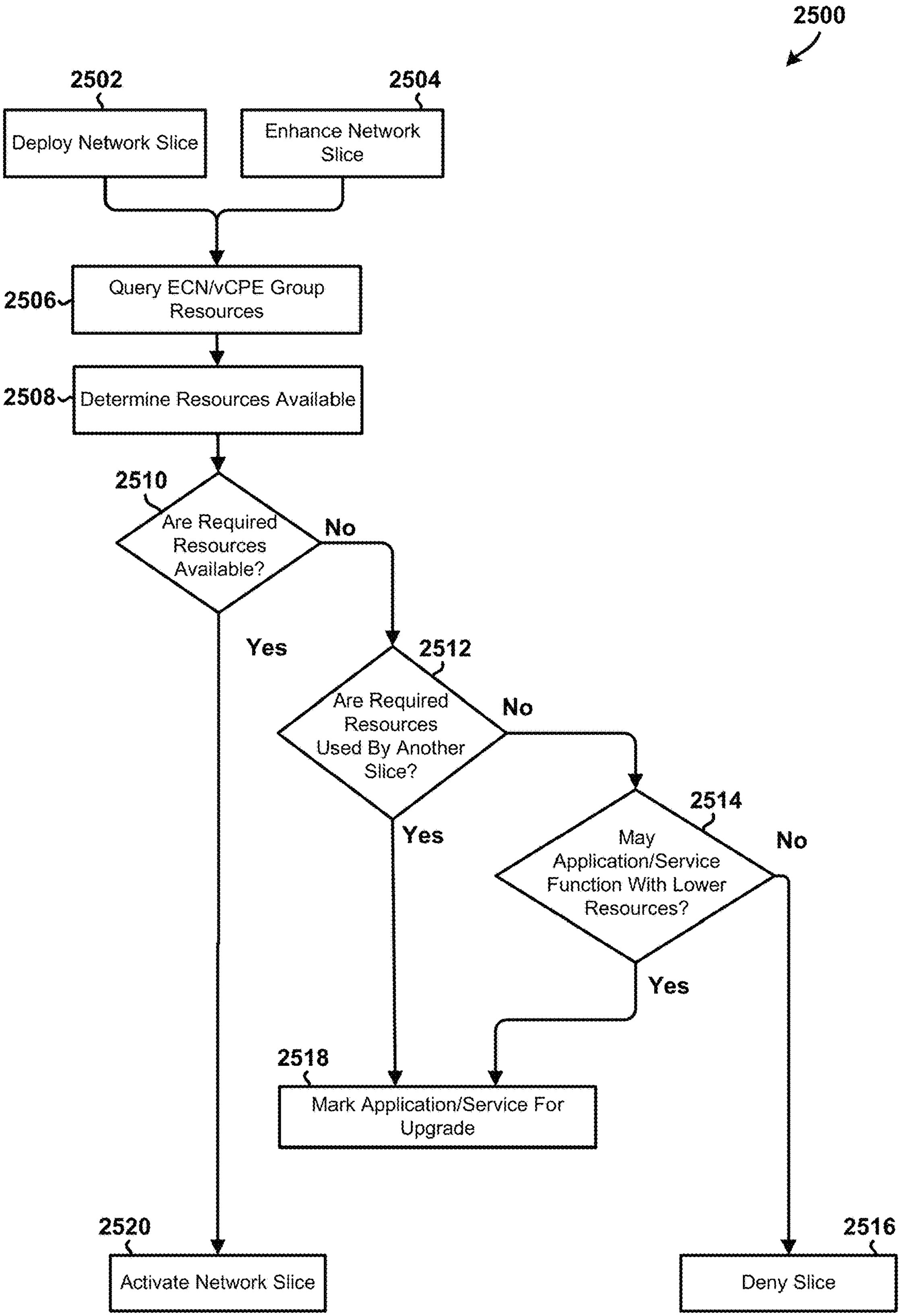
FIG. 25 is a process flow diagram that illustrates a method of operating a slice controller to deploy a network slice in accordance with some embodiments.

FIG. 25 illustrates a method 2500 of operating a slice controller 2302 to deploy and enhance a network slice in accordance with some embodiments. Method 2500 may be performed by a processor or processing system in an edge computing device (e.g., ECN 306, etc.).

In block 2502, the processing system may deploy a new network slice. For example, the processing system may allocate necessary network resources and configure network elements to establish a new network slice tailored to specific service requirements.

In block 2504, the processing system may enhance an existing network slice. This may involve reallocating or augmenting resources to improve the performance or capacity of the current slice. For example, the processing system may adjust bandwidth allocation, update routing paths, or enhance Quality of Service (QOS) parameters.

In block 2506, the processing system may query the ECN/vCPE group resources to determine what resources are currently available. This may include checking the status and capacity of various network components to assess their readiness for inclusion in a network slice.

In block 2508, the processing system may determine the availability of required resources for the network slice. This may include evaluating current resource utilization, such as bandwidth, processing power, and storage capacity, to ensure sufficient resources are available to support the network slice.

In block 2510, the processing system may determine whether the required resources are available. If the resources are available, the method proceeds to block 2520 to activate the network slice. If not, the processing system moves to block 2512 to determine whether the required resources are already used by another slice.

In block 2512, the processing system may determine whether the required resources are used by another network slice. If the resources are already allocated to another slice, the method proceeds to block 2514 to determine whether the application or service can function with lower resources. If the resources are not being used by another slice, the method may move back to block 2506 for further resource assessment.

In block 2514, the processing system may determine whether the application or service can function with lower resources. This may include assessing whether the requested service can operate effectively at a reduced QoS. If the service can function with lower resources, the method proceeds to block 2518 to mark the application or service for an upgrade. If not, the method proceeds to block 2516 to deny the slice.

In block 2516, the processing system may deny the network slice. This operation may include notifying the requester that the network slice cannot be created or enhanced due to insufficient resources or policy constraints.

In block 2518, the processing system may mark the application or service for an upgrade. This may include flagging the service for future resource allocation or performance enhancement when additional resources become available.

In block 2520, the processing system may activate the network slice. This may include configuring the identified network components, establishing the defined routing paths, and enforcing the QoS and bandwidth policies to bring the slice online. The processing system may ensure that the slice is fully operational and ready to support the requested service.

Figure 26A:
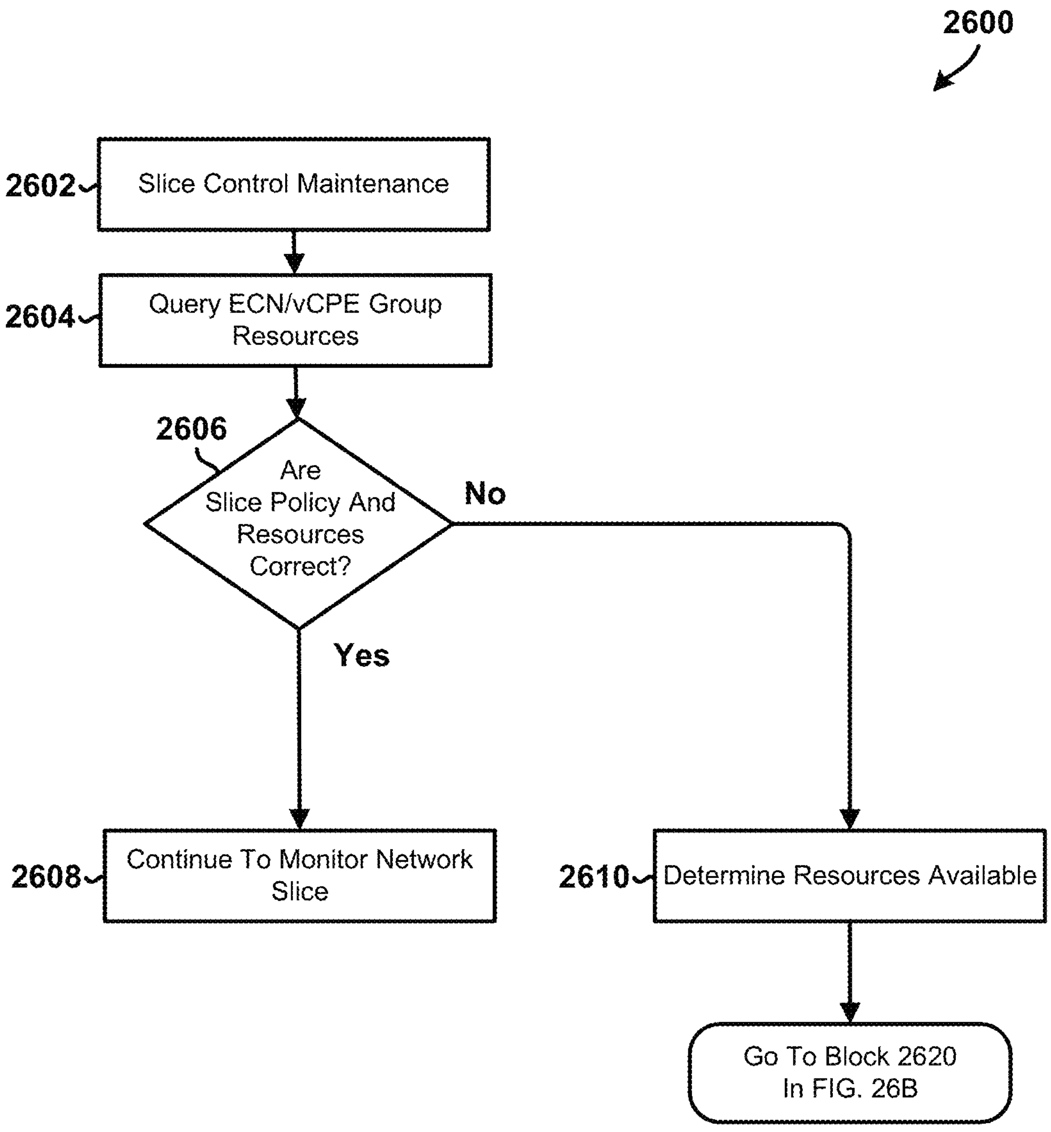
FIGS. 26A and 26B are process flow diagrams that illustrate a method of operating a slice controller to maintain a network slice in accordance with some embodiments.
Figure 26B:
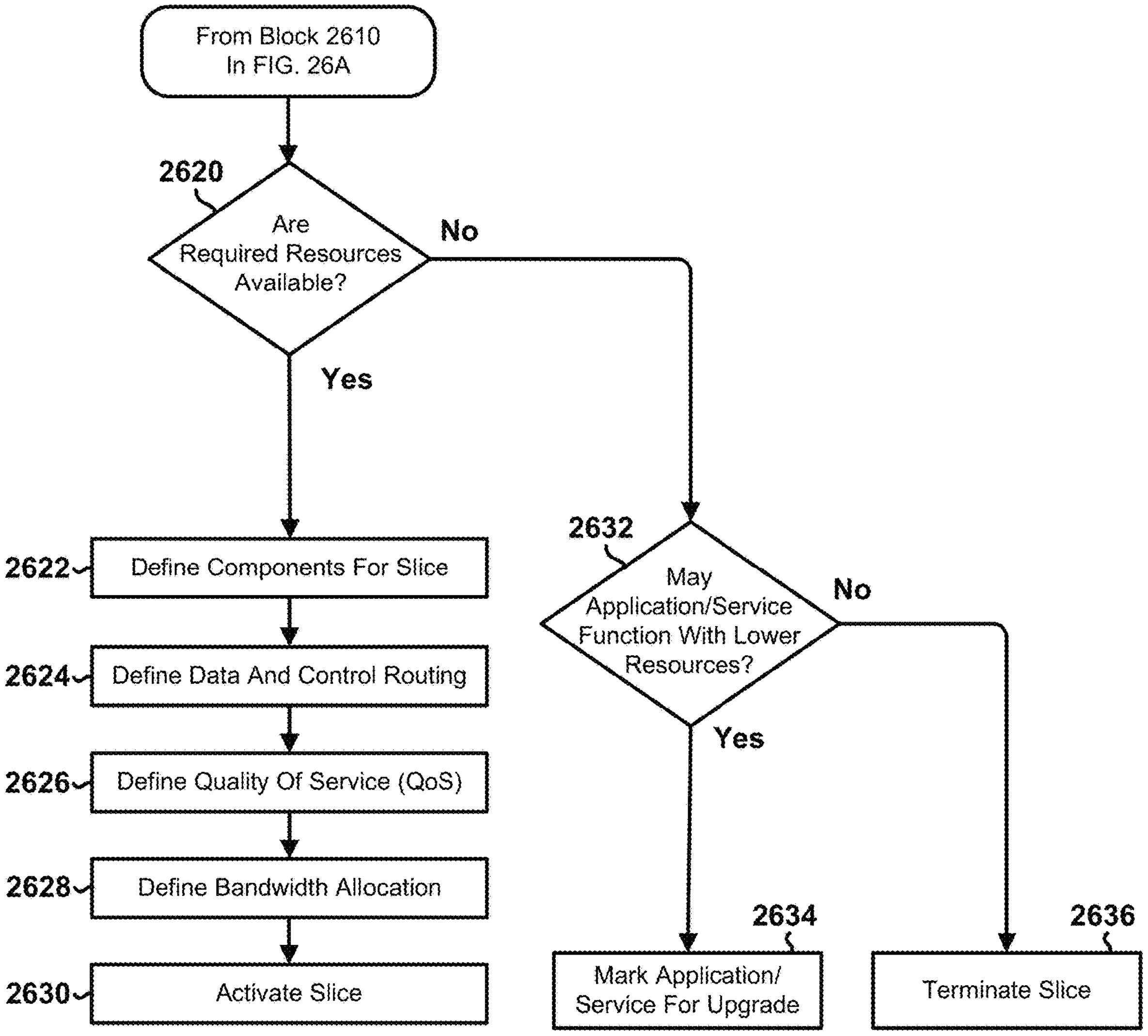

FIGS. 26A and 26B illustrate a method 2600 of operating a slice controller 2302 to maintain a network slice in accordance with some embodiments. Method 2600 may be performed by a processor or processing system in an edge computing device (e.g., ECN 306, etc.).

With reference to FIG. 26A, in block 2602, the processing system may perform slice control maintenance. For example, the processing system may oversee the health and performance of active network slices to make sure they meet the required service levels and operational policies.

In block 2604, the processing system may query the ECN/vCPE group resources to gather current data on available resources. This operation may include checking the status and utilization of network components to understand their capacity and availability for supporting network slices.

In block 2606, the processing system may determine whether the slice policy and resources are correct. This may include determine whether the current configuration and resource allocation align with the predefined policies and requirements. If the policies and resources are correct, the method may proceed to block 2608 to continue monitoring the network slice.

In block 2608, the processing system may continue to monitor the network slice. This may include ongoing surveillance of slice performance, resource utilization, and compliance with service level agreements (SLAs). The processing system may collect and analyze real-time data to detect any deviations from expected performance.

If the policies and resources are not correct, in block 2610, the processing system may determine the available resources. This operation includes reassessing the network's resource availability to identify any gaps or discrepancies. The processing system may then proceed to block 2620 in FIG. 26B for further actions based on the resource determination.

With reference to FIG. 26B, in block 2620 the processing system may determine whether the required resources are available. If the required resources are available, the method continues to block 2622 where the processing system defines the components for the slice. This may include identifying and assigning the necessary hardware and software components required for the network slice.

In block 2624, the processing system may define data and control routing. This may include setting up the paths for data transmission and control signals within the network slice to ensure efficient and secure communication.

In block 2626, the processing system may define the Quality of Service (QoS) parameters. This operation may include establishing the performance standards for the network slice, such as latency, jitter, and bandwidth requirements to meet the service level agreements (SLAs).

In block 2628, the processing system may define the bandwidth allocation. This may include determining the amount of bandwidth that will be allocated to the network slice to ensure that it can handle the expected data load.

In block 2630, the processing system may activate the slice. This operation may include configuring the network components and policies to bring the network slice into operation, making it ready to handle the requested service.

If the required resources are not available in block 2620, the method proceeds to block 2632 where the processing system determines whether the application or service can function with lower resources. This may include determine whether the service can operate with reduced performance parameters.

If the application or service can function with lower resources, the method proceeds to block 2634 where the processing system marks the application or service for an upgrade. This may include scheduling future resource allocation to improve the service performance when additional resources become available.

If the application or service cannot function with lower resources, the method moves to block 2636 where the processing system terminates the slice. This may include notifying the requesting device or service that the network slice cannot be provisioned due to insufficient resources and deallocating any partially assigned resources.

The above-described operations may ensure that network slices are managed efficiently, resources are allocated dynamically, and services are maintained according to their requirements and policies. The methods also allow the system to adapt to changing network conditions and resource availability to provide flexibility and maintain optimal performance for all services.

Figure 26C:
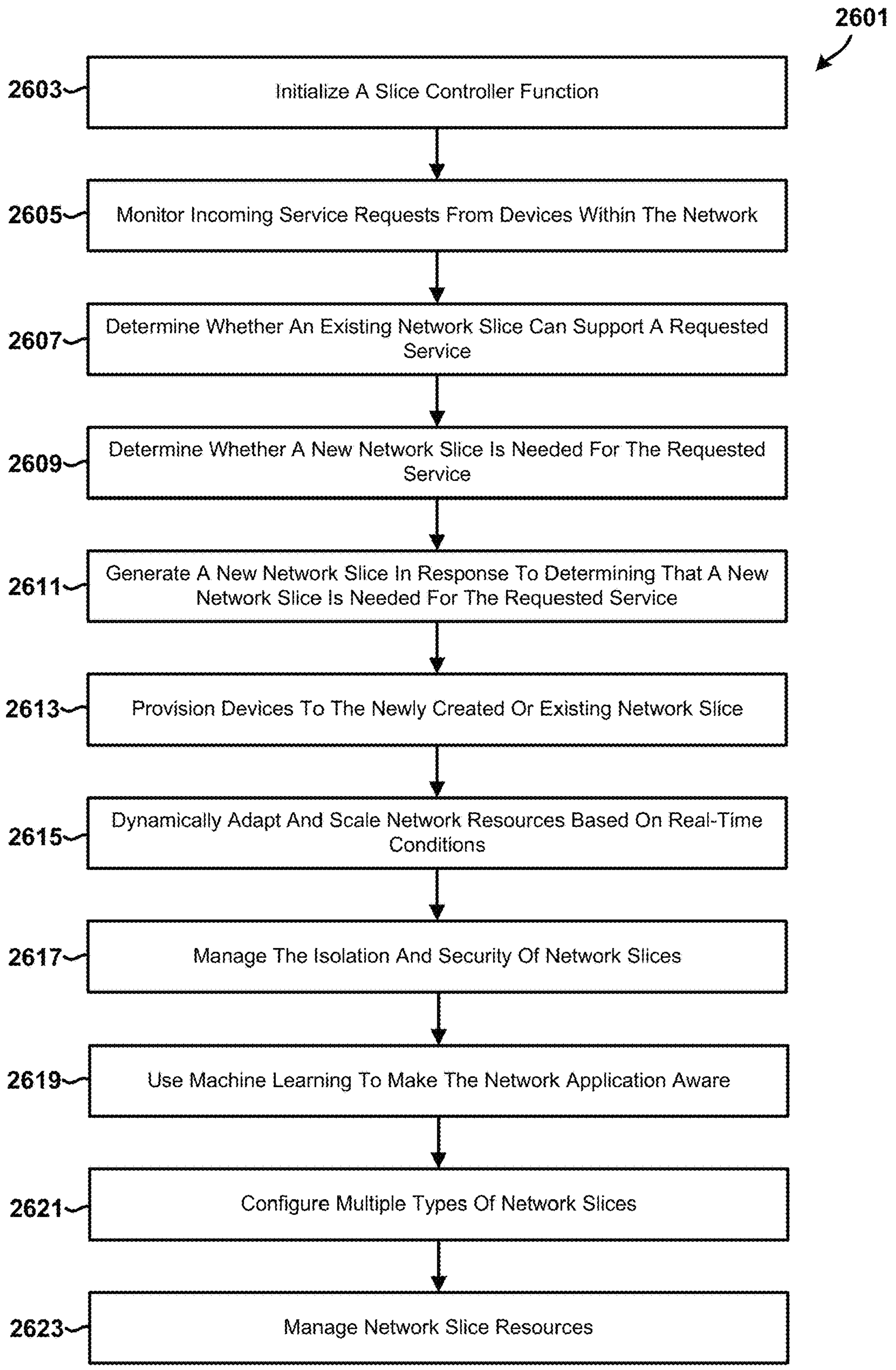
FIG. 26C is a process flow diagram that illustrates a method of operating a slice controller in accordance with some embodiments.

FIG. 26C illustrates a method 2601 of operating a slice controller 2302 in accordance with some embodiments.

Method 2601 may be performed by a processor or processing system in an edge computing device (e.g., ECN 306, etc.).

In block 2603, the processing system may initialize a slice controller function. For example, the processing system may activate the slice controller function to begin managing network slicing operations so that the system can dynamically adapt to changing service requirements. These initialization operations may include starting up the slice controller software, performing system checks, and verifying that all necessary components are operational and ready to handle network slicing tasks.

In some embodiments, initializing the slice controller function in block 2603 may include configuring the slice controller function to deliver network slicing on a network or sub-network basis in a dynamic and real-time manner to support required services. For example, the processing system may set parameters for the slice controller, such as thresholds for resource allocation, policies for prioritizing different types of traffic, and criteria for creating new slices. This configuration may allow the slice controller to make real-time decisions about how to best allocate network resources to meet the specific needs of various services and applications.

In some embodiments, initializing the slice controller function in block 2603 may include loading system parameters and policies, initializing network resources and topology maps, etc. For example, the processing system may retrieve configuration files that define the network's topology, load policies that dictate how resources should be allocated and managed, and initialize connections to network components such as routers, switches, and edge devices.

In block 2605, the processing system may monitor incoming service requests from devices within the network. For example, the processing system may continuously scan for and log service requests sent by user devices and other connected hardware. This monitoring may include evaluating the type and urgency of each request, identifying the device making the request, and determining the specific service or application required. The system may then prioritize these requests based on predefined policies and the current state of network resources.

In block 2607, the processing system may determine whether an existing network slice can support a requested service. For example, the processing system may evaluate the current resource allocation, performance metrics, and QOS parameters of the existing network slices. This evaluation may include analyzing the bandwidth, latency, and processing power available in the slices to determine whether they meet the requirements of the requested service.

In some embodiments, determining whether an existing network slice can support a requested service in block 2607 may include determining whether the requested service can be provisioned within an existing network slice and, if the existing network slice suffices, provisioning the device for the requested service. For example, the processing system may compare the requested service's needs against the capabilities of the available network slices. If an existing slice meets the requirements, the processing system may configure the slice to accommodate the new service, update the slice's resource allocation, and provision the device to use this slice for the requested service.

In block 2609, the processing system may determine whether a new network slice is needed for the requested service. For example, the processing system may evaluate the existing network slices' capacity and performance to determine whether they are able to meet the new service's requirements. In some embodiments, this determination may include assessing the current load, traffic patterns, and resource utilization of the network slices.

In some embodiments, determining whether a new network slice is needed for the requested service in block 2609 may include checking group policy for permission to create a new slice and initiating a network discovery process to map the current topology and identify available network components in response to determining that the group policy permits creation of a new slice. For example, the processing system may verify the group policy settings to ensure that the creation of a new slice is allowed. If permitted, the processing system may perform a network discovery to analyze the existing network topology, identify available resources such as routers, switches, and bandwidth, and determine the optimal configuration for the new network slice to support the requested service.

In block 2611, the processing system may generate a new network slice in response to determining that a new network slice is needed for the requested service. For example, the processing system may allocate the necessary network resources, configure network elements, and segment the network to create a new network slice that is tailored to the service's specific requirements.

In some embodiments, generating a new network slice in block 2611 may include evaluating resource availability. The processing system may assess the current utilization of bandwidth, processing power, and storage capacity to determine whether sufficient resources are available. If resources are adequate, the processing system may configure and activate the new slice by assigning components such as routers, switches, and gateways, and setting up routing and access control policies. If resources are insufficient, the processing system may evaluate whether the service can operate at a reduced Quality of Service (QOS). For example, the processing system may adjust resource allocation to provide the service at a reduced QoS, ensuring functionality despite limited resources. The system may provision the service within the newly created slice with adjusted parameters if the reduced QOS is acceptable.

In some embodiments, generating a new network slice in block 2611 may include updating routing tables and enforcing access controls for the new slice.

In block 2613, the processing system may provision devices to the newly created or existing network slice. For example, the processing system may configure the devices to connect to the appropriate network slice so that they have the necessary credentials and configurations to operate within the slice.

In some embodiments, provisioning devices to the newly created or existing network slice in block 2613 may include assigning devices to appropriate groups, associating relevant policies with each group, and initiating self-provisioning for devices to join the slice. For example, the processing system may categorize devices based on their functions, apply specific policies for resource allocation and security, and automate the configuration process to streamline device integration into the network slice.

In some embodiments, provisioning devices to the newly created or existing network slice in block 2613 may include assigning devices to groups based on hardware and software specifications, usage patterns, and functional roles. In some embodiments, provisioning devices to the newly created or existing network slice in block 2613 may include initiating self-provisioning by querying a secure database for device credentials and system parameters.

In block 2615, the processing system may dynamically adapt and scale network resources based on real-time conditions. For example, the processing system may continuously monitor network performance, detect changes in demand, and reallocate resources to maintain optimal service levels.

In some embodiments, dynamically adapting and scaling network resources based on real-time conditions in block 2615 may include continuously monitoring network conditions and resource utilization and reallocating resources dynamically to meet changing demands and service requirements. For example, the processing system may use real-time analytics to predict future network loads and proactively adjust resource distribution to prevent congestion and ensure smooth operation.

In some embodiments, dynamically adapting and scaling network resources based on real-time conditions in block 2615 may include monitoring network traffic patterns and usage trends in real-time and scaling out additional edge nodes to handle increased load or consolidating resources during periods of low demand.

In block 2617, the processing system may manage the isolation and security of network slices. For example, the processing system may implement mechanisms to ensure that data and traffic within one slice do not interfere with other slices.

In some embodiments, managing the isolation and security of network slices in block 2617 may include segregating traffic between different network slices to ensure each slice operates independently and securely and implementing inter-subscriber and inter-category firewalls to control communication within and between groups. For example, the processing system may establish virtual firewalls to enforce strict access controls, monitor traffic patterns to detect anomalies and adjust security policies dynamically to respond to emerging threats.

In some embodiments, managing the isolation and security of network slices in block 2617 may include configuring virtual firewalls to enforce strict access controls and dynamically adjusting firewall rules to accommodate changes in network topology or device configuration.

In block 2619, the processing system may use machine learning to make the network application aware. For example, the processing system may analyze application behavior and adjust network resources to optimize performance for specific applications.

In some embodiments, using machine learning to make the network application-aware in block 2619 may include adapting slices dynamically to the specific requirements of each application within a group. For example, the processing system may use machine learning algorithms to predict the resource needs of applications based on historical data and real-time usage patterns, allowing the system to allocate resources more efficiently.

In some embodiments, using machine learning to make the network application-aware in block 2619 may include analyzing application profiles and dynamically adjusting network slices based on application requirements.

In block 2621, the processing system may configure multiple types of network slices. For example, the processing system may create vertical, horizontal, and diagonal slices to meet diverse service requirements.

In some embodiments, configuring multiple types of network slices in block 2621 may include establishing vertical, horizontal, and diagonal slices to manage resources at different hierarchical levels, applying logical separations, and optimizing topology for diverse service requirements. For example, the processing system may allocate vertical slices for end-to-end resource management, horizontal slices for specific service types, and diagonal slices to integrate elements from both vertical and horizontal layers, ensuring comprehensive resource management and flexibility.

In some embodiments, configuring multiple types of network slices in block 2621 may include establishing vertical slices to manage resources from the core to the edge of the network, ensuring end-to-end resource management. For example, vertical slices may be allocated for services requiring consistent performance across all network layers, such as real-time video streaming. The operations may also include creating horizontal slices that segment the network at the same hierarchical level to cater to specific service types. Horizontal slices may be used to isolate different applications within the same network layer (e.g., separating IoT devices from traditional IT infrastructure, etc.). In addition, developing diagonal slices may integrate elements from both vertical and horizontal layers to provide flexibility and comprehensive resource management. For example, diagonal slices may be created to support complex applications that require resources from multiple network levels, such as a combination of data processing and storage services. By implementing these configurations, the processing system may provide optimal resource management, logical separations, and a tailored approach to meet the diverse requirements of various services.

In some embodiments, configuring multiple types of network slices in block 2621 may include establishing vertical slices to manage end-to-end network resources from core to edge, establishing horizontal slices to segment different service types within the same layer, and/or establishing diagonal slices to integrate vertical and horizontal elements.

In block 2623, the processing system may manage network slice resources. For example, the processing system may monitor resource usage, optimize allocation, and ensure the availability of important resources for important services.

In some embodiments, managing network slice resources in block 2623 may include using dedicated and/or shared resources effectively and isolating slices to ensure dedicated resources for important services. demand and the processing system may reserve certain bandwidth and processing power for high-priority services, dynamically adjust resource allocations based on real-time demand, and maintain strict isolation to prevent resource contention between slices.

In some embodiments, managing network slice resources in block 2623 may include deploying computational tasks closer to the data source to minimize latency and improve response times.

Figure 27:
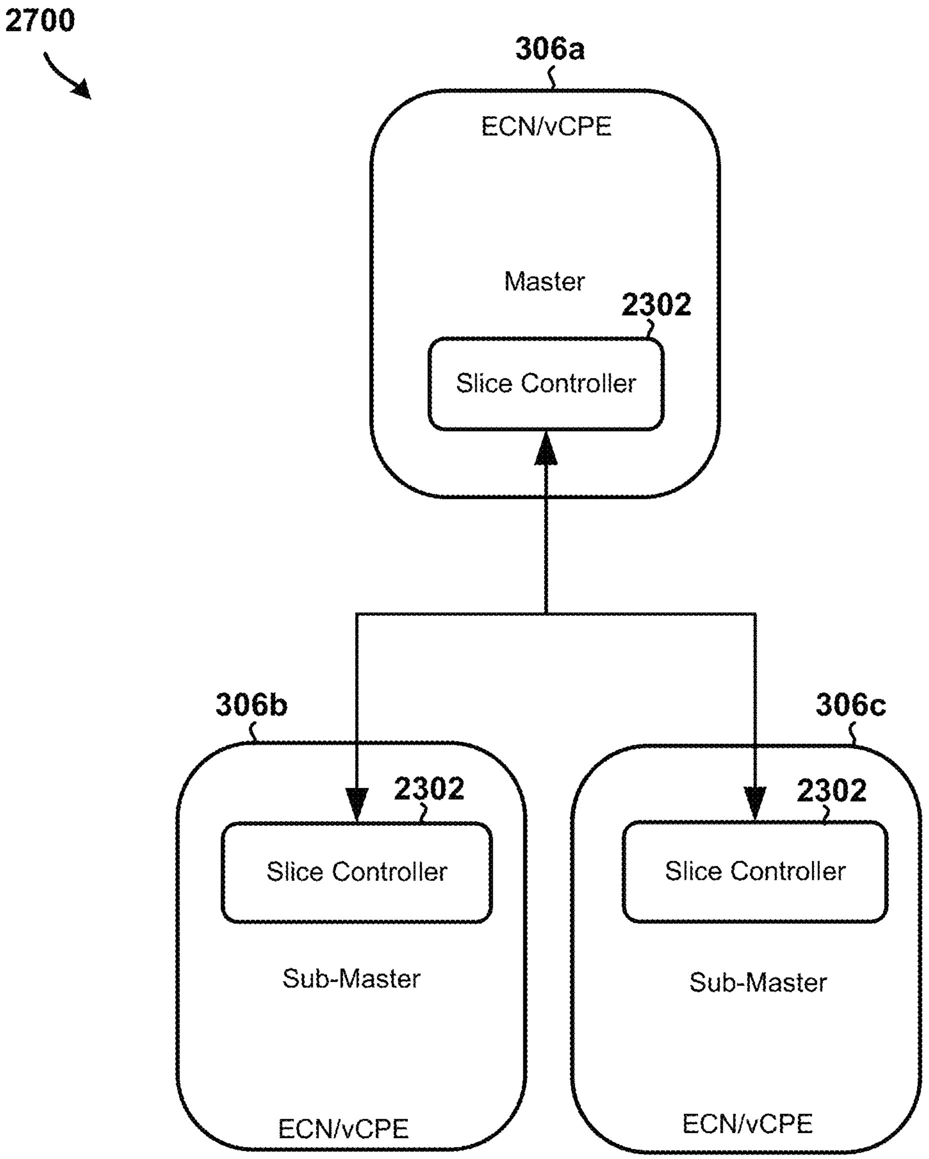
FIG. 27 is a block diagram that illustrates a three-node edge network that could be configured to use the vDA system's network slicing system in accordance with some embodiments.

FIG. 27 illustrates a three-node edge network 2700 that could be configured to use the vDA system's network slicing system. In the example illustrated in FIG. 27, the slice controller 2302 is associated with each ECN 306 (or vCPE) for increased resiliency and control of the network slice. Alternatively, the slice controller may be located in the ECN/vCPE Master (306*a*), in a cloud environment, or in all of these locations.

Network slicing is often static, with differentiation being done for the service within the slice itself, which may limit its flexibility. However, the vDA system may allocate to a group a network slice that may be dynamically adjusted based on the application requirements within the group. The vDA system may assign a constant bit rate (CBR) or defined bandwidth to the group with a defined QoS. The policy for the group (which may be specified in the PSK assigned to the group) determines the bearer required for the application. The policy may define that only best effort is given to the group with a defined set of resources, or it may specify different treatments for different bearers. For example, application class ID 1 may use a best effort approach while class ID 2 may have a guaranteed bit rate. The parameters associated with each bearer service that is applied between a group or device and the service endpoint may also be defined in the policy.

Figure 28:
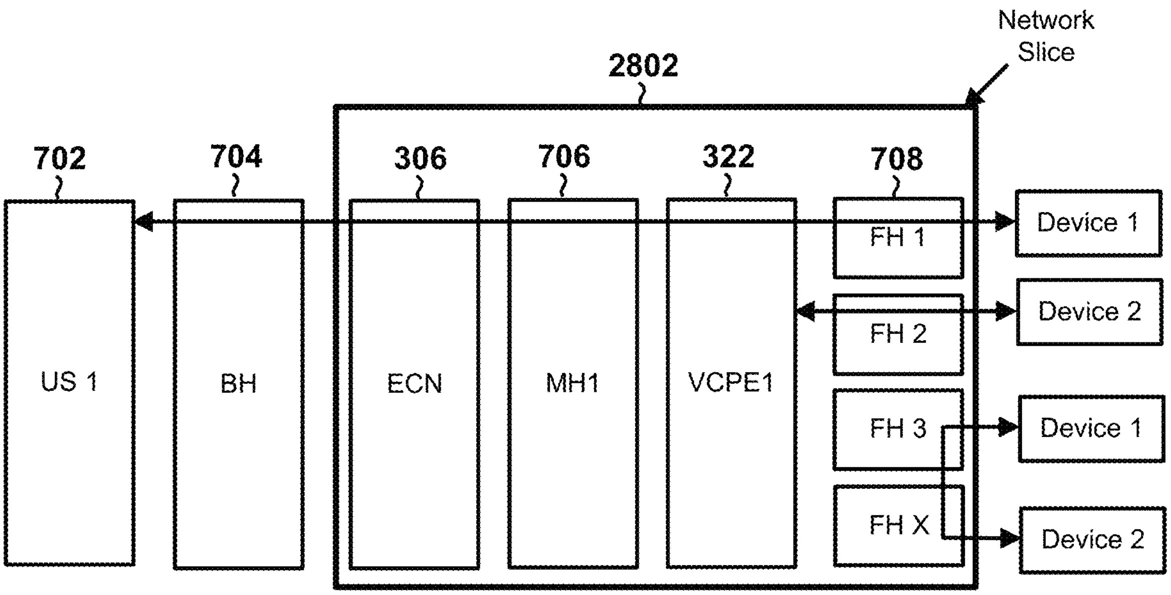
FIG. 28 is a component block diagram that illustrates an example edge network ecosystem that could implement or include vDA systems in accordance with some embodiments.

FIG. 28 is a component block diagram that illustrates an example edge network ecosystem that could implement or include vDA systems. In particular, FIG. 28 illustrates three possible scenarios in which a device is connected to a service endpoint. In the first scenario, Device 1 is connected directly to the upstream service 702 provider as a service endpoint. In the second scenario, Device 2 is connected to the ECN/vCPE 322 that is serving the group or application directly or is associated with the group or application. In the third scenario, Devices 3 and 4 are connected in a peer-to-peer relationship. Devices 3 and 4 could be same group or in different groups (if the policy for both groups allows it). These three scenarios are just a few examples of the possible permutations.

The service endpoint may be within or outside of the vDA system network. When the service endpoint resides outside of the vDA system, the service parameters in some embodiments only apply to the components within the vDA system.

FIGS. 29A-29C illustrate tables that may be used by the vDA system to categorize and manage the bandwidth usage and allocation, as well as the desired QoS, for different groups or devices within the vDA network.

FIG. 29A is an illustration of a bandwidth traffic table. In some embodiments, the traffic throughput or bandwidth assigned to a group may assigned a class ID. The bandwidth traffic table illustrated in FIG. 29A includes an example in which Class ID 1 is associated with the bandwidth Traffic ID. This table provides just one example of how traffic throughput or bandwidth may be classified and assigned in the vDA system.

The table illustrated in FIG. 29A associates a bandwidth service class (BSC) for both uplink and downlink rates, which may be used to manage and allocate bandwidth for both incoming and outgoing traffic for each group or device in the network. The BSCs defined in FIG. 29A may provide a way to categorize and manage the bandwidth usage and allocation for different groups or devices within the vDA system.

FIG. 29B is an illustration of a group class ID assignment table that may be used by a vPolicy policy engine (e.g., vPolicy 2308 component of the slice controller 2302 illustrated in FIG. 23). With reference to FIG. 29B, the master Group ID may be used to identify the group that is associated with the service, and the master class ID may be the bandwidth service that defines the entire slice. The sub class IDs may be subparts of the slice, and their values may be either the same as the master class for the BSC or fall within the range of values defined by the master class.

In the vDA system, it is possible to have several different BSC IDs per group and/or network slice. Defining the bandwidth service levels needed for a service may be only a part of the process of delivering the service. The available bandwidth that may be associated with the BSC class ID may also be important. For bearer traffic, there may be another layer of detail, shown in FIG. 29C, which outlines the virtual Quality of Service (vQOS) requirements for the bearer traffic. These requirements may provide additional information about the desired QoS for the bearer traffic, beyond what is defined by the BSC class ID.

FIG. 29C is an illustration of a table that may be used to determine which bearers are categorized as guaranteed bit rate (GBR) and which are non-GBR. The priority associated with each virtual Quality of Service (vQoS) level may be applied when forwarding packets across the network, with Level 1 corresponding to the highest priority. The vQOS levels depicted in FIG. 29C are just examples of the different levels of GBR and non-GBR services that may be defined. The bandwidth service class (BSC) and vQOS may be used together with the vPolicy engine to deliver the service.

As mentioned above, the vPolicy 2308 component of the slice controller 2302 illustrated in FIG. 23 may include vPolicy engine. The vPolicy engine may be used to define the functions, services, and actions that are permitted or not permitted within a network slice or subnetwork slice. The vPolicy engine may also be used to determine whether an application is permitted to run locally, and this information may be provided to the slice controller 2302, which may then review the network topology for resource availability and compatibility. With vDA and the vPolicy engine, it is possible to assign multiple service types to a group and/or network slice. For example, it is possible to have both a best effort service for TCP traffic (QOS 6) and another service with a higher priority (vQoS 4) in the same group and/or network slice. The vPolicy engine may allow the slice controller to deliver these services to the appropriate groups or devices within the network.

The vPolicy engine may be configured to help manage and shape the traffic for a group and/or network slice. The vPolicy engine may be configured to determine whether the service being requested is allowed or not. The vPolicy engine may also provide the maintenance function of the slice controller with information about the ability to alter the QoS and/or application performance based on resource consumption. The alteration of the application may be done until such time that the conditions warrant the restoration of the QoS values for the application. For example, the vPolicy engine may inform the maintenance function that Service 1 cannot be altered, but Service 2 may be altered. As such, when the resources for the slice and/or group reach a defined threshold level (e.g., 85%), Service 2 may be degraded by at least one QoS level. Yet, in a group or slice, there may be several instances of applications with different service levels. When the threshold is reached, the maintenance function may select the best service to perform the QoS degradation on, using methods such as random selection or ranked order based on bandwidth consumption and packet traffic load. The vPolicy engine may also able to determine whether an application is able to run locally without the need for external connectivity.

The vPolicy engine may be configured to determine whether resources external to the group and/or network slice may be utilized for the delivery of the service, and how those resources may be used. In the vDA system, a group may also have different containers running within it, such as pods or multiple pods within the group. These groupings may be associated with the Kubernetes k8/k3s or any other container system. The use of groupings and containers within the vDA system may allow for greater flexibility and resource management within the network or subnetwork.

Figure 29D:
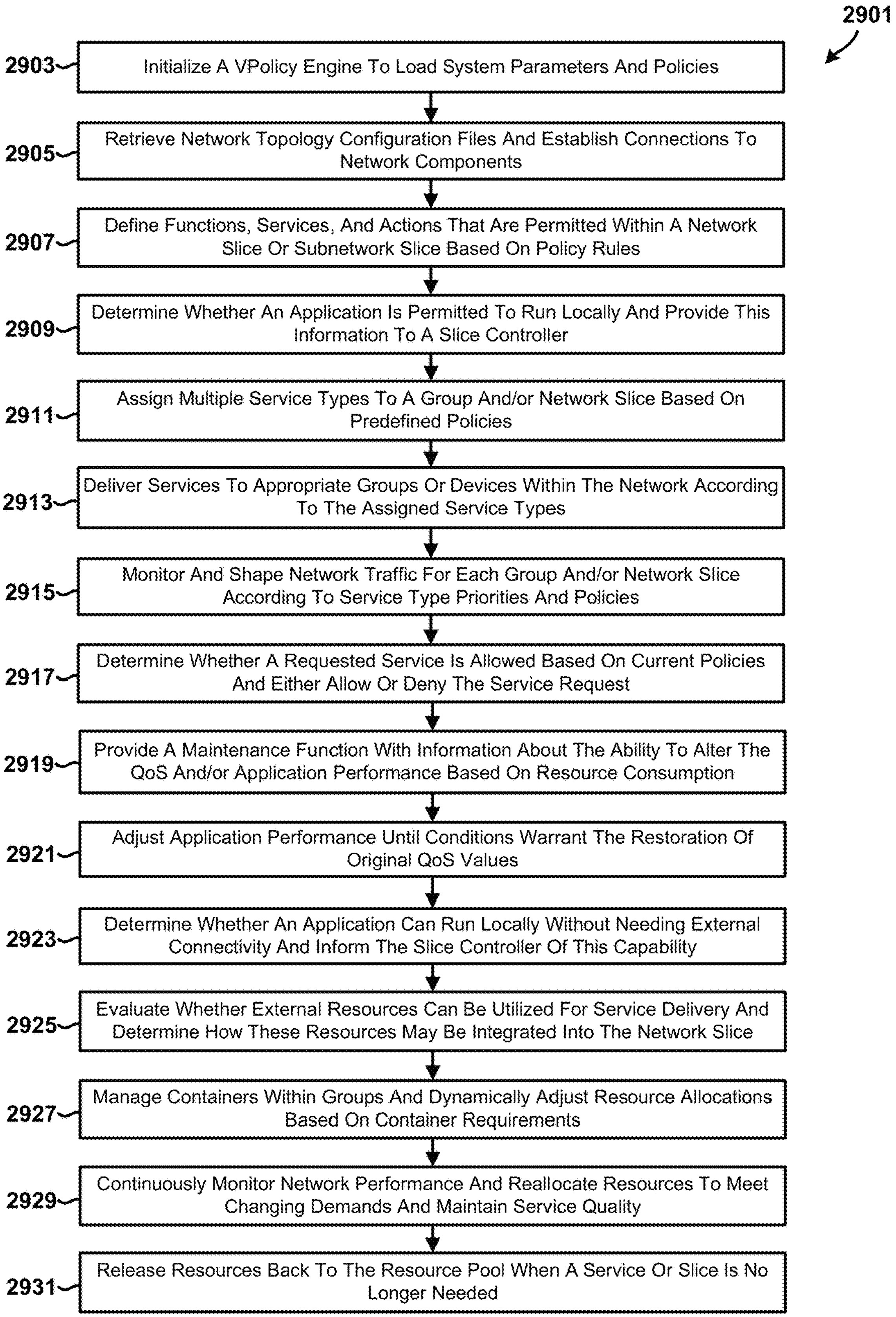
FIG. 29D is a process flow diagram that illustrates a method of managing network slices in a vDA system in accordance with some embodiments.

FIG. 29D illustrates a method 2901 of managing network slices in a vDA system in accordance with some embodiments. Method 2901 may be performed by a processor or processing system in an edge computing device (e.g., ECN 306, etc.).

In block 2903, the processing system may initialize a vPolicy engine to load system parameters and policies. For example, the processing system may load configuration files, set initial parameters, and verify policy rules to prepare the vPolicy engine for operation.

In some embodiments, initializing the vPolicy engine in block 2903 may include activating the vPolicy engine to begin managing network slicing operations, performing system checks, and verifying that all necessary components are operational and ready to handle network slicing tasks. For example, the processing system may start the vPolicy engine, run diagnostic checks, and ensure connectivity with network components.

In block 2905, the processing system may retrieve network topology configuration files and establish connections to network components. For example, the processing system may access a central repository to download the latest network topology data and establish secure connections to routers, switches, and edge devices within the network.

In block 2907, the processing system may define functions, services, and actions that are permitted within a network slice or subnetwork slice based on policy rules. For example, the processing system may reference policy documents to specify which services are allowed or restricted within each network slice, ensuring compliance with organizational policies.

In some embodiments, defining permitted functions, services, and actions in block 2907 may include analyzing policy rules to define what functions, services, and actions are permitted within each network slice or subnetwork slice. For example, the processing system may use a policy engine to automatically enforce rules that govern data traffic, service priorities, and security protocols within each slice.

In block 2909, the processing system may determine whether an application is permitted to run locally and provide this information to a slice controller. For example, the processing system may analyze the application's resource requirements and security constraints to determine whether it can execute on local hardware.

In some embodiments, determining whether an application is permitted to run locally in block 2909 may include evaluating each incoming service request to determine whether the application is permitted to run locally, and providing this information to the slice controller. For example, the processing system may cross-reference service requests with a database of approved local applications and relay the decision to the slice controller.

In block 2911, the processing system may assign multiple service types to a group and/or network slice based on predefined policies. For example, the processing system may categorize services into groups such as video streaming, data analytics, and IoT management, and allocate them to corresponding network slices.

In some embodiments, assigning multiple service types to groups or network slices in block 2911 may include assigning multiple service types (e.g., QoS levels) to the appropriate groups or network slices based on predefined policies. For example, the processing system may designate high-priority traffic to slices with higher QoS levels to enhance performance for important services.

In block 2913, the processing system may deliver services to appropriate groups or devices within the network according to the assigned service types. For example, the processing system may use routing protocols to direct service traffic to the correct network slice or device, ensuring efficient service delivery.

In some embodiments, delivering services to appropriate groups or devices in block 2913 may include routing services to the correct network slices or devices based on policy configurations. For example, the processing system may implement policy-based routing to ensure that each service reaches its designated slice or endpoint according to established rules.

In block 2915, the processing system may monitor and shape network traffic for each group and/or network slice according to service type priorities and policies. For example, the processing system may use traffic-shaping techniques to manage bandwidth allocation and reduce congestion in high-traffic slices.

In some embodiments, monitoring and shaping network traffic in block 2915 may include monitoring and managing network traffic for each group and/or network slice, and shaping traffic according to service type priorities and policies. For example, the processing system may analyze traffic patterns and apply rate limiting or prioritization rules to optimize network performance.

In block 2917, the processing system may determine whether a requested service is allowed based on current policies and either allow or deny the service request. For example, the processing system may compare the service request against a policy database and permit or block the request accordingly.

In some embodiments, determining whether a requested service is allowed in block 2917 may include determine whether the requested service is allowed based on current policies, and proceeding to resource allocation if the service is allowed, otherwise denying the service request. For example, the processing system may check the policy compliance of the service request and, if compliant, initiate the allocation of necessary resources for service delivery.

In block 2919, the processing system may provide a maintenance function with information about the ability to alter the Quality of Service (QOS) and/or application performance based on resource consumption. For example, the processing system may send alerts to the maintenance team when resource usage exceeds thresholds, indicating a need to adjust QoS parameters.

In some embodiments, providing a maintenance function with information about the ability to alter the QoS and/or application performance in block 2919 may include monitoring resource consumption, adjusting application performance as necessary, and restoring original QoS values when conditions allow. For example, the processing system may dynamically adjust the bandwidth allocation for an application during peak usage times and revert to standard levels during off-peak periods.

In block 2921, the processing system may adjust application performance until conditions warrant the restoration of original QoS values. For example, the processing system may temporarily reduce the resolution of video streams during network congestion to maintain service continuity.

In some embodiments, adjusting application performance in block 2921 may include providing maintenance function with QoS adjustment information, and adjusting QoS as needed until conditions allow restoration of original QoS values. For example, the processing system may downgrade non-important services' QoS to prioritize emergency services during a network outage.

In block 2923, the processing system may determine whether an application can run locally without needing external connectivity and inform the slice controller of this capability. For example, the processing system may analyze the application's dependencies and determine whether local execution is feasible based on available resources.

In block 2925, the processing system may determine whether external resources can be utilized for service delivery and determine how these resources may be integrated into the network slice. For example, the processing system may evaluate cloud resources' availability and plan the integration of these resources into the local network infrastructure.

In some embodiments, determining whether external resources can be utilized in block 2925 may include determine whether external resources can be used for service delivery; determining how these resources may be integrated into the network slice. For example, the processing system may verify the compatibility of external resources with the existing network architecture and establish secure connections to incorporate them into the service delivery framework.

In block 2927, the processing system may manage containers within groups and dynamically adjust resource allocations based on container requirements. For example, the processing system may use orchestration tools like Kubernetes to manage container deployment and optimize resource usage according to real-time demand.

In some embodiments, managing containers within groups in block 2927 may include managing containers (e.g., Kubernetes pods) dynamically, and adjusting resource allocations based on container requirements. For example, the processing system may scale container resources up or down based on usage metrics, ensuring efficient operation.

In block 2929, the processing system may continuously monitor network performance and reallocate resources to meet changing demands and maintain service quality. For example, the processing system may employ network monitoring tools to track performance metrics and adjust resource distribution to prevent bottlenecks.

In some embodiments, monitoring network performance in block 2929 may include monitoring network performance in real-time, and reallocating resources dynamically to meet changing demands and maintain service quality. For example, the processing system may use predictive analytics to forecast network load and proactively adjust resource allocation to avoid performance degradation.

In block 2931, the processing system may release resources back to the resource pool when a service or slice is no longer needed. For example, the processing system may deallocate virtual machines or bandwidth that are no longer in use, making them available for other services.

In some embodiments, releasing resources back to the resource pool in block 2931 may include releasing resources to the resource pool when a service or slice is no longer needed, and reallocating released resources to other slices or services as needed. For example, the processing system may automatically reclaim resources from decommissioned slices and reassign them to new or existing slices to optimize overall resource utilization.

The vDA system may allow microservices to be executed at the edge of a network. The ECN/vCPE may run applications within containers. While using containers for running applications with low latency requirements is not ideal due to all traffic flowing through the container, the vDA system may address this issue by separating the traffic and control flows within the container.

FIGS. 30A-30D illustrate the vDA systems that separate the traffic and control flows within a container in accordance with some embodiments. This separation of traffic and control flows may be necessary to meet service requirements and reduce latency in the network by processing services upstream or off-net.

Figure 30A:
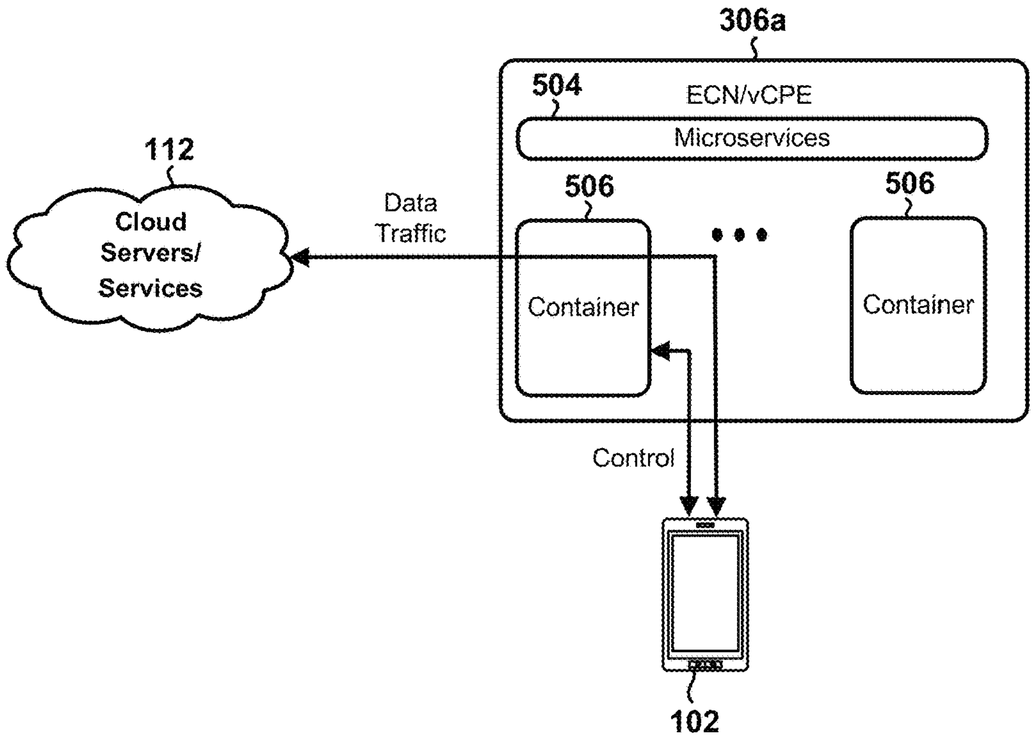
FIGS. 30A-30D are block diagrams that illustrate vDA systems that separate the traffic and control flow within a container in accordance with some embodiments.

In the example illustrated in FIG. 30A, both the data and control flows pass through the container 506.

Figure 30B:
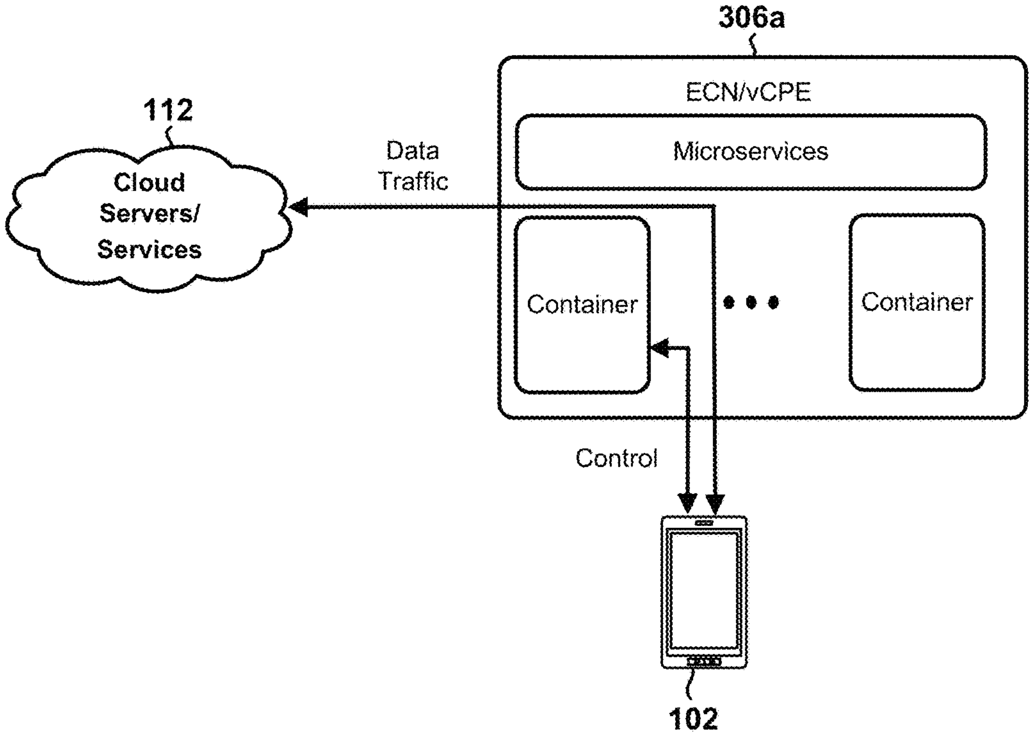

In the example illustrated in FIG. 30B, most of the data plane is moved onto the host or ECN/vCPE 306*a*, reducing latency by preventing data packets from flowing through the container. This allows other functions to improve routing and accelerate traffic. The control plane remains within the container 506 as it is specific to the application. There are several ways to achieve this traffic/control split, such as implementing new APIs on the host that allow for more advanced traffic configuration or allowing the container to run with "host mode networking", which allows it to directly modify the host's network configuration.

Figure 30C:
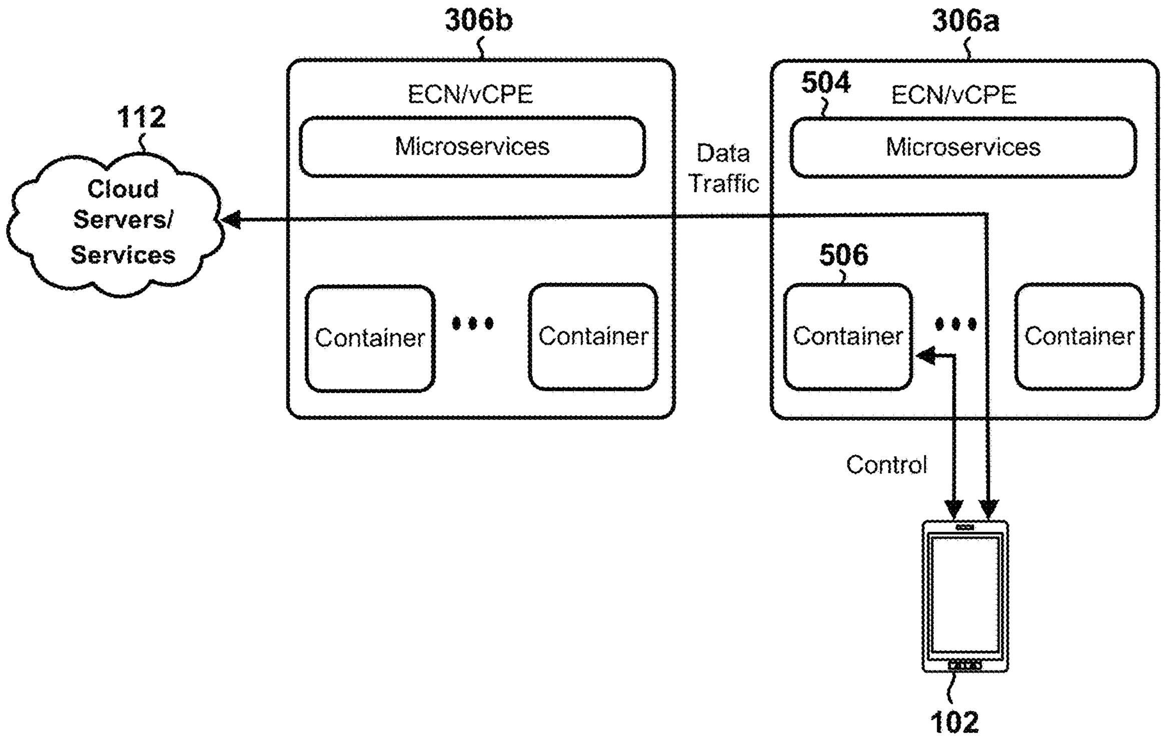

In the example illustrated in FIG. 30C, a second ECN/vCPE 306*b* is used to provide WAN connectivity to a service. In this case, the data traffic passes through another ECN/vCPE 306*b* as specified in the data routing instructions provided during service initiation.

Figure 30D:
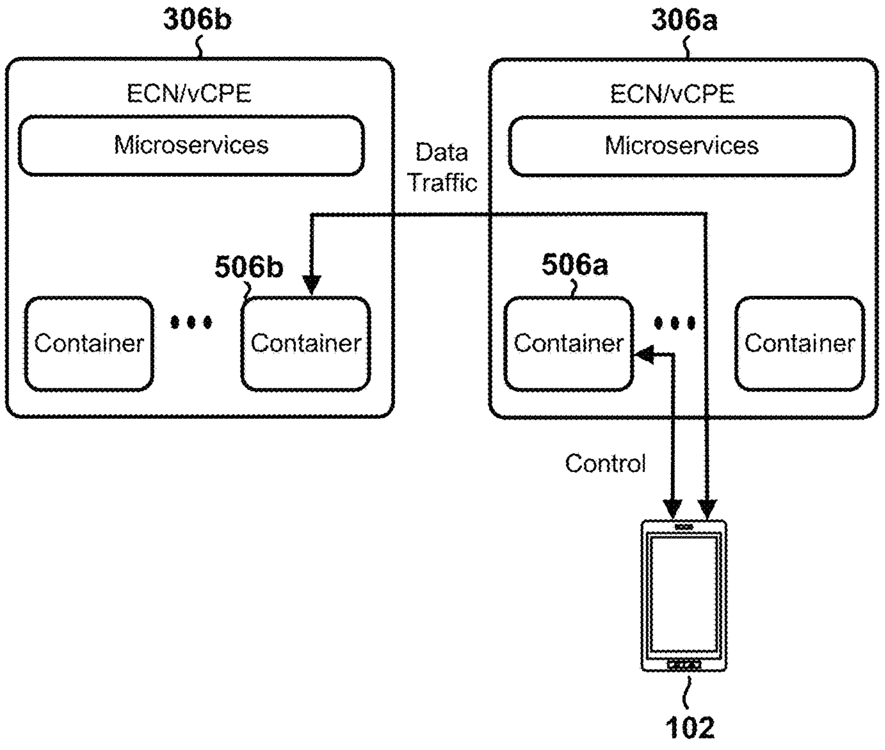

In the example illustrated in FIG. 30D, data plane is moved onto the host or ECN/vCPE 306*a* and the control plane remains within the container 506*a*, but another container 506*b* is used as part of the service to process the data traffic from the end device.

Figure 31:
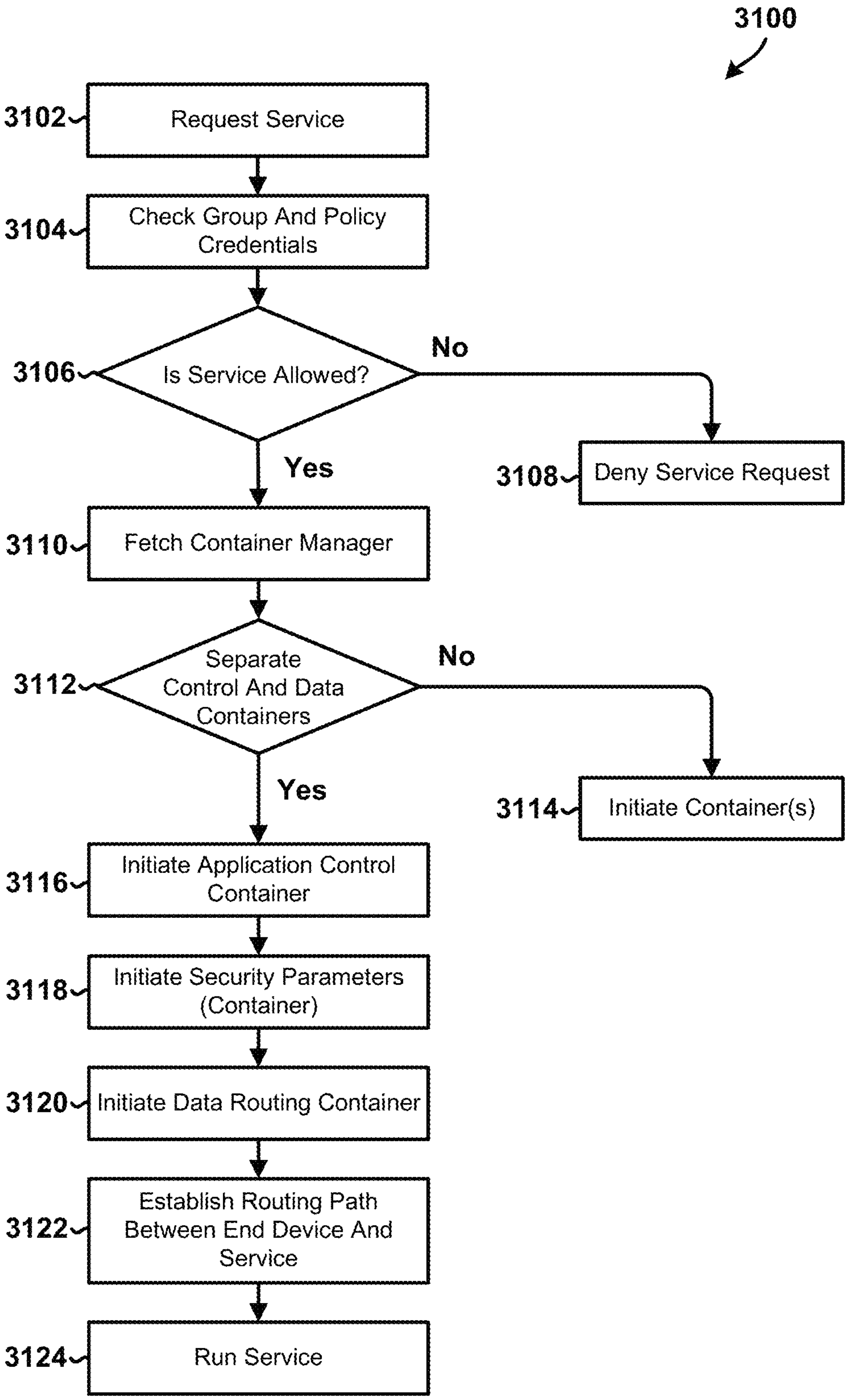
FIG. 31 is a process flow diagram that illustrates a method of separating the control and data planes in a container environment in accordance with some embodiments.

FIG. 31 illustrates a method 3100 of separating the control and data planes in a container environment in accordance with some embodiments. Method 3100 may be performed by a processor or processing system in an edge computing device (e.g., ECN 306, etc.).

In overview, when an end device requests a service, the group and policy credentials are checked to ensure that the requested service is allowed based on the service request or other criteria, such as the number of active and idle devices in the group that have connectivity to services requiring a connection outside the service ECN/vCPE. If the service is allowed, the necessary containers are retrieved from the image repository and initiated. Once the control and security containers are initiated, the data path and routing are established, and the service begins to run.

With reference to FIG. 31, in block 3102 the device may request a service. In block 3104, the device may check the group and policy credentials. In determination block 3106, the device may determine whether the service is allowed. In response to determining that service is not allowed (i.e., determination block 3106="No"), the device may deny the service request in block 3108. In response to determining that service is allowed (i.e., determination block 3106="Yes"), the device may fetch a container manager in block 3110. In determination block 3112, the device may determine whether it should separate the control and data containers. In response to determining that it should not separate the control and data containers (i.e., determination block 3112="No"), the device may initiate the container(s) in block 3114. In block 3116, the device may initiate an application control container. In block 3118, the device may initiate security parameters, which may be a container. In block 3120, the device may initiate data routing container. In block 3122, the device may establish a routing path between the end device and the service. In block 3122, the device may run the service.

The various embodiments include methods and computing systems (e.g., edge computing systems, etc.) that implement the methods for improving functionality and addressing various limitations of conventional solutions. In some embodiments, the edge computing system may include a distributed access system (herein "vDA system") configured to manage resource allocation and policy application in a network. The vDA system may simplify client device access and support elastic scaling and network slicing across network components, such as core elements, radio access components, or network segments.

The various embodiments may address technical challenges and limitations of conventional solutions to enhance the functionality, performance, security, and reliability of user devices, edge devices, communication networks, and their constituent components. These technical challenges and improved functionality, along with additional enhancements and benefits, will be evident from the disclosures below.

Some embodiments may incorporate various authentication and wireless access technologies, such as the Extensible Authentication Protocol (EAP) exchange using 802.1X and the pre-shared key (PSK) methods. When a client device attempts to access a wireless access point (WAP) broadcasting a recognized Service Set Identifier (SSID), it initiates an authentication request to verify its credentials and gain network access. This request may use either a pre-shared key (PSK) or an EAP exchange using 802.1X. If the PSK method is used, a shared secret previously agreed upon by both parties authenticates the client device. If the 802.1X method is used, an authentication server facilitates the EAP exchange. Upon completing the authentication process, a Pairwise Master Key (PMK) and Group Master Key (GMK) are generated, which are then used to create a Pairwise Transient Key (PTK) and Group Transient Key (GTK) for encrypting wireless traffic. The described embodiments may simplify client device access processes while maintaining strong security measures and overcoming limitations of existing solutions. Some embodiments may authenticate devices on a per-subscriber basis, in contrast to existing per-client device authentication methods.

Wi-Fi Passpoint (also known as HotSpot 2.0) allows users to connect to Wi-Fi networks at multiple locations without manually entering login credentials each time. A limitation of Wi-Fi Passpoint is that it does not directly support client isolation or inter-client communications. In contrast, the described embodiments may support client isolation and inter-client communications.

Some embodiments may include methods of establishing connections and forming groups in an edge computing system, which may include detecting and identifying, by a processor the edge computing system, devices attempting to connect to the network, establishing connections, by the processor, to one or more of the detected devices by authenticating the detected devices using a common pre-shared key (PSK) stored in a memory of the edge computing system, forming, by the processor, of the connected devices based on predefined criteria stored in the memory of the edge computing system, sharing, by the processor, the common PSK within each of the formed groups by transmitting the common PSK over a secured communication channel, creating, by the processor, a subnetwork or private local area network (LAN) for each subscriber associated with the connected devices using network configuration data stored in the memory, assigning, by the processor, virtual pre-shared keys (vPSKs) to the connected devices dynamically or statically based on service requirements retrieved from a service database, determining, by the processor, the capabilities of each connected device by analyzing device-specific information received from the devices, and determining, by the processor, which allowed applications are supported by each connected device based on the determined capabilities and application compatibility data stored in the memory.

Some embodiments may further include retrieving, by a processor in an edge device, the common PSK, scanning, by the processor in the edge device, for network Service Set Identifiers (SSIDs), and sending, by the processor in the edge device, a request to join a detected network associated with the SSID, in which the operations of detecting and identifying, by the processor, devices attempting to connect to the network are performed after the sending, by the processor in the edge device, the request to join the detected network associated with the SSID. In some embodiments, the operations of detecting and identifying, by the processor, devices attempting to connect to the network further include receiving identification information from each of the detected devices. In some embodiments, the predefined criteria for forming groups include at least one of a device type, a service plan, or a user subscription level. In some embodiments, assigning the vPSKs to the connected devices dynamically or statically based on the service requirements may include dynamically assigning the vPSKs to the connected devices based on real-time service requirements and usage patterns.

In some embodiments, determining, by the processor, the capabilities of each connected device may include evaluating processing power, memory capacity, and communication capabilities of each connected device. In some embodiments, creating, by the processor, the subnetwork or private LAN for each subscriber associated with the connected devices may include creating a subnetwork or private LAN for each subscriber that may be isolated from other subscribers' subnetworks or LANs. Some embodiments may further include dynamically reassigning devices to different groups based on changes in device capabilities or service requirements.

Some embodiments may include methods of automated device provisioning and management in an edge computing system, which may include retrieving self-provisioning parameters and device credentials from a database, adding a new device to the system determining whether the number of devices allowed for a group may be exceeded removing a device from the group in response to determining that the number of devices exceeds the allowed limit allowing more devices to be added to the group through a top-off process in response to determining that the number of devices does not exceed the allowed limit, forming a trusted group of devices, monitoring, adding, removing, or disabling devices based on policy for the trusted group or current system requirements, forming a self-service group of devices, changing the service or application provided via the network, dynamically changing the group(s) the new device may be associated with based on various factors or conditions, assigning a vPSK to a subnetwork or private local area network (LAN) that may be assigned to a particular subscriber rather than to individual devices, creating private LANs and virtual private clouds (vPCs) within a larger network, sharing the device credentials with upstream services, and generating and using virtual networks (vNets) to provision and manage the new device.

In some embodiments, retrieving the self-provisioning parameters and the device credentials from the database may include retrieving information related to account identification, device name, medium access control (MAC) address, subscription services, quality of service (QOS), service enhancement capabilities, access restrictions, and group assignments.

In some embodiments, adding the new device to the system may include detecting an unrecognized device attempting to connect to the network, activating a self-provisioning process in response to detecting the unrecognized device, authenticating and authorizing the unrecognized device locally, and automatically adding the unrecognized device as the new device to the edge computing system. In some embodiments, authenticating and authorizing the unrecognized device locally may include using stored credentials to verify the identity of the unrecognized device, and validating security features of the unrecognized device and compliance with network policies before granting access. In some embodiments, forming a trusted group of devices may include grouping devices based on trust levels and usage patterns, using encryption and secure protocols for secure communication within the group, and modifying group membership based on device behavior and security status. In some embodiments, dynamically changing the group(s) may include evaluating real-time network performance metrics and device capabilities, reassigning devices to different groups to optimize resource utilization and service delivery, and balancing network load during peak usage times by adjusting group memberships.

In some embodiments, assigning a vPSK to a subnetwork or private local area network (LAN) may include generating a unique vPSK for the subnetwork, configuring devices within the subnetwork to use the shared vPSK for secure communication, and managing the vPSK to ensure it remains secure and periodically updated. In some embodiments, creating private LANs and virtual private clouds (vPCs) within a larger network may include segregating network traffic to create isolated communication channels, ensuring enhanced security and performance by isolating traffic and resources, and managing the private LANs and vPCs to maintain optimal network operation. In some embodiments, sharing the device credentials with upstream services for redundancy and resiliency may include transmitting device credentials to cloud-based services or other network components, ensuring device information may be backed up and recoverable in case of failures, and periodically synchronizing credentials to maintain consistency across the system. In some embodiments, implementing and using virtual networks (vNets) may include creating isolated virtual network segments within the larger edge computing system, configuring vNets dynamically to form trusted domains, providing enhanced security and control over network traffic, and establishing vNets for specific groups of devices that provide secure communication and resource management.

Some embodiments may include methods of dynamically managing device provisioning, policy application, and resource allocation in real-time using virtual private security keys (vPSKs) and network slicing, which may include retrieving self-provisioning parameters and device credentials from a database to initialize system configurations and parameters, categorizing devices based on their types, capabilities, and roles, associating each group of devices with one or more policies, assigning devices to groups based on the categorization and the associated policies, generating or retrieving a vPSK for each device, assigning the vPSK to one or more groups with a defined policy, configuring network slices for the groups based on their traffic requirements, and allocating network resources dynamically to meet the needs of each network slice.

In some embodiments, configuring multiple group and policy combinations to allow customization of services and support numerous group and policy combinations that meet diverse user requirements may include defining specific network settings, resource allocations, and access permissions for each group based on user requirements, storing the defined network settings, resource allocations, and access permissions in memory, and dynamically adjusting the stored network settings, resource allocations, and access permissions in response to detecting changes in network conditions.

Some embodiments may further include allowing customization of services by supporting numerous group and policy combinations to meet diverse user requirements, mapping a pre-shared key (PSK) to a policy group and associating the policy group with a network and a subscriber, sharing policies within a group of devices in the same network or between networks, verifying device credentials to add new devices to groups, allowing devices to select services and applications, adding devices to appropriate groups based on the verification, assigning policies and vPSK values to the devices, updating network access configurations for the devices, determining whether the number of devices allowed in a group may be exceeded, removing an existing device from the group if the number of devices exceeds the allowed limit, requesting a service top-off if no devices can be removed, thereby scaling the network or adding resources, entering device credentials and assigning services, policies, and vPSKs to new devices if more devices are allowed in the group, granting network access to the new devices, dynamically reassigning devices to different groups based on real-time factors, which may include device capabilities, resource availability, and service requirements, forming trusted domains using virtual networks (vNets) to provide remote endpoint visibility and control through dynamic network segmentation, creating localized networks for automatic secure connections to external services, and sharing device credentials with upstream services to ensure redundancy and resiliency.

In some embodiments, retrieving self-provisioning parameters and device credentials from the database may include accessing a secure database to fetch parameters such as device identifiers, authentication keys, and configuration settings needed for provisioning new devices. In some embodiments, categorizing devices based on their types, capabilities, and roles may include analyzing each device's hardware and software specifications, usage patterns, and functional roles to group them appropriately for optimized management and policy application. In some embodiments, associating each group of devices with one or more policies may include linking each group to policies that define network slicing, traffic priorities, security measures, and quality of service (QOS) parameters so that each group operates under conditions that are adequate for its requirements. In some embodiments, generating or retrieving a vPSK for each device may include creating a new vPSK or retrieving an existing one from the security database to ensure secure communication and authentication for each device. In some embodiments, configuring network slices for the groups based on their traffic requirements may include setting up dedicated network slices for each group and configuring routing, switching, and resource allocation to meet the specific traffic needs of the groups. In some embodiments, dynamically reassigning devices to different groups based on real-time factors may include evaluating real-time network performance metrics and reassigning devices to different groups to optimize resource utilization and service delivery.

In some embodiments, forming trusted domains using virtual networks (vNets) may include creating virtual networks that isolate and secure groups of devices to provide enhanced visibility and control for network administrators. In some embodiments, creating localized networks for automatic secure connections to external services may include setting up localized network segments that ensure secure and efficient connections to external services and configuring routing and access controls to manage traffic. In some embodiments, sharing device credentials with upstream services to ensure redundancy and resiliency may include communicating device credentials to upstream services to allow redundancy and support failover mechanisms for continuous network operation and resilience.

Some embodiments include methods of dynamically managing network segmentation, slicing, and scaling operations in an edge computing system, which may include retrieving, by a processing system in an edge computing device, system parameters and device credentials from a secure database to initialize system configurations and parameters, segmenting the network by the processing system, in which segmenting the network may include analyzing device types, capabilities, and roles, categorizing devices into logical groups, assigning devices to the logical groups, selecting appropriate policies for each logical group, and storing group membership and policy information in a central database, configuring network slices by the processing system, in which configuring the network slices may include determining whether a new service request requires a dedicated network slice, initiating network discovery to map the network topology and identify necessary components, selecting and assigning specific network elements to the new slice, configuring and activating the network slice, updating routing tables, enforcing access controls, and dynamically allocating resources in real-time based on the network slice requirements of each network slice.

In some embodiments, segmenting the network further may include segmenting the network into subnetworks or segmenting a particular portion of the network into separate components through virtualization, which may include horizontal, vertical, diagonal, or a combination of horizontal and vertical segmentation types. In some embodiments, horizontal segmentation may include resources from other edge computing nodes (ECNs) or devices in the edge computing system. In some embodiments, dynamically allocating network resources further may include continuously monitoring network usage by the processing system, adjusting resource allocation so that each network slice has adequate bandwidth and processing power, determining whether the service may function at a reduced Quality of Service (QOS) within an existing slice in response to determining that resources are insufficient for a new slice, and allocating the service to the existing slice in response to determining that the service may function at a reduced QoS, or denying the service request in response to determining that the reduced QoS may be insufficient.

In some embodiments, managing the isolation and security further may include implementing virtual slices (vSlices) and groups to isolate subnetworks and devices, applying policies to manage communication within and between groups, and controlling unidirectional or bidirectional communication based on the applied policies. In some embodiments, managing the isolation and security further may include assigning specific Quality of Service (QOS) parameters to each group to prioritize important traffic and guarantee bandwidth for high-priority applications while isolating less important devices to prevent them from impacting overall network performance. In some embodiments, supporting microservices and edge computing further may include using microservices in a container environment to simplify provisioning and ensure efficient application execution, hosting services at the network edge, using wired and wireless connectivity for the front haul and as a gateway to the WAN, and using multiple gateways to access the WAN, provide failover, and support stable network performance.

In some embodiments, implementing elastic edge architecture and scaling further may include providing horizontal and vertical scaling capabilities for rapidly adapting to changes or demands of applications, systems, or networks, distributing computing resources and services throughout the network to improve efficiency and reduce latency, and implementing backhaul aggregation to deliver traffic from edge computing nodes (ECNs) or virtual customer premise equipment (vCPEs) to the WAN. In some embodiments, creating customized network slices tailored to the unique requirements of multiple applications and services to configure the network slicing for specific use cases further may include implementing vertical, horizontal, and diagonal network slices to meet differentiated customer requirements; the vertical slices manage resources at different hierarchical levels, the horizontal slices segment resources across similar levels, and the diagonal slices combine vertical and horizontal elements to support complex services.

In some embodiments, segmenting the network may include analyzing device types, capabilities, and roles to categorize them, assigning devices to logical groups based on predefined rules and policies, selecting policies for each group, which may include settings for network slicing, traffic management, security protocols, and Quality of Service (QOS) parameters, and storing group membership and policy information in a central database, configuring, by the processing system, network slices, in which configuring the network slices may include determining whether a new service request requires a dedicated network slice, initiating network discovery to map the network topology and identify necessary components, selecting and assigning specific network elements to the new slice, configuring and activating the network slice, updating routing tables, enforcing access controls, and dynamically allocating resources in real-time based on the network slice requirements of each network slice, dynamically allocating network resources by the processing system, in which dynamically allocating network resources may include continuously monitoring network usage, adjusting resource allocation to ensure each slice has adequate bandwidth, processing power, and other resources, determining whether the service may be able to function at a reduced QoS within the existing slice if resources are insufficient for a new slice, allocating the service to the existing slice in response to determining that the service may be able to function at a reduced QoS, and denying the service request in response to determining that the service may be not able to function at a reduced QoS, managing, by the processing system, isolation and security, in which managing isolation and security may include implementing virtual slices (vSlices) and groups to isolate subnetworks and devices, applying policies to manage communication within and between groups, controlling unidirectional or bidirectional communication based on applied policies, and ensuring that devices in trusted groups maintain isolation even when IP addresses or gateways change, supporting, by the processing system, microservices and edge computing, in which supporting microservices and edge computing may include allowing the use of microservices in a container environment to simplify provisioning and ensure efficient application execution, hosting services at the network edge, using both wired and wireless connectivity for the front haul and as a gateway to the WAN, and using multiple gateways to access the WAN, providing failover and ensuring stable network performance, implementing, by the processing system, elastic edge architecture and scaling, in which implementing elastic edge architecture and scaling may include providing horizontal and vertical scaling capabilities to adapt to changes or demands of applications, systems, or networks, distributing computing resources and services throughout the network to improve efficiency and reduce latency, and implementing backhaul aggregation to deliver traffic from ECNs or vCPEs to the WAN, configuring, by the processing system, network slicing for specific use cases, in which configuring network slicing for specific use cases may include implementing vertical, horizontal, and diagonal network slices to meet the differentiated requirements of different customers and using diagonal slicing to combine vertical and horizontal network elements and concatenate various slices to create larger slices.

In some embodiments, retrieving system parameters and device credentials further may include accessing device identifiers, authentication keys, and configuration settings needed for provisioning new devices, segmenting the network further may include categorizing devices by analyzing each device's hardware and software specifications, usage patterns, and functional roles, configuring network slices further may include determining whether the group's requirements for traffic load, latency, security, and other factors exceed the capabilities of a shared network segment, dynamically allocating network resources further may include reallocating resources in response to real-time changes in network usage and service requirements, managing isolation and security further may include using policies and grouping to isolate devices and provide required Quality of Service (QOS) for end device services, supporting microservices and edge computing further may include verifying that the connection between the device running the application and the processing device meets certain QoS requirements, implementing elastic edge architecture and scaling further may include distributing computing resources to improve efficiency by reducing latency in accessing data and services, and configuring network slicing for specific use cases further may include implementing vertical, horizontal, and diagonal network slices to isolate subnetworks and devices and deliver services to groups of devices in a vDA system.

Some embodiments may include methods of dynamic network slicing in an edge computing system, which may include initializing, by a processor in a computing device, a slice controller function configured to deliver network slicing on a network or sub-network basis in a dynamic and real-time manner to support required services, monitoring to receive, by the processor, an incoming service request from devices within the network, determining, by the processor, whether an existing network slice may support a requested service included in the incoming service request and provisioning the device for the requested service in response to determining that it may be provisioned within the existing network slice, generating, by the processor, a new network slice in response to determining that existing network slice may not support the requested service, in which generating the new network slice may include determining whether sufficient resources are available for the new network slice, configuring and activating the new network slice by assigning identified network components in response to determining that sufficient resources are available for the new network slice, and provisioning the service at a reduced quality of service (QOS) in response to determining that the requested service may operate at the reduced QoS, dynamically adapting and scaling, by the processor, network resources based on real-time conditions, in which adapting and scaling may include continuously monitoring network conditions and resource utilization, and dynamically reallocating resources to meet changing demands and service requirements, managing, by the processor, network slice resources by using a combination of dedicated and shared resources and isolating slices to provide dedicated resources for critical services.

Some embodiments may further include configuring multiple types of network slices by generating vertical slices to manage end-to-end network resources from core to edge, generating horizontal slices to segment different service types within the same layer, and generating diagonal slices that integrate vertical and horizontal elements, Some embodiments may further include determining, by the processor, whether a group policy permits the creation of a new slice, and initiating a network discovery process to map the current topology and identify available network components in response to determining that the group policy permits the creation of the new slice.

In some embodiments, provisioning may include assigning devices to appropriate groups, associating relevant policies with each group, and initiating self-provisioning for devices to join the slice. In some embodiments, provisioning devices further may include assigning devices to groups based on hardware and software specifications, usage patterns, and functional roles, or initiating self-provisioning by querying a secure database for device credentials and system parameters. In some embodiments, dynamically adapting and scaling network resources further may include monitoring network traffic patterns and usage trends in real-time, and scaling out additional edge nodes to handle increased load or consolidating resources during periods of low demand. In some embodiments, segregating the traffic between the different network slices further may include implementing inter-subscriber and inter-category firewalls to control communication within and between groups. In some embodiments, configuring may include establishing vertical, horizontal, and diagonal slices to manage resources at different hierarchical levels, and applying logical separations to enhance topology for diverse service requirements.

In some embodiments, the slice controller function may be configured to deliver network slicing on a network or sub-network basis in a dynamic and real-time manner to support required services, monitoring incoming service requests from devices within the network, determining whether an existing network slice can support a requested service by determining whether the requested service may be provisioned within an existing network slice and provisioning the device for the requested service in response to determining that the requested service may be provisioned within an existing network slice, determining whether a new network slice may be needed for the requested service by determining whether a group policy provides permission to create a new slice and initiating a network discovery process to map the current topology and identify available network components in response to determining the group policy provides permission to create the new slice, generating a new network slice in response to determining that a new network slice may be needed for the requested service, in which generating the new network slice may include determining whether sufficient resources are available for the new network slice, configuring and activating the new network slice by assigning identified network components in response to determining that sufficient resources are available for the new network slice, determining whether the requested service may operate at a reduced quality of service (QOS) in response to determining that sufficient resources are not available for the new network slice, and provisioning the service at the reduced QoS in response to determining that the requested service may operate at the reduced QoS, provisioning devices to the newly created or existing network slice, in which the provisioning may include assigning devices to appropriate groups, associating relevant policies with each group, and initiating self-provisioning for devices to join the slice, dynamically adapting and scaling network resources based on real-time conditions, in which the adapting and scaling may include continuously monitoring network conditions and resource utilization, and dynamically reallocating resources to meet changing demands and service requirements, segregating traffic between different network slices so that each network slice operates independently, using machine learning to dynamically adapt network slices to the specific requirements of each application within a group and make the network application-aware, configuring multiple types of network slices, in which the configuring may include establishing vertical, horizontal, and diagonal slices to manage resources at different hierarchical levels, applying logical separations, and enhancing topology for diverse service requirements, managing network slice resources, in which the managing may include allowing a combination of dedicated resources and/or shared resources and isolating slices to generate dedicated resources for critical services.

In some embodiments, initializing the slice controller function may include initializing further may include loading system parameters and policies, and initializing network resources and topology maps, provisioning devices to the newly created or existing network slice further may include assigning devices to groups based on hardware and software specifications, usage patterns, and functional roles, or initiating self-provisioning by querying a secure database for device credentials and system parameters, dynamically adapting and scaling network resources based on real-time conditions further may include monitoring network traffic patterns and usage trends in real-time, and scaling out additional edge nodes to handle increased load or consolidating resources during periods of low demand, segregating traffic between different network slices so that each network slice operates independently further may include implementing inter-subscriber and inter-category firewalls to control communication within and between groups, configuring multiple types of network slices may include generating vertical slices to manage end-to-end network resources from core to edge, generating horizontal slices to segment different service types within the same layer, and generating diagonal slices that integrate vertical and horizontal elements, managing network slice resources may include deploying computational tasks closer to the data source to reduce latency and improve response times, and generating the new network slice may include updating routing tables and enforcing access controls for the new slice.

Some embodiments may include methods of dynamically managing network slices in an edge computing system, which may include initializing, by a processor in the edge computing system, a slice controller function configured to deliver network slicing on a network or sub-network basis in a dynamic and real-time manner to support required services, determining, by the processor, whether an existing network slice can support a requested service and provisioning the device for the requested service if it can be provisioned within the existing network slice, generating, by the processor, a new network slice in response to determining that a new network slice may be needed for the requested service, in which generating the new network slice may include evaluating the availability of sufficient resources for the new network slice, configuring and activating the new network slice by assigning identified network components in response to determining that sufficient resources are available, and provisioning the service at a reduced quality of service (QOS) in response to determining that the requested service can operate at the reduced QoS, assigning a Group class ID to each group, in which the Group class ID defines the bandwidth service for the entire slice, and assigning sub class IDs as subparts of the slice, with values either the same as the master class for the BSC or within the range of values defined by the master class, defining virtual Quality of Service (vQoS) requirements for bearer traffic associated with the BSC class ID, in which vQoS levels are categorized as guaranteed bit rate (GBR) or non-GBR, with priority levels applied when forwarding packets across the network, generating shards, by the processor, by isolating different groups and devices within each network slice to provide independent resource allocation.

In some embodiments, assigning the Group class ID further may include identifying the group associated with the service and defining the bandwidth service that encompasses the entire slice. In some embodiments, assigning sub class IDs further may include categorizing the subparts of the slice based on the values defined by the master class for a bandwidth service class (BSC). In some embodiments, defining vQOS requirements further may include specifying the quality standards for latency and reliability tailored to specific service needs.

In some embodiments, adapting and scaling may include continuously monitoring network conditions and resource utilization, and dynamically reallocating resources to meet changing demands and service requirements. In some embodiments, generating the new network slice further may include updating routing tables and enforcing access controls for the new slice. Some embodiments may further include provisioning devices to the newly created or existing network slice by assigning devices to appropriate groups, associating relevant policies with each group, and initiating self-provisioning for devices to join the slice.

Some embodiments may include methods of dynamically managing network slices in an edge computing system, the method which may include initializing, by a processor in the edge computing system, a slice controller function configured to deliver network slicing on a network or sub-network basis in a dynamic and real-time manner to support required services, determining, by the processor, whether an existing network slice can support a requested service and provisioning the device for the requested service if it can be provisioned within the existing network slice, generating, by the processor, a new network slice in response to determining that a new network slice may be needed for the requested service, in which generating the new network slice may include evaluating the availability of sufficient resources for the new network slice, configuring and activating the new network slice by assigning identified network components in response to determining that sufficient resources are available, and provisioning the service at a reduced quality of service (QOS) in response to determining that the requested service can operate at the reduced QoS, assigning a Group class ID to each group, in which the Group class ID defines the bandwidth service for the entire slice, assigning sub class IDs as subparts of the slice, with values either the same as the master class for the bandwidth service class (BSC) or within the range of values defined by the master class, defining virtual Quality of Service (vQOS) requirements for bearer traffic associated with the BSC class ID, in which vQoS levels are categorized as guaranteed bit rate (GBR) or non-GBR, with priority levels applied when forwarding packets across the network, generating shards, by the processor, by isolating different groups and devices within each network slice to provide independent resource allocation.

In some embodiments, assigning the Group class ID further may include identifying the group associated with the service and defining the bandwidth service that encompasses the entire slice. In some embodiments, assigning sub class IDs further may include categorizing the subparts of the slice based on the values defined by the master class for the bandwidth service class (BSC). In some embodiments, defining vQOS requirements further may include specifying the quality standards for latency and reliability tailored to specific service needs.

In some embodiments, adapting and scaling may include continuously monitoring network conditions and resource utilization, and dynamically reallocating resources to meet changing demands and service requirements.

In some embodiments, generating the new network slice further may include updating routing tables and enforcing access controls for the new slice. Some embodiments may further include provisioning devices to the newly created or existing network slice by assigning devices to appropriate groups, associating relevant policies with each group, and initiating self-provisioning for devices to join the slice.

In some embodiments, the vQOS requirements are used in conjunction with the vPolicy engine to deliver the service, providing additional information about the desired QoS for the bearer traffic beyond what may be defined by the BSC class ID. Further embodiments may include a computing device having a processor configured with processor-executable instructions to perform various operations corresponding to the methods discussed above.

Some embodiments may include methods of managing network slices in a virtual Distributed Architecture (vDA) system, which may include initializing a vPolicy engine to load system parameters and policies, retrieving network topology configuration files and establishing connections to network components, defining functions, services, and actions that are permitted within a network slice or subnetwork slice based on policy rules, determining whether an application may be permitted to run locally and providing this information to a slice controller, assigning multiple service types to a group and/or network slice based on predefined policies, delivering services to appropriate groups or devices within the network according to the assigned service types, monitoring and shaping network traffic for each group and/or network slice according to service type priorities and policies, determining whether a requested service may be allowed based on current policies and either allowing or denying the service request, providing a maintenance function with information about the ability to alter the Quality of Service (QOS) and/or application performance based on resource consumption, adjusting application performance until conditions warrant the restoration of original QoS values, determining whether an application may be able run locally without needing external connectivity and informing the slice controller of this capability, determining whether external resources may be utilized for service delivery and how these external resources may be integrated into the network slice, managing containers within groups and dynamically adjusting resource allocations based on container requirements, continuously monitoring network performance and reallocating resources to meet changing demands and maintain service quality, releasing resources back to the resource pool in response to determining that a service or slice may be no longer needed.

In some embodiments, initializing the vPolicy engine further may include activating the vPolicy engine to begin managing network slicing operations, and performing system checks and verifying that all necessary components are operational and ready to handle network slicing tasks. In some embodiments, defining permitted functions, services, and actions may include accessing policy rules to define the functions, services, and actions that are permitted within each network slice or subnetwork slice. In some embodiments, determining whether an application may be permitted to run locally may include evaluating each incoming service request to determine whether the application may be permitted to run locally, and providing a result of the evaluation to the slice controller.

In some embodiments, assigning multiple service types to groups or network slices may include assigning multiple service types to the appropriate groups or network slices based on predefined policies. In some embodiments, delivering services to appropriate groups or devices may include routing services to the correct network slices or devices based on policy configurations. In some embodiments, monitoring and shaping network traffic may include monitoring and managing network traffic for each group and/or network slice, and shaping traffic according to service type priorities and policies. In some embodiments, determining whether a requested service may be allowed may include determining whether the requested service may be allowed based on current policies. In some embodiments, providing a maintenance function with information about the ability to alter the QoS and/or application performance may include monitoring resource consumption and adjusting application performance as necessary, and restoring original QoS values when conditions allow. In some embodiments, adjusting application performance may include providing maintenance function with QoS adjustment information, and adjusting QoS as needed until conditions allow restoration of original QoS values. In some embodiments, evaluating whether external resources can be utilized may include determining whether external resources may be used for service delivery, and determining how these resources may be integrated into the network slice. In some embodiments, managing containers within groups may include dynamically managing containers and adjusting resource allocations based on container requirements. In some embodiments, continuously monitoring network performance may include monitoring network performance in real-time, and reallocating resources dynamically to meet changing demands and maintain service quality. In some embodiments, releasing resources back to the resource pool may include releasing resources to the resource pool when a service or slice may be no longer needed, and dynamically reallocating released resources to other slices or services based on changing resource requirements.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 400-3100 may be substituted for or combined with one or more operations of the methods 400-3100.

The processors discussed in this application may be any programmable microprocessor, microcomputer or multiple processor chip or chips that may be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. For the purposes of this description, a general reference to memory refers to memory accessible by the processors including internal memory or removable memory plugged into the device and memory within the processors themselves. Additionally, as used herein, any reference to a memory may be a reference to a memory storage and the terms may be used interchangeable.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in or by a vehicle's advanced driver assistance system (ADAS), system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

As used in this application, the term "system on chip" (SOC) may refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

As used in this application, the "system in a package" (SIP) may refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent system-on-chips (SOCs) coupled together via high speed communication circuitry and packaged in close proximity, such as on a single backplane, single motherboard or in a single wireless device. The proximity of the SOCs facilitates high speed communications and the sharing of memory and resources.

As used in this application, "multicore processor" may refer to a single integrated circuit (IC) chip or chip package that contains two or more independent processing cores (e.g., CPU core, IP core, GPU core, etc.) configured to read and execute program instructions. A SOC may include multiple multicore processors, and each processor in an SOC may be referred to as a core. The term "multiprocessor" may refer to a system or device that includes two or more processing units configured to read and execute program instructions.

The various embodiments may include, use, incorporate, implement, or provide access to a variety of wired and wireless communication networks, technologies, and standards that are currently available or contemplated in the future. These may include Bluetooth®, Bluetooth Low Energy, ZigBee, LoRa, Wireless HART, Weightless P, DASH7, RPMA, RFID, NFC, LwM2M, Adaptive Network Topology (ANT), Worldwide Interoperability for Microwave Access (WiMAX), WiFi, WiFi 6, WiFi Protected Access I & II (WPA, WPA2), personal area networks (PAN), local area networks (LAN), metropolitan area networks (MAN), wide area networks (WAN), data over cable service interface specification (DOCSIS) networks, asymmetric digital subscriber line (ADSL) technologies, third generation partnership project (3GPP), long term evolution (LTE) systems, LTE-Direct, third generation wireless mobile communication technology (3G), fourth generation wireless mobile communication technology (4G), fifth generation wireless mobile communication technology (5G), sixth generation wireless mobile communication technology (6G), global system for mobile communications (GSM), universal mobile telecommunications system (UMTS), high-speed downlink packet access (HSDPA), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), and other technologies. Each of these wired and wireless technologies includes, for example, the transmission and reception of data, signaling, and/or content messages. Any references to terminology and/or technical details related to an individual wired or wireless communications standard or technology are for illustrative purposes only and are not intended to limit the scope of the claims to a particular communication system or technology unless specifically recited in the claim language.

The foregoing method descriptions and process flow diagrams are provided merely as illustrative examples and are not intended to require or imply that the operations or steps of the various embodiments must be performed in the order presented. As will be appreciated by one skilled in the art, the order of steps in the foregoing embodiments may be performed in any order. Words such as "thereafter," "then," "next," etc., are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a multiprocessor, but, alternatively, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, solid-state drives (SSD), non-volatile memory express (NVMe) drives, three-dimensional (3D) NAND flash, or any other medium that may be used to store target program code in the form of instructions or data structures and that may be accessed by a computer. Modern technologies, such as cloud-based storage solutions, including infrastructure-as-a-service (IaaS) platforms, offer scalable and distributed options for storing and analyzing program code. Additionally, the operations of a method or algorithm may reside as one or any combination or set of codes and/or instructions on a non-transitory processor-readable medium and/or computer-readable medium, which may be incorporated into a computer program product. Emerging technologies, including quantum computing storage media and blockchain-based storage solutions, may further enhance data integrity and security. Artificial intelligence (AI) and machine learning (ML)-optimized hardware accelerators, such as graphical processing units (GPUs) and tensor processing units (TPUs), may be used to execute complex algorithms.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the claims are not intended to be limited to the embodiments shown herein but are to be accorded the widest scope consistent with the following claims and the principles and novel features disclosed herein.

What is claimed is:

1. A method of automated device provisioning and management in an edge computing system, comprising:

retrieving, by a processor in an edge computing system, self-provisioning parameters and device credentials from a database;

adding a new device to the system;

determining whether the number of devices allowed for a group is exceeded;

removing a device from the group in response to determining that the number of devices exceeds the allowed limit:

allowing more devices to be added to the group through a top-off process in response to determining that the number of devices does not exceed the allowed limit;

forming a trusted group of devices;

monitoring, adding, removing, or disabling devices based on policy for the trusted group or current system requirements;

forming a self-service group of devices;

changing the service or application provided via the network;

dynamically changing the group(s) the new device is associated with based on various factors or conditions;

assigning a virtual pre-shared key (vPSK) to a subnetwork or private local area network (LAN) that is assigned to a particular subscriber rather than to individual devices;

creating the private LAN and a virtual private cloud (vPC) within a larger network;

sharing the device credentials with upstream services; and generating and using virtual networks (vNets) to provision and manage the new device.

2. The method of claim 1, wherein retrieving the self-provisioning parameters and the device credentials from the database comprises retrieving information related to account identification, device name, medium access control (MAC) address, subscription services, quality of service (QoS), service enhancement capabilities, access restrictions, and group assignments.

3. The method of claim 1, wherein adding the new device to the system comprises:

detecting an unrecognized device attempting to connect to the network;

activating a self-provisioning process in response to detecting the unrecognized device;

authenticating and authorizing the unrecognized device locally; and automatically adding the unrecognized device as the new device to the edge computing system.

4. The method of claim 3, wherein authenticating and authorizing the unrecognized device locally comprises:

using stored credentials to verify the identity of the unrecognized device; and validating security features of the unrecognized device and compliance with network policies before granting access.

5. The method of claim 1, wherein forming a trusted group of devices comprises:

grouping devices based on trust levels and usage patterns;

using encryption and secure protocols for secure communication within the group; and modifying group membership based on device behavior and security status.

6. The method of claim 1, wherein dynamically changing the group(s) comprises:

evaluating real-time network performance metrics and device capabilities;

reassigning devices to different groups to optimize resource utilization and service delivery; and balancing network load during peak usage times by adjusting group memberships.

7. The method of claim 1, wherein assigning the vPSK to a subnetwork or the private LAN comprises:

generating a unique vPSK for the subnetwork;

configuring devices within the subnetwork to use the shared vPSK for secure communication; and managing the vPSK to ensure it remains secure and periodically updated.

8. The method of claim 1, wherein creating the private LAN and the vPC within a larger network comprises:

segregating network traffic to create isolated communication channels;

ensuring enhanced security and performance by isolating traffic and resources; and managing the private LAN and vPC to maintain optimal network operation.

9. The method of claim 1, wherein sharing the device credentials with upstream services for redundancy and resiliency comprises:

transmitting device credentials to cloud-based services or other network components;

ensuring device information is backed up and recoverable in case of failures; and periodically synchronizing credentials to maintain consistency across the system.

10. The method of claim 1, wherein implementing and using the vNets comprises:

creating isolated virtual network segments within the larger edge computing system;

configuring the vNets dynamically to form trusted domains;

providing enhanced security and control over network traffic; and establishing the vNets for specific groups of devices that provide secure communication and resource management.

11. A computing device, comprising:

a processing system configured to:

retrieve self-provisioning parameters and device credentials from a database;

add a new device to the system;

determine whether the number of devices allowed for a group is exceeded;

remove a device from the group in response to determining that the number of devices exceeds the allowed limit;

allow more devices to be added to the group through a top-off process in response to determining that the number of devices does not exceed the allowed limit;

form a trusted group of devices;

monitor, add, remove, or disable devices based on policy for the trusted group or current system requirements;

form a self-service group of devices;

change the service or application provided via the network;

dynamically change the group(s) the new device is associated with based on various factors or conditions;

assign a virtual pre-shared key (vPSK) to a subnetwork or private local area network (LAN) that is assigned to a particular subscriber rather than to individual devices;

create the private LAN and a virtual private cloud (vPC) within a larger network;

share the device credentials with upstream services; and generate and use virtual networks (vNets) to provision and manage the new device.

12. The computing device of claim 11, wherein the processing system is configured to retrieve the self-provisioning parameters and the device credentials from the database by retrieving information related to account identification, device name, medium access control (MAC) address, subscription services, quality of service (QoS), service enhancement capabilities, access restrictions, and group assignments.

13. The computing device of claim 11, wherein the processing system is configured to add the new device to the system by:

detecting an unrecognized device attempting to connect to the network;

activating a self-provisioning process in response to detecting the unrecognized device;

authenticating and authorizing the unrecognized device locally; and automatically adding the unrecognized device as the new device to the edge computing system.

14. The computing device of claim 11, wherein the processing system is configured to form a trusted group of devices by:

grouping devices based on trust levels and usage patterns;

using encryption and secure protocols for secure communication within the group; and modifying group membership based on device behavior and security status.

15. The computing device of claim 11, wherein the processing system is configured to dynamically change the group(s) by:

evaluating real-time network performance metrics and device capabilities;

reassigning devices to different groups to optimize resource utilization and service delivery; and balancing network load during peak usage times by adjusting group memberships.

16. The computing device of claim 11, wherein the processing system is configured to assign the vPSK to the subnetwork or the private LAN by:
generating a unique vPSK for the subnetwork;
configuring devices within the subnetwork to use the shared vPSK for secure communication; and
managing the vPSK to ensure it remains secure and periodically updated.

17. The computing device of claim 11, wherein the processing system is configured to create the private LAN and the vPC within a larger network by:
segregating network traffic to create isolated communication channels;
ensuring enhanced security and performance by isolating traffic and resources; and
managing the private LAN and vPC to maintain optimal network operation.

18. The computing device of claim 11, wherein the processing system is configured to share the device credentials with upstream services for redundancy and resiliency by:
transmitting device credentials to cloud-based services;
backing up device information; and
periodically synchronizing credentials to maintain consistency across the system.

19. The computing device of claim 11, wherein the processing system is configured to implement and use the vNets by:
creating isolated virtual network segments within the larger edge computing system;
configuring the vNets dynamically to form trusted domains;
providing enhanced security and control over network traffic; and
establishing the vNets for specific groups of devices that provide secure communication and resource management.

20. A non-transitory computer-readable storage medium having stored thereon processor-executable software instructions configured to cause a processing system to perform operations for automated device provisioning and management in an edge computing system, the operations comprising:
retrieving self-provisioning parameters and device credentials from a database;
adding a new device to the system;
determining whether the number of devices allowed for a group is exceeded;
removing a device from the group in response to determining that the number of devices exceeds the allowed limit;
allowing more devices to be added to the group through a top-off process in response to determining that the number of devices does not exceed the allowed limit;
forming a trusted group of devices;
monitoring, adding, removing, or disabling devices based on policy for the trusted group or current system requirements;
forming a self-service group of devices;
changing the service or application provided via the network;
dynamically changing the group(s) the new device is associated with based on various factors or conditions;
assigning a virtual pre-shared key (vPSK) to a subnetwork or private local area network (LAN) that is assigned to a particular subscriber rather than to individual devices;
creating the private LAN and a virtual private cloud (vPC) within a larger network; and
generating and using virtual networks (vNets) to provision and manage the new device.

* * * * *